(12) United States Patent
Shanley et al.

(10) Patent No.: US 7,508,590 B2
(45) Date of Patent: Mar. 24, 2009

US007508590B2

(54) OPTICAL SYSTEM FOR A DIGITAL LIGHT PROJECTION SYSTEM INCLUDING 3-CHANNEL AND 4-CHANNEL LED ARRAY LIGHT ENGINES

(75) Inventors: James F. Shanley, Westborough, MA (US); Christopher T. Cotton, Honeoye Falls, NY (US)

(73) Assignee: Scram Technologies, Inc., Dunkirk, MD (US)

( * ) Notice: Subject to any disclaimer, the term of this patent is extended or adjusted under 35 U.S.C. 154(b) by 129 days.

(21) Appl. No.: 11/375,356

(22) Filed: Mar. 13, 2006

(65) Prior Publication Data

US 2007/0132958 A1 Jun. 14, 2007

Related U.S. Application Data

(63) Continuation-in-part of application No. 11/299,281, filed on Dec. 9, 2005.

(51) Int. Cl.
*G02B 27/14* (2006.01)
*G02B 25/00* (2006.01)

(52) U.S. Cl. ........................................ 359/629; 359/645

(58) Field of Classification Search .................. 359/629
See application file for complete search history.

(56) References Cited

U.S. PATENT DOCUMENTS

| | | | |
|---|---|---|---|
| 2,215,900 | A | 9/1940 | Bitner |
| 2,254,961 | A | 9/1941 | Harris |
| 5,700,076 | A | 12/1997 | Minich et al. |
| 5,757,557 | A | 5/1998 | Medvedev et al. |
| 6,227,682 | B1 | 5/2001 | Li |
| 6,547,423 | B2 | 4/2003 | Marshall et al. |
| 6,580,469 | B1 | 6/2003 | Rieche et al. |
| 6,595,673 | B1 | 7/2003 | Ferrante et al. |
| 6,619,820 | B2 | 9/2003 | Li |

(Continued)

OTHER PUBLICATIONS

Automated optimization advances software for illumination design. Laser Focus World, Nov. 2004. Author: William Cassarly, 3 pages.

*Primary Examiner*—Jordan M. Schwartz
*Assistant Examiner*—James C Jones
(74) *Attorney, Agent, or Firm*—Matthew J. Esserman

(57) ABSTRACT

An optical system for a digital light projection system is provided. The optical system comprises a plurality of LED arrays, wherein each LED array comprises a plurality of LEDs. The optical system also comprises an optical concentrator element positioned substantially adjacent to each of the LED arrays, wherein each concentrator element reflects light emitted from the plurality of LEDs within the corresponding LED array so as to provide substantially uniform light at an output surface of each concentrator element. The optical system preferably further comprises an optical combiner element, wherein the output surface of each concentrator element is optically aligned with a corresponding side of the combiner element, and wherein the combiner element chromatically combines the substantially uniform light provided at the output surface of each concentrator element so as to form color-combined light at an output surface of the combiner element. In one embodiment, the combiner element comprises a first dichroic element and a second dichroic element, and wherein the first dichroic element and the second dichroic element are positioned substantially adjacent to each other and are angled with respect to each other so as to form a substantially V-shaped pattern.

37 Claims, 24 Drawing Sheets

| ITEM NO. | QTY. | PART NO. |
|---|---|---|
| 1 | 1 | OSA Armature 2-25-05 |
| 2 | 1 | Projection Housing 2-25-05 |
| 9 | 1 | Lens 6-8300-01-006 |
| 22 | 1 | DMD PC Board 2-09-05 |
| 32 | 1 | Lens Strap 1 |
| 33 | 1 | Lens Strap 2 |
| 52 | 1 | Turning Mirror 2 3-09-05 |
| 53 | 1 | Turning Mirror 1 |
| 55 | 1 | TIR Prism Cover-top |
| 57 | 1 | TIR Prism Cover-front |
| 58 | 1 | Beam Dump |
| 66 | 1 | Illuminator Housing 3-8-05 |
| 71 | 1 | LED Housing |
| 87 | 3 | LED Heat Sink |

U.S. PATENT DOCUMENTS

| | | | |
|---|---|---|---|
| 6,724,543 B1 | 4/2004 | Chinniah et al. | |
| 6,739,726 B2 | 5/2004 | Li | |
| 6,819,505 B1 | 11/2004 | Cassarly et al. | |
| 6,819,506 B1 | 11/2004 | Taylor et al. | |
| 6,836,576 B2 | 12/2004 | Li | |
| 6,856,436 B2 | 2/2005 | Brukilacchio et al. | |
| 6,856,727 B2 | 2/2005 | Li | |
| 6,857,772 B2 | 2/2005 | Brukilacchio | |
| 6,871,982 B2 | 3/2005 | Holman et al. | |
| 6,926,435 B2 | 8/2005 | Li | |
| 6,942,365 B2 | 9/2005 | Galli | |
| 6,969,177 B2 | 11/2005 | Li et al. | |
| 6,974,234 B2 | 12/2005 | Galli | |
| 7,002,745 B2 | 2/2006 | Li | |
| 7,006,288 B2 | 2/2006 | Li | |
| 7,020,368 B2 | 3/2006 | Li | |
| 7,072,096 B2 | 7/2006 | Holman et al. | |
| 7,106,936 B2 | 9/2006 | Saccomanno | |
| 7,151,874 B2 | 12/2006 | Li | |
| 7,153,015 B2 | 12/2006 | Brukilacchio | |
| 7,172,290 B2 | 2/2007 | Li | |
| 2002/0176175 A1* | 11/2002 | Kamo | 359/645 |
| 2005/0201100 A1 | 9/2005 | Cassarly et al. | |
| 2006/0126178 A1* | 6/2006 | Li | 359/485 |
| 2006/0139580 A1* | 6/2006 | Conner | 353/98 |
| 2006/0164600 A1* | 7/2006 | Morejon et al. | 353/31 |
| 2006/0164857 A1* | 7/2006 | Morejon et al. | 362/555 |

* cited by examiner

| ITEM NO. | QTY. | PART NO. |
|---|---|---|
| 1 | 1 | OSA Armature 2-25-05 |
| 2 | 1 | Projection Housing 2-25-05 |
| 9 | 1 | Lens 6-8300-01-006 |
| 22 | 1 | DMD PC Board 2-09-05 |
| 32 | 1 | Lens Strap 1 |
| 33 | 1 | Lens Strap 2 |
| 52 | 1 | Turning Mirror 2 3-09-05 |
| 53 | 1 | Turning Mirror 1 |
| 55 | 1 | TIR Prism Cover-top |
| 57 | 1 | TIR Prism Cover-front |
| 58 | 1 | Beam Dump |
| 66 | 1 | Illuminator Housing 3-8-05 |
| 71 | 1 | LED Housing |
| 87 | 3 | LED Heat Sink |

Left View

Right View

Plan View

| ITEM NO. | QTY. | PART NO. |
|---|---|---|
| 1 | 2 | M2 PIN |
| 2 | 1 | alignment disk |
| 3 | 1 | 1pc housing |
| 4 | 4 | Prism 1, 8300-01-301 |
| 5 | 3 | aperture |
| | | |
| | | |
| 8 | 1 | prism retainer |
| | | |
| | | |
| 11 | 1 | Prism oring |
| | | |
| 13 | 3 | S_1064 spring |
| 14 | 3 | OCE bd-3n |
| 15 | 96 | LL-CREE XB290 Die |
| 16 | 3 | OCE for X-cube 1_finished |
| 17 | 3 | small heat spreader |
| 18 | 3 | OCE lock |
| 19 | 3 | Custom heat sink |
| 20 | 3 | OCE Holder2 |
| | | |

200

OPTICAL SYSTEM FOR A DIGITAL LIGHT PROJECTION SYSTEM INCLUDING 3-CHANNEL AND 4-CHANNEL LED ARRAY LIGHT ENGINES

This application is a continuation-in-part of U.S. patent application Ser. No. 11/299,281, filed Dec. 9, 2005.

FIELD OF THE INVENTION

The present invention relates generally to the field of digital light projection systems, and, more specifically, to optical systems for digital light projection systems including 3-channel and 4-channel LED array light engines.

BACKGROUND OF THE INVENTION

For digital light projection (DLP) systems, a need exists for an optical system capable of producing a substantially uniform and substantially white light in the illumination path. Traditional optical systems for DLP systems typically include light sources such as, for example, high intensity mercury lamps or xenon lamps. However, these traditional optical systems and corresponding light sources suffer from drawbacks such as, for example, non-uniformity of light, non-white light, and insufficient brightness. Moreover, the excess heat generation and high design complexity of these traditional optical systems require complicated and expensive procedures and techniques to manufacture the optical systems.

Thus, it is desirable to provide an optical system which is able to overcome the above disadvantages and which can be manufactured in an inexpensive and efficient fashion.

It is therefore desirable to provide an optical system including LED arrays and corresponding optical concentrator elements that can be utilized in DLP systems, and that does not suffer from the above drawbacks experienced by traditional optical systems. Additionally, while addressing these problems, the optical system including LED arrays and corresponding optical concentrator elements of the present invention will simultaneously provide superior uniformity of light, white light, and brightness desired in DLP systems.

These and other advantages of the present invention will become more fully apparent from the detailed description of the invention hereinbelow.

SUMMARY OF THE INVENTION

The present invention is directed to an optical system for a digital light projection system, the optical system comprising a plurality of LED arrays, wherein each LED array comprises a plurality of LEDs. The optical system also comprises an optical concentrator element positioned substantially adjacent to each of the LED arrays, wherein each concentrator element totally internally or specularly reflects light emitted from the plurality of LEDs within the corresponding LED array so as to provide substantially uniform light at an output surface of each concentrator element. The optical system may further comprise an optical combiner element, wherein the output surface of each concentrator element is optically aligned with a corresponding side of the combiner element, and wherein the combiner element spatially or chromatically combines the substantially uniform light provided at the output surface of each concentrator element so as to form substantially white light or color-combined light at an output surface of the combiner element.

BRIEF DESCRIPTION OF THE DRAWINGS

For the present invention to be clearly understood and readily practiced, the present invention will be described in conjunction with the following figures, wherein.

DETAILED DESCRIPTION OF THE PREFERRED EMBODIMENTS

Figure 1:
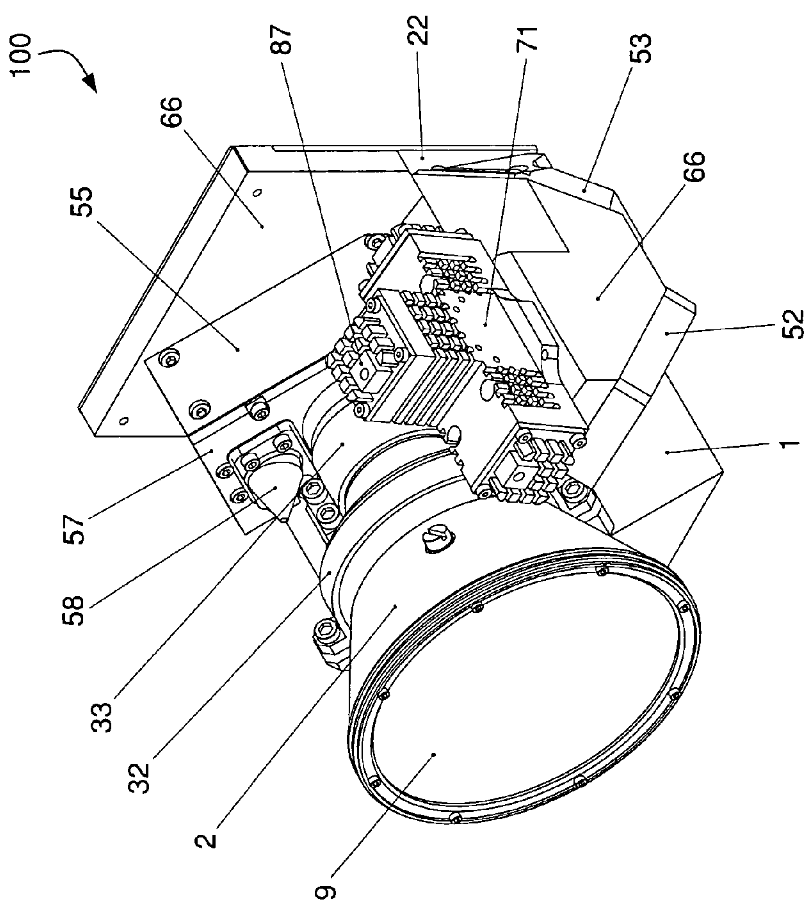
FIG. 1 is an isometric view illustrating a digital light projection system including a 3-channel LED array configuration, in accordance with a preferred embodiment of the present invention.

It is to be understood that the figures and descriptions of the present invention may have been simplified to illustrate elements that are relevant for a clear understanding of the present invention, while eliminating, for purposes of clarity, other elements found in a typical digital light projection system. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Illustrated in FIG. 1 is a digital light projection (DLP) system 100 in accordance with an preferred exemplary embodiment of the present invention. The DLP system is an assembly and orientation of components including an armature 1, projection housing 2, lens 9, digital micromirror device (DMD) board 22, lens straps 32,33, turning (folding) mirrors 52,53, total internal reflection (TIR) prism top cover 55, TIR prism front cover 57, beam dump 58, illuminator housing 66, light emitting diode (LED) housing 71, and LED heat sink 87. Although a DMD is utilized in this configuration as the digital imaging device 75 (see FIGS. 10-12), alternative digital imaging devices may be contemplated.

Figure 2:
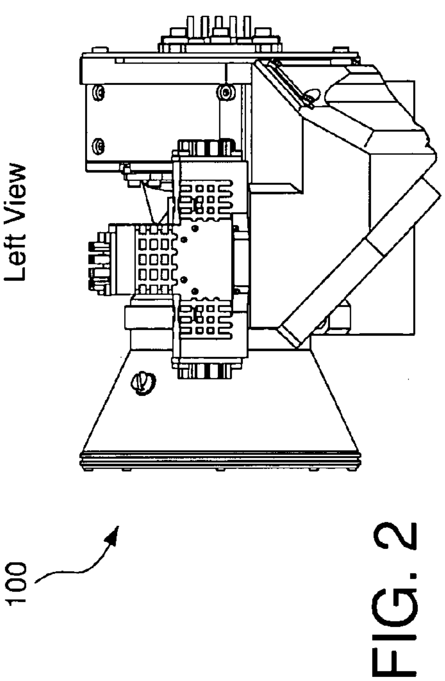
FIG. 2 is a left side view of the digital light projection system shown in FIG. 1.
Figure 3:
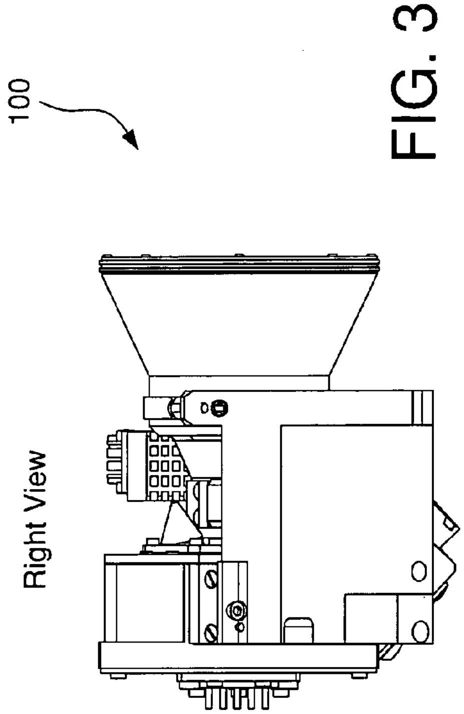
FIG. 3 is a right side view of the digital light projection system shown in FIG. 1.
Figure 4:
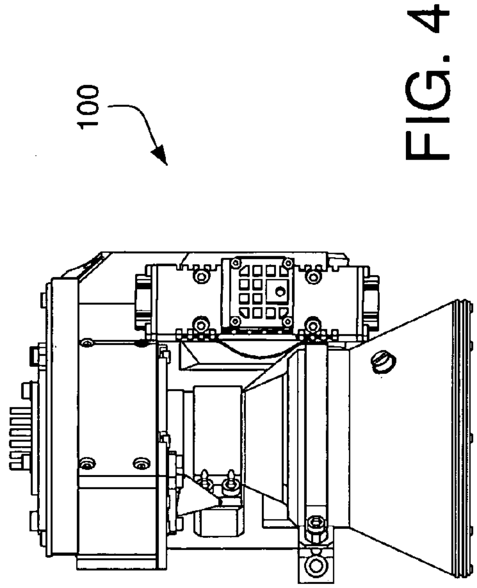
FIG. 4 is a plan view of the digital light projection system shown in FIG. 1.
Figure 5:
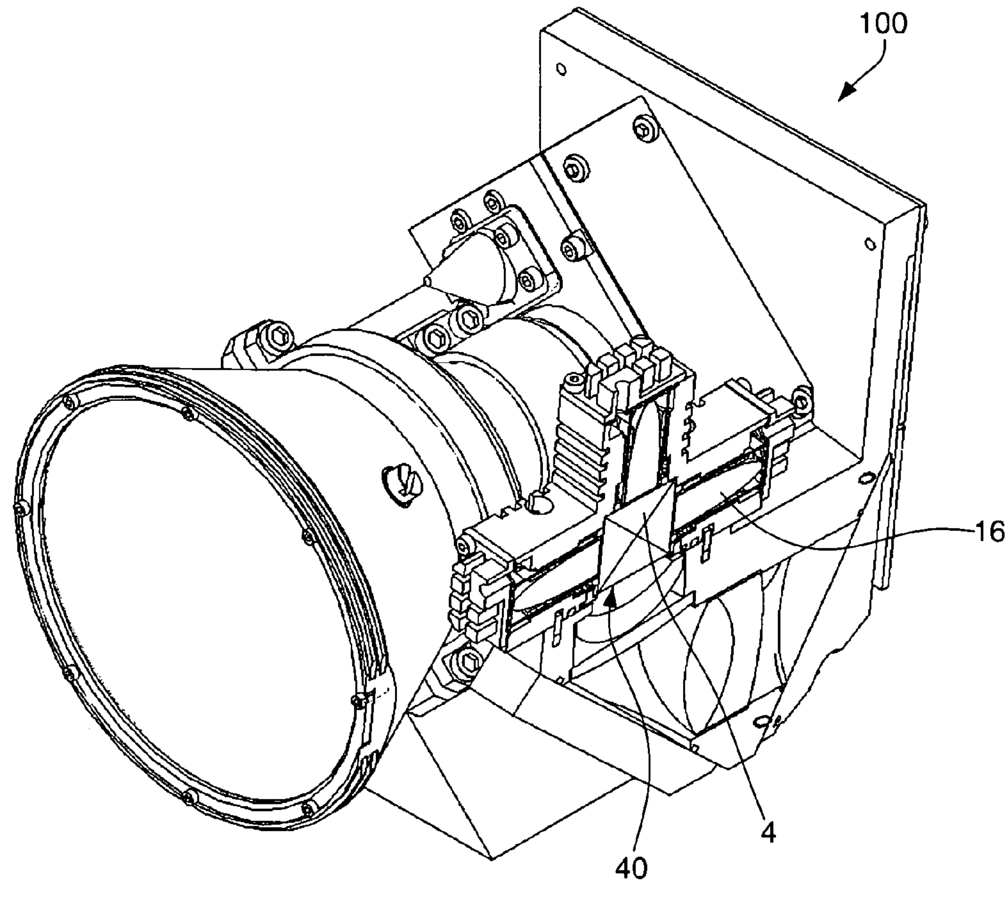
FIG. 5 is a cross-sectional view of the digital light projection system shown in FIG. 1.

FIG. 2 is a left side view of the DLP system 100 shown in FIG. 1. FIG. 3 is a right side view of the DLP system 100 shown in FIG. 1. FIG. 4 is a plan view of the DLP system 100 shown in FIG. 1. FIG. 5 is a cross-sectional view of the DLP system 100 shown in FIG. 1.

Figure 6:
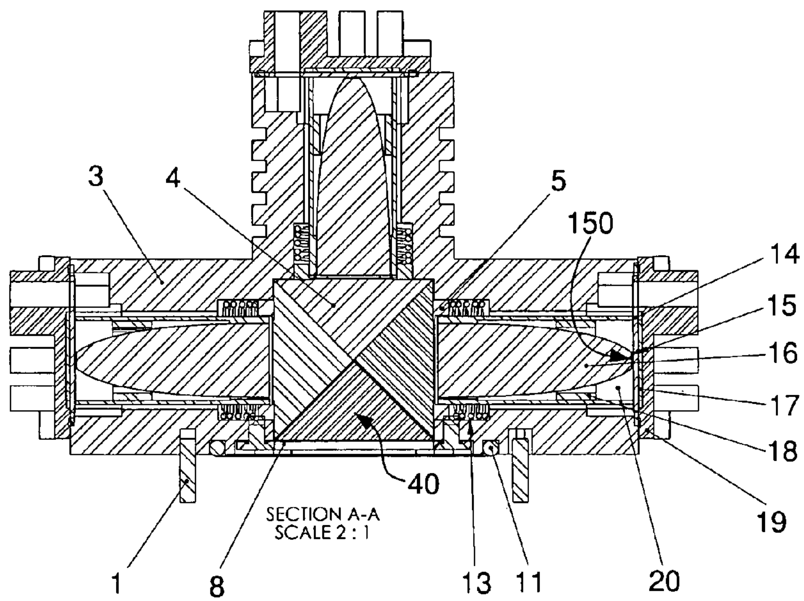
FIG. 6 is an enlarged, cross-sectional left side view of a portion of the digital light projection system shown in FIG. 1, including the 3 optical concentrator elements, the optical combiner element, and the 3 LED arrays.

FIG. 6 (with reference to the cross-sectional portion of FIG. 5) is an enlarged, cross-sectional left side view of a portion of the DLP system 100 shown in FIG. 1, including 3 optical concentrator elements 16, an optical combiner element 40, and 3 LED arrays 150. FIG. 6 also illustrates a pin 1, alignment disk 2, housing 3 (preferably aluminum which is cast or machined), prism 4, aperture 5, prism retainer 8, prism o-ring 11, spring 13, optical concentrator element board (or LED array mounting board) 14, LED (die) 15, small heat spreader 17, optical concentrator element lock 18, custom heat sink 19, and optical concentrator element holder 20. Although it is shown that, in this preferred example, one particular type of LED is utilized (i.e. LL-CREE XB290—for one of the 3 channels), other LEDs from other manufacturers may of course be contemplated. The number of LEDs per each LED array is preferably 32 but this number may vary. Also, the number of LEDs in one LED array may differ from that in another LED array.

Figure 7:
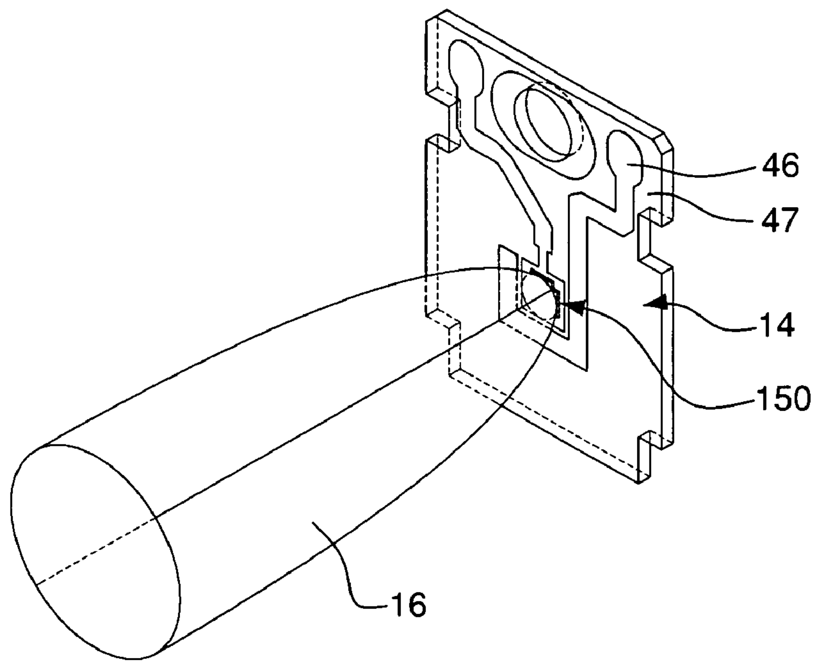
FIG. 7 is an enlarged, isometric view of a portion of the digital light projection system shown in FIG. 1, including the optical concentrator element, the LED array and corresponding LED array mounting board.

FIG. 7 is an enlarged, isometric view of a portion of the DLP system 100 shown in FIG. 1, including an optical concentrator element 16, an LED array 150 and corresponding LED array mounting board 14. FIG. 7 also illustrates a preferred LED circuit trace 46 comprising, for example, gold. The LED array mounting board 14 comprises an LED submount/board 47 comprising, for example, beryllium oxide. The LEDs 15 may be directly mounted on LED array mounting board 14 or via a supplemental board therebetween.

Figure 8:
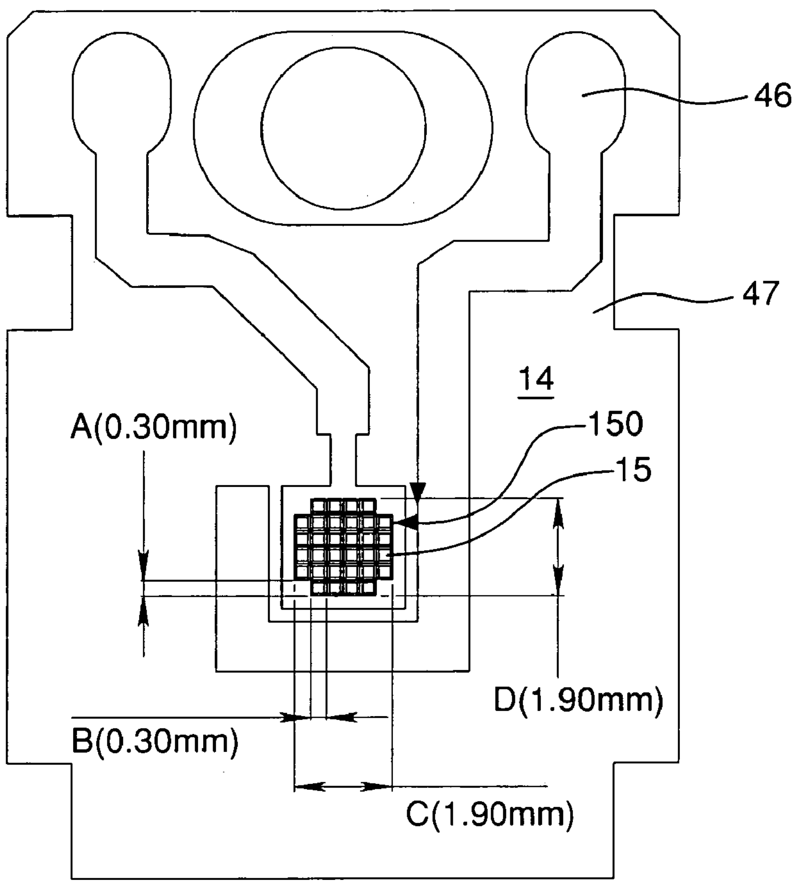
FIG. 8 is an enlarged, plan view of a portion of the digital light projection system shown in FIG. 1, including the LED array and corresponding LED array mounting board.
Figure 9:
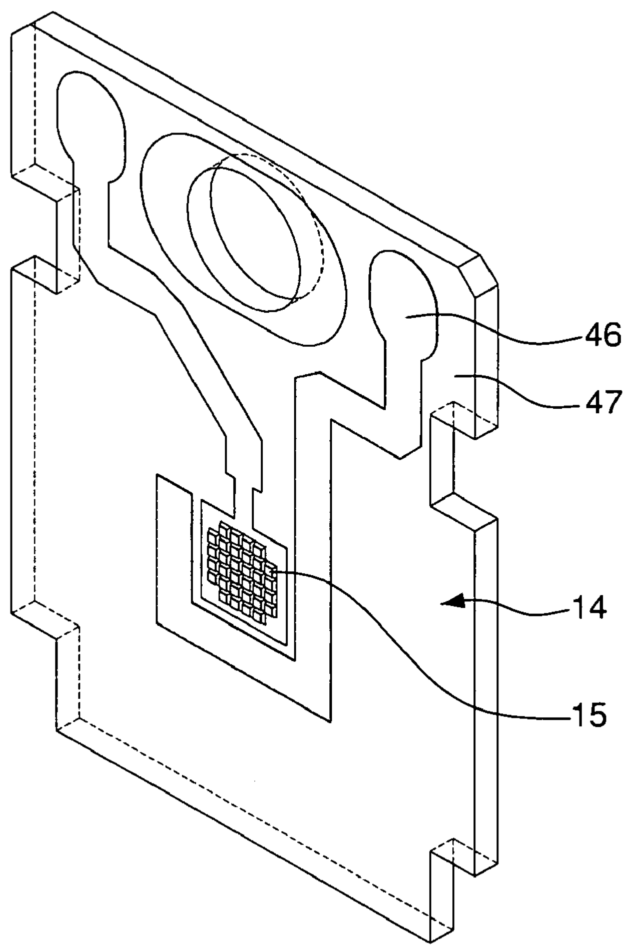
FIG. 9 is an isometric view of a portion of the digital light projection system shown in FIG. 1, including the LED array and corresponding LED array mounting board.

FIG. 8 is an enlarged, plan view of a portion of the DLP system 100 shown in FIG. 1, including an LED array 150 and corresponding LED array mounting board 14. The preferred dimensions and spacings of the LEDs 15 in the corresponding LED array 150 are as illustrated in FIG. 8 (i.e. A=0.30 mm, B=0.30 mm, C=1.90 mm, and D=1.90 mm). It is noted that other dimensions and spacings may be contemplated. FIG. 9 is an isometric view of a portion of the DLP system 100 shown in FIG. 1.

The optical concentrator element 16 is positioned substantially adjacent to each LED array 150, wherein each concentrator element 16 totally internally reflects light emitted from the plurality of LEDs 15 within the corresponding LED array 150 so as to provide substantially uniform light at an output surface of each concentrator element 16. The concentrator element 16 is formed by diamond-turning or mold processes. The concentrator element 16 preferably comprises a plastic, glass, or polymer material, or combinations thereof, that can withstand high heat such as, for example, Zeonex®. The concentrator element 16 is positioned directly in contact with each LED array. In the exemplary embodiment illustrated in the drawings, the concentrator element 16 is solid and TIR is employed therein. However, a reflective layer may be formed on portions (or the entire) outer surface of the concentrator element 16 to effect specular reflection instead of TIR. Alternative, the concentrator element 16 may be hollow and have reflective surfaces to achieve specular reflection. A concentrator element 16 having a combination of TIR and specular reflective portions may alternatively be contemplated.

The DLP system 100 may additionally include an optical coupling material positioned between the concentrator element and each LED array, wherein the optical coupling material is in contact with the concentrator element and each LED array. The optical coupling material preferably comprises a gel having an index of refraction which substantially matches that of the concentrator element.

Each LED array comprises LEDs which are preferably less than 0.35 mm in width, with 0.30 mm more preferably being the optimum width. Each LED array comprises LEDs which are spaced from adjacent LEDs within the same array by an amount preferably less than 0.025 mm, with 0.02 mm more preferably being the optimum spacing.

The concentrator element 16 preferably has a conic shape, and more preferably has a complex conic shape. The concentrator element 16 may either have a substantially parabolic cross section, a cross section which is a portion of a substantially hyperbolic shape, a cross section which is a portion of a substantially elliptical shape, or combinations thereof.

The DLP system 100 preferably further comprises an optical combiner element 40, wherein the output surface of each concentrator element 16 is positioned substantially adjacent to a corresponding side of the combiner element 40, and wherein the combiner element 40 spatially combines the substantially uniform light provided at the output surface of each concentrator element 16 so as to form substantially white light at an output surface of the combiner element 40.

The combiner element 40 preferably is a combiner cube which preferably comprises 4 prisms which are preferably composed of plastic, glass, polymer, or combinations thereof, with BK7 glass being the more preferred material. Dichroic coatings are preferably positioned between the prisms. The combiner element 40 preferably has an antireflective coating on the outside surfaces thereof. The combiner cube may be the type which is known in the art as an "X-Cube". Although other types of combiner elements may be contemplated.

In the configuration shown in FIG. 6, the combiner element allows red light from the left concentrator element 16 to be reflected downward, while being transmissive to green and blue from the other concentrator elements 16. Similarly, the same combiner element allows blue light from the right concentrator element 16 to be reflected downward, while being transmissive to green and red from the other concentrator elements 16. However, the same combiner element is transmissive for allowing the green light from the top concentrator element 16 to be transmitted downward. Of course, the locations of these colors may be varied or switched.

The plurality of LED arrays preferably consists of 3 LED arrays, wherein the 3 LED arrays preferably consist of 3 single-color LED arrays, and wherein each of the 3 single-color LED arrays is preferably of a different color from one another. More preferably, the 3 single-color LED arrays consist of an LED array consisting of only red LEDs, an LED array consisting of only green LEDs, and an LED array consisting of only blue LEDs. However, multi-color LED arrays (i.e. an LED array having multi-colored LEDs within the same LED array) may alternatively be contemplated.

Figure 10:
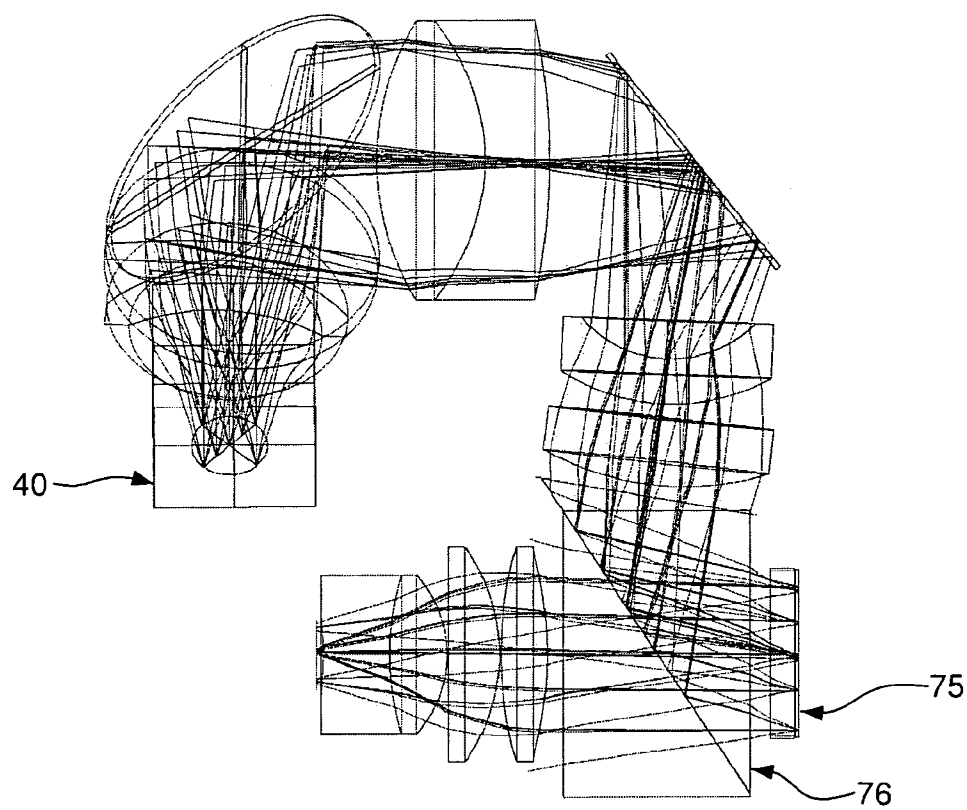
FIG. 10 is a plan view of a portion of the digital light projection system shown in FIG. 1, including the optical combiner element, illumination optics, total internal reflection (TIR) prism, digital imaging device, and projection optics.
Figure 11:
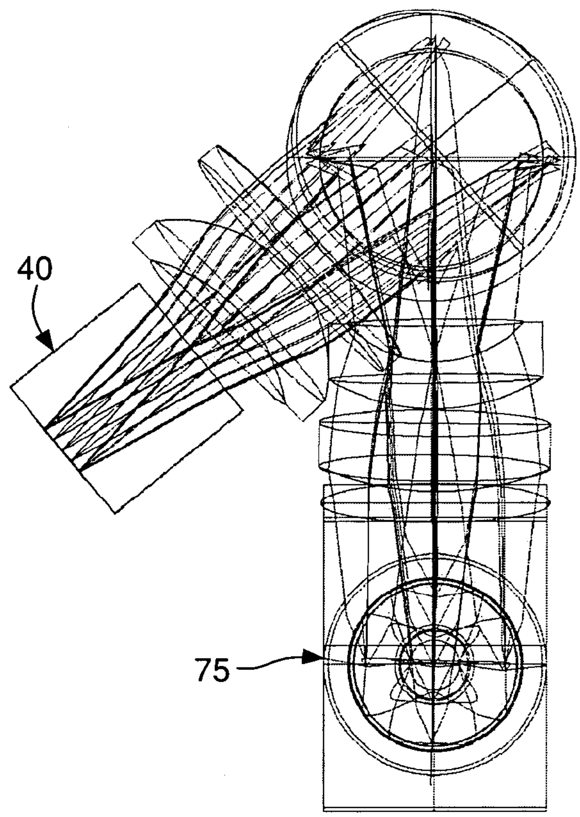
FIG. 11 is a left side view of the configuration shown in FIG. 10.
Figure 12:
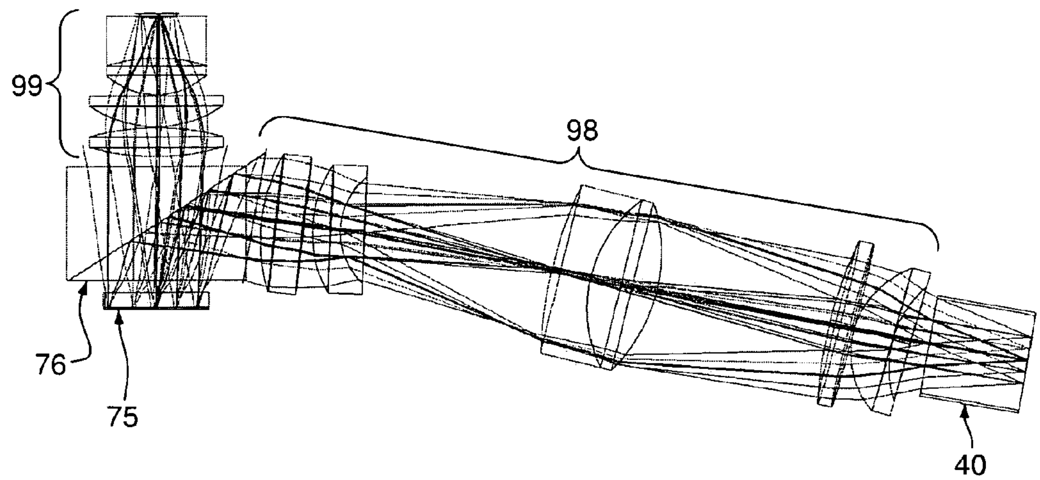
FIG. 12 is an unfolded plan view of the configuration shown in FIG. 10.

FIG. 10 is a plan view of a portion of the DLP system 100 shown in FIG. 1, including the optical combiner element 40, TIR cube 76 (e.g. preferably comprising 2 prisms with preferably an air interface (gap) therebetween), and digital imaging device 75. Sample ray traces are also illustrated in FIGS. 10-12. FIG. 11 is a left side view of the configuration shown in FIG. 10. FIG. 12 is an unfolded plan view of the configuration shown in FIG. 10. FIG. 12 also identifies the optical system which comprises illumination optics 98 and projection optics 99 portions of the DLP system 100.

Commonly available optical design software such as, for example, ZEMAX (Focus Software, Inc.) may be used to assist in describing the various characteristics (e.g. radius, thickness, glass type, diameter, and whether the surface is conic) corresponding to each surface region of each individual elements/groups within the optical system. In the preferred exemplary configuration shown in FIGS. 10 and 11, the ZEMAX software outputs surface data describing these surface characteristics as illustrated in Tables 1 and 2. Table 1 specifically illustrates data corresponding to the illumination optics 98 portion of the DLP system 100 while Table 2 specifically illustrates data corresponding to the projection optics 99 portion of the DLP system 100.

Of course, other surface data values for each individual element/group will become apparent to those of ordinary skill in the art in light of the present disclosure and may therefore be determined through routine experimentation dependent, inter alia, on the overall configuration and positioning of the individual elements/groups within the optical system, and the quality of the image desired.

TABLE 1

ZEMAX Software Output Describing Surface Data Summary and Detail for Each Individual Element within the Illumination Optical System 98

GENERAL LENS DATA:

Surfaces: 58
Stop: 18
System Aperture: Object Space NA = 0.342
Telecentric Mode: On
Glass Catalogs: OHARA SCHOTT
Ray Aiming: Off
Apodization: Uniform, factor = 0.00000E+000
Effective Focal Length: 8.441475 (in air at system temperature and pressure)
Effective Focal Length: 8.441475 (in image space)
Back Focal Length: −1.62518
Total Track: 103.0885
Image Space F/#: 1.159715e−009
Paraxial Working F/#: 3.000081
Working F/#: 3.786189
Image Space NA: 0.1643947
Object Space NA: 0.342
Stop Radius: −14.12827
Paraxial Image Height: 10.26355
Paraxial Magnification: −2.183735
Entrance Pupil Diameter: 7.278919e+009
Entrance Pupil Position: 1e+010
Exit Pupil Diameter: 6.144481
Exit Pupil Position: −0.7151799

TABLE 1-continued

ZEMAX Software Output Describing Surface Data Summary and Detail for Each Individual Element within the Illumination Optical System 98

Field Type: Object height in Millimeters
Maximum Field: 4.7
Primary Wave: 0.525
Lens Units: Millimeters
Angular Magnification: 1.184627e+009

Fields: 8
Field Type: Object height in Millimeters

| # | X-Value | Y-Value | Weight |
|---|---|---|---|
| 1 | 0.000000 | −4.700000 | 1.000000 |
| 2 | −4.700000 | 0.000000 | 1.000000 |
| 3 | 0.000000 | 0.000000 | 1.000000 |
| 4 | 0.000000 | 4.700000 | 1.000000 |
| 5 | −4.700000 | 0.000000 | 1.000000 |
| 6 | 0.000000 | 2.350000 | 1.000000 |
| 7 | 0.000000 | −2.350000 | 1.000000 |
| 8 | 4.680000 | 0.000000 | 1.000000 |

Vignetting Factors

| # | VDX | VDY | VCX | VCY | VAN |
|---|---|---|---|---|---|
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |
| 4 | 0.000000 | 0.000000 | 0.000000 | 0.000000 | 0.000000 |
| 5 | 0.000000 | 0.000000 | 0.000000 | 0.000000 | 0.000000 |
| 6 | 0.000000 | 0.000000 | 0.000000 | 0.000000 | 0.000000 |
| 7 | 0.000000 | 0.000000 | 0.000000 | 0.000000 | 0.000000 |
| 8 | 0.000000 | 0.000000 | 0.000000 | 0.000000 | 0.000000 |

Wavelengths: 3
Units: µm

| # | Value | Weight |
|---|---|---|
| 1 | 0.460000 | 0.100000 |
| 2 | 0.525000 | 0.100000 |
| 3 | 0.638000 | 0.100000 |

SURFACE DATA SUMMARY:

| Surf | Type | Comment | Radius | Thickness | Glass | Diameter | Conic |
|---|---|---|---|---|---|---|---|
| OBJ | TILTSURF | | — | −0.1 | | 9.4 | — |
| 1 | COORDBRK | | — | 0 | | — | — |
| 2 | COORDBRK | | — | 0 | | — | — |
| 3 | STANDARD | | Infinity | −20 | BK7 | 9.946429 | 0 |
| 4 | STANDARD | | Infinity | 0 | | 19.67943 | 0 |
| 5 | COORDBRK | | — | −8.5 | | — | — |
| 6 | COORDBRK | | — | 0 | | — | — |
| 7 | STANDARD | | 21.71 | −7.891024 | S-TIM5 | 24 | 0 |
| 8 | STANDARD | | 18.25 | −0.5 | | 30 | 0 |
| 9 | COORDBRK | | — | 0 | | — | — |
| 10 | STANDARD | | Infinity | −4.557022 | S-LAH66 | 34 | 0 |
| 11 | STANDARD | | 88.4428 | −20 | | 34 | 0 |
| 12 | COORDBRK | | — | 0 | | — | — |
| 13 | STANDARD | | Infinity | 0 | MIRROR | 48.54833 | 0 |
| 14 | COORDBRK | | — | 15 | | — | — |
| 15 | COORDBRK | | — | 0 | | — | — |
| 16 | STANDARD | | 33.39 | 13.54779 | S-PHM52 | 35 | 0 |
| 17 | STANDARD | | −27.48 | 8 | S-TIH6 | 35 | 0 |
| STO | STANDARD | | −86.487 | 18 | | 30.58858 | 0 |
| 19 | COORDBRK | | — | 0 | | — | — |
| 20 | STANDARD | | Infinity | 0 | MIRROR | 32.50427 | 0 |
| 21 | COORDBRK | | — | −25 | | — | — |
| 22 | COORDBRK | | — | 0 | | — | — |
| 23 | STANDARD | | 14.454 | −5.741131 | S-LAH66 | 21.5 | 0 |
| 24 | STANDARD | | 24.38 | −1.792458 | | 26 | 0 |
| 25 | COORDBRK | | — | 0 | | — | — |
| 26 | STANDARD | | Infinity | −8.394174 | S-LAH66 | 26.89927 | 0 |
| 27 | STANDARD | | 35.2 | −1.5 | | 27.97676 | 0 |
| 28 | COORDBRK | | — | 0 | | — | — |

TABLE 1-continued

ZEMAX Software Output Describing Surface Data Summary and Detail for Each Individual Element within the Illumination Optical System 98

| | | | | | | |
|---|---|---|---|---|---|---|
| 29 | STANDARD | Infinity | 0 | | 27.73099 | 0 |
| 30 | STANDARD | Infinity | 0 | BK7 | 27.73099 | 0 |
| 31 | COORDBRK | — | 0 | | — | — |
| 32 | COORDBRK | — | 0 | | — | — |
| 33 | STANDARD | Infinity | 0 | MIRROR | 46.07963 | 0 |
| 34 | COORDBRK | — | 0 | | — | — |
| 35 | COORDBRK | — | 0 | | — | — |
| 36 | STANDARD | Infinity | 2.5 | | 23.09484 | 0 |
| 37 | STANDARD | Infinity | 3 | FK5 | 19.75174 | 0 |
| 38 | STANDARD | Infinity | 0.5 | | 20.79397 | 0 |
| 39 | STANDARD | Infinity | 0 | | 21.06476 | 0 |
| 40 | COORDBRK | — | 0 | | — | — |
| 41 | PARAXIAL | — | 0 | | 9369.208 | — |
| 42 | COORDBRK | — | 0 | | — | — |
| 43 | PARAXIAL | — | 0 | | 21.06476 | — |
| 44 | STANDARD | Infinity | −0.5 | MIRROR | 21.06476 | 0 |
| 45 | STANDARD | Infinity | −3 | FK5 | 20.86724 | 0 |
| 46 | STANDARD | Infinity | −2.5 | | 21.35858 | 0 |
| 47 | STANDARD | Infinity | −23 | BK7 | 22.46585 | 0 |
| 48 | STANDARD | Infinity | −2 | | 29.18505 | 0 |
| 49 | STANDARD | −49.071 | −5.7785 | S-PHM53 | 27 | 0 |
| 50 | STANDARD | 49.071 | −0.2 | | 27 | 0 |
| 51 | STANDARD | −23.88 | −6.194 | S-BSM81 | 27 | 0 |
| 52 | STANDARD | Infinity | −0.2 | | 27 | 0 |
| 53 | STANDARD | −14.732 | −7.297 | S-FSL5 | 20 | 0 |
| 54 | STANDARD | 35.2 | −8.181 | S-TIH6 | 20 | 0 |
| 55 | STANDARD | −32 | −0.91 | | 9.749377 | 0 |
| 56 | STANDARD | Infinity | 0 | | 8.773558 | 0 |
| 57 | STANDARD | Infinity | 0 | | 8.773558 | 0 |
| IMA | STANDARD | Infinity | | | 8.35577 | 0 |

SURFACE DATA DETAIL:

Surface OBJ: TILTSURF
X Tangent: 0
Y Tangent: 0
Surface 1: COORDBRK
Decenter X: 0
Decenter Y: 0
Tilt About X: 0
Tilt About Y: 0
Tilt About Z: −131
Order: Decenter then tilt
Surface 2: COORDBRK
Decenter X: 0
Decenter Y: 0
Tilt About X: 0
Tilt About Y: 0
Tilt About Z: −2.9
Order: Decenter then tilt
Surface 3: STANDARD
Aperture: Rectangular Aperture
X Half Width: 10
Y Half Width: 10
X-Decenter: 0
Y-Decenter: −0.5
Surface 4: STANDARD
Aperture: Rectangular Aperture
X Half Width: 10
Y Half Width: 10
X-Decenter: 0
Y-Decenter: −0.5
Surface 5: COORDBRK
Decenter X: −5.2218237
Decenter Y: 0.54365794
Tilt About X: 1.9041816
Tilt About Y: −15.502077
Tilt About Z: 2.9
Order: Decenter then tilt
Surface 6: COORDBRK
Decenter X: 3.3921034
Decenter Y: −0.66705067
Tilt About X: −5.3573672
Tilt About Y: 19.739401
Tilt About Z: 0
Order: Decenter then tilt TABLE 1-continued

| ZEMAX Software Output Describing Surface Data Summary and Detail for Each Individual Element within the Illumination Optical System 98 |
|---|
| Surface 7: STANDARD<br>Aperture: Circular Aperture<br>Minimum Radius: 0<br>Maximum Radius: 12<br>Surface 8: STANDARD<br>Aperture: Circular Aperture<br>Minimum Radius: 0<br>Maximum Radius: 15<br>Surface 9: COORDBRK<br>Decenter X: 0.14501681<br>Decenter Y: −1.0712542<br>Tilt About X: −0.066043177<br>Tilt About Y: −2.1064114<br>Tilt About Z: 0<br>Order: Decenter then tilt<br>Surface 10: STANDARD<br>Aperture: Circular Aperture<br>Minimum Radius: 0<br>Maximum Radius: 17<br>Surface 11: STANDARD<br>Aperture: Circular Aperture<br>Minimum Radius: 0<br>Maximum Radius: 17<br>Surface 12: COORDBRK<br>Decenter X: 0<br>Decenter Y: 0<br>Tilt About X: 47.8<br>Tilt About Y: 0<br>Tilt About Z: 0<br>Order: Decenter then tilt<br>Surface 13: STANDARD<br>Aperture: Elliptical Aperture<br>X Half Width: 17<br>Y Half Width: 23<br>X-Decenter: 0<br>Y-Decenter: 2.5<br>Surface 14: COORDBRK<br>Decenter X: 0<br>Decenter Y: 0<br>Tilt About X: 47.8<br>Tilt About Y: 0<br>Tilt About Z: 0<br>Order: Decenter then tilt<br>Surface 15: COORDBRK<br>Decenter X: 0.99137317<br>Decenter Y: 3.376614<br>Tilt About X: −1.475471<br>Tilt About Y: −0.81685172<br>Tilt About Z: 131<br>Order: Decenter then tilt<br>Surface 16: STANDARD<br>Aperture: Circular Aperture<br>Minimum Radius: 0<br>Maximum Radius: 17.5<br>Surface 17: STANDARD<br>Aperture: Circular Aperture<br>Minimum Radius: 0<br>Maximum Radius: 17.5<br>Surface STO: STANDARD<br>Aperture: Circular Aperture<br>Minimum Radius: 0<br>Maximum Radius: 17.5<br>Surface 19: COORDBRK<br>Decenter X: 0<br>Decenter Y: 0<br>Tilt About X: −38.08<br>Tilt About Y: 0<br>Tilt About Z: 0<br>Order: Decenter then tilt<br>Surface 20: STANDARD<br>Aperture: Elliptical Aperture<br>X Half Width: 13.5<br>Y Half Width: 17<br>Surface 21: COORDBRK<br>Decenter X: 0<br>Decenter Y: 0 |

TABLE 1-continued

| ZEMAX Software Output Describing Surface Data Summary and Detail for Each Individual Element within the Illumination Optical System 98 |
|---|
| Tilt About X: −38.08 |
| Tilt About Y: 0 |
| Tilt About Z: 0 |
| Order: Decenter then tilt |
| Surface 22: COORDBRK |
| Decenter X: −0.47489395 |
| Decenter Y: −2.5440208 |
| Tilt About X: −11.395468 |
| Tilt About Y: 0.41607589 |
| Tilt About Z: 0 |
| Order: Decenter then tilt |
| Surface 23: STANDARD |
| Aperture: Circular Aperture |
| Minimum Radius: 0 |
| Maximum Radius: 10.75 |
| Surface 24: STANDARD |
| Aperture: Circular Aperture |
| Minimum Radius: 0 |
| Maximum Radius: 13 |
| Surface 25: COORDBRK |
| Decenter X: 0.14410789 |
| Decenter Y: 0.37194946 |
| Tilt About X: 4.0907234 |
| Tilt About Y: −1.1395971 |
| Tilt About Z: 0 |
| Order: Decenter then tilt |
| Surface 26: STANDARD |
| Aperture: Circular Aperture |
| Minimum Radius: 0 |
| Maximum Radius: 14 |
| Surface 27: STANDARD |
| Aperture: Circular Aperture |
| Minimum Radius: 0 |
| Maximum Radius: 14 |
| Surface 28: COORDBRK |
| Decenter X: −0.19341404 |
| Decenter Y: 0.80152634 |
| Tilt About X: 3.4489226 |
| Tilt About Y: 0.68325579 |
| Tilt About Z: 0 |
| Order: Decenter then tilt |
| Surface 29: STANDARD |
| Surface 30: STANDARD |
| Aperture: Rectangular Aperture |
| X Half Width: 13.5 |
| Y Half Width: 13.03 |
| Surface 31: COORDBRK |
| Decenter X: 0 |
| Decenter Y: 13.03 |
| Tilt About X: 47 |
| Tilt About Y: 0 |
| Tilt About Z: 0 |
| Order: Decenter then tilt |
| Surface 32: COORDBRK |
| Decenter X: 0 |
| Decenter Y: −23.565 |
| Tilt About X: 0 |
| Tilt About Y: 0 |
| Tilt About Z: 0 |
| Order: Decenter then tilt |
| Surface 33: STANDARD |
| Aperture: Rectangular Aperture |
| X Half Width: 13.5 |
| Y Half Width: 23.57 |
| Surface 34: COORDBRK |
| Decenter X: 0 |
| Decenter Y: −23.565 |
| Tilt About X: 33 |
| Tilt About Y: 0 |
| Tilt About Z: 0 |
| Order: Decenter then tilt |
| Surface 35: COORDBRK |
| Decenter X: 0 |
| Decenter Y: 17.5 |
| Tilt About X: 0 |
| Tilt About Y: 0 |

TABLE 1-continued

| ZEMAX Software Output Describing Surface Data Summary and Detail for Each Individual Element within the Illumination Optical System 98 |
|---|
| Tilt About Z: 0 |
| Order: Decenter then tilt |
| Surface 36: STANDARD |
| Aperture: Rectangular Aperture |
| X Half Width: 13.5 |
| Y Half Width: 17.5 |
| Surface 37: STANDARD |
| Surface 38: STANDARD |
| Surface 39: STANDARD |
| Surface 40: COORDBRK |
| Decenter X: 0 |
| Decenter Y: 4451.5 |
| Tilt About X: 0 |
| Tilt About Y: 0 |
| Tilt About Z: 0 |
| Order: Decenter then tilt |
| Surface 41: PARAXIAL |
| Focal length: −10000 |
| OPD Mode: 0 |
| Surface 42: COORDBRK |
| Decenter X: 0 |
| Decenter Y: −4451.5 |
| Tilt About X: 0 |
| Tilt About Y: 0 |
| Tilt About Z: 0 |
| Order: Decenter then tilt |
| Surface 43: PARAXIAL |
| Focal length: 0 |
| OPD Mode: 0 |
| Surface 44: STANDARD |
| Surface 45: STANDARD |
| Surface 46: STANDARD |
| Surface 47: STANDARD |
| Aperture: Rectangular Aperture |
| X Half Width: 13.5 |
| Y Half Width: 18 |
| Surface 48: STANDARD |
| Aperture: Rectangular Aperture |
| X Half Width: 13.5 |
| Y Half Width: 18 |
| Surface 49: STANDARD |
| Aperture: Circular Aperture |
| Minimum Radius: 0 |
| Maximum Radius: 13 |
| Surface 50: STANDARD |
| Aperture: Floating Aperture |
| Maximum Radius: 13.5 |
| Surface 51: STANDARD |
| Aperture: Floating Aperture |
| Maximum Radius: 13.5 |
| Surface 52: STANDARD |
| Aperture: Floating Aperture |
| Maximum Radius: 13.5 |
| Surface 53: STANDARD |
| Aperture: Floating Aperture |
| Maximum Radius: 10 |
| Surface 54: STANDARD |
| Aperture: Floating Aperture |
| Maximum Radius: 10 |
| Surface 55: STANDARD |
| Surface 56: STANDARD |
| Surface 57: STANDARD |
| Aperture: Circular Aperture |
| Minimum Radius: 0 |
| Maximum Radius: 3.06 |
| Surface IMA: STANDARD |
| COATING DEFINITIONS: PHYSICAL OPTICS PROPAGATION SETTINGS SUMMARY: |
| OBJ TILTSURF |
| Use Rays To Propagate To Next Surface: Off |
| Recompute Pilot Beam: Off |
| Do Not Rescale Beam Size Using Ray Data: Off |
| Use Angular Spectrum Propagator: Off |

TABLE 1-continued

ZEMAX Software Output Describing Surface Data Summary and Detail for Each Individual Element within the Illumination Optical System 98

Use Parallel Probing Rays: Off
Reference Radius: Best Fit
1 COORDBRK

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
2 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
3 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
4 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
5 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
6 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
7 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
8 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
9 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit TABLE 1-continued ZEMAX Software Output Describing Surface Data Summary and Detail for Each Individual Element within the Illumination Optical System 98

10 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

11 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

12 COORDBRK

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

13 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

14 COORDBRK

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

15 COORDBRK

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

16 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

17 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

STO STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

19 COORDBRK

Use Rays To Propagate To Next Surface: Off
Recompute Pilot Beam: Off

TABLE 1-continued

ZEMAX Software Output Describing Surface Data Summary and Detail for Each Individual Element within the Illumination Optical System 98

Do Not Rescale Beam Size Using Ray Data: Off
Use Angular Spectrum Propagator: Off
Use Parallel Probing Rays: Off
Reference Radius: Best Fit
20 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
21 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
22 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
23 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
24 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
25 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
26 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
27 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
28 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit TABLE 1-continued ZEMAX Software Output Describing Surface Data Summary and Detail for Each Individual Element within the Illumination Optical System 98

29 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

30 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

31 COORDBRK

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

32 COORDBRK

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

33 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

34 COORDBRK

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

35 COORDBRK

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

36 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

37 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

38 STANDARD

Use Rays To Propagate To Next Surface: Off
Recompute Pilot Beam: Off

TABLE 1-continued

ZEMAX Software Output Describing Surface Data Summary and Detail for Each Individual Element within the Illumination Optical System 98

Do Not Rescale Beam Size Using Ray Data: Off
Use Angular Spectrum Propagator: Off
Use Parallel Probing Rays: Off
Reference Radius: Best Fit
39 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
40 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
41 PARAXIAL Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
42 COORDBRK Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
43 PARAXIAL Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
44 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
45 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
46 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
47 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit TABLE 1-continued ZEMAX Software Output Describing Surface Data Summary and Detail for Each Individual Element within the Illumination Optical System 98

48 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

49 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

50 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

51 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

52 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

53 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

54 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

55 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

56 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

57 STANDARD

Use Rays To Propagate To Next Surface: Off
Recompute Pilot Beam: Off

TABLE 1-continued

ZEMAX Software Output Describing Surface Data Summary and Detail for Each Individual Element within the Illumination Optical System 98

Do Not Rescale Beam Size Using Ray Data: Off
Use Angular Spectrum Propagator: Off
Use Parallel Probing Rays: Off
Reference Radius: Best Fit
IMA STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

EDGE THICKNESS DATA:

| Surf | X-Edge | Y-Edge |
|---|---|---|
| OBJ | −0.100000 | −0.100000 |
| 1 | 0.000000 | 0.000000 |
| 2 | 0.000000 | 0.000000 |
| 3 | −20.000000 | −20.000000 |
| 4 | 0.000000 | 0.000000 |
| 5 | −8.500000 | −8.500000 |
| 6 | 3.617900 | 3.617900 |
| 7 | −3.654235 | −3.654235 |
| 8 | −8.354689 | −8.354689 |
| 9 | 0.000000 | 0.000000 |
| 10 | −2.907821 | −2.907821 |
| 11 | −21.649201 | −21.649201 |
| 12 | 0.000000 | 0.000000 |
| 13 | 0.000000 | 0.000000 |
| 14 | 15.000000 | 15.000000 |
| 15 | 4.953367 | 4.953367 |
| 16 | 2.301690 | 2.301690 |
| 17 | 12.929674 | 12.929674 |
| STO | 19.363056 | 19.363056 |
| 19 | 0.000000 | 0.000000 |
| 20 | 0.000000 | 0.000000 |
| 21 | −25.000000 | −25.000000 |
| 22 | 4.791929 | 4.791929 |
| 23 | −6.777909 | −6.777909 |
| 24 | −5.547609 | −5.547609 |
| 25 | 0.000000 | 0.000000 |
| 26 | −5.495339 | −5.495339 |
| 27 | −4.398835 | −4.398835 |
| 28 | 0.000000 | 0.000000 |
| 29 | 0.000000 | 0.000000 |
| 30 | 0.000000 | 0.000000 |
| 31 | 0.000000 | 0.000000 |
| 32 | 0.000000 | 0.000000 |
| 33 | 0.000000 | 0.000000 |
| 34 | 0.000000 | 0.000000 |
| 35 | 0.000000 | 0.000000 |
| 36 | 2.500000 | 2.500000 |
| 37 | 3.000000 | 3.000000 |
| 38 | 0.500000 | 0.500000 |
| 39 | 0.000000 | 0.000000 |
| 40 | 0.000000 | 0.000000 |
| 41 | 0.000000 | 0.000000 |
| 42 | 0.000000 | 0.000000 |
| 43 | 0.000000 | 0.000000 |
| 44 | −0.500000 | −0.500000 |
| 45 | −3.000000 | −3.000000 |
| 46 | −2.500000 | −2.500000 |
| 47 | −23.000000 | −23.000000 |
| 48 | −3.893537 | −3.893537 |
| 49 | −1.991427 | −1.991427 |
| 50 | −6.275709 | −6.275709 |
| 51 | −2.011827 | −2.011827 |
| 52 | −4.113875 | −4.113875 |
| 53 | −1.932791 | −1.932791 |
| 54 | −10.004803 | −10.004803 |
| 55 | −0.536530 | −0.536530 |
| 56 | 0.000000 | 0.000000 |

TABLE 1-continued

| ZEMAX Software Output Describing Surface Data Summary and Detail for Each Individual Element within the Illumination Optical System 98 | | |
|---|---|---|
| 57 | 0.000000 | 0.000000 |
| IMA | 0.000000 | 0.000000 |

MULTI-CONFIGURATION DATA:

Configuration 1:

1 Y-field 1: −4.7
2 X-field 2: −4.7 Pick up from configuration 1, operand 1, scale 1, offset 0
3 Y-field 4: 4.7 Pick up from configuration 1, operand 1, scale −1, offset 0
4 X-field 5: −4.7 Pick up from configuration 1, operand 1, scale 1, offset 0
5 Y-field 6: 2.35 Pick up from configuration 1, operand 1, scale −0.5, offset 0
6 Y-field 7: −2.35 Pick up from configuration 1, operand 1, scale 0.5, offset 0
7 Aperture: 0.342

SOLVE AND VARIABLE DATA:

Parameter 1 Surf 5: Variable
Parameter 2 Surf 5: Variable
Parameter 3 Surf 5: Variable
Parameter 4 Surf 5: Variable
Parameter 5 Surf 5: Pickup from 2 times −1.000000, plus 0.000000
Parameter 1 Surf 6: Variable
Parameter 2 Surf 6: Variable
Parameter 3 Surf 6: Variable
Parameter 4 Surf 6: Variable
Thickness of 7: Variable
Semi Diameter 7: Fixed
Semi Diameter 8: Fixed
Parameter 1 Surf 9: Variable
Parameter 2 Surf 9: Variable
Parameter 3 Surf 9: Variable
Parameter 4 Surf 9: Variable
Thickness of 10: Variable
Semi Diameter 10: Fixed
Semi Diameter 11: Fixed
Parameter 3 Surf 14: Pickup from 12 times 1.000000, plus 0.000000
Parameter 1 Surf 15: Variable
Parameter 2 Surf 15: Variable
Parameter 3 Surf 15: Variable
Parameter 4 Surf 15: Variable
Parameter 5 Surf 15: Pickup from 1 times −1.000000, plus 0.000000
Thickness of 16: Variable
Semi Diameter 16: Fixed
Semi Diameter 17: Fixed
Parameter 3 Surf 21: Pickup from 19 times 1.000000, plus 0.000000
Parameter 1 Surf 22: Variable
Parameter 2 Surf 22: Variable
Parameter 3 Surf 22: Variable
Parameter 4 Surf 22: Variable
Thickness of 23: Variable
Semi Diameter 23: Fixed
Thickness of 24: Variable
Semi Diameter 24: Fixed
Parameter 1 Surf 25: Variable
Parameter 2 Surf 25: Variable
Parameter 3 Surf 25: Variable
Parameter 4 Surf 25: Variable
Thickness of 26: Variable
Parameter 1 Surf 28: Variable
Parameter 2 Surf 28: Variable
Parameter 3 Surf 28: Variable
Parameter 4 Surf 28: Variable
Parameter 2 Surf 34: Pickup from 32 times 1.000000, plus 0.000000
Parameter 1 Surf 42: Pickup from 40 times −1.000000, plus 0.000000
Parameter 2 Surf 42: Pickup from 40 times −1.000000, plus 0.000000
Thickness of 44: Solve, pick up value from 38, scaled by −1.00000, plus 0.00000
Semi Diameter 49: Fixed
Curvature of 50: Solve, pick up value from 49, scaled by −1.00000
Semi Diameter 50: Pickup from 49
Semi Diameter 51: Fixed
Semi Diameter 52: Fixed
Semi Diameter 53: Fixed
Semi Diameter 54: Fixed
Config 1, Oper 2 X-field 2: −4.7 Pick up from configuration 1, operand 1, scale 1, offset 0

TABLE 1-continued

ZEMAX Software Output Describing Surface Data Summary and Detail for Each Individual Element within the Illumination Optical System 98

Config 1, Oper 3 Y-field 4: 4.7 Pick up from configuration 1, operand 1, scale −1, offset 0
Config 1, Oper 4 X-field 5: −4.7 Pick up from configuration 1, operand 1, scale 1, offset 0
Config 1, Oper 5 Y-field 6: 2.35 Pick up from configuration 1, operand 1, scale −0.5, offset 0
Config 1, Oper 6 Y-field 7: −2.35 Pick up from configuration 1, operand 1, scale 0.5, offset 0

INDEX OF REFRACTION DATA:

| Surf | Glass | Temp | Pres | 0.460000 | 0.525000 | 0.638000 |
|---|---|---|---|---|---|---|
| 0 | | 20.00 | 1.00 | 1.00000000 | 1.00000000 | 1.00000000 |
| 1 | <CRD BRK> | | | 1.00000000 | 1.00000000 | 1.00000000 |
| 2 | <CRD BRK> | | | 1.00000000 | 1.00000000 | 1.00000000 |
| 3 | BK7 | 20.00 | 1.00 | 1.52443350 | 1.51986781 | 1.51491301 |
| 4 | | 20.00 | 1.00 | 1.00000000 | 1.00000000 | 1.00000000 |
| 5 | <CRD BRK> | | | 1.00000000 | 1.00000000 | 1.00000000 |
| 6 | <CRD BRK> | | | 1.00000000 | 1.00000000 | 1.00000000 |
| 7 | S-TIM5 | 25.00 | 1.00 | 1.61896887 | 1.60946991 | 1.59984226 |
| 8 | | 20.00 | 1.00 | 1.00000000 | 1.00000000 | 1.00000000 |
| 9 | <CRD BRK> | | | 1.00000000 | 1.00000000 | 1.00000000 |
| 10 | S-LAH66 | 25.00 | 1.00 | 1.78746088 | 1.77844022 | 1.76890908 |
| 11 | | 20.00 | 1.00 | 1.00000000 | 1.00000000 | 1.00000000 |
| 12 | <CRD BRK> | | | 1.00000000 | 1.00000000 | 1.00000000 |
| 13 | MIRROR | 20.00 | 1.00 | 1.00000000 | 1.00000000 | 1.00000000 |
| 14 | <CRD BRK> | | | 1.00000000 | 1.00000000 | 1.00000000 |
| 15 | <CRD BRK> | | | 1.00000000 | 1.00000000 | 1.00000000 |
| 16 | S-PHM52 | 25.00 | 1.00 | 1.62732483 | 1.62172274 | 1.61573794 |
| 17 | S-TIH6 | 25.00 | 1.00 | 1.83685381 | 1.81725141 | 1.79821004 |
| 18 | | 20.00 | 1.00 | 1.00000000 | 1.00000000 | 1.00000000 |
| 19 | <CRD BRK> | | | 1.00000000 | 1.00000000 | 1.00000000 |
| 20 | MIRROR | 20.00 | 1.00 | 1.00000000 | 1.00000000 | 1.00000000 |
| 21 | <CRD BRK> | | | 1.00000000 | 1.00000000 | 1.00000000 |
| 22 | <CRD BRK> | | | 1.00000000 | 1.00000000 | 1.00000000 |
| 23 | S-LAH66 | 25.00 | 1.00 | 1.78746088 | 1.77844022 | 1.76890908 |
| 24 | | 20.00 | 1.00 | 1.00000000 | 1.00000000 | 1.00000000 |
| 25 | <CRD BRK> | | | 1.00000000 | 1.00000000 | 1.00000000 |
| 26 | S-LAH66 | 25.00 | 1.00 | 1.78746088 | 1.77844022 | 1.76890908 |
| 27 | | 20.00 | 1.00 | 1.00000000 | 1.00000000 | 1.00000000 |
| 28 | <CRD BRK> | | | 1.00000000 | 1.00000000 | 1.00000000 |
| 29 | | 20.00 | 1.00 | 1.00000000 | 1.00000000 | 1.00000000 |
| 30 | BK7 | 20.00 | 1.00 | 1.52443350 | 1.51986781 | 1.51491301 |
| 31 | <CRD BRK> | | | 1.52443350 | 1.51986781 | 1.51491301 |
| 32 | <CRD BRK> | | | 1.52443350 | 1.51986781 | 1.51491301 |
| 33 | MIRROR | 20.00 | 1.00 | 1.52443350 | 1.51986781 | 1.51491301 |
| 34 | <CRD BRK> | | | 1.52443350 | 1.51986781 | 1.51491301 |
| 35 | <CRD BRK> | | | 1.52443350 | 1.51986781 | 1.51491301 |
| 36 | | 20.00 | 1.00 | 1.00000000 | 1.00000000 | 1.00000000 |
| 37 | FK5 | 20.00 | 1.00 | 1.49402111 | 1.49012584 | 1.48585830 |
| 38 | | 20.00 | 1.00 | 1.00000000 | 1.00000000 | 1.00000000 |
| 39 | | 20.00 | 1.00 | 1.00000000 | 1.00000000 | 1.00000000 |
| 40 | <CRD BRK> | | | 1.00000000 | 1.00000000 | 1.00000000 |
| 41 | | 20.00 | 1.00 | 1.00000000 | 1.00000000 | 1.00000000 |
| 42 | <CRD BRK> | | | 1.00000000 | 1.00000000 | 1.00000000 |
| 43 | | 20.00 | 1.00 | 1.00000000 | 1.00000000 | 1.00000000 |
| 44 | MIRROR | 20.00 | 1.00 | 1.00000000 | 1.00000000 | 1.00000000 |
| 45 | FK5 | 20.00 | 1.00 | 1.49402111 | 1.49012584 | 1.48585830 |
| 46 | | 20.00 | 1.00 | 1.00000000 | 1.00000000 | 1.00000000 |
| 47 | BK7 | 20.00 | 1.00 | 1.52443350 | 1.51986781 | 1.51491301 |
| 48 | | 20.00 | 1.00 | 1.00000000 | 1.00000000 | 1.00000000 |
| 49 | S-PHM53 | 25.00 | 1.00 | 1.61177822 | 1.60651481 | 1.60085657 |
| 50 | | 20.00 | 1.00 | 1.00000000 | 1.00000000 | 1.00000000 |
| 51 | S-BSM81 | 25.00 | 1.00 | 1.65011121 | 1.64405670 | 1.63750734 |
| 52 | | 20.00 | 1.00 | 1.00000000 | 1.00000000 | 1.00000000 |
| 53 | S-FSL5 | 25.00 | 1.00 | 1.49404408 | 1.49013274 | 1.48585674 |
| 54 | S-TIH6 | 25.00 | 1.00 | 1.83685381 | 1.81725141 | 1.79821004 |
| 55 | | 20.00 | 1.00 | 1.00000000 | 1.00000000 | 1.00000000 |
| 56 | | 20.00 | 1.00 | 1.00000000 | 1.00000000 | 1.00000000 |

TABLE 1-continued

ZEMAX Software Output Describing Surface Data Summary and Detail for Each Individual Element within the Illumination Optical System 98

| | | | | | |
|---|---|---|---|---|---|
| 57 | 20.00 | 1.00 | 1.00000000 | 1.00000000 | 1.00000000 |
| 58 | 20.00 | 1.00 | 1.00000000 | 1.00000000 | 1.00000000 |

THERMAL COEFFICIENT OF EXPANSION DATA:

| Surf | Glass | TCE *10E−6 |
|---|---|---|
| 0 | | 0.00000000 |
| 1 | <CRD BRK> | 0.00000000 |
| 2 | <CRD BRK> | 0.00000000 |
| 3 | BK7 | 7.10000000 |
| 4 | | 0.00000000 |
| 5 | <CRD BRK> | 0.00000000 |
| 6 | <CRD BRK> | 0.00000000 |
| 7 | S-TIM5 | 8.30000000 |
| 8 | | 0.00000000 |
| 9 | <CRD BRK> | 0.00000000 |
| 10 | S-LAH66 | 6.20000000 |
| 11 | | 0.00000000 |
| 12 | <CRD BRK> | 0.00000000 |
| 13 | MIRROR | 0.00000000 |
| 14 | <CRD BRK> | 0.00000000 |
| 15 | <CRD BRK> | 0.00000000 |
| 16 | S-PHM52 | 10.10000000 |
| 17 | S-TIH6 | 8.90000000 |
| 18 | | 0.00000000 |
| 19 | <CRD BRK> | 0.00000000 |
| 20 | MIRROR | 0.00000000 |
| 21 | <CRD BRK> | 0.00000000 |
| 22 | <CRD BRK> | 0.00000000 |
| 23 | S-LAH66 | 6.20000000 |
| 24 | | 0.00000000 |
| 25 | <CRD BRK> | 0.00000000 |
| 26 | S-LAH66 | 6.20000000 |
| 27 | | 0.00000000 |
| 28 | <CRD BRK> | 0.00000000 |
| 29 | | 0.00000000 |
| 30 | BK7 | 7.10000000 |
| 31 | <CRD BRK> | 7.10000000 |
| 32 | <CRD BRK> | 7.10000000 |
| 33 | MIRROR | 0.00000000 |
| 34 | <CRD BRK> | 0.00000000 |
| 35 | <CRD BRK> | 0.00000000 |
| 36 | | 0.00000000 |
| 37 | FK5 | 9.20000000 |
| 38 | | 0.00000000 |
| 39 | | 0.00000000 |
| 40 | <CRD BRK> | 0.00000000 |
| 41 | | 0.00000000 |
| 42 | <CRD BRK> | 0.00000000 |
| 43 | | 0.00000000 |
| 44 | MIRROR | 0.00000000 |
| 45 | FK5 | 9.20000000 |
| 46 | | 0.00000000 |
| 47 | BK7 | 7.10000000 |
| 48 | | 0.00000000 |
| 49 | S-PHM53 | 9.30000000 |
| 50 | | 0.00000000 |
| 51 | S-BSM81 | 5.80000000 |
| 52 | | 0.00000000 |
| 53 | S-FSL5 | 9.00000000 |
| 54 | S-TIH6 | 8.90000000 |
| 55 | | 0.00000000 |

TABLE 1-continued

ZEMAX Software Output Describing Surface Data Summary and Detail for Each Individual Element within the Illumination Optical System 98

| | |
|---|---|
| 56 | 0.00000000 |
| 57 | 0.00000000 |
| 58 | 0.00000000 |

F/# DATA:
F/# calculations consider vignetting factors and ignore surface apertures.

| | | Wavelength: | | | | | |
|---|---|---|---|---|---|---|---|
| | | 0.460000 | | 0.525000 | | 0.638000 | |
| # | Field | Tan | Sag | Tan | Sag | Tan | Sag |
| 1 | 0.0000, −4.7000 mm: | 4.8398 | 4.3748 | 4.4425 | 4.0018 | 4.2373 | 3.7817 |
| 2 | −4.7000, 0.0000 mm: | 3.8570 | 6.8070 | 3.5637 | 6.0899 | 3.3948 | 5.7508 |
| 3 | 0.0000, 0.0000 mm: | 3.8427 | 4.6147 | 3.5095 | 4.1546 | 3.3157 | 3.8884 |
| 4 | 0.0000, 4.7000 mm: | 9.9516 | 4.6933 | 8.4478 | 4.2863 | 7.9387 | 4.0561 |
| 5 | −4.7000, 0.0000 mm: | 3.8570 | 6.8070 | 3.5637 | 6.0899 | 3.3948 | 5.7508 |
| 6 | 0.0000, 2.3500 mm: | 4.6871 | 4.6396 | 4.2321 | 4.1943 | 3.9876 | 3.9387 |
| 7 | 0.0000, −2.3500 mm: | 3.9215 | 4.5231 | 3.5916 | 4.0869 | 3.3990 | 3.8313 |
| 8 | 4.6800, 0.0000 mm: | 3.7304 | 6.3593 | 3.4531 | 5.6840 | 3.2929 | 5.3537 |

GLOBAL VERTEX COORDINATES, ORIENTATIONS, AND ROTATION/OFFSET MATRICES:
Reference Surface: 35

| Surf | R11<br>R21<br>R31 | R12<br>R22<br>R32 | R13<br>R23<br>R33 | X<br>Y<br>Z |
|---|---|---|---|---|
| 0 | 0.4336132998 | 0.4566178415 | 0.7768395285 | 4.517843432E+001 |
| | 0.5349194913 | 0.5633300907 | −0.6296986158 | 4.369443138E+001 |
| | −0.7251487047 | 0.6885923001 | 0.0000136360 | −6.445732627E+001 |
| 1 | −0.6290897799 | 0.0276838538 | 0.7768395285 | 4.510075037E+001 |
| | −0.7760893783 | 0.0341310725 | −0.6296986158 | 4.375740124E+001 |
| | −0.0439468507 | −0.9990338704 | 0.0000136360 | −6.445732764E+001 |
| 2 | −0.6296847481 | −0.0041791009 | 0.7768395285 | 4.510075037E+001 |
| | −0.7768222763 | −0.0051772806 | −0.6296986158 | 4.375740124E+001 |
| | 0.0066534903 | −0.9999778652 | 0.0000136360 | −6.445732764E+001 |
| 3 | −0.6296847481 | −0.0041791009 | 0.7768395285 | 4.510075037E+001 |
| | −0.7768222763 | −0.0051772806 | −0.6296986158 | 4.375740124E+001 |
| | 0.0066534903 | −0.9999778652 | 0.0000136360 | −6.445732764E+001 |
| 4 | −0.6296847481 | −0.0041791009 | 0.7768395285 | 2.956395980E+001 |
| | −0.7768222763 | −0.0051772806 | −0.6296986158 | 5.635137355E+001 |
| | 0.0066534903 | −0.9999778652 | 0.0000136360 | −6.445760036E+001 |
| 5 | −0.3976204718 | 0.0418064530 | 0.9165970657 | 3.284979056E+001 |
| | −0.9168711729 | 0.0203151008 | −0.3986659617 | 6.040498788E+001 |
| | −0.0352875716 | −0.9989191745 | 0.0302534317 | −6.503598962E+001 |
| 6 | −0.6837956136 | −0.0439565517 | 0.7283483921 | 2.368205873E+001 |
| | −0.7295767638 | 0.0574488052 | −0.6814817536 | 6.066997554E+001 |
| | −0.0118871570 | −0.9973802968 | −0.0713529197 | −6.474651317E+001 |
| 7 | −0.6837956136 | −0.0439565517 | 0.7283483921 | 2.368205873E+001 |
| | −0.7295767638 | 0.0574488052 | −0.6814817536 | 6.066997554E+001 |
| | −0.0118871570 | −0.9973802968 | −0.0713529197 | −6.474651317E+001 |
| 8 | −0.6837956136 | −0.0439565517 | 0.7283483921 | 1.793464400E+001 |
| | −0.7295767638 | 0.0574488052 | −0.6814817536 | 6.604756449E+001 |
| | −0.0118871570 | −0.9973802968 | −0.0713529197 | −6.418346556E+001 |
| 9 | −0.6565646105 | −0.0447960683 | 0.7529383935 | 1.751839659E+001 |
| | −0.7541295542 | 0.0582342911 | −0.6541386572 | 6.622096220E+001 |
| | −0.0145439936 | −0.9972973877 | −0.0720166136 | −6.308106508E+001 |
| 10 | −0.6565646105 | −0.0447960683 | 0.7529383935 | 1.751839659E+001 |
| | −0.7541295542 | 0.0582342911 | −0.6541386572 | 6.622096220E+001 |
| | −0.0145439936 | −0.9972973877 | −0.0720166136 | −6.308106508E+001 |
| 11 | −0.6565646105 | −0.0447960683 | 0.7529383935 | 1.408723977E+001 |
| | −0.7541295542 | 0.0582342911 | −0.6541386572 | 6.920188645E+001 |
| | −0.0145439936 | −0.9972973877 | −0.0720166136 | −6.275288379E+001 |
| 12 | −0.6565646105 | 0.5276897813 | 0.5389493547 | −9.715280989E−001 |
| | −0.7541295542 | −0.4454717516 | −0.4825386348 | 8.228465959E+001 |
| | −0.0145439936 | −0.7232554274 | 0.6904274466 | −6.131255152E+001 |
| 13 | −0.6565646105 | 0.5276897813 | 0.5389493547 | −9.715280989E−001 |
| | −0.7541295542 | −0.4454717516 | −0.4825386348 | 8.228465959E+001 |
| | −0.0145439936 | −0.7232554274 | 0.6904274466 | −6.131255152E+001 |
| 14 | −0.6565646105 | 0.7537162500 | −0.0288916372 | −9.715280989E−001 |
| | −0.7541295542 | −0.6566993861 | 0.0058763849 | 8.228465959E+001 |
| | −0.0145439936 | 0.0256462639 | 0.9995652762 | −6.131255152E+001 |

TABLE 1-continued

ZEMAX Software Output Describing Surface Data Summary and Detail for Each Individual Element within the Illumination Optical System 98

| | | | | |
|---|---|---|---|---|
| 15 | 0.9999997042 | 0.0007607226 | −0.0001135077 | 4.892056127E−001 |
| | −0.0007607547 | 0.9999996707 | −0.0002827083 | 7.940776125E+001 |
| | 0.0001132926 | 0.0002827946 | 0.9999999536 | −4.624689337E+001 |
| 16 | 0.9999997042 | 0.0007607226 | −0.0001135077 | 4.892056127E−001 |
| | −0.0007607547 | 0.9999996707 | −0.0002827083 | 7.940776125E+001 |
| | 0.0001132926 | 0.0002827946 | 0.9999999536 | −4.624689337E+001 |
| 17 | 0.9999997042 | 0.0007607226 | −0.0001135077 | 4.876678347E−001 |
| | −0.0007607547 | 0.9999996707 | −0.0002827083 | 7.940393118E+001 |
| | 0.0001132926 | 0.0002827946 | 0.9999999536 | −3.269910661E+001 |
| 18 | 0.9999997042 | 0.0007607226 | −0.0001135077 | 4.867597732E−001 |
| | −0.0007607547 | 0.9999996707 | −0.0002827083 | 7.940166951E+001 |
| | 0.0001132926 | 0.0002827946 | 0.9999999536 | −2.469910698E+001 |
| 19 | 0.9999997042 | 0.0006688102 | 0.0003798365 | 4.847166348E−001 |
| | −0.0007607547 | 0.7873244644 | 0.6165384083 | 7.939658076E+001 |
| | 0.0001132926 | −0.6165385149 | 0.7873247404 | −6.699107813E+000 |
| 20 | 0.9999997042 | 0.0006688102 | 0.0003798365 | 4.847166348E−001 |
| | −0.0007607547 | 0.7873244644 | 0.6165384083 | 7.939658076E+001 |
| | 0.0001132926 | −0.6165385149 | 0.7873247404 | −6.699107813E+000 |
| 21 | 0.9999997042 | 0.0002921858 | 0.0007114846 | 4.847166348E−001 |
| | −0.0007607547 | 0.2394858009 | 0.9708995687 | 7.939658076E+001 |
| | 0.0001132926 | −0.9708998228 | 0.2394859523 | −6.699107813E+000 |
| 22 | 0.9999678527 | 0.0001458509 | 0.0080169972 | −8.707615719E−003 |
| | −0.0080158666 | 0.0429346250 | 0.9990457266 | 5.451519596E+001 |
| | −0.0001984951 | −0.9990778732 | 0.0429344139 | −1.021632109E+001 |
| 23 | 0.9999678527 | 0.0001458509 | 0.0080169972 | −8.707615719E−003 |
| | −0.0080158666 | 0.0429346250 | 0.9990457266 | 5.451519596E+001 |
| | −0.0001984951 | −0.9990778732 | 0.0429344139 | −1.021632109E+001 |
| 24 | 0.9999678527 | 0.0001458509 | 0.0080169972 | −5.473424960E−002 |
| | −0.0080158666 | 0.0429346250 | 0.9990457266 | 4.877954327E+001 |
| | −0.0001984951 | −0.9990778732 | 0.0429344139 | −1.046281320E+001 |
| 25 | 0.9999288973 | 0.0007173794 | −0.0119031827 | 7.505312732E−002 |
| | 0.0117436164 | 0.1140931188 | 0.9934006481 | 4.700360971E+001 |
| | 0.0020707164 | −0.9934698011 | 0.1140765819 | −1.091140643E+001 |
| 26 | 0.9999288973 | 0.0007173794 | −0.0119031827 | 7.505312732E−002 |
| | 0.0117436164 | 0.1140931188 | 0.9934006481 | 4.700360971E+001 |
| | 0.0020707164 | −0.9934698011 | 0.1140765819 | −1.091140643E+001 |
| 27 | 0.9999288973 | 0.0007173794 | −0.0119031827 | 1.749705142E−001 |
| | 0.0117436164 | 0.1140931188 | 0.9934006481 | 3.866483183E+001 |
| | 0.0020707164 | −0.9934698011 | 0.1140765819 | −1.186898511E+001 |
| 28 | 1.0000000000 | 0.0000000000 | 0.0000000000 | 0.000000000E+000 |
| | 0.0000000000 | 0.1736481777 | 0.9848077530 | 3.726390811E+001 |
| | 0.0000000000 | −0.9848077530 | 0.1736481777 | −1.283679270E+001 |
| 29 | 1.0000000000 | 0.0000000000 | 0.0000000000 | 0.000000000E+000 |
| | 0.0000000000 | 0.1736481777 | 0.9848077530 | 3.726390811E+001 |
| | 0.0000000000 | −0.9848077530 | 0.1736481777 | −1.283679270E+001 |
| 30 | 1.0000000000 | 0.0000000000 | 0.0000000000 | 0.000000000E+000 |
| | 0.0000000000 | 0.1736481777 | 0.9848077530 | 3.726390811E+001 |
| | 0.0000000000 | −0.9848077530 | 0.1736481777 | −1.283679270E+001 |
| 31 | 1.0000000000 | 0.0000000000 | 0.0000000000 | 0.000000000E+000 |
| | 0.0000000000 | 0.8386705679 | 0.5446390350 | 3.952654387E+001 |
| | 0.0000000000 | −0.5446390350 | 0.8386705679 | −2.566883772E+001 |
| 32 | 1.0000000000 | 0.0000000000 | 0.0000000000 | 0.000000000E+000 |
| | 0.0000000000 | 0.8386705679 | 0.5446390350 | 1.976327193E+001 |
| | 0.0000000000 | −0.5446390350 | 0.8386705679 | −1.283441886E+001 |
| 33 | 1.0000000000 | 0.0000000000 | 0.0000000000 | 0.000000000E+000 |
| | 0.0000000000 | 0.8386705679 | 0.5446390350 | 1.976327193E+001 |
| | 0.0000000000 | −0.5446390350 | 0.8386705679 | −1.283441886E+001 |
| 34 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 0.000000000E+000 |
| 35 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 0.000000000E+000 |
| 36 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 0.000000000E+000 |
| 37 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 2.500000000E+000 |
| 38 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 5.500000000E+000 |
| 39 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 6.000000000E+000 |

TABLE 1-continued

ZEMAX Software Output Describing Surface Data Summary and Detail for Each Individual Element within the Illumination Optical System 98

| | | | | |
|---|---|---|---|---|
| 40 | 1.0000000000 | 0.0000000000 | 0.0000000000 | 0.000000000E+000 |
| | 0.0000000000 | 1.0000000000 | 0.0000000000 | 4.469000000E+003 |
| | 0.0000000000 | 0.0000000000 | 1.0000000000 | 6.000000000E+000 |
| 41 | 1.0000000000 | 0.0000000000 | 0.0000000000 | 0.000000000E+000 |
| | 0.0000000000 | 1.0000000000 | 0.0000000000 | 4.469000000E+003 |
| | 0.0000000000 | 0.0000000000 | 1.0000000000 | 6.000000000E+000 |
| 42 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 6.000000000E+000 |
| 43 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 6.000000000E+000 |
| 44 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 6.000000000E+000 |
| 45 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 5.500000000E+000 |
| 46 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 2.500000000E+000 |
| 47 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 0.000000000E+000 |
| 48 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −2.300000000E+001 |
| 49 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −2.500000000E+001 |
| 50 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −3.077850000E+001 |
| 51 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −3.097850000E+001 |
| 52 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −3.717250000E+001 |
| 53 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −3.737250000E+001 |
| 54 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −4.466950000E+001 |
| 55 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −5.285050000E+001 |
| 56 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −5.376050000E+001 |
| 57 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −5.376050000E+001 |
| 58 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −5.376050000E+001 |

ELEMENT VOLUME DATA:
For centered elements with plane or spherical circular faces, exact volumes are computed by assuming edges are squared up to the larger of the front and back radial aperture.
For all other elements, approximate volumes are numerically integrated to 0.1% accuracy. Zero volume means the volume cannot be accurately computed.
Single elements that are duplicated in the Lens Data Editor for ray tracing purposes may be listed more than once yielding incorrect total mass estimates.

| | Volume cc | Density g/cc | Mass g |
|---|---|---|---|
| Element surf 3 to 4 | 8.025020 | 2.510000 | 20.142799 |
| Element surf 7 to 8 | 4.769696 | 2.630000 | 12.544300 |
| Element surf 10 to 11 | 3.391090 | 4.230000 | 14.344310 |
| Element surf 16 to 17 | 7.818599 | 3.670000 | 28.694260 |
| Element surf 17 to 18 | 9.784333 | 3.370000 | 32.973202 |
| Element surf 23 to 24 | 3.695705 | 4.230000 | 15.632832 |

TABLE 1-continued

| ZEMAX Software Output Describing Surface Data Summary and Detail for Each Individual Element within the Illumination Optical System 98 | | | |
|---|---|---|---|
| Element surf 26 to 27 | 4.281907 | 4.230000 | 18.112466 |
| Element surf 30 to 31 | 0.000000 | 2.510000 | 0.000000 |
| Element surf 31 to 32 | 0.000000 | 0.000000 | 0.000000 |
| Element surf 32 to 33 | 0.000000 | 0.000000 | 0.000000 |
| Element surf 34 to 35 | 0.000000 | 0.000000 | 0.000000 |
| Element surf 35 to 36 | 0.000000 | 0.000000 | 0.000000 |
| Element surf 37 to 38 | 1.018793 | 2.450000 | 2.496042 |
| Element surf 45 to 46 | 1.074870 | 2.450000 | 2.633431 |
| Element surf 47 to 48 | 22.437579 | 2.510000 | 56.318323 |
| Element surf 49 to 50 | 2.231466 | 3.510000 | 7.832445 |
| Element surf 51 to 52 | 2.387445 | 3.060000 | 7.305583 |
| Element surf 53 to 54 | 1.482802 | 2.460000 | 3.647692 |
| Element surf 54 to 55 | 2.899719 | 3.370000 | 9.772053 |
| Total Mass: | | | 232.449738 |

CARDINAL POINTS:
Object space positions are measured with respect to surface 1.
Image space positions are measured with respect to the image surface.
The index in both the object space and image space is considered.

| | Object Space | Image Space |
|---|---|---|
| W = 0.460000 | | |
| Focal Length: | −8.312566 | 8.312566 |
| Focal Planes: | 3.847888 | −0.619539 |
| Principal Planes: | 12.160454 | −8.932105 |
| Anti-Principal Planes: | −4.464678 | 7.693027 |
| Nodal Planes: | 12.160454 | −8.932105 |
| Anti-Nodal Planes: | −4.464678 | 7.693027 |
| W = 0.525000 (Primary) | | |
| Focal Length: | −8.441475 | 8.441475 |
| Focal Planes: | 3.965614 | −0.715180 |
| Principal Planes: | 12.407089 | −9.156655 |
| Anti-Principal Planes: | −4.475861 | 7.726295 |
| Nodal Planes: | 12.407089 | −9.156655 |
| Anti-Nodal Planes: | −4.475861 | 7.726295 |
| W = 0.638000 | | |
| Focal Length: | −8.588137 | 8.588137 |
| Focal Planes: | 4.163721 | −0.827454 |
| Principal Planes: | 12.751857 | −9.415591 |
| Anti-Principal Planes: | −4.424416 | 7.760682 |
| Nodal Planes: | 12.751857 | −9.415591 |
| Anti-Nodal Planes: | −4.424416 | 7.760682 |

TABLE 2

ZEMAX Software Output Describing Surface Data Summary and Detail for Each Individual Element within the Projection Optical System 99

GENERAL LENS DATA:

Surfaces: 22
Stop: 13
System Aperture: Object Space NA = 0.2
Telecentric Mode: On
Glass Catalogs: MISC SCHOTT OHARA
Ray Aiming: Off
Apodization: Uniform, factor = 5.00000E−001
Effective Focal Length: 53.39083 (in air at system temperature and pressure)
Effective Focal Length: 53.39083 (in image space)
Back Focal Length: −622.2273
Total Track: 330.1757
Image Space F/#: 1.307803e−008
Paraxial Working F/#: 29.07414
Working F/#: 29.00313
Image Space NA: 0.01719487
Object Space NA: 0.2
Stop Radius: 2.913214
Paraxial Image Height: 88.17827

TABLE 2-continued

ZEMAX Software Output Describing Surface Data Summary and Detail for Each Individual Element within the Projection Optical System 99

Paraxial Magnification: −11.86947
Entrance Pupil Diameter: 4.082483e+009
Entrance Pupil Position: 1e+010
Exit Pupil Diameter: 21.79671
Exit Pupil Position: −622.2273
Field Type: Object height in Millimeters
Maximum Field: 7.429
Primary Wave: 0.46
Lens Units: Millimeters
Angular Magnification: 1.872981e+008

Fields: 5
Field Type: Object height in Millimeters

| # | X-Value | Y-Value | Weight |
|---|---|---|---|
| 1 | 0.000000 | 0.000000 | 1.000000 |
| 2 | 0.000000 | 2.500000 | 3.000000 |
| 3 | 0.000000 | 5.000000 | 12.000000 |
| 4 | 0.000000 | 7.000000 | 15.000000 |
| 5 | 0.000000 | 7.429000 | 1.000000 |

Vignetting Factors

| # | VDX | VDY | VCX | VCY | VAN |
|---|---|---|---|---|---|
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |
| 4 | 0.000000 | 0.000000 | 0.000000 | 0.000000 | 0.000000 |
| 5 | 0.000000 | 0.000000 | 0.000000 | 0.000000 | 0.000000 |

Wavelengths: 3
Units: µm

| # | Value | Weight |
|---|---|---|
| 1 | 0.460000 | 1.000000 |
| 2 | 0.525000 | 1.000000 |
| 3 | 0.635000 | 1.000000 |

SURFACE DATA SUMMARY:

| Surf | Type | Comment | Radius | Thickness | Glass | Diameter | Conic |
|---|---|---|---|---|---|---|---|
| OBJ | STANDARD | | Infinity | 0 | | 14.858 | 0 |
| 1 | STANDARD | | Infinity | 0.5 | | 16.3438 | 0 |
| 2 | STANDARD | | Infinity | 3 | N-FK5 | 16.56834 | 0 |
| 3 | STANDARD | | Infinity | 2.5 | | 17.46482 | 0 |
| 4 | STANDARD | | Infinity | 23 | N-BK7 | 18.5875 | 0 |
| 5 | STANDARD | | Infinity | 2 | | 25.32628 | 0 |
| 6 | STANDARD | | 49.071 | 5.778508 | S-PHM53 | 27 | 0 |
| 7 | STANDARD | | −49.071 | 0.2 | | 27 | 0 |
| 8 | STANDARD | | 23.88 | 6.19367 | S-BSM81 | 27 | 0 |
| 9 | STANDARD | | Infinity | 0.2 | | 23.87212 | 0 |
| 10 | STANDARD | | 14.732 | 7.297311 | S-FSL5 | 20 | 0 |
| 11 | STANDARD | | −35.2 | 8.181407 | S-TIH6 | 20 | 0 |
| 12 | STANDARD | | 32 | 0.9104899 | | 9 | 0 |
| STO | STANDARD | | Infinity | 6.399912 | | 6.116962 | 0 |
| 14 | STANDARD | | −6.67 | 11.23256 | S-TIH3 | 11 | 0 |
| 15 | STANDARD | | −18 | 0.2 | | 25.6 | 0 |
| 16 | STANDARD | | −96.016 | 4.960048 | S-TIH6 | 30 | 0 |
| 17 | STANDARD | | −52.68 | 49.35403 | | 34 | 0 |
| 18 | STANDARD | | 182.45 | 11.9887 | S-BSM81 | 92 | 0 |
| 19 | STANDARD | | Infinity | 161.2791 | | 92 | 0 |
| 20 | STANDARD | | Infinity | 0 | | 183.3892 | 0 |
| 21 | EVENASPH | | 295.1198 | 25 | POLYCARB | 190.8502 | 0 |
| IMA | STANDARD | | Infinity | | | 174.5479 | 0 |

SURFACE DATA DETAIL:

Surface OBJ: STANDARD
Surface 1: STANDARD
Surface 2: STANDARD
Surface 3: STANDARD
Surface 4: STANDARD TABLE 2-continued ZEMAX Software Output Describing Surface Data Summary and Detail for Each Individual Element within the Projection Optical System 99

Surface 5: STANDARD
Surface 6: STANDARD
Aperture: Floating Aperture
Maximum Radius: 13.5
Surface 7: STANDARD
Aperture: Floating Aperture
Maximum Radius: 13.5
Surface 8: STANDARD
Aperture: Floating Aperture
Maximum Radius: 13.5
Surface 9: STANDARD
Surface 10: STANDARD
Aperture: Floating Aperture
Maximum Radius: 10
Surface 11: STANDARD
Aperture: Floating Aperture
Maximum Radius: 10
Surface 12: STANDARD
Aperture: Floating Aperture
Maximum Radius: 4.5
Surface STO: STANDARD
Surface 14: STANDARD
Aperture: Floating Aperture
Maximum Radius: 5.5
Surface 15: STANDARD
Aperture: Floating Aperture
Maximum Radius: 12.8
Surface 16: STANDARD
Aperture: Floating Aperture
Maximum Radius: 15
Surface 17: STANDARD
Aperture: Floating Aperture
Maximum Radius: 17
Surface 18: STANDARD
Aperture: Floating Aperture
Maximum Radius: 46
Surface 19: STANDARD
Aperture: Floating Aperture
Maximum Radius: 46
Surface 20: STANDARD
Surface 21: EVENASPH
Coeff on r 2: 0
Coeff on r 4: 0
Coeff on r 6: 0
Coeff on r 8: 0
Coeff on r 10: 0
Coeff on r 12: 0
Coeff on r 14: 0
Coeff on r 16: 0
Surface IMA: STANDARD

COATING DEFINITIONS:
PHYSICAL OPTICS PROPAGATION SETTINGS SUMMARY:

OBJ STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

1 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

2 STANDARD

Use Rays To Propagate To Next Surface: Off
Recompute Pilot Beam: Off
Do Not Rescale Beam Size Using Ray Data: Off
Use Angular Spectrum Propagator: Off TABLE 2-continued ZEMAX Software Output Describing Surface Data Summary and Detail for Each Individual Element within the Projection Optical System 99

Use Parallel Probing Rays: Off
Reference Radius: Best Fit
3 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
4 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
5 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
6 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
7 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
8 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
9 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
10 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
11 STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit TABLE 2-continued ZEMAX Software Output Describing Surface Data Summary and Detail for Each Individual Element within the Projection Optical System 99

12 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

STO STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

14 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

15 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

16 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

17 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

18 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

19 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

20 STANDARD

Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

21 EVENASPH

Use Rays To Propagate To Next Surface: Off
Recompute Pilot Beam: Off

TABLE 2-continued

ZEMAX Software Output Describing Surface Data Summary and Detail for Each Individual Element within the Projection Optical System 99

Do Not Rescale Beam Size Using Ray Data: Off
Use Angular Spectrum Propagator: Off
Use Parallel Probing Rays: Off
Reference Radius: Best Fit
IMA STANDARD Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit

EDGE THICKNESS DATA:

| Surf | Edge |
|---|---|
| OBJ | 0.000000 |
| 1 | 0.500000 |
| 2 | 3.000000 |
| 3 | 2.500000 |
| 4 | 23.000000 |
| 5 | 3.893537 |
| 6 | 1.991435 |
| 7 | 6.275709 |
| 8 | 2.011497 |
| 9 | 4.113875 |
| 10 | 1.933102 |
| 11 | 9.949726 |
| 12 | 0.592504 |
| STO | 3.503359 |
| 14 | 8.784551 |
| 15 | 4.365649 |
| 16 | 3.320598 |
| 17 | 58.066448 |
| 18 | 6.094651 |
| 19 | 161.279099 |
| 20 | 15.853350 |
| 21 | 9.146650 |
| IMA | 0.000000 |

MULTI-CONFIGURATION DATA:

Configuration 1:

1 Thickness 20: 0
Configuration 2:

1 Thickness 20: −5
Configuration 3:

1 Thickness 20: 5

SOLVE AND VARIABLE DATA:

Thickness of 6: Variable
Semi Diameter 6: Fixed
Curvature of 7: Solve, pick up value from 6, scaled by −1.00000
Semi Diameter 7: Pickup from 6
Thickness of 8: Variable
Semi Diameter 8: Pickup from 6
Thickness of 10: Variable
Semi Diameter 10: Fixed
Thickness of 11: Variable
Semi Diameter 11: Pickup from 10
Thickness of 12: Variable
Semi Diameter 12: Fixed
Thickness of 13: Variable
Thickness of 14: Variable
Semi Diameter 14: Fixed
Semi Diameter 15: Fixed
Thickness of 16: Variable
Semi Diameter 16: Fixed
Thickness of 17: Variable
Semi Diameter 17: Fixed
Thickness of 18: Variable TABLE 2-continued ZEMAX Software Output Describing Surface Data Summary and Detail for Each Individual Element within the Projection Optical System 99

Semi Diameter 18: Fixed
Thickness of 19: Variable
Semi Diameter 19: Fixed
Curvature of 21: Variable

INDEX OF REFRACTION DATA:

| Surf | Glass | Temp | Pres | 0.460000 | 0.525000 | 0.635000 |
|---|---|---|---|---|---|---|
| 0 | | 20.00 | 1.00 | 1.00000000 | 1.00000000 | 1.00000000 |
| 1 | | 20.00 | 1.00 | 1.00000000 | 1.00000000 | 1.00000000 |
| 2 | N-FK5 | 20.00 | 1.00 | 1.49402111 | 1.49012584 | 1.48594605 |
| 3 | | 20.00 | 1.00 | 1.00000000 | 1.00000000 | 1.00000000 |
| 4 | N-BK7 | 20.00 | 1.00 | 1.52443350 | 1.51986781 | 1.51501420 |
| 5 | | 20.00 | 1.00 | 1.00000000 | 1.00000000 | 1.00000000 |
| 6 | S-PHM53 | 25.00 | 1.00 | 1.61177822 | 1.60651481 | 1.60097110 |
| 7 | | 20.00 | 1.00 | 1.00000000 | 1.00000000 | 1.00000000 |
| 8 | S-BSM81 | 25.00 | 1.00 | 1.65011121 | 1.64405670 | 1.63764082 |
| 9 | | 20.00 | 1.00 | 1.00000000 | 1.00000000 | 1.00000000 |
| 10 | S-FSL5 | 25.00 | 1.00 | 1.49404408 | 1.49013274 | 1.48594450 |
| 11 | S-TIH6 | 25.00 | 1.00 | 1.83685381 | 1.81725141 | 1.79857441 |
| 12 | | 20.00 | 1.00 | 1.00000000 | 1.00000000 | 1.00000000 |
| 13 | | 20.00 | 1.00 | 1.00000000 | 1.00000000 | 1.00000000 |
| 14 | S-TIH3 | 25.00 | 1.00 | 1.76602131 | 1.74996726 | 1.73451038 |
| 15 | | 20.00 | 1.00 | 1.00000000 | 1.00000000 | 1.00000000 |
| 16 | S-TIH6 | 25.00 | 1.00 | 1.83685381 | 1.81725141 | 1.79857441 |
| 17 | | 20.00 | 1.00 | 1.00000000 | 1.00000000 | 1.00000000 |
| 18 | S-BSM81 | 25.00 | 1.00 | 1.65011121 | 1.64405670 | 1.63764082 |
| 19 | | 20.00 | 1.00 | 1.00000000 | 1.00000000 | 1.00000000 |
| 20 | | 20.00 | 1.00 | 1.00000000 | 1.00000000 | 1.00000000 |
| 21 | POLYCARB | 20.00 | 1.00 | 1.60505860 | 1.59293157 | 1.58138766 |
| 22 | | 20.00 | 1.00 | 1.00000000 | 1.00000000 | 1.00000000 |

THERMAL COEFFICIENT OF EXPANSION DATA:

| Surf | Glass | TCE *10E−6 |
|---|---|---|
| 0 | | 0.00000000 |
| 1 | | 0.00000000 |
| 2 | N-FK5 | 9.20000000 |
| 3 | | 0.00000000 |
| 4 | N-BK7 | 7.10000000 |
| 5 | | 0.00000000 |
| 6 | S-PHM53 | 9.30000000 |
| 7 | | 0.00000000 |
| 8 | S-BSM81 | 5.80000000 |
| 9 | | 0.00000000 |
| 10 | S-FSL5 | 9.00000000 |
| 11 | S-TIH6 | 8.90000000 |
| 12 | | 0.00000000 |
| 13 | | 0.00000000 |
| 14 | S-TIH3 | 8.50000000 |
| 15 | | 0.00000000 |
| 16 | S-TIH6 | 8.90000000 |
| 17 | | 0.00000000 |
| 18 | S-BSM81 | 5.80000000 |
| 19 | | 0.00000000 |
| 20 | | 0.00000000 |
| 21 | POLYCARB | 67.00000000 |
| 22 | | 0.00000000 |

F/# DATA:
F/# calculations consider vignetting factors and ignore surface apertures.

| | | Wavelength: | | | | | |
|---|---|---|---|---|---|---|---|
| | | 0.460000 | | 0.525000 | | 0.635000 | |
| # | Field | Tan | Sag | Tan | Sag | Tan | Sag |
| 1 | 0.0000 mm: | 29.0031 | 29.0031 | 28.8420 | 28.8420 | 28.9161 | 28.9161 |
| 2 | 2.5000 mm: | 29.2056 | 29.0837 | 29.0481 | 28.9190 | 29.0876 | 28.9776 |
| 3 | 5.0000 mm: | 29.5933 | 29.3230 | 29.5306 | 29.1621 | 29.5295 | 29.1850 |
| 4 | 7.0000 mm: | 29.0724 | 29.5275 | 29.2642 | 29.4061 | 29.3265 | 29.4099 |
| 5 | 7.4290 mm: | 28.6953 | 29.5394 | 28.9573 | 29.4353 | 29.0457 | 29.4397 |

TABLE 2-continued

ZEMAX Software Output Describing Surface Data Summary and Detail for Each Individual Element within the Projection Optical System 99

GLOBAL VERTEX COORDINATES, ORIENTATIONS, AND ROTATION/OFFSET MATRICES:
Reference Surface: 0

| Surf | R11<br>R21<br>R31 | R12<br>R22<br>R32 | R13<br>R23<br>R33 | X<br>Y<br>Z |
|---|---|---|---|---|
| 0 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 0.000000000E+000 |
| 1 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 0.000000000E+000 |
| 2 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 5.000000000E−001 |
| 3 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 3.500000000E+000 |
| 4 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 6.000000000E+000 |
| 5 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 2.900000000E+001 |
| 6 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 3.100000000E+001 |
| 7 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 3.677850848E+001 |
| 8 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 3.697850848E+001 |
| 9 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 4.317217864E+001 |
| 10 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 4.337217864E+001 |
| 11 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 5.066948953E+001 |
| 12 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 5.885089610E+001 |
| 13 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 5.976138604E+001 |
| 14 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 6.616129816E+001 |
| 15 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 7.739386198E+001 |
| 16 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 7.759386198E+001 |
| 17 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 8.255391027E+001 |
| 18 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 1.319079376E+002 |
| 19 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 1.438966413E+002 |
| 20 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 3.051757408E+002 |
| 21 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 3.051757408E+002 |

TABLE 2-continued

ZEMAX Software Output Describing Surface Data Summary and Detail for Each Individual Element within the Projection Optical System 99

| | | | | |
|---|---|---|---|---|
| 22 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 3.301757408E+002 |

ELEMENT VOLUME DATA:
For centered elements with plane or spherical circular faces, exact volumes are computed by assuming edges are squared up to the larger of the front and back radial aperture.
For all other elements, approximate volumes are numerically integrated to 0.1% accuracy. Zero volume means the volume cannot be accurately computed.
Single elements that are duplicated in the Lens Data Editor for ray tracing purposes may be listed more than once yielding incorrect total mass estimates.

| | Volume cc | Density g/cc | Mass g |
|---|---|---|---|
| Element surf 2 to 3 | 0.718686 | 2.450000 | 1.760781 |
| Element surf 4 to 5 | 11.586722 | 2.510000 | 29.082673 |
| Element surf 6 to 7 | 2.231471 | 3.510000 | 7.832462 |
| Element surf 8 to 9 | 2.387256 | 3.060000 | 7.305005 |
| Element surf 10 to 11 | 1.482899 | 2.460000 | 3.647932 |
| Element surf 11 to 12 | 2.886252 | 3.370000 | 9.726669 |
| Element surf 14 to 15 | 5.826621 | 3.110000 | 18.120791 |
| Element surf 16 to 17 | 3.888465 | 3.370000 | 13.104127 |
| Element surf 18 to 19 | 60.212756 | 3.060000 | 184.251035 |
| Element surf 21 to 22 | 449.470461 | 1.250000 | 561.838077 |
| Total Mass: | | | 836.669550 |

CARDINAL POINTS:
Object space positions are measured with respect to surface 1.
Image space positions are measured with respect to the image surface.
The index in both the object space and image space is considered.

| | Object Space | Image Space |
|---|---|---|
| W = 0.460000 (Primary) | | |
| Focal Length: | −53.390829 | 53.390829 |
| Focal Planes: | 4.498166 | −622.227272 |
| Principal Planes: | 57.888995 | −675.618101 |
| Anti-Principal Planes: | −48.892663 | −568.836444 |
| Nodal Planes: | 57.888995 | −675.618101 |
| Anti-Nodal Planes: | −48.892663 | −568.836444 |
| W = 0.525000 | | |
| Focal Length: | −51.915834 | 51.915834 |
| Focal Planes: | 4.391026 | −604.898243 |
| Principal Planes: | 56.306860 | −656.814077 |
| Anti-Principal Planes: | −47.524807 | −552.982409 |
| Nodal Planes: | 56.306860 | −656.814077 |
| Anti-Nodal Planes: | −47.524807 | −552.982409 |
| W = 0.635000 | | |
| Focal Length: | −50.637947 | 50.637947 |
| Focal Planes: | 4.268027 | −589.053890 |
| Principal Planes: | 54.905974 | −639.691837 |
| Anti-Principal Planes: | −46.369920 | −538.415942 |
| Nodal Planes: | 54.905974 | −639.691837 |
| Anti-Nodal Planes: | −46.369920 | −538.415942 |

The illumination optical system 98 as described above properly images the output surface of the optical concentrator element 16 directly on the digital imaging device 75.

Instead of comprising lenses, the elements within the illumination and projection optical systems each may alternatively comprise a refractive element, a reflective element (e.g. mirror), a diffractive element, or combinations thereof. The surface shapes may be provided in whole, or in part, by Fresnel steps or facets. It may be desirable to provide additional mirror elements to effect additional folds in the optical path of the optical system to thereby reduce the overall dimensions of the housing containing the DLP system 100. These design variations may also be envisioned with any of the following alternative illumination optical systems.

The DLP system 100 described above preferably has the following characteristics: high resolution (e.g. XGA or greater); low power requirement of less than 30 watts; light weight (less than 30 pounds); small form factor; inputs such as, for example, DVI, VGA, USB, RS232, composite, and HDMI may be employed. These characteristics may also be envisioned with any of the following alternative illumination optical systems.

The DLP system 100 of the present invention may be employed as a free-standing or hand-held projector (i.e. without a screen), or alternatively may be employed in conjunction with a screen such as, for example, the types disclosed in U.S. Pat. No. 6,301,417 issued to Biscardi et al or U.S. Pat. No. 6,487,350 issued to Veligdan et al. These screens (or optical display panels) are known to have superior brightness and contrast even in ambient conditions. These different utilizations may also be envisioned with any of the following alternative illumination optical systems.

The below illumination optical systems may alternatively be contemplated and may work in conjunction with the projection optical system described above or may work with other types of projection optical systems.

Figure 13:
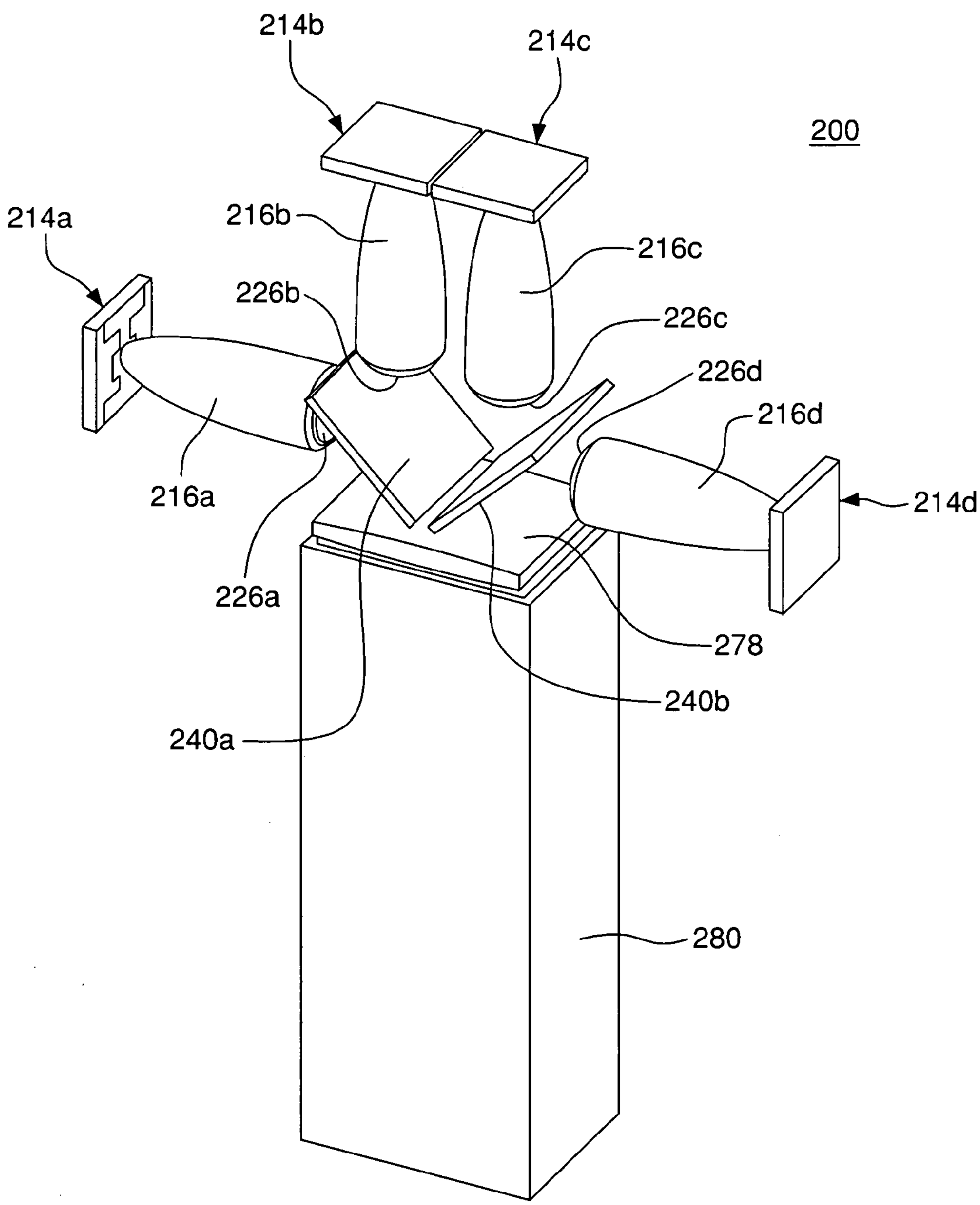
FIG. 13 is an isometric view illustrating a portion of another digital light projection system including a 4-channel LED array configuration, in accordance with a preferred embodiment of the present invention.
Figure 14:
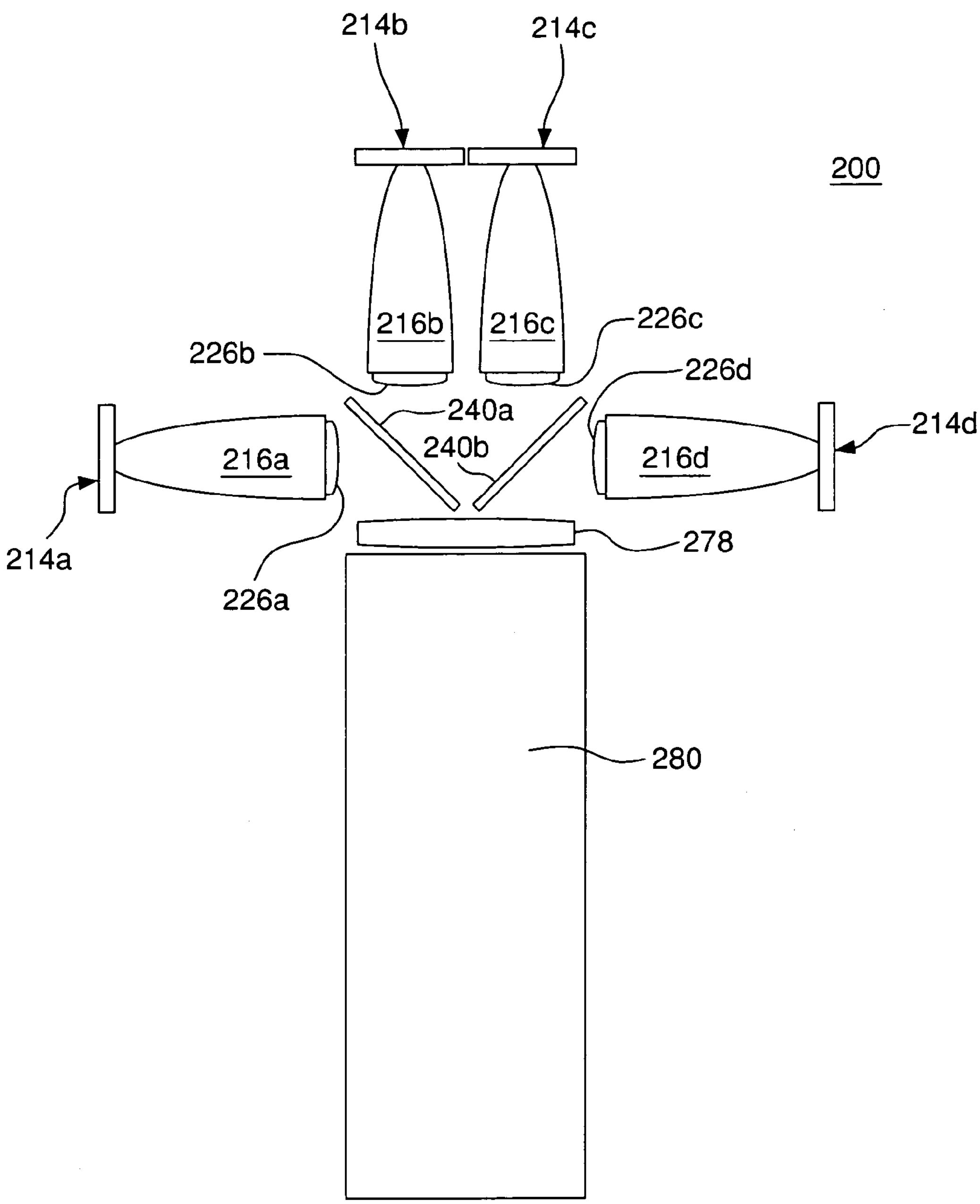
FIG. 14 is a side view of the portion of the digital light projection system shown in FIG. 13.

FIG. 13 is an isometric view illustrating a portion 200 of another digital light projection system including a 4-channel LED array configuration, in accordance with a preferred embodiment of the present invention. FIG. 13 illustrates the use of LED array mounting boards 214*a-d* with respective corresponding optical concentrator elements 216*a-d*. Field lenses 226*a-d* are optically aligned between the output of the concentrator elements and dielectric plates 240*a*, 240*b*. A single imaging lens 278 is optically aligned between the dielectric plates 240*a*, 240*b* and integrator element (e.g. rod) 280. FIG. 14 is a side view of the portion 200 of the digital light projection system shown in FIG. 13.

Figure 15:
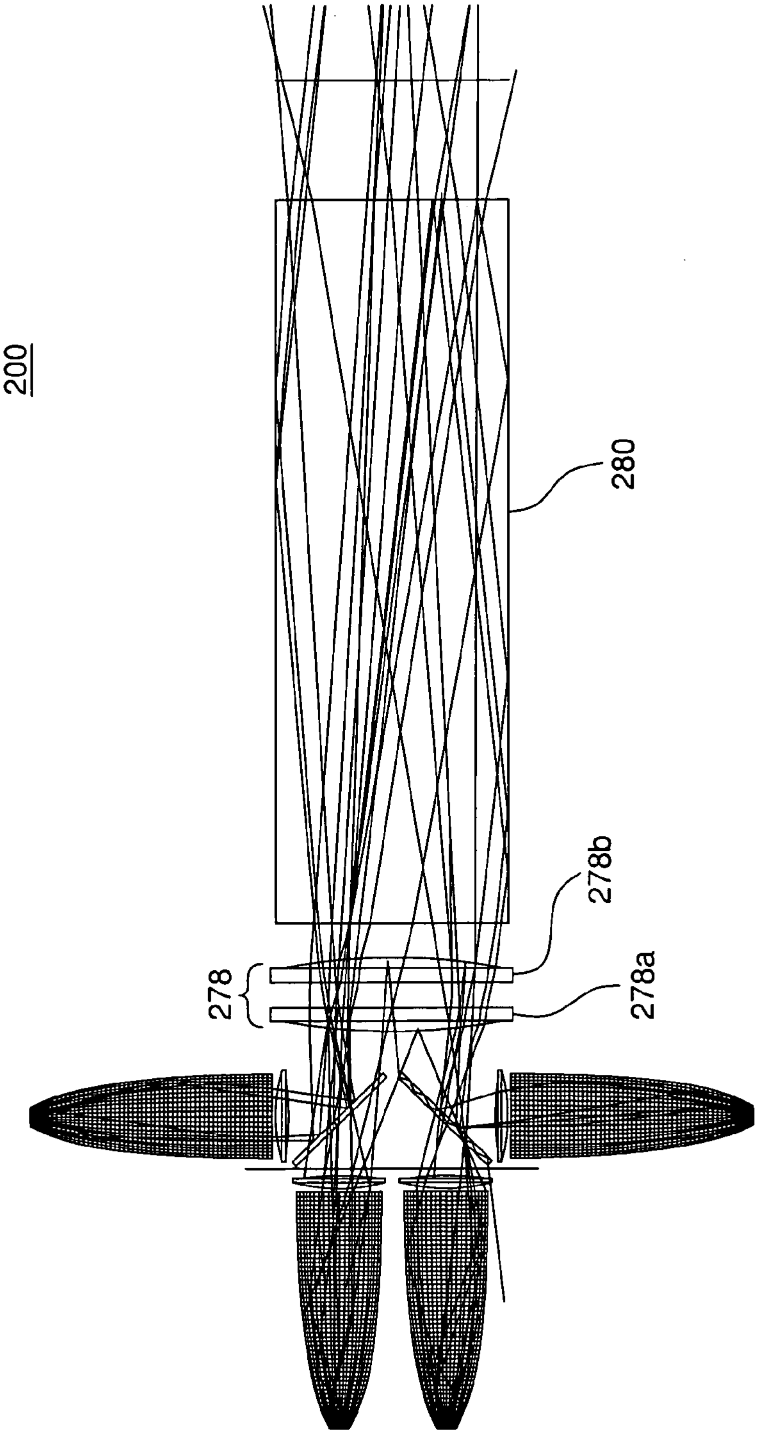
FIG. 15 is a side view of the portion of the digital light projection system shown in FIG. 13 with the addition of an optional second imaging lens. Select sample ray traces are also illustrated.

FIG. 15 is a side view of the portion 200 of the digital light projection system shown in FIG. 13 with imaging lens 278 alternatively comprising two imaging lenses 278*a*, 278*b*. Select sample ray traces are also illustrated.

Figure 16:
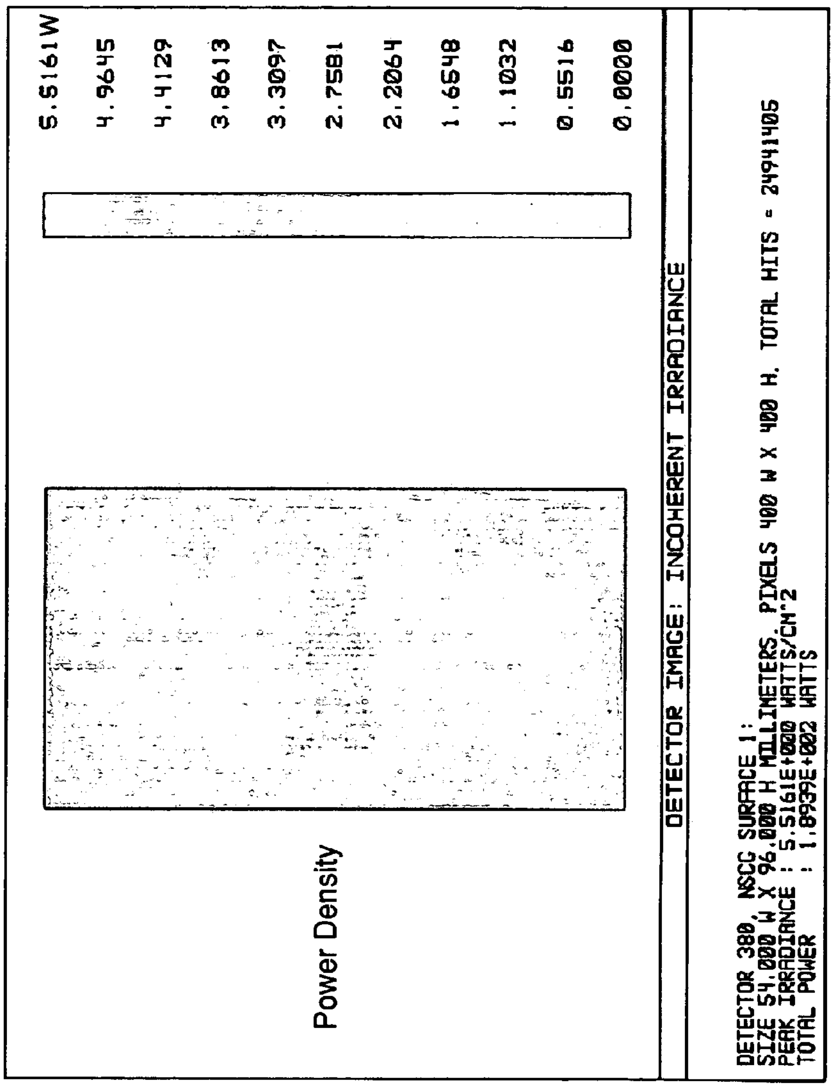
FIG. 16 is a Power Density plot of the portion of the digital light projection system shown in FIG. 13.

FIG. 16 is a Power Density plot of the portion 200 of the digital light projection system shown in FIG. 13. Since there are two adjacent light paths from LED array mounting boards 214*b*,214*c* and respective concentrator element 216*b*,216*c*, light from these two paths are directed towards different, opposite, and/or separate portions of the digital imaging device which is optically aligned subsequent the integrator element 280. This configuration is most beneficial in systems which employ a digital imaging device having an aspect ratio other than 1:1, and which is preferably 16:9. With this configuration, light substantially fills the etendue of the imaging device as depicted in FIG. 16. It is noted that the LED arrays mounted on LED array mounting boards 214*b*, 214*c* are preferably the same color and are more preferably green. LED array mounting boards 214*a*,214*d* are preferably red and blue, respectively or vice-versa. Variations of these preferred colors are possible. The two green sources produce circles which overlap and provide a better fill for a 16:9 imaging device and can therefore capture more brightness. This design also achieves greater thermal energy isolation for the green channels thereby providing the ability to overdrive the system while achieving better heat dissipation.

Also, although there are two adjacent green paths in this embodiment, one path may be alternatively contemplated. In this alterative configuration, light from a single green LED array mounting board and corresponding single concentrator may be transmitted through a single dichroic plate 240*a* or 240*b*, or preferably both dichroic plates 240*a* and 240*b*.

Optical concentrator elements 216*a-d* are individually positioned substantially adjacent to each of the LED arrays, wherein each concentrator element reflects light emitted from the plurality of LEDs within the corresponding LED array so as to provide substantially uniform light at an output surface of each concentrator element. The substantially uniform light provided at the output surface of at least two of the concentrator elements (i.e. 216*b*,216*c*) is directed towards different portions of the imaging device so as to substantially fill the etendue of the imaging device. The system preferably comprises an optical combiner element (e.g. comprising dichroic plates 240*a*, 240*b*), wherein the combiner element chromatically combines the substantially uniform light provided at the output surface of each concentrator element so as to form color-combined light at an output surface of the combiner element.

The output surface of each concentrator element is optically aligned with a corresponding side of the combiner element, wherein the combiner element chromatically combines the substantially uniform light provided at the output surface of each concentrator element so as to form color-combined light at an output surface of the combiner element;

The first dichroic element 240*a* and the second dichroic element 240*b* are positioned substantially adjacent to each other and are angled with respect to each other so as to form a substantially V-shaped pattern, wherein each of the first dichroic element and the second dichroic element spatially combines the substantially uniform light provided at the output surface of at most two of the concentrator elements.

The first dichroic element 240*a* spatially combines the substantially uniform light provided at the output surface of each of a first and a second of the concentrator elements (i.e. 216*a*,216*b*), wherein the second dichroic element 240*b* spatially combines the substantially uniform light provided at the output surface of each of a third and a fourth of the concentrator elements (i.e. 216*c*,216*d*), and wherein the second concentrator element 216*b* and the third concentrator element 216*c* are positioned substantially adjacent to each other such that the output surfaces of the second concentrator element and third concentrator element are optically aligned with a common side of the combiner element which comprises dichroic plates 240*a*,240*b*. The first dichroic element 240*a* reflects the substantially uniform light provided at the output surface of the first concentrator element 216*a*, and wherein the first dichroic element 240*a* transmits the substantially uniform light provided at the output surface of the second concentrator element 216*b*. The second dichroic element 240*b* reflects the substantially uniform light provided at the output surface of the fourth concentrator element 216*d*, and wherein the second dichroic element 240*b* transmits the substantially uniform light provided at the output surface of the third concentrator element 216*c*. The first concentrator element 216*a* and the fourth concentrator element 216*d* are oriented in substantially opposite directions from each other such that the output surfaces of the first concentrator element and the fourth concentrator element are optically aligned with opposite sides of the combiner element, and wherein the common side of the combiner element joins the opposite sides of the combiner element.

The plurality of LED arrays mounted on LED array mounting boards 214*a-d* preferably consists of 4 LED arrays, wherein the 4 LED arrays consist of 4 single-color LED arrays, and wherein 3 of the 4 single-color LED arrays is of a different color from one another. The 4 single-color LED arrays more preferably consist of an LED array consisting of only red LEDs, an LED array consisting of only green LEDs, an LED array consisting of only blue LEDs, and an LED array consisting of only either red, green, or blue LEDs.

The substantially uniform light at the output surface of the second and third concentrator elements 216*b*,216*c* is substantially the same color and is preferably green.

In a preferred embodiment, the blue LED array comprises 32 blue LEDs, the red LED array comprises 45 red LEDs, and each of the green LED arrays comprise 45 green LEDs. It is noted that the number and overall positions of the individual LEDs within a particular LED array may vary and is selected based on the etendue of the spatial light modulator (imaging device) combined with the desired white point of the imaging system.

The system further comprises a common field lens provided between the output surfaces of the second and third concentrator elements, and the common side of the combiner element.

The system further comprises a digital imaging device, wherein the imaging device has an aspect ratio other than 1:1, and wherein the substantially uniform light provided at the output surfaces of the second and third concentrator elements are directed towards different, opposite, or separate portions of the imaging device so as to substantially fill the etendue of the imaging device.

In an alternative configuration, a field lens may be provided between the output surface of each concentrator element and the corresponding side of the combiner element.

At least one of the first dichroic element and the second dichroic element is a dichroic plate. The first dichroic element and the second dichroic element may be defined by dichroic coatings on two adjacent facets of a prism.

The reflection of light performed by the concentrator elements may be specular reflection but is preferably total internal reflection.

The output surface of the combiner element is optically aligned with an input surface of the integrator element 280, wherein the integrator element spatially homogenizes the color-combined light provided at the output surface of the combiner element so as to form color-combined light which is substantially homogenized at an output surface of the integrator element.

At least one field lens may be provided between the output surface of the combiner element and the input surface of the integrator element.

The concentrator elements preferably each have a conic shape, and more preferably have a complex conic shape. The concentrator elements may each either have a substantially parabolic cross section, a cross section which is a portion of a substantially hyperbolic shape, a cross section which is a portion of a substantially elliptical shape, or combinations thereof. The concentrator elements may comprise a material selected from the group consisting of a polymer, plastic, glass, metal, and combinations thereof. The concentrator elements preferably comprise Zeonex®.

The output surface of each concentrator element is imaged directly on the digital imaging device, wherein the imaging device may have an aspect ratio other than 1:1, and is preferably 16:9. With the two adjacent concentrators 216*b*,216*c*, the system is able to more efficiently couple to a rectangular imaging device.

In the preferred exemplary configuration shown in FIGS. 13-15, the ZEMAX software outputs surface data describing these surface characteristics as illustrated in Table 3.

TABLE 3

ZEMAX Software Output Describing Surface Data Summary and Detail for Each Individual Element within the Illumination Optical System illustrated in FIGS. 13-15

GENERAL LENS DATA:

Glass Catalogs: SCHOTT MISC
Temperature (C.): 2.00000E+001
Pressure (ATM): 1.00000E+000
Adjust Index Data To Environment: Off
Primary Wavelength: 0.5875618 μm
Lens Units: Millimeters
Wavelengths: 3
Units: μm

| # | Value | Weight |
|---|---|---|
| 1 | 0.486133 | 1.000000 |
| 2 | 0.587562 | 1.000000 |
| 3 | 0.656273 | 1.000000 |

Object DATA DETAIL:

There are 385 objects:
Object 1: SUBSTRATE
Object type: Rectangular Volume (NSC_RBLK)
CSG 0: Side Faces
Coating: (none)
Scattering: Lambertian
Scatter Fraction: 0.4
Number of Scatter Rays: 0
CSG 1: Front Face
Coating: (none)
Scattering: None
CSG 2: Back Face
Coating: (none)
Scattering: None
Reference object: 0
Inside of: 0

| | | | | |
|---|---|---|---|---|
| XYZ position: | 0 | 148 | 130 | |
| Tilt about XYZ: | 90 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | −3.82858892E−016 | −1.00000000E+000 | 1.48000000E+002 |
| Pos. Mtrx. R31 R32 R33 Z: | 0.00000000E+000 | 1.00000000E+000 | −3.82858892E−016 | 1.30000000E+002 |

Material: MIRROR
X1 Half Width: 4
Y1 Half Width: 4
Z Length: 0.5

TABLE 3-continued

ZEMAX Software Output Describing Surface Data Summary and Detail for Each Individual Element within the Illumination Optical System illustrated in FIGS. 13-15

X2 Half Width: 4
Y2 Half Width: 4
Front X Angle: 0
Front Y Angle: 0
Rear X Angle: 0
Rear Y Angle: 0
Object 2: ROW 5
Object type: Null Object (NSC_NULL)
Reference object: 0
Inside of: 0
XYZ position: 0 −0.3556 0
Tilt about XYZ: 0 0 0
Pos. Mtrx. R11 R12 R13 X: 1.00000000E+000 0.00000000E+000 0.00000000E+000 −3.55600000E−001
Pos. Mtrx. R21 R22 R23 Y: 0.00000000E+000 1.00000000E+000 0.00000000E+000 0.00000000E+000
Pos. Mtrx. R31 R32 R33 Z: 0.00000000E+000 0.00000000E+000 1.00000000E+000 0.00000000E+000
Material:
Index at 0.486133 μm = 1.00000000
Index at 0.587562 μm = 1.00000000
Index at 0.656273 μm = 1.00000000
Object 3: LED EMITTER C5
Object type: Source Volume Rectangle (NSC_VSRR)
Reference object: −2
Inside of: 0
XYZ position: 0.6 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.30000000E+002
Layout Rays: 0
Analysis Rays: 10000
Power(Watts): 1
Wavenumber: 1
Color #: 1
X Half Width: 0.1778
Y Half Width: 0.1778
Z Half Width: 0.01
Object 4: LED EMITTER C4
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.30711200E+002
Layout Rays: 1
Analysis Rays: 10000
Power(Watts): 1
Wavenumber: 1
Color #: 1
X Half Width: 0.1778
Y Half Width: 0.1778
Z Half Width: 0.01
Object 5: LED EMITTER C3
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.31422400E+002
Layout Rays: 0
Analysis Rays: 10000
Power(Watts): 1
Wavenumber: 1
Color #: 1
X Half Width: 0.1778
Y Half Width: 0.1778
Z Half Width: 0.01
Object 6: LED EMITTER C2
Object type: Source Volume Rectangle (NSC_VSRR)
Reference object: −1
Inside of: 0
XYZ position: 0 0.7112 0
Tilt about XYZ: 0 0 0

TABLE 3-continued

ZEMAX Software Output Describing Surface Data Summary and Detail for Each Individual Element within the Illumination Optical System illustrated in FIGS. 13-15

Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.32133600E+002
Layout Rays: 0
Analysis Rays: 10000
Power(Watts): 1
Wavenumber: 1
Color #: 1
X Half Width: 0.1778
Y Half Width: 0.1778
Z Half Width: 0.01
Object 7: LED EMITTER C1
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.32844800E+002
Layout Rays: 0
Analysis Rays: 10000
Power(Watts): 1
Wavenumber: 1
Color #: 1
X Half Width: 0.1778
Y Half Width: 0.1778
Z Half Width: 0.01
Object 8: LED EMITTER C6
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.32133600E+002
Layout Rays: 0
Analysis Rays: 10000
Power(Watts): 1
Wavenumber: 1
Color #: 1
X Half Width: 0.1778
Y Half Width: 0.1778
Z Half Width: 0.01
Object 9: LED EMITTER C7
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.31422400E+002
Layout Rays: 0
Analysis Rays: 10000
Power(Watts): 1
Wavenumber: 1
Color #: 1
X Half Width: 0.1778
Y Half Width: 0.1778
Z Half Width: 0.01
Object 10: LED EMITTER C8
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.30711200E+002
Layout Rays: 0
Analysis Rays: 10000

TABLE 3-continued

ZEMAX Software Output Describing Surface Data Summary and Detail for Each Individual Element within the Illumination Optical System illustrated in FIGS. 13-15

Power(Watts): 1
Wavenumber: 1
Color #: 1
X Half Width: 0.1778
Y Half Width: 0.1778
Z Half Width: 0.01
Object 11: LED EMITTER C9
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30000000E+002 |

Layout Rays: 0
Analysis Rays: 10000
Power(Watts): 1
Wavenumber: 1
Color #: 1
X Half Width: 0.1778
Y Half Width: 0.1778
Z Half Width: 0.01
Object 12: ROW 4
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 µm = 1.00000000
Index at 0.587562 µm = 1.00000000
Index at 0.656273 µm = 1.00000000
Object 13: LED EMITTER C5
Object type: Source Volume Rectangle (NSC_VSRR)
Reference object: −10
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30000000E+002 |

Layout Rays: 0
Analysis Rays: 10000
Power(Watts): 1
Wavenumber: 1
Color #: 2
X Half Width: 0.1778
Y Half Width: 0.1778
Z Half Width: 0.01
Object 14: LED EMITTER C4
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30711200E+002 |

Layout Rays: 0
Analysis Rays: 10000
Power(Watts): 1
Wavenumber: 1
Color #: 2
X Half Width: 0.1778
Y Half Width: 0.1778
Z Half Width: 0.01
Object 15: LED EMITTER C3
Object type: Source Volume Rectangle (NSC_VSRR)
Reference object: −1
Inside of: 0
XYZ position: 0 0.7112 0
Tilt about XYZ: 0 0 0

TABLE 3-continued

ZEMAX Software Output Describing Surface Data Summary and Detail for Each Individual Element within the Illumination Optical System illustrated in FIGS. 13-15

| | | | | |
|---|---|---|---|---|
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.31422400E+002 |

Layout Rays: 0
Analysis Rays: 10000
Power(Watts): 1
Wavenumber: 1
Color #: 2
X Half Width: 0.1778
Y Half Width: 0.1778
Z Half Width: 0.01
Object 16: LED EMITTER C2
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |

Layout Rays: 0
Analysis Rays: 10000
Power(Watts): 1
Wavenumber: 1
Color #: 2
X Half Width: 0.1778
Y Half Width: 0.1778
Z Half Width: 0.01
Object 17: LED EMITTER C1
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |

Layout Rays: 0
Analysis Rays: 10000
Power(Watts): 1
Wavenumber: 1
Color #: 2
X Half Width: 0.1778
Y Half Width: 0.1778
Z Half Width: 0.01
Object 18: LED EMITTER C6
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |

Layout Rays: 0
Analysis Rays: 10000
Power(Watts): 1
Wavenumber: 1
Color #: 2
X Half Width: 0.1778
Y Half Width: 0.1778
Z Half Width: 0.01
Object 19: LED EMITTER C7
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.31422400E+002 |

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 1
Color #: 2
X Half Width: 0.1778
Y Half Width: 0.1778
Z Half Width: 0.01
Object 20: LED EMITTER C8
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30711200E+002 |

Layout Rays: 0
Analysis Rays: 10000
Power(Watts): 1
Wavenumber: 1
Color #: 2
X Half Width: 0.1778
Y Half Width: 0.1778
Z Half Width: 0.01
Object 21: LED EMITTER C9
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30000000E+002 |

Layout Rays: 0
Analysis Rays: 10000
Power(Watts): 1
Wavenumber: 1
Color #: 2
X Half Width: 0.1778
Y Half Width: 0.1778
Z Half Width: 0.01
Object 22: ROW 3
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 23: LED EMITTER C5
Object type: Source Volume Rectangle (NSC_VSRR)
Reference object: −20
Inside of: 0
XYZ position: 0 −1.4224 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30000000E+002 |

Layout Rays: 0
Analysis Rays: 10000
Power(Watts): 1
Wavenumber: 1
Color #: 3
X Half Width: 0.1778
Y Half Width: 0.1778
Z Half Width: 0.01

TABLE 3-continued

ZEMAX Software Output Describing Surface Data Summary and Detail for Each Individual Element within the Illumination Optical System illustrated in FIGS. 13-15

Object 24: LED EMITTER C4
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30711200E+002 |

Layout Rays: 0
Analysis Rays: 10000
Power(Watts): 1
Wavenumber: 1
Color #: 3
X Half Width: 0.1778
Y Half Width: 0.1778
Z Half Width: 0.01
Object 25: LED EMITTER C3
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.31422400E+002 |

Layout Rays: 0
Analysis Rays: 10000
Power(Watts): 1
Wavenumber: 1
Color #: 3
X Half Width: 0.1778
Y Half Width: 0.1778
Z Half Width: 0.01
Object 26: LED EMITTER C2
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |

Layout Rays: 0
Analysis Rays: 10000
Power(Watts): 1
Wavenumber: 1
Color #: 3
X Half Width: 0.1778
Y Half Width: 0.1778
Z Half Width: 0.01
Object 27: LED EMITTER C1
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |

Layout Rays: 1
Analysis Rays: 10000
Power(Watts): 1
Wavenumber: 1
Color #: 3
X Half Width: 0.1778
Y Half Width: 0.1778
Z Half Width: 0.01
Object 28: LED EMITTER C6
Object type: Source Volume Rectangle (NSC_VSRR)
Reference object: −1
Inside of: 0

| | | | |
|---|---|---|---|
| XYZ position: | 0 | −0.7112 | 0 |
| Tilt about XYZ: | 0 | 0 | 0 |

TABLE 3-continued

ZEMAX Software Output Describing Surface Data Summary and Detail for Each Individual Element within the Illumination Optical System illustrated in FIGS. 13-15

| | | | | |
|---|---|---|---|---|
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |
| # Layout Rays: 0 | | | | |
| # Analysis Rays: 10000 | | | | |
| Power(Watts): 1 | | | | |
| Wavenumber: 1 | | | | |
| Color #: 3 | | | | |
| X Half Width: 0.1778 | | | | |
| Y Half Width: 0.1778 | | | | |
| Z Half Width: 0.01 | | | | |
| Object 29: LED EMITTER C7 | | | | |
| Object type: Source Volume Rectangle (NSC_VSRR) | | | | |
| Reference object: −1 | | | | |
| Inside of: 0 | | | | |
| XYZ position: 0 −0.7112 0 | | | | |
| Tilt about XYZ: 0 0 0 | | | | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.31422400E+002 |
| # Layout Rays: 0 | | | | |
| # Analysis Rays: 10000 | | | | |
| Power(Watts): 1 | | | | |
| Wavenumber: 1 | | | | |
| Color #: 3 | | | | |
| X Half Width: 0.1778 | | | | |
| Y Half Width: 0.1778 | | | | |
| Z Half Width: 0.01 | | | | |
| Object 30: LED EMITTER C8 | | | | |
| Object type: Source Volume Rectangle (NSC_VSRR) | | | | |
| Reference object: −1 | | | | |
| Inside of: 0 | | | | |
| XYZ position: 0 −0.7112 0 | | | | |
| Tilt about XYZ: 0 0 0 | | | | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30711200E+002 |
| # Layout Rays: 0 | | | | |
| # Analysis Rays: 10000 | | | | |
| Power(Watts): 1 | | | | |
| Wavenumber: 1 | | | | |
| Color #: 3 | | | | |
| X Half Width: 0.1778 | | | | |
| Y Half Width: 0.1778 | | | | |
| Z Half Width: 0.01 | | | | |
| Object 31: LED EMITTER C9 | | | | |
| Object type: Source Volume Rectangle (NSC_VSRR) | | | | |
| Reference object: −1 | | | | |
| Inside of: 0 | | | | |
| XYZ position: 0 −0.7112 0 | | | | |
| Tilt about XYZ: 0 0 0 | | | | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30000000E+002 |
| # Layout Rays: 0 | | | | |
| # Analysis Rays: 10000 | | | | |
| Power(Watts): 1 | | | | |
| Wavenumber: 1 | | | | |
| Color #: 3 | | | | |
| X Half Width: 0.1778 | | | | |
| Y Half Width: 0.1778 | | | | |
| Z Half Width: 0.01 | | | | |
| Object 32: ROW 2 | | | | |
| Object type: Null Object (NSC_NULL) | | | | |
| Reference object: 0 | | | | |
| Inside of: 0 | | | | |
| XYZ position: 0 00 | | | | |
| Tilt about XYZ: 0 00 | | | | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

TABLE 3-continued

ZEMAX Software Output Describing Surface Data Summary and Detail for Each Individual Element within the Illumination Optical System illustrated in FIGS. 13-15

Material:
Index at 0.486133 μm = 1.00000000
Index at 0.587562 μm = 1.00000000
Index at 0.656273 μm = 1.00000000
Object 33: LED EMITTER C5
Object type: Source Volume Rectangle (NSC__VSRR)
Reference object: −30
Inside of: 0
XYZ position: 0 −2.1336 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30000000E+002 |

Layout Rays: 0
Analysis Rays: 10000
Power(Watts): 1
Wavenumber: 1
Color #: 4
X Half Width: 0.1778
Y Half Width: 0.1778
Z Half Width: 0.01
Object 34: LED EMITTER C4
Object type: Source Volume Rectangle (NSC__VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30711200E+002 |

Layout Rays: 0
Analysis Rays: 10000
Power(Watts): 1
Wavenumber: 1
Color #: 4
X Half Width: 0.1778
Y Half Width: 0.1778
Z Half Width: 0.01
Object 35: LED EMITTER C3
Object type: Source Volume Rectangle (NSC__VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.31422400E+002 |

Layout Rays: 0
Analysis Rays: 10000
Power(Watts): 1
Wavenumber: 1
Color #: 4
X Half Width: 0.1778
Y Half Width: 0.1778
Z Half Width: 0.01
Object 36: LED EMITTER C2
Object type: Source Volume Rectangle (NSC__VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |

Layout Rays: 0
Analysis Rays: 10000
Power(Watts): 1
Wavenumber: 1

TABLE 3-continued

ZEMAX Software Output Describing Surface Data Summary and Detail for Each Individual Element within the Illumination Optical System illustrated in FIGS. 13-15

Color #: 4
X Half Width: 0.1778
Y Half Width: 0.1778
Z Half Width: 0.01
Object 37: LED EMITTER C1
Object type: Null Object (NSC_NULL)
Reference object: 36
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |

Material:
Index at 0.486133 μm = 1.00000000
Index at 0.587562 μm = 1.00000000
Index at 0.656273 μm = 1.00000000
Object 38: LED EMITTER C6
Object type: Source Volume Rectangle (NSC_VSRR)
Reference object: −5
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.29288800E+002 |

Layout Rays: 0
Analysis Rays: 10000
Power(Watts): 1
Wavenumber: 1
Color #: 4
X Half Width: 0.1778
Y Half Width: 0.1778
Z Half Width: 0.01
Object 39: LED EMITTER C7
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.28577600E+002 |

Layout Rays: 0
Analysis Rays: 10000
Power(Watts): 1
Wavenumber: 1
Color #: 4
X Half Width: 0.1778
Y Half Width: 0.1778
Z Half Width: 0.01
Object 40: LED EMITTER C8
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27866400E+002 |

Layout Rays: 0
Analysis Rays: 10000
Power(Watts): 1
Wavenumber: 1
Color #: 4
X Half Width: 0.1778
Y Half Width: 0.1778
Z Half Width: 0.01
Object 41: LED EMITTER C9
Object type: Null Object (NSC_NULL)

TABLE 3-continued

ZEMAX Software Output Describing Surface Data Summary and Detail for Each Individual Element within the Illumination Optical System illustrated in FIGS. 13-15

Reference object: 40
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |

Material:
Index at 0.486133 μm = 1.00000000
Index at 0.587562 μm = 1.00000000
Index at 0.656273 μm = 1.00000000
Object 42: ROW 1
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 43: LED EMITTER C5
Object type: Source Volume Rectangle (NSC_VSRR)
Reference object: −40
Inside of: 0
XYZ position: 0 −2.8448 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30000000E+002 |

Layout Rays: 0
Analysis Rays: 10000
Power(Watts): 1
Wavenumber: 1
Color #: 5
X Half Width: 0.1778
Y Half Width: 0.1778
Z Half Width: 0.01
Object 44: LED EMITTER C4
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30711200E+002 |

Layout Rays: 0
Analysis Rays: 10000
Power(Watts): 1
Wavenumber: 1
Color #: 5
X Half Width: 0.1778
Y Half Width: 0.1778
Z Half Width: 0.01
Object 45: LED EMITTER C3
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.31422400E+002 |

Layout Rays: 0
Analysis Rays: 10000
Power(Watts): 1
Wavenumber: 1

TABLE 3-continued

ZEMAX Software Output Describing Surface Data Summary and Detail for Each Individual Element within the Illumination Optical System illustrated in FIGS. 13-15

Color #: 5
X Half Width: 0.1778
Y Half Width: 0.1778
Z Half Width: 0.01
Object 46: LED EMITTER C2
Object type: Null Object (NSC_NULL)
Reference object: 45
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |

Material:
Index at 0.486133 μm = 1.00000000
Index at 0.587562 μm = 1.00000000
Index at 0.656273 μm = 1.00000000
Object 47: LED EMITTER C1
Object type: Null Object (NSC_NULL)
Reference object: 46
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |

Material:
Index at 0.486133 μm = 1.00000000
Index at 0.587562 μm = 1.00000000
Index at 0.656273 μm = 1.00000000
Object 48: LED EMITTER C6
Object type: Source Volume Rectangle (NSC_VSRR)
Reference object: −5
Inside of: 0

| | | | | |
|---|---|---|---|---|
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.29288800E+002 |

Layout Rays: 0
Analysis Rays: 10000
Power(Watts): 1
Wavenumber: 1
Color #: 5
X Half Width: 0.1778
Y Half Width: 0.1778
Z Half Width: 0.01
Object 49: LED EMITTER C7
Object type: Source Volume Rectangle (NSC_VSRR)
Reference object: −1
Inside of: 0

| | | | | |
|---|---|---|---|---|
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.28577600E+002 |

Layout Rays: 0
Analysis Rays: 10000
Power(Watts): 1
Wavenumber: 1
Color #: 5
X Half Width: 0.1778
Y Half Width: 0.1778
Z Half Width: 0.01
Object 50: LED EMITTER C8
Object type: Null Object (NSC_NULL)
Reference object: 49
Inside of: 0

| | | | | |
|---|---|---|---|---|
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27866400E+002 |

TABLE 3-continued

ZEMAX Software Output Describing Surface Data Summary and Detail for Each Individual Element within the Illumination Optical System illustrated in FIGS. 13-15

Material:
Index at 0.486133 μm = 1.00000000
Index at 0.587562 μm = 1.00000000
Index at 0.656273 μm = 1.00000000
Object 51: LED EMITTER C9
Object type: Null Object (NSC_NULL)
Reference object: 50
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |

Material:
Index at 0.486133 μm = 1.00000000
Index at 0.587562 μm = 1.00000000
Index at 0.656273 μm = 1.00000000
Object 52: ROW 6
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 53: LED EMITTER C5
Object type: Source Volume Rectangle (NSC_VSRR)
Reference object: −50
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30000000E+002 |

Layout Rays: 0
Analysis Rays: 10000
Power(Watts): 1
Wavenumber: 1
Color #: 6
X Half Width: 0.1778
Y Half Width: 0.1778
Z Half Width: 0.01
Object 54: LED EMITTER C4
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30711200E+002 |

Layout Rays: 0
Analysis Rays: 10000
Power(Watts): 1
Wavenumber: 1
Color #: 6
X Half Width: 0.1778
Y Half Width: 0.1778
Z Half Width: 0.01
Object 55: LED EMITTER C3
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.31422400E+002 |

TABLE 3-continued

ZEMAX Software Output Describing Surface Data Summary and Detail for Each Individual Element within the Illumination Optical System illustrated in FIGS. 13-15

Layout Rays: 1
Analysis Rays: 10000
Power(Watts): 1
Wavenumber: 1
Color #: 6
X Half Width: 0.1778
Y Half Width: 0.1778
Z Half Width: 0.01
Object 56: LED EMITTER C2
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |

Layout Rays: 0
Analysis Rays: 10000
Power(Watts): 1
Wavenumber: 1
Color #: 6
X Half Width: 0.1778
Y Half Width: 0.1778
Z Half Width: 0.01
Object 57: LED EMITTER C1
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |

Layout Rays: 0
Analysis Rays: 10000
Power(Watts): 1
Wavenumber: 1
Color #: 6
X Half Width: 0.1778
Y Half Width: 0.1778
Z Half Width: 0.01
Object 58: LED EMITTER C6
Object type: Source Volume Rectangle (NSC_VSRR)
Reference object: −5
Inside of: 0

| | | | | |
|---|---|---|---|---|
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.29288800E+002 |

Layout Rays: 0
Analysis Rays: 10000
Power(Watts): 1
Wavenumber: 1
Color #: 6
X Half Width: 0.1778
Y Half Width: 0.1778
Z Half Width: 0.01
Object 59: LED EMITTER C7
Object type: Source Volume Rectangle (NSC_VSRR)
Reference object: −1
Inside of: 0

| | | | | |
|---|---|---|---|---|
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.28577600E+002 |

Layout Rays: 0
Analysis Rays: 10000
Power(Watts): 1
Wavenumber: 1

TABLE 3-continued

ZEMAX Software Output Describing Surface Data Summary and Detail for Each Individual Element within the Illumination Optical System illustrated in FIGS. 13-15

Color #: 6
X Half Width: 0.1778
Y Half Width: 0.1778
Z Half Width: 0.01
Object 60: LED EMITTER C8
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27866400E+002 |

Layout Rays: 0
Analysis Rays: 10000
Power(Watts): 1
Wavenumber: 1
Color #: 6
X Half Width: 0.1778
Y Half Width: 0.1778
Z Half Width: 0.01
Object 61: LED EMITTER C9
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |

Layout Rays: 0
Analysis Rays: 10000
Power(Watts): 1
Wavenumber: 1
Color #: 6
X Half Width: 0.1778
Y Half Width: 0.1778
Z Half Width: 0.01
Object 62: ROW 7
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 63: LED EMITTER C5
Object type: Source Volume Rectangle (NSC_VSRR)
Reference object: −60
Inside of: 0
XYZ position: 0 1.4224 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30000000E+002 |

Layout Rays: 0
Analysis Rays: 10000
Power(Watts): 1
Wavenumber: 1
Color #: 7
X Half Width: 0.1778
Y Half Width: 0.1778
Z Half Width: 0.01
Object 64: LED EMITTER C4
Object type: Source Volume Rectangle (NSC_VSRR)
Reference object: −1

TABLE 3-continued

ZEMAX Software Output Describing Surface Data Summary and Detail for Each Individual Element within the Illumination Optical System illustrated in FIGS. 13-15

Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 1.42240000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.30711200E+002
Layout Rays: 0
Analysis Rays: 10000
Power(Watts): 1
Wavenumber: 1
Color #: 7
X Half Width: 0.1778
Y Half Width: 0.1778
Z Half Width: 0.01
Object 65: LED EMITTER C3
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 1.42240000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.31422400E+002
Layout Rays: 0
Analysis Rays: 10000
Power(Watts): 1
Wavenumber: 1
Color #: 7
X Half Width: 0.1778
Y Half Width: 0.1778
Z Half Width: 0.01
Object 66: LED EMITTER C2
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 1.42240000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.32133600E+002
Layout Rays: 0
Analysis Rays: 10000
Power(Watts): 1
Wavenumber: 1
Color #: 7
X Half Width: 0.1778
Y Half Width: 0.1778
Z Half Width: 0.01
Object 67: LED EMITTER C1
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 1.42240000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.32844800E+002
Layout Rays: 0
Analysis Rays: 10000
Power(Watts): 1
Wavenumber: 1
Color #: 7
X Half Width: 0.1778
Y Half Width: 0.1778
Z Half Width: 0.01
Object 68: LED EMITTER C6
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 1.42240000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.32133600E+002
Layout Rays: 0
Analysis Rays: 10000

TABLE 3-continued

ZEMAX Software Output Describing Surface Data Summary and Detail for Each Individual Element within the Illumination Optical System illustrated in FIGS. 13-15

Power(Watts): 1
Wavenumber: 1
Color #: 7
X Half Width: 0.1778
Y Half Width: 0.1778
Z Half Width: 0.01
Object 69: LED EMITTER C7
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.31422400E+002 |

Layout Rays: 0
Analysis Rays: 10000
Power(Watts): 1
Wavenumber: 1
Color #: 7
X Half Width: 0.1778
Y Half Width: 0.1778
Z Half Width: 0.01
Object 70: LED EMITTER C8
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30711200E+002 |

Layout Rays: 0
Analysis Rays: 10000
Power(Watts): 1
Wavenumber: 1
Color #: 7
X Half Width: 0.1778
Y Half Width: 0.1778
Z Half Width: 0.01
Object 71: LED EMITTER C9
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30000000E+002 |

Layout Rays: 0
Analysis Rays: 10000
Power(Watts): 1
Wavenumber: 1
Color #: 7
X Half Width: 0.1778
Y Half Width: 0.1778
Z Half Width: 0.01
Object 72: ROW 8
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 73: LED EMITTER C5
Object type: Source Volume Rectangle (NSC_VSRR)
Reference object: −70
Inside of: 0
XYZ position: 0 2.1336 0
Tilt about XYZ: 0 0 0

TABLE 3-continued

ZEMAX Software Output Describing Surface Data Summary and Detail for Each Individual Element within the Illumination Optical System illustrated in FIGS. 13-15

Pos. Mtrx. R11 R12 R13 X: 1.00000000E+000 0.00000000E+000 0.00000000E+000 2.13360000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.30000000E+002
Layout Rays: 0
Analysis Rays: 10000
Power(Watts): 1
Wavenumber: 1
Color #: 8
X Half Width: 0.1778
Y Half Width: 0.1778
Z Half Width: 0.01
Object 74: LED EMITTER C4
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 2.13360000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.30711200E+002
Layout Rays: 0
Analysis Rays: 10000
Power(Watts): 1
Wavenumber: 1
Color #: 8
X Half Width: 0.1778
Y Half Width: 0.1778
Z Half Width: 0.01
Object 75: LED EMITTER C3
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 2.13360000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.31422400E+002
Layout Rays: 0
Analysis Rays: 10000
Power(Watts): 1
Wavenumber: 1
Color #: 8
X Half Width: 0.1778
Y Half Width: 0.1778
Z Half Width: 0.01
Object 76: LED EMITTER C2
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 2.13360000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.32133600E+002
Layout Rays: 0
Analysis Rays: 10000
Power(Watts): 1
Wavenumber: 1
Color #: 8
X Half Width: 0.1778
Y Half Width: 0.1778
Z Half Width: 0.01
Object 77: LED EMITTER C1
Object type: Null Object (NSC_NULL)
Reference object: 76
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 2.13360000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.32844800E+002
Material:
Index at 0.486133 µm = 1.00000000
Index at 0.587562 µm = 1.00000000
Index at 0.656273 µm = 1.00000000

TABLE 3-continued

ZEMAX Software Output Describing Surface Data Summary and Detail for Each Individual Element within the Illumination Optical System illustrated in FIGS. 13-15

Object 78: LED EMITTER C6
Object type: Source Volume Rectangle (NSC_VSRR)
Reference object: −5
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 2.13360000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.29288800E+002
Layout Rays: 0
Analysis Rays: 10000
Power(Watts): 1
Wavenumber: 1
Color #: 8
X Half Width: 0.1778
Y Half Width: 0.1778
Z Half Width: 0.01
Object 79: LED EMITTER C7
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 2.13360000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.28577600E+002
Layout Rays: 0
Analysis Rays: 10000
Power(Watts): 1
Wavenumber: 1
Color #: 8
X Half Width: 0.1778
Y Half Width: 0.1778
Z Half Width: 0.01
Object 80: LED EMITTER C8
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 2.13360000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.27866400E+002
Layout Rays: 0
Analysis Rays: 10000
Power(Watts): 1
Wavenumber: 1
Color #: 8
X Half Width: 0.1778
Y Half Width: 0.1778
Z Half Width: 0.01
Object 81: LED EMITTER C9
Object type: Null Object (NSC_NULL)
Reference object: 80
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 2.13360000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.27155200E+002
Material:
Index at 0.486133 μm = 1.00000000
Index at 0.587562 μm = 1.00000000
Index at 0.656273 μm = 1.00000000
Object 82: ROW 9
Object type: Null Object (NSC_NULL)
Reference object: 0
Inside of: 0
XYZ position: 0 00
Tilt about XYZ: 0 00
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 0.00000000E+000
Pos. Mtrx. R31 R32 R33 Z: 0.00000000E+000 0.00000000E+000 1.00000000E+000 0.00000000E+000

TABLE 3-continued

ZEMAX Software Output Describing Surface Data Summary and Detail for Each Individual Element within the Illumination Optical System illustrated in FIGS. 13-15

Material:
Index at 0.486133 μm = 1.00000000
Index at 0.587562 μm = 1.00000000
Index at 0.656273 μm = 1.00000000
Object 83: LED EMITTER C5
Object type: Source Volume Rectangle (NSC_VSRR)
Reference object: −80
Inside of: 0
XYZ position: 0 2.8448 0
Tilt about XYZ: 0 0 0
Pos. Mtrx. R11 R12 R13 X: 1.00000000E+000 0.00000000E+000 0.00000000E+000 2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.30000000E+002
Layout Rays: 0
Analysis Rays: 10000
Power(Watts): 1
Wavenumber: 1
Color #: 9
X Half Width: 0.1778
Y Half Width: 0.1778
Z Half Width: 0.01
Object 84: LED EMITTER C4
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.30711200E+002
Layout Rays: 0
Analysis Rays: 10000
Power(Watts): 1
Wavenumber: 1
Color #: 9
X Half Width: 0.1778
Y Half Width: 0.1778
Z Half Width: 0.01
Object 85: LED EMITTER C3
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.31422400E+002
Layout Rays: 0
Analysis Rays: 10000
Power(Watts): 1
Wavenumber: 1
Color #: 9
X Half Width: 0.1778
Y Half Width: 0.1778
Z Half Width: 0.01
Object 86: LED EMITTER C2
Object type: Null Object (NSC_NULL)
Reference object: 85
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.32133600E+002
Material:
Index at 0.486133 μm = 1.00000000
Index at 0.587562 μm = 1.00000000
Index at 0.656273 μm = 1.00000000
Object 87: LED EMITTER C1
Object type: Null Object (NSC_NULL)
Reference object: 86

TABLE 3-continued

ZEMAX Software Output Describing Surface Data Summary and Detail for Each Individual Element within the Illumination Optical System illustrated in FIGS. 13-15

Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.32844800E+002
Material:
Index at 0.486133 µm = 1.00000000
Index at 0.587562 µm = 1.00000000
Index at 0.656273 µm = 1.00000000
Object 88: LED EMITTER C6
Object type: Source Volume Rectangle (NSC_VSRR)
Reference object: −5
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.29288800E+002
Layout Rays: 0
Analysis Rays: 10000
Power(Watts): 1
Wavenumber: 1
Color #: 9
X Half Width: 0.1778
Y Half Width: 0.1778
Z Half Width: 0.01
Object 89: LED EMITTER C7
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.28577600E+002
Layout Rays: 0
Analysis Rays: 10000
Power(Watts): 1
Wavenumber: 1
Color #: 9
X Half Width: 0.1778
Y Half Width: 0.1778
Z Half Width: 0.01
Object 90: LED EMITTER C8
Object type: Null Object (NSC_NULL)
Reference object: 89
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.27866400E+002
Material:
Index at 0.486133 µm = 1.00000000
Index at 0.587562 µm = 1.00000000
Index at 0.656273 µm = 1.00000000
Object 91: LED EMITTER C9
Object type: Null Object (NSC_NULL)
Reference object: 90
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.27155200E+002
Material:
Index at 0.486133 µm = 1.00000000
Index at 0.587562 µm = 1.00000000
Index at 0.656273 µm = 1.00000000
Object 92:
Object type: CPC (NSC_CPCO)
CSG 0: Side Faces
Coating: (none)

TABLE 3-continued

ZEMAX Software Output Describing Surface Data Summary and Detail for Each Individual Element within the Illumination Optical System illustrated in FIGS. 13-15

Scattering: None
CSG 1: Front Face
Coating: (none)
Scattering: None
CSG 2: Back Face
Coating: (none)
Scattering: None
Reference object: −91
Inside of: 0
XYZ position: 0.5 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | −3.82858892E−016 | −1.00000000E+000 | 1.47500000E+002 |
| Pos. Mtrx. R31 R32 R33 Z: | 0.00000000E+000 | 1.00000000E+000 | −3.82858892E−016 | 1.30000000E+002 |

Material: MIRROR
Radial Aperture: 3.6
Angle (deg): 12
Length: 98.4
#Angle Facets: 50
#Length Facets: 48
Is Volume?: 0
Object 93: Condenser
Object type: Standard Lens (NSC_SLEN)
CSG 0: Side Faces
Coating: (none)
Scattering: None
CSG 1: Front Face
Coating: (none)
Scattering: None
CSG 2: Back Face
Coating: (none)
Scattering: None
Reference object: −92
Inside of: 0
XYZ position: 100 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | −3.82858892E−016 | −1.00000000E+000 | 4.80000000E+001 |
| Pos. Mtrx. R31 R32 R33 Z: | 0.00000000E+000 | 1.00000000E+000 | −3.82858892E−016 | 1.30000000E+002 |

Material: BK7
Index at 0.486133 μm = 1.52237629
Index at 0.587562 μm = 1.51680003
Index at 0.656273 μm = 1.51432235
Radius 1: 75
Conic 1: 0
Clear 1: 19
Edge 1: 19
Thickness: 5
Radius 2: −175
Conic 2: 0
Clear 2: 19
Edge 2: 19
Object 94:
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 95: SUBSTRATE
Object type: Rectangular Volume (NSC_RBLK)
CSG 0: Side Faces
Coating: (none)
Scattering: Lambertian
Scatter Fraction: 0.4
Number of Scatter Rays: 0
CSG 1: Front Face
Coating: (none)
Scattering: None
CSG 2: Back Face TABLE 3-continued ZEMAX Software Output Describing Surface Data Summary and Detail for Each Individual Element within the Illumination Optical System illustrated in FIGS. 13-15

Coating: (none)
Scattering: None
Reference object: 0
Inside of: 0
XYZ position: 0 0 22
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 0.00000000E+000 |

Material: MIRROR
X1 Half Width: 4
Y1 Half Width: 4
Z Length: 0.5
X2 Half Width: 4
Y2 Half Width: 4
Front X Angle: 0
Front Y Angle: 0
Rear X Angle: 0
Rear Y Angle: 0
Object 96: ROW 5
Object type: Null Object (NSC_NULL)
Reference object: 0
Inside of: 0
XYZ position: 0 −0.3556 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −3.55600000E−001 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 µm = 1.00000000
Index at 0.587562 µm = 1.00000000
Index at 0.656273 µm = 1.00000000
Object 97: LED EMITTER C5
Object type: Source Volume Rectangle (NSC_VSRR)
Reference object: −2
Inside of: 0
XYZ position: 0.6 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 6.00000000E−001 |

Layout Rays: 1
Analysis Rays: 10000
Power(Watts): 1
Wavenumber: 2
Color #: 1
X Half Width: 0.1778
Y Half Width: 0.1778
Z Half Width: 0.01
Object 98: LED EMITTER C4
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 2.27112000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 1
X Half Width: 0.1778
Y Half Width: 0.1778
Z Half Width: 0.01
Object 99: LED EMITTER C3
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 2.34224000E+001 |
| Pos. Mtrx. R31 R32 R33 Z: | 0.00000000E+000 | 0.00000000E+000 | 1.00000000E+000 | 6.00000000E−001 |

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 2
Color #: 1
X Half Width: 0.1778
Y Half Width: 0.1778
Z Half Width: 0.01
Object 100: LED EMITTER C2
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 2.41336000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 1
X Half Width: 0.1778
Y Half Width: 0.1778
Z Half Width: 0.01
Object 101: LED EMITTER C1
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 2.48448000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 1
X Half Width: 0.1778
Y Half Width: 0.1778
Z Half Width: 0.01
Object 102: LED EMITTER C6
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 2.41336000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 1
X Half Width: 0.1778
Y Half Width: 0.1778
Z Half Width: 0.01
Object 103: LED EMITTER C7
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 2.34224000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 1
X Half Width: 0.1778
Y Half Width: 0.1778
Z Half Width: 0.01

TABLE 3-continued

ZEMAX Software Output Describing Surface Data Summary and Detail for Each Individual Element within the Illumination Optical System illustrated in FIGS. 13-15

Object 104: LED EMITTER C8
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 2.27112000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 1
X Half Width: 0.1778
Y Half Width: 0.1778
Z Half Width: 0.01
Object 105: LED EMITTER C9
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 1
X Half Width: 0.1778
Y Half Width: 0.1778
Z Half Width: 0.01
Object 106: ROW 4
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 107: LED EMITTER C5
Object type: Source Volume Rectangle (NSC_VSRR)
Reference object: −10
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 2
X Half Width: 0.1778
Y Half Width: 0.1778
Z Half Width: 0.01
Object 108: LED EMITTER C4
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | 2.27112000E+001 |
| Pos. Mtrx. R31 R32 R33 Z: | 0.00000000E+000 | 0.00000000E+000 | 1.00000000E+000 | 6.00000000E−001 |

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 2
Color #: 2
X Half Width: 0.1778
Y Half Width: 0.1778
Z Half Width: 0.01
Object 109: LED EMITTER C3
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | 2.34224000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 2
X Half Width: 0.1778
Y Half Width: 0.1778
Z Half Width: 0.01
Object 110: LED EMITTER C2
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | 2.41336000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 2
X Half Width: 0.1778
Y Half Width: 0.1778
Z Half Width: 0.01
Object 111: LED EMITTER C1
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | 2.48448000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 2
X Half Width: 0.1778
Y Half Width: 0.1778
Z Half Width: 0.01
Object 112: LED EMITTER C6
Object type: Source Volume Rectangle (NSC_VSRR)
Reference object: −1
Inside of: 0

| | | | | |
|---|---|---|---|---|
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | 2.41336000E+001 |
| Pos. Mtrx. R31 R32 R33 Z: | 0.00000000E+000 | 0.00000000E+000 | 1.00000000E+000 | 6.00000000E−001 |

Layout Rays: 1
Analysis Rays: 10000
Power(Watts): 1
Wavenumber: 2
Color #: 2
X Half Width: 0.1778
Y Half Width: 0.1778
Z Half Width: 0.01

TABLE 3-continued

ZEMAX Software Output Describing Surface Data Summary and Detail for Each Individual Element within the Illumination Optical System illustrated in FIGS. 13-15

Object 113: LED EMITTER C7
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | 2.34224000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 2
X Half Width: 0.1778
Y Half Width: 0.1778
Z Half Width: 0.01
Object 114: LED EMITTER C8
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | 2.27112000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 2
X Half Width: 0.1778
Y Half Width: 0.1778
Z Half Width: 0.01
Object 115: LED EMITTER C9
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 2
X Half Width: 0.1778
Y Half Width: 0.1778
Z Half Width: 0.01
Object 116: ROW 3
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 117: LED EMITTER C5
Object type: Source Volume Rectangle (NSC_VSRR)
Reference object: −20
Inside of: 0
XYZ position: 0 −1.4224 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 6.00000000E−001 |

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 2
Color #: 3
X Half Width: 0.1778
Y Half Width: 0.1778
Z Half Width: 0.01
Object 118: LED EMITTER C4
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | 2.27112000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 3
X Half Width: 0.1778
Y Half Width: 0.1778
Z Half Width: 0.01
Object 119: LED EMITTER C3
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | 2.34224000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 3
X Half Width: 0.1778
Y Half Width: 0.1778
Z Half Width: 0.01
Object 120: LED EMITTER C2
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | 2.41336000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 3
X Half Width: 0.1778
Y Half Width: 0.1778
Z Half Width: 0.01
Object 121: LED EMITTER C1
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | 2.48448000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 3
X Half Width: 0.1778
Y Half Width: 0.1778
Z Half Width: 0.01

TABLE 3-continued

ZEMAX Software Output Describing Surface Data Summary and Detail for Each Individual Element within the Illumination Optical System illustrated in FIGS. 13-15

Object 122: LED EMITTER C6
Object type: Source Volume Rectangle (NSC_VSRR)
Reference object: −1
Inside of: 0

| | | | | |
|---|---|---|---|---|
| XYZ position: | 0 −0.7112 0 | | | |
| Tilt about XYZ: | 0 0 0 | | | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | 2.41336000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 3
X Half Width: 0.1778
Y Half Width: 0.1778
Z Half Width: 0.01
Object 123: LED EMITTER C7
Object type: Source Volume Rectangle (NSC_VSRR)
Reference object: −1
Inside of: 0

| | | | | |
|---|---|---|---|---|
| XYZ position: | 0 −0.7112 0 | | | |
| Tilt about XYZ: | 0 0 0 | | | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | 2.34224000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 3
X Half Width: 0.1778
Y Half Width: 0.1778
Z Half Width: 0.01
Object 124: LED EMITTER C8
Object type: Source Volume Rectangle (NSC_VSRR)
Reference object: −1
Inside of: 0

| | | | | |
|---|---|---|---|---|
| XYZ position: | 0 −0.7112 0 | | | |
| Tilt about XYZ: | 0 0 0 | | | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | 2.27112000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 3
X Half Width: 0.1778
Y Half Width: 0.1778
Z Half Width: 0.01
Object 125: LED EMITTER C9
Object type: Source Volume Rectangle (NSC_VSRR)
Reference object: −1
Inside of: 0

| | | | | |
|---|---|---|---|---|
| XYZ position: | 0 −0.7112 0 | | | |
| Tilt about XYZ: | 0 0 0 | | | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 3
X Half Width: 0.1778
Y Half Width: 0.1778
Z Half Width: 0.01

TABLE 3-continued

ZEMAX Software Output Describing Surface Data Summary and Detail for Each Individual Element within the Illumination Optical System illustrated in FIGS. 13-15

Object 126: ROW 2
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 127: LED EMITTER C5
Object type: Source Volume Rectangle (NSC_VSRR)
Reference object: −30
Inside of: 0
XYZ position: 0 −2.1336 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 4
X Half Width: 0.1778
Y Half Width: 0.1778
Z Half Width: 0.01
Object 128: LED EMITTER C4
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | 1.00000000E+000 | 0.00000000E+000 | 2.27112000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 4
X Half Width: 0.1778
Y Half Width: 0.1778
Z Half Width: 0.01
Object 129: LED EMITTER C3
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | 1.00000000E+000 | 0.00000000E+000 | 2.34224000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 4
X Half Width: 0.1778
Y Half Width: 0.1778
Z Half Width: 0.01
Object 130: LED EMITTER C2
Object type: Source Volume Rectangle (NSC_VSRR)
Reference object: −1

TABLE 3-continued

ZEMAX Software Output Describing Surface Data Summary and Detail for Each Individual Element within the Illumination Optical System illustrated in FIGS. 13-15

Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 −2.13360000E+000
Pos. Mtrx. R21 R22 R23 Y: 0.00000000E+000 1.00000000E+000 0.00000000E+000 2.41336000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 4
X Half Width: 0.1778
Y Half Width: 0.1778
Z Half Width: 0.01
Object 131: LED EMITTER C1
Object type: Null Object (NSC_NULL)
Reference object: 36
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 −2.13360000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.32844800E+002
Material:
Index at 0.486133 μm = 1.00000000
Index at 0.587562 μm = 1.00000000
Index at 0.656273 μm = 1.00000000
Object 132: LED EMITTER C6
Object type: Source Volume Rectangle (NSC_VSRR)
Reference object: −5
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −2.13360000E+000
Pos. Mtrx. R21 R22 R23 Y: 0.00000000E+000 1.00000000E+000 0.00000000E+000 2.12888000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 4
X Half Width: 0.1778
Y Half Width: 0.1778
Z Half Width: 0.01
Object 133: LED EMITTER C7
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −2.13360000E+000
Pos. Mtrx. R21 R22 R23 Y: 0.00000000E+000 1.00000000E+000 0.00000000E+000 2.05776000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 4
X Half Width: 0.1778
Y Half Width: 0.1778
Z Half Width: 0.01
Object 134: LED EMITTER C8
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −2.13360000E+000
Pos. Mtrx. R21 R22 R23 Y: 0.00000000E+000 1.00000000E+000 0.00000000E+000 1.98664000E+001
Pos. Mtrx. R31 R32 R33 Z: 0.00000000E+000 0.00000000E+000 1.00000000E+000 6.00000000E−001

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 2
Color #: 4
X Half Width: 0.1778
Y Half Width: 0.1778
Z Half Width: 0.01
Object 135: LED EMITTER C9
Object type: Null Object (NSC_NULL)
Reference object: 40
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |

Material:
Index at 0.486133 µm = 1.00000000
Index at 0.587562 µm = 1.00000000
Index at 0.656273 µm = 1.00000000
Object 136: ROW 1
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 µm = 1.00000000
Index at 0.587562 µm = 1.00000000
Index at 0.656273 µm = 1.00000000
Object 137: LED EMITTER C5
Object type: Source Volume Rectangle (NSC_VSRR)
Reference object: −40
Inside of: 0
XYZ position: 0 −2.8448 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 5
X Half Width: 0.1778
Y Half Width: 0.1778
Z Half Width: 0.01
Object 138: LED EMITTER C4
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | 1.00000000E+000 | 0.00000000E+000 | 2.27112000E+001 |
| Pos. Mtrx. R31 R32 R33 Z: | 0.00000000E+000 | 0.00000000E+000 | 1.00000000E+000 | 6.00000000E−001 |

Layout Rays: 1
Analysis Rays: 10000
Power(Watts): 1
Wavenumber: 2
Color #: 5
X Half Width: 0.1778
Y Half Width: 0.1778
Z Half Width: 0.01
Object 139: LED EMITTER C3
Object type: Source Volume Rectangle (NSC_VSRR)
Reference object: −1

TABLE 3-continued

ZEMAX Software Output Describing Surface Data Summary and Detail for Each Individual Element within the Illumination Optical System illustrated in FIGS. 13-15

Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 −2.84480000E+000
Pos. Mtrx. R21 R22 R23 Y: 0.00000000E+000 1.00000000E+000 0.00000000E+000 2.34224000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 5
X Half Width: 0.1778
Y Half Width: 0.1778
Z Half Width: 0.01
Object 140: LED EMITTER C2
Object type: Null Object (NSC_NULL)
Reference object: 45
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 −2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.32133600E+002
Material:
Index at 0.486133 μm = 1.00000000
Index at 0.587562 μm = 1.00000000
Index at 0.656273 μm = 1.00000000
Object 141: LED EMITTER C1
Object type: Null Object (NSC_NULL)
Reference object: 46
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 −2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.32844800E+002
Material:
Index at 0.486133 μm = 1.00000000
Index at 0.587562 μm = 1.00000000
Index at 0.656273 μm = 1.00000000
Object 142: LED EMITTER C6
Object type: Source Volume Rectangle (NSC_VSRR)
Reference object: −5
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −2.84480000E+000
Pos. Mtrx. R21 R22 R23 Y: 0.00000000E+000 1.00000000E+000 0.00000000E+000 2.12888000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 5
X Half Width: 0.1778
Y Half Width: 0.1778
Z Half Width: 0.01
Object 143: LED EMITTER C7
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −2.84480000E+000
Pos. Mtrx. R21 R22 R23 Y: 0.00000000E+000 1.00000000E+000 0.00000000E+000 2.05776000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2

TABLE 3-continued

ZEMAX Software Output Describing Surface Data Summary and Detail for Each Individual Element within the Illumination Optical System illustrated in FIGS. 13-15

Color #: 5
X Half Width: 0.1778
Y Half Width: 0.1778
Z Half Width: 0.01
Object 144: LED EMITTER C8
Object type: Null Object (NSC_NULL)
Reference object: 49
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.27866400E+002
Material:
Index at 0.486133 μm = 1.00000000
Index at 0.587562 μm = 1.00000000
Index at 0.656273 μm = 1.00000000
Object 145: LED EMITTER C9
Object type: Null Object (NSC_NULL)
Reference object: 50
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.27155200E+002
Material:
Index at 0.486133 μm = 1.00000000
Index at 0.587562 μm = 1.00000000
Index at 0.656273 μm = 1.00000000
Object 146: ROW 6
Object type: Null Object (NSC_NULL)
Reference object: 0
Inside of: 0
XYZ position: 0 0 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 0.00000000E+000
Pos. Mtrx. R31 R32 R33 Z: 0.00000000E+000 0.00000000E+000 1.00000000E+000 0.00000000E+000
Material:
Index at 0.486133 μm = 1.00000000
Index at 0.587562 μm = 1.00000000
Index at 0.656273 μm = 1.00000000
Object 147: LED EMITTER C5
Object type: Source Volume Rectangle (NSC_VSRR)
Reference object: −50
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 7.11200000E−001
Pos. Mtrx. R21 R22 R23 Y: 0.00000000E+000 1.00000000E+000 0.00000000E+000 2.20000000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 6
X Half Width: 0.1778
Y Half Width: 0.1778
Z Half Width: 0.01
Object 148: LED EMITTER C4
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 7.11200000E−001
Pos. Mtrx. R21 R22 R23 Y: 0.00000000E+000 1.00000000E+000 0.00000000E+000 2.27112000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 6
X Half Width: 0.1778
Y Half Width: 0.1778

TABLE 3-continued

ZEMAX Software Output Describing Surface Data Summary and Detail for Each Individual Element within the Illumination Optical System illustrated in FIGS. 13-15

Z Half Width: 0.01
Object 149: LED EMITTER C3
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | 2.34224000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 6
X Half Width: 0.1778
Y Half Width: 0.1778
Z Half Width: 0.01
Object 150: LED EMITTER C2
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | 2.41336000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 6
X Half Width: 0.1778
Y Half Width: 0.1778
Z Half Width: 0.01
Object 151: LED EMITTER C1
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | 2.48448000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 6
X Half Width: 0.1778
Y Half Width: 0.1778
Z Half Width: 0.01
Object 152: LED EMITTER C6
Object type: Source Volume Rectangle (NSC_VSRR)
Reference object: −5
Inside of: 0

| | | | | |
|---|---|---|---|---|
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | 2.12888000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 6
X Half Width: 0.1778
Y Half Width: 0.1778
Z Half Width: 0.01
Object 153: LED EMITTER C7
Object type: Source Volume Rectangle (NSC_VSRR)
Reference object: −1

TABLE 3-continued

ZEMAX Software Output Describing Surface Data Summary and Detail for Each Individual Element within the Illumination Optical System illustrated in FIGS. 13-15

Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | 2.05776000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 6
X Half Width: 0.1778
Y Half Width: 0.1778
Z Half Width: 0.01
Object 154: LED EMITTER C8
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | 1.98664000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 6
X Half Width: 0.1778
Y Half Width: 0.1778
Z Half Width: 0.01
Object 155: LED EMITTER C9
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | 1.91552000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 6
X Half Width: 0.1778
Y Half Width: 0.1778
Z Half Width: 0.01
Object 156: ROW 7
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 157: LED EMITTER C5
Object type: Source Volume Rectangle (NSC_VSRR)
Reference object: −60
Inside of: 0
XYZ position: 0 1.4224 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 6.00000000E−001 |

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 2
Color #: 7
X Half Width: 0.1778
Y Half Width: 0.1778
Z Half Width: 0.01
Object 158: LED EMITTER C4
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | 2.27112000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 7
X Half Width: 0.1778
Y Half Width: 0.1778
Z Half Width: 0.01
Object 159: LED EMITTER C3
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | 2.34224000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 7
X Half Width: 0.1778
Y Half Width: 0.1778
Z Half Width: 0.01
Object 160: LED EMITTER C2
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | 2.41336000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 7
X Half Width: 0.1778
Y Half Width: 0.1778
Z Half Width: 0.01
Object 161: LED EMITTER C1
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | 2.48448000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2

TABLE 3-continued

ZEMAX Software Output Describing Surface Data Summary and Detail for Each Individual Element within the Illumination Optical System illustrated in FIGS. 13-15

Color #: 7
X Half Width: 0.1778
Y Half Width: 0.1778
Z Half Width: 0.01
Object 162: LED EMITTER C6
Object type: Source Volume Rectangle (NSC_VSRR)
Reference object: −1
Inside of: 0

| | | | | |
|---|---|---|---|---|
| XYZ position: | 0 −0.7112 0 | | | |
| Tilt about XYZ: | 0 0 0 | | | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | 2.41336000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 7
X Half Width: 0.1778
Y Half Width: 0.1778
Z Half Width: 0.01
Object 163: LED EMITTER C7
Object type: Source Volume Rectangle (NSC_VSRR)
Reference object: −1
Inside of: 0

| | | | | |
|---|---|---|---|---|
| XYZ position: | 0 −0.7112 0 | | | |
| Tilt about XYZ: | 0 0 0 | | | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | 2.34224000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 7
X Half Width: 0.1778
Y Half Width: 0.1778
Z Half Width: 0.01
Object 164: LED EMITTER C8
Object type: Source Volume Rectangle (NSC_VSRR)
Reference object: −1
Inside of: 0

| | | | | |
|---|---|---|---|---|
| XYZ position: | 0 −0.7112 0 | | | |
| Tilt about XYZ: | 0 0 0 | | | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | 2.27112000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 7
X Half Width: 0.1778
Y Half Width: 0.1778
Z Half Width: 0.01
Object 165: LED EMITTER C9
Object type: Source Volume Rectangle (NSC_VSRR)
Reference object: −1
Inside of: 0

| | | | | |
|---|---|---|---|---|
| XYZ position: | 0 −0.7112 0 | | | |
| Tilt about XYZ: | 0 0 0 | | | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 7
X Half Width: 0.1778
Y Half Width: 0.1778

TABLE 3-continued

ZEMAX Software Output Describing Surface Data Summary and Detail for Each Individual Element within the Illumination Optical System illustrated in FIGS. 13-15

Z Half Width: 0.01
Object 166: ROW 8
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 167: LED EMITTER C5
Object type: Source Volume Rectangle (NSC_VSRR)
Reference object: −70
Inside of: 0
XYZ position: 0 2.1336 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 8
X Half Width: 0.1778
Y Half Width: 0.1778
Z Half Width: 0.01
Object 168: LED EMITTER C4
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | 2.27112000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 8
X Half Width: 0.1778
Y Half Width: 0.1778
Z Half Width: 0.01
Object 169: LED EMITTER C3
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | 2.34224000E+001 |
| Pos. Mtrx. R31 R32 R33 Z: | 0.00000000E+000 | 0.00000000E+000 | 1.00000000E+000 | 6.00000000E−001 |

Layout Rays: 1
Analysis Rays: 10000
Power(Watts): 1
Wavenumber: 2
Color #: 8
X Half Width: 0.1778
Y Half Width: 0.1778
Z Half Width: 0.01
Object 170: LED EMITTER C2
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | 2.41336000E+001 |
| Pos. Mtrx. R31 R32 R33 Z: | 0.00000000E+000 | 0.00000000E+000 | 1.00000000E+000 | 6.00000000E−001 |

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 2
Color #: 8
X Half Width: 0.1778
Y Half Width: 0.1778
Z Half Width: 0.01
Object 171: LED EMITTER C1
Object type: Null Object (NSC_NULL)
Reference object: 76
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |

Material:
Index at 0.486133 μm = 1.00000000
Index at 0.587562 μm = 1.00000000
Index at 0.656273 μm = 1.00000000
Object 172: LED EMITTER C6
Object type: Source Volume Rectangle (NSC_VSRR)
Reference object: −5
Inside of: 0

| | | | | |
|---|---|---|---|---|
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | 2.12888000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 8
X Half Width: 0.1778
Y Half Width: 0.1778
Z Half Width: 0.01
Object 173: LED EMITTER C7
Object type: Source Volume Rectangle (NSC_VSRR)
Reference object: −1
Inside of: 0

| | | | | |
|---|---|---|---|---|
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | 2.05776000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 8
X Half Width: 0.1778
Y Half Width: 0.1778
Z Half Width: 0.01
Object 174: LED EMITTER C8
Object type: Source Volume Rectangle (NSC_VSRR)
Reference object: −1
Inside of: 0

| | | | | |
|---|---|---|---|---|
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | 1.98664000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 8
X Half Width: 0.1778
Y Half Width: 0.1778
Z Half Width: 0.01

TABLE 3-continued

ZEMAX Software Output Describing Surface Data Summary and Detail for Each Individual Element within the Illumination Optical System illustrated in FIGS. 13-15

Object 175: LED EMITTER C9
Object type: Null Object (NSC_NULL)
Reference object: 80
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 2.13360000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.27155200E+002
Material:
Index at 0.486133 µm = 1.00000000
Index at 0.587562 µm = 1.00000000
Index at 0.656273 µm = 1.00000000
Object 176: ROW 9
Object type: Null Object (NSC_NULL)
Reference object: 0
Inside of: 0
XYZ position: 0 0 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 0.00000000E+000
Pos. Mtrx. R31 R32 R33 Z: 0.00000000E+000 0.00000000E+000 1.00000000E+000 0.00000000E+000
Material:
Index at 0.486133 µm = 1.00000000
Index at 0.587562 µm = 1.00000000
Index at 0.656273 µm = 1.00000000
Object 177: LED EMITTER C5
Object type: Source Volume Rectangle (NSC_VSRR)
Reference object: −80
Inside of: 0
XYZ position: 0 2.8448 0
Tilt about XYZ: 0 0 0
Pos. Mtrx. R11 R12 R13 X: 1.00000000E+000 0.00000000E+000 0.00000000E+000 2.84480000E+000
Pos. Mtrx. R21 R22 R23 Y: 0.00000000E+000 1.00000000E+000 0.00000000E+000 2.20000000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 9
X Half Width: 0.1778
Y Half Width: 0.1778
Z Half Width: 0.01
Object 178: LED EMITTER C4
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 2.84480000E+000
Pos. Mtrx. R21 R22 R23 Y: 0.00000000E+000 1.00000000E+000 0.00000000E+000 2.27112000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 9
X Half Width: 0.1778
Y Half Width: 0.1778
Z Half Width: 0.01
Object 179: LED EMITTER C3
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 2.84480000E+000
Pos. Mtrx. R21 R22 R23 Y: 0.00000000E+000 1.00000000E+000 0.00000000E+000 2.34224000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2

TABLE 3-continued

ZEMAX Software Output Describing Surface Data Summary and Detail for Each Individual Element within the Illumination Optical System illustrated in FIGS. 13-15

Color #: 9
X Half Width: 0.1778
Y Half Width: 0.1778
Z Half Width: 0.01
Object 180: LED EMITTER C2
Object type: Null Object (NSC_NULL)
Reference object: 85
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |

Material:
Index at 0.486133 μm = 1.00000000
Index at 0.587562 μm = 1.00000000
Index at 0.656273 μm = 1.00000000
Object 181: LED EMITTER C1
Object type: Null Object (NSC_NULL)
Reference object: 86
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |

Material:
Index at 0.486133 μm = 1.00000000
Index at 0.587562 μm = 1.00000000
Index at 0.656273 μm = 1.00000000
Object 182: LED EMITTER C6
Object type: Source Volume Rectangle (NSC_VSRR)
Reference object: −5
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | 1.00000000E+000 | 0.00000000E+000 | 2.12888000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 9
X Half Width: 0.1778
Y Half Width: 0.1778
Z Half Width: 0.01
Object 183: LED EMITTER C7
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | 1.00000000E+000 | 0.00000000E+000 | 2.05776000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 9
X Half Width: 0.1778
Y Half Width: 0.1778
Z Half Width: 0.01
Object 184: LED EMITTER C8
Object type: Null Object (NSC_NULL)
Reference object: 89
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27866400E+002 |

TABLE 3-continued

ZEMAX Software Output Describing Surface Data Summary and Detail for Each Individual Element within the Illumination Optical System illustrated in FIGS. 13-15

Material:
Index at 0.486133 μm = 1.00000000
Index at 0.587562 μm = 1.00000000
Index at 0.656273 μm = 1.00000000
Object 185: LED EMITTER C9
Object type: Null Object (NSC_NULL)
Reference object: 90
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |

Material:
Index at 0.486133 μm = 1.00000000
Index at 0.587562 μm = 1.00000000
Index at 0.656273 μm = 1.00000000
Object 186:
Object type: CPC (NSC_CPCO)
CSG 0: Side Faces
Coating: (none)
Scattering: None
CSG 1: Front Face
Coating: (none)
Scattering: None
CSG 2: Back Face
Coating: (none)
Scattering: None
Reference object: −91
Inside of: 0
XYZ position: 0.5 00
Tilt about XYZ: 0 00

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 5.00000000E−001 |

Material: MIRROR
Radial Aperture: 3.6
Angle (deg): 12
Length: 98.4
#Angle Facets: 50
#Length Facets: 48
Is Volume?: 0
Object 187: Condenser
Object type: Standard Lens (NSC_SLEN)
CSG 0: Side Faces
Coating: (none)
Scattering: None
CSG 1: Front Face
Coating: (none)
Scattering: None
CSG 2: Back Face
Coating: (none)
Scattering: None
Reference object: −92
Inside of: 0
XYZ position: 100 00
Tilt about XYZ: 0 00

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 1.00000000E+002 |

Material: BK7
Index at 0.486133 μm = 1.52237629
Index at 0.587562 μm = 1.51680003
Index at 0.656273 μm = 1.51432235
Radius 1: 75
Conic 1: 0
Clear 1: 19
Edge 1: 19
Thickness: 5
Radius 2: −175
Conic 2: 0
Clear 2: 19

TABLE 3-continued

ZEMAX Software Output Describing Surface Data Summary and Detail for Each Individual Element within the Illumination Optical System illustrated in FIGS. 13-15

Edge 2: 19
Object 188:
Object type: Null Object (NSC_NULL)
Reference object: 0
Inside of: 0
XYZ position: 0 0 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 0.00000000E+000
Pos. Mtrx. R31 R32 R33 Z: 0.00000000E+000 0.00000000E+000 1.00000000E+000 0.00000000E+000
Material:
Index at 0.486133 μm = 1.00000000
Index at 0.587562 μm = 1.00000000
Index at 0.656273 μm = 1.00000000
Object 189: SUBSTRATE
Object type: Rectangular Volume (NSC_RBLK)
CSG 0: Side Faces
Coating: (none)
Scattering: Lambertian
Scatter Fraction: 0.4
Number of Scatter Rays: 0
CSG 1: Front Face
Coating: (none)
Scattering: None
CSG 2: Back Face
Coating: (none)
Scattering: None
Reference object: 0
Inside of: 0
XYZ position: 0 −22 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 −2.20000000E+001
Pos. Mtrx. R31 R32 R33 Z: 0.00000000E+000 0.00000000E+000 1.00000000E+000 0.00000000E+000
Material: MIRROR
X1 Half Width: 4
Y1 Half Width: 4
Z Length: 0.5
X2 Half Width: 4
Y2 Half Width: 4
Front X Angle: 0
Front Y Angle: 0
Rear X Angle: 0
Rear Y Angle: 0
Object 190: ROW 5
Object type: Null Object (NSC_NULL)
Reference object: 0
Inside of: 0
XYZ position: 0 −0.3556 0
Tilt about XYZ: 0 0 0
Pos. Mtrx. R11 R12 R13 X: 1.00000000E+000 0.00000000E+000 0.00000000E+000 −3.55600000E−001
Pos. Mtrx. R21 R22 R23 Y: 0.00000000E+000 1.00000000E+000 0.00000000E+000 0.00000000E+000
Pos. Mtrx. R31 R32 R33 Z: 0.00000000E+000 0.00000000E+000 1.00000000E+000 0.00000000E+000
Material:
Index at 0.486133 μm = 1.00000000
Index at 0.587562 μm = 1.00000000
Index at 0.656273 μm = 1.00000000
Object 191: LED EMITTER C5
Object type: Source Volume Rectangle (NSC_VSRR)
Reference object: −2
Inside of: 0
XYZ position: 0 0.6 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 −2.20000000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2

TABLE 3-continued

ZEMAX Software Output Describing Surface Data Summary and Detail for Each Individual Element within the Illumination Optical System illustrated in FIGS. 13-15

Color #: 1
X Half Width: 0.1778
Y Half Width: 0.1778
Z Half Width: 0.01
Object 192: LED EMITTER C4
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | −2.12888000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 1
X Half Width: 0.1778
Y Half Width: 0.1778
Z Half Width: 0.01
Object 193: LED EMITTER C3
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | −2.05776000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 1
X Half Width: 0.1778
Y Half Width: 0.1778
Z Half Width: 0.01
Object 194: LED EMITTER C2
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | −1.98664000E+001 |
| Pos. Mtrx. R31 R32 R33 Z: | 0.00000000E+000 | 0.00000000E+000 | 1.00000000E+000 | 6.00000000E−001 |

Layout Rays: 1
Analysis Rays: 10000
Power(Watts): 1
Wavenumber: 2
Color #: 1
X Half Width: 0.1778
Y Half Width: 0.1778
Z Half Width: 0.01
Object 195: LED EMITTER C1
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | −1.91552000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 1
X Half Width: 0.1778
Y Half Width: 0.1778
Z Half Width: 0.01

TABLE 3-continued

ZEMAX Software Output Describing Surface Data Summary and Detail for Each Individual Element within the Illumination Optical System illustrated in FIGS. 13-15

Object 196: LED EMITTER C6
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 −1.98664000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 1
X Half Width: 0.1778
Y Half Width: 0.1778
Z Half Width: 0.01
Object 197: LED EMITTER C7
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 −2.05776000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 1
X Half Width: 0.1778
Y Half Width: 0.1778
Z Half Width: 0.01
Object 198: LED EMITTER C8
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 −2.12888000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 1
X Half Width: 0.1778
Y Half Width: 0.1778
Z Half Width: 0.01
Object 199: LED EMITTER C9
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 −2.20000000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 1
X Half Width: 0.1778
Y Half Width: 0.1778
Z Half Width: 0.01

TABLE 3-continued

ZEMAX Software Output Describing Surface Data Summary and Detail for Each Individual Element within the Illumination Optical System illustrated in FIGS. 13-15

Object 200: ROW 4
Object type: Null Object (NSC_NULL)
Reference object: 0
Inside of: 0
XYZ position: 0 0 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 0.00000000E+000
Pos. Mtrx. R31 R32 R33 Z: 0.00000000E+000 0.00000000E+000 1.00000000E+000 0.00000000E+000
Material:
Index at 0.486133 μm = 1.00000000
Index at 0.587562 μm = 1.00000000
Index at 0.656273 μm = 1.00000000
Object 201: LED EMITTER C5
Object type: Source Volume Rectangle (NSC_VSRR)
Reference object: −10
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −7.11200000E−001
Pos. Mtrx. R21 R22 R23 Y: 0.00000000E+000 1.00000000E+000 0.00000000E+000 −2.20000000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 2
X Half Width: 0.1778
Y Half Width: 0.1778
Z Half Width: 0.01
Object 202: LED EMITTER C4
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 −7.11200000E−001
Pos. Mtrx. R21 R22 R23 Y: 0.00000000E+000 1.00000000E+000 0.00000000E+000 −2.12888000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 2
X Half Width: 0.1778
Y Half Width: 0.1778
Z Half Width: 0.01
Object 203: LED EMITTER C3
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 −7.11200000E−001
Pos. Mtrx. R21 R22 R23 Y: 0.00000000E+000 1.00000000E+000 0.00000000E+000 −2.05776000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 2
X Half Width: 0.1778
Y Half Width: 0.1778
Z Half Width: 0.01
Object 204: LED EMITTER C2
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 −7.11200000E−001
Pos. Mtrx. R21 R22 R23 Y: 0.00000000E+000 1.00000000E+000 0.00000000E+000 −1.98664000E+001
Pos. Mtrx. R31 R32 R33 Z: 0.00000000E+000 0.00000000E+000 1.00000000E+000 6.00000000E−001

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 2
Color #: 2
X Half Width: 0.1778
Y Half Width: 0.1778
Z Half Width: 0.01
Object 205: LED EMITTER C1
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 −7.11200000E−001
Pos. Mtrx. R21 R22 R23 Y: 0.00000000E+000 1.00000000E+000 0.00000000E+000 −1.91552000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 2
X Half Width: 0.1778
Y Half Width: 0.1778
Z Half Width: 0.01
Object 206: LED EMITTER C6
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −7.11200000E−001
Pos. Mtrx. R21 R22 R23 Y: 0.00000000E+000 1.00000000E+000 0.00000000E+000 −1.98664000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 2
X Half Width: 0.1778
Y Half Width: 0.1778
Z Half Width: 0.01
Object 207: LED EMITTER C7
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −7.11200000E−001
Pos. Mtrx. R21 R22 R23 Y: 0.00000000E+000 1.00000000E+000 0.00000000E+000 −2.05776000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 2
X Half Width: 0.1778
Y Half Width: 0.1778
Z Half Width: 0.01
Object 208: LED EMITTER C8
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −7.11200000E−001
Pos. Mtrx. R21 R22 R23 Y: 0.00000000E+000 1.00000000E+000 0.00000000E+000 −2.12888000E+001
Pos. Mtrx. R31 R32 R33 Z: 0.00000000E+000 0.00000000E+000 1.00000000E+000 6.00000000E−001

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 2
Color #: 2
X Half Width: 0.1778
Y Half Width: 0.1778
Z Half Width: 0.01
Object 209: LED EMITTER C9
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 2
X Half Width: 0.1778
Y Half Width: 0.1778
Z Half Width: 0.01
Object 210: ROW 3
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 211: LED EMITTER C5
Object type: Source Volume Rectangle (NSC_VSRR)
Reference object: −20
Inside of: 0
XYZ position: 0 −1.4224 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 3
X Half Width: 0.1778
Y Half Width: 0.1778
Z Half Width: 0.01
Object 212: LED EMITTER C4
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | −2.12888000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 3
X Half Width: 0.1778
Y Half Width: 0.1778
Z Half Width: 0.01

TABLE 3-continued

ZEMAX Software Output Describing Surface Data Summary and Detail for Each Individual Element within the Illumination Optical System illustrated in FIGS. 13-15

Object 213: LED EMITTER C3
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | −2.05776000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 3
X Half Width: 0.1778
Y Half Width: 0.1778
Z Half Width: 0.01
Object 214: LED EMITTER C2
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | −1.98664000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 3
X Half Width: 0.1778
Y Half Width: 0.1778
Z Half Width: 0.01
Object 215: LED EMITTER C1
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | −1.91552000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 3
X Half Width: 0.1778
Y Half Width: 0.1778
Z Half Width: 0.01
Object 216: LED EMITTER C6
Object type: Source Volume Rectangle (NSC_VSRR)
Reference object: −1
Inside of: 0

| | | | | |
|---|---|---|---|---|
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | −1.98664000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 3
X Half Width: 0.1778
Y Half Width: 0.1778
Z Half Width: 0.01

TABLE 3-continued

ZEMAX Software Output Describing Surface Data Summary and Detail for Each Individual Element within the Illumination Optical System illustrated in FIGS. 13-15

Object 217: LED EMITTER C7
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | −2.05776000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 3
X Half Width: 0.1778
Y Half Width: 0.1778
Z Half Width: 0.01
Object 218: LED EMITTER C8
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | −2.12888000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 3
X Half Width: 0.1778
Y Half Width: 0.1778
Z Half Width: 0.01
Object 219: LED EMITTER C9
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 3
X Half Width: 0.1778
Y Half Width: 0.1778
Z Half Width: 0.01
Object 220: ROW 2
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 µm = 1.00000000
Index at 0.587562 µm = 1.00000000
Index at 0.656273 µm = 1.00000000
Object 221: LED EMITTER C5
Object type: Source Volume Rectangle (NSC_VSRR)
Reference object: −30
Inside of: 0
XYZ position: 0 −2.1336 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 6.00000000E−001 |

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 2
Color #: 4
X Half Width: 0.1778
Y Half Width: 0.1778
Z Half Width: 0.01
Object 222: LED EMITTER C4
Object type: Source Volume Rectangle (NSC__VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | 1.00000000E+000 | 0.00000000E+000 | −2.12888000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 4
X Half Width: 0.1778
Y Half Width: 0.1778
Z Half Width: 0.01
Object 223: LED EMITTER C3
Object type: Source Volume Rectangle (NSC__VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | 1.00000000E+000 | 0.00000000E+000 | −2.05776000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 4
X Half Width: 0.1778
Y Half Width: 0.1778
Z Half Width: 0.01
Object 224: LED EMITTER C2
Object type: Source Volume Rectangle (NSC__VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | 1.00000000E+000 | 0.00000000E+000 | −1.98664000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 4
X Half Width: 0.1778
Y Half Width: 0.1778
Z Half Width: 0.01
Object 225: LED EMITTER C1
Object type: Null Object (NSC__NULL)
Reference object: 36
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |

TABLE 3-continued

ZEMAX Software Output Describing Surface Data Summary and Detail for Each Individual Element within the Illumination Optical System illustrated in FIGS. 13-15

Material:
Index at 0.486133 μm = 1.00000000
Index at 0.587562 μm = 1.00000000
Index at 0.656273 μm = 1.00000000
Object 226: LED EMITTER C6
Object type: Source Volume Rectangle (NSC_VSRR)
Reference object: −5
Inside of: 0

| | | | | |
|---|---|---|---|---|
| XYZ position: | 0 −0.7112 0 | | | |
| Tilt about XYZ: | 0 0 0 | | | |
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | 1.00000000E+000 | 0.00000000E+000 | −2.27112000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 4
X Half Width: 0.1778
Y Half Width: 0.1778
Z Half Width: 0.01
Object 227: LED EMITTER C7
Object type: Source Volume Rectangle (NSC_VSRR)
Reference object: −1
Inside of: 0

| | | | | |
|---|---|---|---|---|
| XYZ position: | 0 −0.7112 0 | | | |
| Tilt about XYZ: | 0 0 0 | | | |
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | 1.00000000E+000 | 0.00000000E+000 | −2.34224000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 4
X Half Width: 0.1778
Y Half Width: 0.1778
Z Half Width: 0.01
Object 228: LED EMITTER C8
Object type: Source Volume Rectangle (NSC_VSRR)
Reference object: −1
Inside of: 0

| | | | | |
|---|---|---|---|---|
| XYZ position: | 0 −0.7112 0 | | | |
| Tilt about XYZ: | 0 0 0 | | | |
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | 1.00000000E+000 | 0.00000000E+000 | −2.41336000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 4
X Half Width: 0.1778
Y Half Width: 0.1778
Z Half Width: 0.01
Object 229: LED EMITTER C9
Object type: Null Object (NSC_NULL)
Reference object: 40
Inside of: 0

| | | | | |
|---|---|---|---|---|
| XYZ position: | 0 −0.7112 0 | | | |
| Tilt about XYZ: | 0 0 0 | | | |
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |

Material:
Index at 0.486133 μm = 1.00000000
Index at 0.587562 μm = 1.00000000
Index at 0.656273 μm = 1.00000000

TABLE 3-continued

ZEMAX Software Output Describing Surface Data Summary and Detail for Each Individual Element within the Illumination Optical System illustrated in FIGS. 13-15

Object 230: ROW 1
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 µm = 1.00000000
Index at 0.587562 µm = 1.00000000
Index at 0.656273 µm = 1.00000000
Object 231: LED EMITTER C5
Object type: Source Volume Rectangle (NSC_VSRR)
Reference object: −40
Inside of: 0
XYZ position: 0 −2.8448 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 5
X Half Width: 0.1778
Y Half Width: 0.1778
Z Half Width: 0.01
Object 232: LED EMITTER C4
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | 1.00000000E+000 | 0.00000000E+000 | −2.12888000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 5
X Half Width: 0.1778
Y Half Width: 0.1778
Z Half Width: 0.01
Object 233: LED EMITTER C3
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | 1.00000000E+000 | 0.00000000E+000 | −2.05776000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 5
X Half Width: 0.1778
Y Half Width: 0.1778
Z Half Width: 0.01
Object 234: LED EMITTER C2
Object type: Null Object (NSC_NULL)
Reference object: 45
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |

TABLE 3-continued

ZEMAX Software Output Describing Surface Data Summary and Detail for Each Individual Element within the Illumination Optical System illustrated in FIGS. 13-15

Material:
Index at 0.486133 µm = 1.00000000
Index at 0.587562 µm = 1.00000000
Index at 0.656273 µm = 1.00000000
Object 235: LED EMITTER C1
Object type: Null Object (NSC_NULL)
Reference object: 46
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |

Material:
Index at 0.486133 µm = 1.00000000
Index at 0.587562 µm = 1.00000000
Index at 0.656273 µm = 1.00000000
Object 236: LED EMITTER C6
Object type: Source Volume Rectangle (NSC_VSRR)
Reference object: −5
Inside of: 0

| | | | | |
|---|---|---|---|---|
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | 1.00000000E+000 | 0.00000000E+000 | −2.27112000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 5
X Half Width: 0.1778
Y Half Width: 0.1778
Z Half Width: 0.01
Object 237: LED EMITTER C7
Object type: Source Volume Rectangle (NSC_VSRR)
Reference object: −1
Inside of: 0

| | | | | |
|---|---|---|---|---|
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | 1.00000000E+000 | 0.00000000E+000 | −2.34224000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 5
X Half Width: 0.1778
Y Half Width: 0.1778
Z Half Width: 0.01
Object 238: LED EMITTER C8
Object type: Null Object (NSC_NULL)
Reference object: 49
Inside of: 0

| | | | | |
|---|---|---|---|---|
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27866400E+002 |

Material:
Index at 0.486133 µm = 1.00000000
Index at 0.587562 µm = 1.00000000
Index at 0.656273 µm = 1.00000000
Object 239: LED EMITTER C9
Object type: Null Object (NSC_NULL)
Reference object: 50
Inside of: 0

| | | | | |
|---|---|---|---|---|
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |

TABLE 3-continued

ZEMAX Software Output Describing Surface Data Summary and Detail for Each Individual Element within the Illumination Optical System illustrated in FIGS. 13-15

Material:
Index at 0.486133 μm = 1.00000000
Index at 0.587562 μm = 1.00000000
Index at 0.656273 μm = 1.00000000
Object 240: ROW 6
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 241: LED EMITTER C5
Object type: Source Volume Rectangle (NSC_VSRR)
Reference object: −50
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 6
X Half Width: 0.1778
Y Half Width: 0.1778
Z Half Width: 0.01
Object 242: LED EMITTER C4
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | −2.12888000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 6
X Half Width: 0.1778
Y Half Width: 0.1778
Z Half Width: 0.01
Object 243: LED EMITTER C3
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | −2.05776000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 6
X Half Width: 0.1778
Y Half Width: 0.1778
Z Half Width: 0.01

TABLE 3-continued

ZEMAX Software Output Describing Surface Data Summary and Detail for Each Individual Element within the Illumination Optical System illustrated in FIGS. 13-15

Object 244: LED EMITTER C2
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | −1.98664000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 6
X Half Width: 0.1778
Y Half Width: 0.1778
Z Half Width: 0.01

Object 245: LED EMITTER C1
Object type: Source Volume Rectangle (NSC_VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | −1.91552000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 6
X Half Width: 0.1778
Y Half Width: 0.1778
Z Half Width: 0.01

Object 246: LED EMITTER C6
Object type: Source Volume Rectangle (NSC_VSRR)
Reference object: −5
Inside of: 0

| | | | | |
|---|---|---|---|---|
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | −2.27112000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 6
X Half Width: 0.1778
Y Half Width: 0.1778
Z Half Width: 0.01

Object 247: LED EMITTER C7
Object type: Source Volume Rectangle (NSC_VSRR)
Reference object: −1
Inside of: 0

| | | | | |
|---|---|---|---|---|
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | −2.34224000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 6
X Half Width: 0.1778
Y Half Width: 0.1778
Z Half Width: 0.01

TABLE 3-continued

ZEMAX Software Output Describing Surface Data Summary and Detail for Each Individual Element within the Illumination Optical System illustrated in FIGS. 13-15

Object 248: LED EMITTER C8
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | −2.41336000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 6
X Half Width: 0.1778
Y Half Width: 0.1778
Z Half Width: 0.01
Object 249: LED EMITTER C9
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | −2.48448000E+001 |
| Pos. Mtrx. R31 R32 R33 Z: | 0.00000000E+000 | 0.00000000E+000 | 1.00000000E+000 | 6.00000000E−001 |

Layout Rays: 1
Analysis Rays: 10000
Power(Watts): 1
Wavenumber: 2
Color #: 6
X Half Width: 0.1778
Y Half Width: 0.1778
Z Half Width: 0.01
Object 250: ROW 7
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 251: LED EMITTER C5
Object type: Source Volume Rectangle (NSC_VSRR)
Reference object: −60
Inside of: 0
XYZ position: 0 1.4224 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 7
X Half Width: 0.1778
Y Half Width: 0.1778
Z Half Width: 0.01
Object 252: LED EMITTER C4
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | −2.12888000E+001 |
| Pos. Mtrx. R31 R32 R33 Z: | 0.00000000E+000 | 0.00000000E+000 | 1.00000000E+000 | 6.00000000E−001 |

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 2
Color #: 7
X Half Width: 0.1778
Y Half Width: 0.1778
Z Half Width: 0.01
Object 253: LED EMITTER C3
Object type: Source Volume Rectangle (NSC__VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | −2.05776000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 7
X Half Width: 0.1778
Y Half Width: 0.1778
Z Half Width: 0.01
Object 254: LED EMITTER C2
Object type: Source Volume Rectangle (NSC__VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | −1.98664000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 7
X Half Width: 0.1778
Y Half Width: 0.1778
Z Half Width: 0.01
Object 255: LED EMITTER C1
Object type: Source Volume Rectangle (NSC__VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | −1.91552000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 7
X Half Width: 0.1778
Y Half Width: 0.1778
Z Half Width: 0.01
Object 256: LED EMITTER C6
Object type: Source Volume Rectangle (NSC__VSRR)
Reference object: −1
Inside of: 0

| | | | | |
|---|---|---|---|---|
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | −1.98664000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 7
X Half Width: 0.1778
Y Half Width: 0.1778
Z Half Width: 0.01

TABLE 3-continued

ZEMAX Software Output Describing Surface Data Summary and Detail for Each Individual Element within the Illumination Optical System illustrated in FIGS. 13-15

Object 257: LED EMITTER C7
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | −2.05776000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 7
X Half Width: 0.1778
Y Half Width: 0.1778
Z Half Width: 0.01
Object 258: LED EMITTER C8
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | −2.12888000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 7
X Half Width: 0.1778
Y Half Width: 0.1778
Z Half Width: 0.01
Object 259: LED EMITTER C9
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 7
X Half Width: 0.1778
Y Half Width: 0.1778
Z Half Width: 0.01
Object 260: ROW 8
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 261: LED EMITTER C5
Object type: Source Volume Rectangle (NSC_VSRR)
Reference object: −70
Inside of: 0
XYZ position: 0 2.1336 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 6.00000000E−001 |

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 2
Color #: 8
X Half Width: 0.1778
Y Half Width: 0.1778
Z Half Width: 0.01
Object 262: LED EMITTER C4
Object type: Source Volume Rectangle (NSC__VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | −2.12888000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 8
X Half Width: 0.1778
Y Half Width: 0.1778
Z Half Width: 0.01
Object 263: LED EMITTER C3
Object type: Source Volume Rectangle (NSC__VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | −2.05776000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 8
X Half Width: 0.1778
Y Half Width: 0.1778
Z Half Width: 0.01
Object 264: LED EMITTER C2
Object type: Source Volume Rectangle (NSC__VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | −1.98664000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 8
X Half Width: 0.1778
Y Half Width: 0.1778
Z Half Width: 0.01
Object 265: LED EMITTER C1
Object type: Null Object (NSC__NULL)
Reference object: 76
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |

TABLE 3-continued

ZEMAX Software Output Describing Surface Data Summary and Detail for Each Individual Element within the Illumination Optical System illustrated in FIGS. 13-15

Material:
Index at 0.486133 μm = 1.00000000
Index at 0.587562 μm = 1.00000000
Index at 0.656273 μm = 1.00000000
Object 266: LED EMITTER C6
Object type: Source Volume Rectangle (NSC_VSRR)
Reference object: −5
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | −2.27112000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 8
X Half Width: 0.1778
Y Half Width: 0.1778
Z Half Width: 0.01
Object 267: LED EMITTER C7
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | −2.34224000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 8
X Half Width: 0.1778
Y Half Width: 0.1778
Z Half Width: 0.01
Object 268: LED EMITTER C8
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | −2.41336000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 8
X Half Width: 0.1778
Y Half Width: 0.1778
Z Half Width: 0.01
Object 269: LED EMITTER C9
Object type: Null Object (NSC_NULL)
Reference object: 80
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |

Material:
Index at 0.486133 μm = 1.00000000
Index at 0.587562 μm = 1.00000000
Index at 0.656273 μm = 1.00000000

TABLE 3-continued

ZEMAX Software Output Describing Surface Data Summary and Detail for Each Individual Element within the Illumination Optical System illustrated in FIGS. 13-15

Object 270: ROW 9
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 µm = 1.00000000
Index at 0.587562 µm = 1.00000000
Index at 0.656273 µm = 1.00000000
Object 271: LED EMITTER C5
Object type: Source Volume Rectangle (NSC_VSRR)
Reference object: −80
Inside of: 0
XYZ position: 0 2.8448 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 9
X Half Width: 0.1778
Y Half Width: 0.1778
Z Half Width: 0.01
Object 272: LED EMITTER C4
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | 1.00000000E+000 | 0.00000000E+000 | −2.12888000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 9
X Half Width: 0.1778
Y Half Width: 0.1778
Z Half Width: 0.01
Object 273: LED EMITTER C3
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | 1.00000000E+000 | 0.00000000E+000 | −2.05776000E+001 |
| Pos. Mtrx. R31 R32 R33 Z: | 0.00000000E+000 | 0.00000000E+000 | 1.00000000E+000 | 6.00000000E−001 |

Layout Rays: 0
Analysis Rays: 10000
Power(Watts): 1
Wavenumber: 2
Color #: 9
X Half Width: 0.1778
Y Half Width: 0.1778
Z Half Width: 0.01
Object 274: LED EMITTER C2
Object type: Null Object (NSC_NULL)
Reference object: 85
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |

TABLE 3-continued

ZEMAX Software Output Describing Surface Data Summary and Detail for Each Individual Element within the Illumination Optical System illustrated in FIGS. 13-15

Material:
Index at 0.486133 μm = 1.00000000
Index at 0.587562 μm = 1.00000000
Index at 0.656273 μm = 1.00000000
Object 275: LED EMITTER C1
Object type: Null Object (NSC_NULL)
Reference object: 86
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.32844800E+002
Material:
Index at 0.486133 μm = 1.00000000
Index at 0.587562 μm = 1.00000000
Index at 0.656273 μm = 1.00000000
Object 276: LED EMITTER C6
Object type: Source Volume Rectangle (NSC_VSRR)
Reference object: −5
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 2.84480000E+000
Pos. Mtrx. R21 R22 R23 Y: 0.00000000E+000 1.00000000E+000 0.00000000E+000 −2.27112000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 9
X Half Width: 0.1778
Y Half Width: 0.1778
Z Half Width: 0.01
Object 277: LED EMITTER C7
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 2.84480000E+000
Pos. Mtrx. R21 R22 R23 Y: 0.00000000E+000 1.00000000E+000 0.00000000E+000 −2.34224000E+001
Pos. Mtrx. R31 R32 R33 Z: 0.00000000E+000 0.00000000E+000 1.00000000E+000 6.00000000E−001
Layout Rays: 0
Analysis Rays: 10000
Power(Watts): 1
Wavenumber: 2
Color #: 9
X Half Width: 0.1778
Y Half Width: 0.1778
Z Half Width: 0.01
Object 278: LED EMITTER C8
Object type: Null Object (NSC_NULL)
Reference object: 89
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.27866400E+002
Material:
Index at 0.486133 μm = 1.00000000
Index at 0.587562 μm = 1.00000000
Index at 0.656273 μm = 1.00000000
Object 279: LED EMITTER C9
Object type: Null Object (NSC_NULL)
Reference object: 90
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.27155200E+002

TABLE 3-continued

ZEMAX Software Output Describing Surface Data Summary and Detail for Each Individual Element within the Illumination Optical System illustrated in FIGS. 13-15

Material:
Index at 0.486133 μm = 1.00000000
Index at 0.587562 μm = 1.00000000
Index at 0.656273 μm = 1.00000000
Object 280:
Object type: CPC (NSC_CPCO)
CSG 0: Side Faces
Coating: (none)
Scattering: None
CSG 1: Front Face
Coating: (none)
Scattering: None
CSG 2: Back Face
Coating: (none)
Scattering: None
Reference object: −91
Inside of: 0
XYZ position: 0.5 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 5.00000000E−001 |

Material: MIRROR
Radial Aperture: 3.6
Angle (deg): 12
Length: 98.4
#Angle Facets: 50
#Length Facets: 48
Is Volume?: 0
Object 281: Condenser
Object type: Standard Lens (NSC_SLEN)
CSG 0: Side Faces
Coating: (none)
Scattering: None
CSG 1: Front Face
Coating: (none)
Scattering: None
CSG 2: Back Face
Coating: (none)
Scattering: None
Reference object: −92
Inside of: 0
XYZ position: 100 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 1.00000000E+002 |

Material: BK7
Index at 0.486133 μm = 1.52237629
Index at 0.587562 μm = 1.51680003
Index at 0.656273 μm = 1.51432235
Radius 1: 75
Conic 1: 0
Clear 1: 19
Edge 1: 19
Thickness: 5
Radius 2: −175
Conic 2: 0
Clear 2: 19
Edge 2: 19
Object 282:
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

TABLE 3-continued

ZEMAX Software Output Describing Surface Data Summary and Detail for Each Individual Element within the Illumination Optical System illustrated in FIGS. 13-15

Material:
Index at 0.486133 µm = 1.00000000
Index at 0.587562 µm = 1.00000000
Index at 0.656273 µm = 1.00000000
Object 283: SUBSTRATE
Object type: Rectangular Volume (NSC_RBLK)
CSG 0: Side Faces
Coating: (none)
Scattering: Lambertian
Scatter Fraction: 0.4
Number of Scatter Rays: 0
CSG 1: Front Face
Coating: (none)
Scattering: None
CSG 2: Back Face
Coating: (none)
Scattering: None
Reference object: 0
Inside of: 0
XYZ position: 0 −148 130
Tilt about XYZ: −90 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 −3.82858892E−016 1.00000000E+000 −1.48000000E+002
Pos. Mtrx. R31 R32 R33 Z: 0.00000000E+000 −1.00000000E+000 −3.82858892E−016 1.30000000E+002
Material: MIRROR
X1 Half Width: 4
Y1 Half Width: 4
Z Length: 0.5
X2 Half Width: 4
Y2 Half Width: 4
Front X Angle: 0
Front Y Angle: 0
Rear X Angle: 0
Rear Y Angle: 0
Object 284: ROW 5
Object type: Null Object (NSC_NULL)
Reference object: 0
Inside of: 0
XYZ position: 0 −0.3556 0
Tilt about XYZ: 0 0 0
Pos. Mtrx. R11 R12 R13 X: 1.00000000E+000 0.00000000E+000 0.00000000E+000 −3.55600000E−001
Pos. Mtrx. R21 R22 R23 Y: 0.00000000E+000 1.00000000E+000 0.00000000E+000 0.00000000E+000
Pos. Mtrx. R31 R32 R33 Z: 0.00000000E+000 0.00000000E+000 1.00000000E+000 0.00000000E+000
Material:
Index at 0.486133 µm = 1.00000000
Index at 0.587562 µm = 1.00000000
Index at 0.656273 µm = 1.00000000
Object 285: LED EMITTER C5
Object type: Source Volume Rectangle (NSC_VSRR)
Reference object: −2
Inside of: 0
XYZ position: 0.6 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.30000000E+002
Layout Rays: 0
Analysis Rays: 10000
Power(Watts): 1
Wavenumber: 3
Color #: 1
X Half Width: 0.1778
Y Half Width: 0.1778
Z Half Width: 0.01
Object 286: LED EMITTER C4
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.29288800E+002

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 3
Color #: 1
X Half Width: 0.1778
Y Half Width: 0.1778
Z Half Width: 0.01
Object 287: LED EMITTER C3
Object type: Source Volume Rectangle (NSC__VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.28577600E+002 |

Layout Rays: 0
Analysis Rays: 10000
Power(Watts): 1
Wavenumber: 3
Color #: 1
X Half Width: 0.1778
Y Half Width: 0.1778
Z Half Width: 0.01
Object 288: LED EMITTER C2
Object type: Source Volume Rectangle (NSC__VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.27866400E+002 |

Layout Rays: 0
Analysis Rays: 10000
Power(Watts): 1
Wavenumber: 3
Color #: 1
X Half Width: 0.1778
Y Half Width: 0.1778
Z Half Width: 0.01
Object 289: LED EMITTER C1
Object type: Source Volume Rectangle (NSC__VSRR)
Reference object: −1
Inside of: 0

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.27155200E+002 |

Layout Rays: 1
Analysis Rays: 10000
Power(Watts): 1
Wavenumber: 3
Color #: 1
X Half Width: 0.1778
Y Half Width: 0.1778
Z Half Width: 0.01
Object 290: LED EMITTER C6
Object type: Source Volume Rectangle (NSC__VSRR)
Reference object: −1
Inside of: 0

| | | | | |
|---|---|---|---|---|
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.27866400E+002 |

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 3
Color #: 1
X Half Width: 0.1778
Y Half Width: 0.1778
Z Half Width: 0.01
Object 291: LED EMITTER C7
Object type: Source Volume Rectangle (NSC__VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.28577600E+002 |

Layout Rays: 0
Analysis Rays: 10000
Power(Watts): 1
Wavenumber: 3
Color #: 1
X Half Width: 0.1778
Y Half Width: 0.1778
Z Half Width: 0.01
Object 292: LED EMITTER C8
Object type: Source Volume Rectangle (NSC__VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.29288800E+002 |

Layout Rays: 0
Analysis Rays: 10000
Power(Watts): 1
Wavenumber: 3
Color #: 1
X Half Width: 0.1778
Y Half Width: 0.1778
Z Half Width: 0.01
Object 293: LED EMITTER C9
Object type: Source Volume Rectangle (NSC__VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.30000000E+002 |

Layout Rays: 0
Analysis Rays: 10000
Power(Watts): 1
Wavenumber: 3
Color #: 1
X Half Width: 0.1778
Y Half Width: 0.1778
Z Half Width: 0.01
Object 294: ROW 4
Object type: Null Object (NSC__NULL)
Reference object: 0
Inside of: 0
XYZ position: 0 00
Tilt about XYZ: 0 00

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

TABLE 3-continued

ZEMAX Software Output Describing Surface Data Summary and Detail for Each Individual Element within the Illumination Optical System illustrated in FIGS. 13-15

Material:
Index at 0.486133 μm = 1.00000000
Index at 0.587562 μm = 1.00000000
Index at 0.656273 μm = 1.00000000
Object 295: LED EMITTER C5
Object type: Source Volume Rectangle (NSC_VSRR)
Reference object: −10
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −7.11200000E−001
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.30000000E+002
Layout Rays: 0
Analysis Rays: 10000
Power(Watts): 1
Wavenumber: 3
Color #: 2
X Half Width: 0.1778
Y Half Width: 0.1778
Z Half Width: 0.01
Object 296: LED EMITTER C4
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 −7.11200000E−001
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.29288800E+002
Layout Rays: 0
Analysis Rays: 10000
Power(Watts): 1
Wavenumber: 3
Color #: 2
X Half Width: 0.1778
Y Half Width: 0.1778
Z Half Width: 0.01
Object 297: LED EMITTER C3
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 −7.11200000E−001
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.28577600E+002
Layout Rays: 0
Analysis Rays: 10000
Power(Watts): 1
Wavenumber: 3
Color #: 2
X Half Width: 0.1778
Y Half Width: 0.1778
Z Half Width: 0.01
Object 298: LED EMITTER C2
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 −7.11200000E−001
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.27866400E+002
Layout Rays: 0
Analysis Rays: 10000
Power(Watts): 1
Wavenumber: 3
Color #: 2
X Half Width: 0.1778
Y Half Width: 0.1778
Z Half Width: 0.01

TABLE 3-continued

ZEMAX Software Output Describing Surface Data Summary and Detail for Each Individual Element within the Illumination Optical System illustrated in FIGS. 13-15

Object 299: LED EMITTER C1
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 −7.11200000E−001
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.27155200E+002
Layout Rays: 0
Analysis Rays: 10000
Power(Watts): 1
Wavenumber: 3
Color #: 2
X Half Width: 0.1778
Y Half Width: 0.1778
Z Half Width: 0.01
Object 300: LED EMITTER C6
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −7.11200000E−001
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.27866400E+002
Layout Rays: 0
Analysis Rays: 10000
Power(Watts): 1
Wavenumber: 3
Color #: 2
X Half Width: 0.1778
Y Half Width: 0.1778
Z Half Width: 0.01
Object 301: LED EMITTER C7
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −7.11200000E−001
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.28577600E+002
Layout Rays: 0
Analysis Rays: 10000
Power(Watts): 1
Wavenumber: 3
Color #: 2
X Half Width: 0.1778
Y Half Width: 0.1778
Z Half Width: 0.01
Object 302: LED EMITTER C8
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −7.11200000E−001
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.29288800E+002
Layout Rays: 0
Analysis Rays: 10000
Power(Watts): 1
Wavenumber: 3
Color #: 2
X Half Width: 0.1778
Y Half Width: 0.1778
Z Half Width: 0.01

TABLE 3-continued

ZEMAX Software Output Describing Surface Data Summary and Detail for Each Individual Element within the Illumination Optical System illustrated in FIGS. 13-15

Object 303: LED EMITTER C9
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.30000000E+002 |

Layout Rays: 0
Analysis Rays: 10000
Power(Watts): 1
Wavenumber: 3
Color #: 2
X Half Width: 0.1778
Y Half Width: 0.1778
Z Half Width: 0.01
Object 304: ROW 3
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 305: LED EMITTER C5
Object type: Source Volume Rectangle (NSC_VSRR)
Reference object: −20
Inside of: 0
XYZ position: 0 −1.4224 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.30000000E+002 |

Layout Rays: 0
Analysis Rays: 10000
Power(Watts): 1
Wavenumber: 3
Color #: 3
X Half Width: 0.1778
Y Half Width: 0.1778
Z Half Width: 0.01
Object 306: LED EMITTER C4
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.29288800E+002 |

Layout Rays: 0
Analysis Rays: 10000
Power(Watts): 1
Wavenumber: 3
Color #: 3
X Half Width: 0.1778
Y Half Width: 0.1778
Z Half Width: 0.01
Object 307: LED EMITTER C3
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.28577600E+002 |

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 3
Color #: 3
X Half Width: 0.1778
Y Half Width: 0.1778
Z Half Width: 0.01
Object 308: LED EMITTER C2
Object type: Source Volume Rectangle (NSC__VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 −1.42240000E+000
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.27866400E+002
Layout Rays: 0
Analysis Rays: 10000
Power(Watts): 1
Wavenumber: 3
Color #: 3
X Half Width: 0.1778
Y Half Width: 0.1778
Z Half Width: 0.01
Object 309: LED EMITTER C1
Object type: Source Volume Rectangle (NSC__VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 −1.42240000E+000
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.27155200E+002
Layout Rays: 0
Analysis Rays: 10000
Power(Watts): 1
Wavenumber: 3
Color #: 3
X Half Width: 0.1778
Y Half Width: 0.1778
Z Half Width: 0.01
Object 310: LED EMITTER C6
Object type: Source Volume Rectangle (NSC__VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −1.42240000E+000
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.27866400E+002
Layout Rays: 0
Analysis Rays: 10000
Power(Watts): 1
Wavenumber: 3
Color #: 3
X Half Width: 0.1778
Y Half Width: 0.1778
Z Half Width: 0.01
Object 311: LED EMITTER C7
Object type: Source Volume Rectangle (NSC__VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −1.42240000E+000
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.28577600E+002

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 3
Color #: 3
X Half Width: 0.1778
Y Half Width: 0.1778
Z Half Width: 0.01
Object 312: LED EMITTER C8
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.29288800E+002 |

Layout Rays: 0
Analysis Rays: 10000
Power(Watts): 1
Wavenumber: 3
Color #: 3
X Half Width: 0.1778
Y Half Width: 0.1778
Z Half Width: 0.01
Object 313: LED EMITTER C9
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.30000000E+002 |

Layout Rays: 0
Analysis Rays: 10000
Power(Watts): 1
Wavenumber: 3
Color #: 3
X Half Width: 0.1778
Y Half Width: 0.1778
Z Half Width: 0.01
Object 314: ROW 2
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 315: LED EMITTER C5
Object type: Source Volume Rectangle (NSC_VSRR)
Reference object: −30
Inside of: 0
XYZ position: 0 −2.1336 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.30000000E+002 |

Layout Rays: 0
Analysis Rays: 10000
Power(Watts): 1
Wavenumber: 3
Color #: 4
X Half Width: 0.1778
Y Half Width: 0.1778
Z Half Width: 0.01

TABLE 3-continued

ZEMAX Software Output Describing Surface Data Summary and Detail for Each Individual Element within the Illumination Optical System illustrated in FIGS. 13-15

Object 316: LED EMITTER C4
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.29288800E+002 |

Layout Rays: 0
Analysis Rays: 10000
Power(Watts): 1
Wavenumber: 3
Color #: 4
X Half Width: 0.1778
Y Half Width: 0.1778
Z Half Width: 0.01
Object 317: LED EMITTER C3
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.28577600E+002 |

Layout Rays: 0
Analysis Rays: 10000
Power(Watts): 1
Wavenumber: 3
Color #: 4
X Half Width: 0.1778
Y Half Width: 0.1778
Z Half Width: 0.01
Object 318: LED EMITTER C2
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.27866400E+002 |

Layout Rays: 0
Analysis Rays: 10000
Power(Watts): 1
Wavenumber: 3
Color #: 4
X Half Width: 0.1778
Y Half Width: 0.1778
Z Half Width: 0.01
Object 319: LED EMITTER C1
Object type: Null Object (NSC_NULL)
Reference object: 36
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |

Material:
Index at 0.486133 μm = 1.00000000
Index at 0.587562 μm = 1.00000000
Index at 0.656273 μm = 1.00000000
Object 320: LED EMITTER C6
Object type: Source Volume Rectangle (NSC_VSRR)
Reference object: −5
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.30711200E+002 |

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 3
Color #: 4
X Half Width: 0.1778
Y Half Width: 0.1778
Z Half Width: 0.01
Object 321: LED EMITTER C7
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.31422400E+002 |

Layout Rays: 0
Analysis Rays: 10000
Power(Watts): 1
Wavenumber: 3
Color #: 4
X Half Width: 0.1778
Y Half Width: 0.1778
Z Half Width: 0.01
Object 322: LED EMITTER C8
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.32133600E+002 |

Layout Rays: 0
Analysis Rays: 10000
Power(Watts): 1
Wavenumber: 3
Color #: 4
X Half Width: 0.1778
Y Half Width: 0.1778
Z Half Width: 0.01
Object 323: LED EMITTER C9
Object type: Null Object (NSC_NULL)
Reference object: 40
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |

Material:
Index at 0.486133 µm = 1.00000000
Index at 0.587562 µm = 1.00000000
Index at 0.656273 µm = 1.00000000
Object 324: ROW 1
Object type: Null Object (NSC_NULL)
Reference object: 0
Inside of: 0
XYZ position: 0 00
Tilt about XYZ: 0 00

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 µm = 1.00000000
Index at 0.587562 µm = 1.00000000
Index at 0.656273 µm = 1.00000000
Object 325: LED EMITTER C5
Object type: Source Volume Rectangle (NSC_VSRR)

TABLE 3-continued

ZEMAX Software Output Describing Surface Data Summary and Detail for Each Individual Element within the Illumination Optical System illustrated in FIGS. 13-15

Reference object: −40
Inside of: 0
XYZ position: 0 −2.8448 0
Tilt about XYZ: 0 0 0
Pos. Mtrx. R11 R12 R13 X: 1.00000000E+000 0.00000000E+000 0.00000000E+000 −2.84480000E+000
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.30000000E+002
Layout Rays: 0
Analysis Rays: 10000
Power(Watts): 1
Wavenumber: 3
Color #: 5
X Half Width: 0.1778
Y Half Width: 0.1778
Z Half Width: 0.01
Object 326: LED EMITTER C4
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 −2.84480000E+000
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.29288800E+002
Layout Rays: 0
Analysis Rays: 10000
Power(Watts): 1
Wavenumber: 3
Color #: 5
X Half Width: 0.1778
Y Half Width: 0.1778
Z Half Width: 0.01
Object 327: LED EMITTER C3
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 −2.84480000E+000
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.28577600E+002
Layout Rays: 0
Analysis Rays: 10000
Power(Watts): 1
Wavenumber: 3
Color #: 5
X Half Width: 0.1778
Y Half Width: 0.1778
Z Half Width: 0.01
Object 328: LED EMITTER C2
Object type: Null Object (NSC_NULL)
Reference object: 45
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 −2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.32133600E+002
Material:
Index at 0.486133 μm = 1.00000000
Index at 0.587562 μm = 1.00000000
Index at 0.656273 μm = 1.00000000
Object 329: LED EMITTER C1
Object type: Null Object (NSC_NULL)
Reference object: 46
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 −2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.32844800E+002

TABLE 3-continued

ZEMAX Software Output Describing Surface Data Summary and Detail for Each Individual Element within the Illumination Optical System illustrated in FIGS. 13-15

Material:
Index at 0.486133 μm = 1.00000000
Index at 0.587562 μm = 1.00000000
Index at 0.656273 μm = 1.00000000
Object 330: LED EMITTER C6
Object type: Source Volume Rectangle (NSC_VSRR)
Reference object: −5
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −2.84480000E+000
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.30711200E+002
Layout Rays: 0
Analysis Rays: 10000
Power(Watts): 1
Wavenumber: 3
Color #: 5
X Half Width: 0.1778
Y Half Width: 0.1778
Z Half Width: 0.01
Object 331: LED EMITTER C7
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −2.84480000E+000
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.31422400E+002
Layout Rays: 0
Analysis Rays: 10000
Power(Watts): 1
Wavenumber: 3
Color #: 5
X Half Width: 0.1778
Y Half Width: 0.1778
Z Half Width: 0.01
Object 332: LED EMITTER C8
Object type: Null Object (NSC_NULL)
Reference object: 49
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.27866400E+002
Material:
Index at 0.486133 μm = 1.00000000
Index at 0.587562 μm = 1.00000000
Index at 0.656273 μm = 1.00000000
Object 333: LED EMITTER C9
Object type: Null Object (NSC_NULL)
Reference object: 50
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 −2.84480000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.27155200E+002
Material:
Index at 0.486133 μm = 1.00000000
Index at 0.587562 μm = 1.00000000
Index at 0.656273 μm = 1.00000000
Object 334: ROW 6
Object type: Null Object (NSC_NULL)
Reference object: 0
Inside of: 0
XYZ position: 0 00
Tilt about XYZ: 0 00
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 0.00000000E+000
Pos. Mtrx. R31 R32 R33 Z: 0.00000000E+000 0.00000000E+000 1.00000000E+000 0.00000000E+000

TABLE 3-continued

ZEMAX Software Output Describing Surface Data Summary and Detail for Each Individual Element within the Illumination Optical System illustrated in FIGS. 13-15

Material:
Index at 0.486133 μm = 1.00000000
Index at 0.587562 μm = 1.00000000
Index at 0.656273 μm = 1.00000000
Object 335: LED EMITTER C5
Object type: Source Volume Rectangle (NSC_VSRR)
Reference object: −50
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 7.11200000E−001
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.30000000E+002
Layout Rays: 0
Analysis Rays: 10000
Power(Watts): 1
Wavenumber: 3
Color #: 6
X Half Width: 0.1778
Y Half Width: 0.1778
Z Half Width: 0.01
Object 336: LED EMITTER C4
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 7.11200000E−001
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.29288800E+002
Layout Rays: 0
Analysis Rays: 10000
Power(Watts): 1
Wavenumber: 3
Color #: 6
X Half Width: 0.1778
Y Half Width: 0.1778
Z Half Width: 0.01
Object 337: LED EMITTER C3
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 7.11200000E−001
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.28577600E+002
Layout Rays: 0
Analysis Rays: 10000
Power(Watts): 1
Wavenumber: 3
Color #: 6
X Half Width: 0.1778
Y Half Width: 0.1778
Z Half Width: 0.01
Object 338: LED EMITTER C2
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 7.11200000E−001
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.27866400E+002
Layout Rays: 0
Analysis Rays: 10000
Power(Watts): 1
Wavenumber: 3
Color #: 6
X Half Width: 0.1778
Y Half Width: 0.1778
Z Half Width: 0.01

TABLE 3-continued

ZEMAX Software Output Describing Surface Data Summary and Detail for Each Individual Element within the Illumination Optical System illustrated in FIGS. 13-15

Object 339: LED EMITTER C1
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.27155200E+002 |

Layout Rays: 0
Analysis Rays: 10000
Power(Watts): 1
Wavenumber: 3
Color #: 6
X Half Width: 0.1778
Y Half Width: 0.1778
Z Half Width: 0.01
Object 340: LED EMITTER C6
Object type: Source Volume Rectangle (NSC_VSRR)
Reference object: −5
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.30711200E+002 |

Layout Rays: 0
Analysis Rays: 10000
Power(Watts): 1
Wavenumber: 3
Color #: 6
X Half Width: 0.1778
Y Half Width: 0.1778
Z Half Width: 0.01
Object 341: LED EMITTER C7
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.31422400E+002 |

Layout Rays: 0
Analysis Rays: 10000
Power(Watts): 1
Wavenumber: 3
Color #: 6
X Half Width: 0.1778
Y Half Width: 0.1778
Z Half Width: 0.01
Object 342: LED EMITTER C8
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.32133600E+002 |

Layout Rays: 0
Analysis Rays: 10000
Power(Watts): 1
Wavenumber: 3
Color #: 6
X Half Width: 0.1778
Y Half Width: 0.1778
Z Half Width: 0.01

TABLE 3-continued

ZEMAX Software Output Describing Surface Data Summary and Detail for Each Individual Element within the Illumination Optical System illustrated in FIGS. 13-15

Object 343: LED EMITTER C9
Object type: Source Volume Rectangle (NSC_VSRR)
Reference object: −1
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 7.11200000E−001
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.32844800E+002
Layout Rays: 0
Analysis Rays: 10000
Power(Watts): 1
Wavenumber: 3
Color #: 6
X Half Width: 0.1778
Y Half Width: 0.1778
Z Half Width: 0.01
Object 344: ROW 7
Object type: Null Object (NSC_NULL)
Reference object: 0
Inside of: 0
XYZ position: 0 0 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 0.00000000E+000
Pos. Mtrx. R31 R32 R33 Z: 0.00000000E+000 0.00000000E+000 1.00000000E+000 0.00000000E+000
Material:
Index at 0.486133 μm = 1.00000000
Index at 0.587562 μm = 1.00000000
Index at 0.656273 μm = 1.00000000
Object 345: LED EMITTER C5
Object type: Source Volume Rectangle (NSC_VSRR)
Reference object: −60
Inside of: 0
XYZ position: 0 1.4224 0
Tilt about XYZ: 0 0 0
Pos. Mtrx. R11 R12 R13 X: 1.00000000E+000 0.00000000E+000 0.00000000E+000 1.42240000E+000
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.30000000E+002
Layout Rays: 0
Analysis Rays: 10000
Power(Watts): 1
Wavenumber: 3
Color #: 7
X Half Width: 0.1778
Y Half Width: 0.1778
Z Half Width: 0.01
Object 346: LED EMITTER C4
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 1.42240000E+000
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.29288800E+002
Layout Rays: 0
Analysis Rays: 10000
Power(Watts): 1
Wavenumber: 3
Color #: 7
X Half Width: 0.1778
Y Half Width: 0.1778
Z Half Width: 0.01
Object 347: LED EMITTER C3
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 1.42240000E+000
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.28577600E+002

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 3
Color #: 7
X Half Width: 0.1778
Y Half Width: 0.1778
Z Half Width: 0.01
Object 348: LED EMITTER C2
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.27866400E+002 |

Layout Rays: 0
Analysis Rays: 10000
Power(Watts): 1
Wavenumber: 3
Color #: 7
X Half Width: 0.1778
Y Half Width: 0.1778
Z Half Width: 0.01
Object 349: LED EMITTER C1
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.27155200E+002 |

Layout Rays: 0
Analysis Rays: 10000
Power(Watts): 1
Wavenumber: 3
Color #: 7
X Half Width: 0.1778
Y Half Width: 0.1778
Z Half Width: 0.01
Object 350: LED EMITTER C6
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.27866400E+002 |

Layout Rays: 1
Analysis Rays: 10000
Power(Watts): 1
Wavenumber: 3
Color #: 7
X Half Width: 0.1778
Y Half Width: 0.1778
Z Half Width: 0.01
Object 351: LED EMITTER C7
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.28577600E+002 |

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 3
Color #: 7
X Half Width: 0.1778
Y Half Width: 0.1778
Z Half Width: 0.01
Object 352: LED EMITTER C8
Object type: Source Volume Rectangle (NSC__VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.29288800E+002 |

Layout Rays: 0
Analysis Rays: 10000
Power(Watts): 1
Wavenumber: 3
Color #: 7
X Half Width: 0.1778
Y Half Width: 0.1778
Z Half Width: 0.01
Object 353: LED EMITTER C9
Object type: Source Volume Rectangle (NSC__VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.30000000E+002 |

Layout Rays: 0
Analysis Rays: 10000
Power(Watts): 1
Wavenumber: 3
Color #: 7
X Half Width: 0.1778
Y Half Width: 0.1778
Z Half Width: 0.01
Object 354: ROW 8
Object type: Null Object (NSC__NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 355: LED EMITTER C5
Object type: Source Volume Rectangle (NSC__VSRR)
Reference object: −70
Inside of: 0
XYZ position: 0 2.1336 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.30000000E+002 |

Layout Rays: 0
Analysis Rays: 10000
Power(Watts): 1
Wavenumber: 3
Color #: 8
X Half Width: 0.1778
Y Half Width: 0.1778
Z Half Width: 0.01

TABLE 3-continued

ZEMAX Software Output Describing Surface Data Summary and Detail for Each Individual Element within the Illumination Optical System illustrated in FIGS. 13-15

Object 356: LED EMITTER C4
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 2.13360000E+000
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.29288800E+002
Layout Rays: 0
Analysis Rays: 10000
Power(Watts): 1
Wavenumber: 3
Color #: 8
X Half Width: 0.1778
Y Half Width: 0.1778
Z Half Width: 0.01
Object 357: LED EMITTER C3
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 2.13360000E+000
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.28577600E+002
Layout Rays: 0
Analysis Rays: 10000
Power(Watts): 1
Wavenumber: 3
Color #: 8
X Half Width: 0.1778
Y Half Width: 0.1778
Z Half Width: 0.01
Object 358: LED EMITTER C2
Object type: Source Volume Rectangle (NSC_VSRR)
Reference object: −1
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 2.13360000E+000
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.27866400E+002
Layout Rays: 0
Analysis Rays: 10000
Power(Watts): 1
Wavenumber: 3
Color #: 8
X Half Width: 0.1778
Y Half Width: 0.1778
Z Half Width: 0.01
Object 359: LED EMITTER C1
Object type: Null Object (NSC_NULL)
Reference object: 76
Inside of: 0
XYZ position: 0 0.7112 0
Tilt about XYZ: 0 0 0
Pos. Mtrx. R11 R12 R13 X: 1.00000000E+000 0.00000000E+000 0.00000000E+000 2.13360000E+000
Pos. Mtrx. R21 R22 R23 Y: 0.00000000E+000 −3.82858892E−016 −1.00000000E+000 1.47400000E+002
Pos. Mtrx. R31 R32 R33 Z: 0.00000000E+000 1.00000000E+000 −3.82858892E−016 1.32844800E+002
Material:
Index at 0.486133 μm = 1.00000000
Index at 0.587562 μm = 1.00000000
Index at 0.656273 μm = 1.00000000
Object 360: LED EMITTER C6
Object type: Source Volume Rectangle (NSC_VSRR)
Reference object: −5
Inside of: 0
XYZ position: 0 −0.7112 0
Tilt about XYZ: 0 0 0
Pos. Mtrx. R11 R12 R13 X: 1.00000000E+000 0.00000000E+000 0.00000000E+000 2.13360000E+000
Pos. Mtrx. R21 R22 R23 Y: 0.00000000E+000 −3.82858892E−016 1.00000000E+000 −1.47400000E+002
Pos. Mtrx. R31 R32 R33 Z: 0.00000000E+000 −1.00000000E+000 −3.82858892E−016 1.30711200E+002

TABLE 3-continued

ZEMAX Software Output Describing Surface Data Summary and Detail for Each Individual Element within the Illumination Optical System illustrated in FIGS. 13-15

Layout Rays: 0
Analysis Rays: 10000
Power(Watts): 1
Wavenumber: 3
Color #: 8
X Half Width: 0.1778
Y Half Width: 0.1778
Z Half Width: 0.01
Object 361: LED EMITTER C7
Object type: Source Volume Rectangle (NSC__VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.31422400E+002 |

Layout Rays: 0
Analysis Rays: 10000
Power(Watts): 1
Wavenumber: 3
Color #: 8
X Half Width: 0.1778
Y Half Width: 0.1778
Z Half Width: 0.01
Object 362: LED EMITTER C8
Object type: Source Volume Rectangle (NSC__VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.32133600E+002 |

Layout Rays: 0
Analysis Rays: 10000
Power(Watts): 1
Wavenumber: 3
Color #: 8
X Half Width: 0.1778
Y Half Width: 0.1778
Z Half Width: 0.01
Object 363: LED EMITTER C9
Object type: Null Object (NSC__NULL)
Reference object: 80
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |

Material:
Index at 0.486133 μm = 1.00000000
Index at 0.587562 μm = 1.00000000
Index at 0.656273 μm = 1.00000000
Object 364: ROW 9
Object type: Null Object (NSC__NULL)
Reference object: 0
Inside of: 0
XYZ position: 0 00
Tilt about XYZ: 0 00

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 365: LED EMITTER C5
Object type: Source Volume Rectangle (NSC__VSRR)

TABLE 3-continued

ZEMAX Software Output Describing Surface Data Summary and Detail for Each Individual Element within the Illumination Optical System illustrated in FIGS. 13-15

Reference object: −80
Inside of: 0
XYZ position: 0 2.8448 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.30000000E+002 |

Layout Rays: 0
Analysis Rays: 10000
Power(Watts): 1
Wavenumber: 3
Color #: 9
X Half Width: 0.1778
Y Half Width: 0.1778
Z Half Width: 0.01
Object 366: LED EMITTER C4
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.29288800E+002 |

Layout Rays: 0
Analysis Rays: 10000
Power(Watts): 1
Wavenumber: 3
Color #: 9
X Half Width: 0.1778
Y Half Width: 0.1778
Z Half Width: 0.01
Object 367: LED EMITTER C3
Object type: Source Volume Rectangle (NSC_VSRR)
Reference object: −1
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.28577600E+002 |

Layout Rays: 0
Analysis Rays: 10000
Power(Watts): 1
Wavenumber: 3
Color #: 9
X Half Width: 0.1778
Y Half Width: 0.1778
Z Half Width: 0.01
Object 368: LED EMITTER C2
Object type: Null Object (NSC_NULL)
Reference object: 85
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |

Material:
Index at 0.486133 µm = 1.00000000
Index at 0.587562 µm = 1.00000000
Index at 0.656273 µm = 1.00000000
Object 369: LED EMITTER C1
Object type: Null Object (NSC_NULL)
Reference object: 86
Inside of: 0
XYZ position: 0 0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |

TABLE 3-continued

ZEMAX Software Output Describing Surface Data Summary and Detail for Each Individual Element within the Illumination Optical System illustrated in FIGS. 13-15

Material:
Index at 0.486133 μm = 1.00000000
Index at 0.587562 μm = 1.00000000
Index at 0.656273 μm = 1.00000000
Object 370: LED EMITTER C6
Object type: Source Volume Rectangle (NSC_VSRR)
Reference object: −5
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.30711200E+002 |

Layout Rays: 0
Analysis Rays: 10000
Power(Watts): 1
Wavenumber: 3
Color #: 9
X Half Width: 0.1778
Y Half Width: 0.1778
Z Half Width: 0.01
Object 371: LED EMITTER C7
Object type: Source Volume Rectangle (NSC_VSRR)
Reference object: −1
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.31422400E+002 |

Layout Rays: 0
Analysis Rays: 10000
Power(Watts): 1
Wavenumber: 3
Color #: 9
X Half Width: 0.1778
Y Half Width: 0.1778
Z Half Width: 0.01
Object 372: LED EMITTER C8
Object type: Null Object (NSC_NULL)
Reference object: 89
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27866400E+002 |

Material:
Index at 0.486133 μm = 1.00000000
Index at 0.587562 μm = 1.00000000
Index at 0.656273 μm = 1.00000000
Object 373: LED EMITTER C9
Object type: Null Object (NSC_NULL)
Reference object: 90
Inside of: 0
XYZ position: 0 −0.7112 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |

Material:
Index at 0.486133 μm = 1.00000000
Index at 0.587562 μm = 1.00000000
Index at 0.656273 μm = 1.00000000
Object 374:
Object type: CPC (NSC_CPCO)
CSG 0: Side Faces
Coating: (none)
Scattering: None
CSG 1: Front Face
Coating: (none)
Scattering: None
CSG 2: Back Face TABLE 3-continued ZEMAX Software Output Describing Surface Data Summary and Detail for Each Individual Element within the Illumination Optical System illustrated in FIGS. 13-15

Coating: (none)
Scattering: None
Reference object: −91
Inside of: 0
XYZ position: 0.5 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | −3.82858892E−016 | 1.00000000E+000 | −1.47500000E+002 |
| Pos. Mtrx. R31 R32 R33 Z: | 0.00000000E+000 | −1.00000000E+000 | −3.82858892E−016 | 1.30000000E+002 |

Material: MIRROR
Radial Aperture: 3.6
Angle (deg): 12
Length: 98.4
#Angle Facets: 50
#Length Facets: 48
Is Volume?: 0
Object 375: Condenser
Object type: Standard Lens (NSC_SLEN)
CSG 0: Side Faces
Coating: (none)
Scattering: None
CSG 1: Front Face
Coating: (none)
Scattering: None
CSG 2: Back Face
Coating: (none)
Scattering: None
Reference object: −92
Inside of: 0
XYZ position: 100 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | −3.82858892E−016 | 1.00000000E+000 | −4.80000000E+001 |
| Pos. Mtrx. R31 R32 R33 Z: | 0.00000000E+000 | −1.00000000E+000 | −3.82858892E−016 | 1.30000000E+002 |

Material: BK7
Index at 0.486133 μm = 1.52237629
Index at 0.587562 μm = 1.51680003
Index at 0.656273 μm = 1.51432235
Radius 1: 75
Conic 1: 0
Clear 1: 19
Edge 1: 19
Thickness: 5
Radius 2: −175
Conic 2: 0
Clear 2: 19
Edge 2: 19
Object 376: Combiner Optics
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 377: Blue R/Green T
Object type: Rectangular Volume (NSC_RBLK)
CSG 0: Side Faces
Coating: (none)
Scattering: None
CSG 1: Front Face
Coating: (none)
Scattering: None
CSG 2: Back Face TABLE 3-continued ZEMAX Software Output Describing Surface Data Summary and Detail for Each Individual Element within the Illumination Optical System illustrated in FIGS. 13-15

Coating: ILL__BRGT
Scattering: None
Reference object: 0
Inside of: 0
XYZ position: 0 21 128
Tilt about XYZ: −45 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 7.07106781E−001 | 7.07106781E−001 | 2.10000000E+001 |
| Pos. Mtrx. R31 R32 R33 Z: | 0.00000000E+000 | −7.07106781E−001 | 7.07106781E−001 | 1.28000000E+002 |

Material: BK7
Index at 0.486133 µm = 1.52237629
Index at 0.587562 µm = 1.51680003
Index at 0.656273 µm = 1.51432235
X1 Half Width: 26
Y1 Half Width: 26
Z Length: 2
X2 Half Width: 26
Y2 Half Width: 26
Front X Angle: 0
Front Y Angle: 0
Rear X Angle: 0
Rear Y Angle: 0
Object 378: Red R/Green T
Object type: Rectangular Volume (NSC__RBLK)
CSG 0: Side Faces
Coating: (none)
Scattering: None
CSG 1: Front Face
Coating: (none)
Scattering: None
CSG 2: Back Face
Coating: ILL__RRGT
Scattering: None
Reference object: 0
Inside of: 0
XYZ position: 0 21 128
Tilt about XYZ: 45 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 7.07106781E−001 | −7.07106781E−001 | −2.10000000E+001 |
| Pos. Mtrx. R31 R32 R33 Z: | 0.00000000E+000 | 7.07106781E−001 | 7.07106781E−001 | 1.28000000E+002 |

Material: BK7
Index at 0.486133 µm = 1.52237629
Index at 0.587562 µm = 1.51680003
Index at 0.656273 µm = 1.51432235
X1 Half Width: 26
Y1 Half Width: 26
Z Length: 2
X2 Half Width: 26
Y2 Half Width: 26
Front X Angle: 0
Front Y Angle: 0
Rear X Angle: 0
Rear Y Angle: 0
Object 379:
Object type: Null Object (NSC__NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 µm = 1.00000000
Index at 0.587562 µm = 1.00000000
Index at 0.656273 µm = 1.00000000
Object 380:
Object type: Standard Lens (NSC__SLEN)
CSG 0: Side Faces
Coating: (none)
Scattering: None
CSG 1: Front Face
Coating: (none)

TABLE 3-continued

ZEMAX Software Output Describing Surface Data Summary and Detail for Each Individual Element within the Illumination Optical System illustrated in FIGS. 13-15

Scattering: None
CSG 2: Back Face
Coating: (none)
Scattering: None
Reference object: 0
Inside of: 0
XYZ position: 165 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 1.65000000E+002 |

Material: BK7
Index at 0.486133 µm = 1.52237629
Index at 0.587562 µm = 1.51680003
Index at 0.656273 µm = 1.51432235
Radius 1: 300
Conic 1: 20
Clear 1: 48
Edge 1: 50
Thickness: 10
Radius 2: 0
Conic 2: 0
Clear 2: 48
Edge 2: 50
Object 381:
Object type: Standard Lens (NSC_SLEN)
CSG 0: Side Faces
Coating: (none)
Scattering: None
CSG 1: Front Face
Coating: (none)
Scattering: None
CSG 2: Back Face
Coating: (none)
Scattering: None
Reference object: 0
Inside of: 0
XYZ position: 185 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 1.85000000E+002 |

Material: SK5
Index at 0.486133 µm = 1.59580857
Index at 0.587562 µm = 1.58913012
Index at 0.656273 µm = 1.58619276
Radius 1: 0
Conic 1: 0
Clear 1: 48
Edge 1: 50
Thickness: 10
Radius 2: −325
Conic 2: 0
Clear 2: 48
Edge 2: 50
Object 382:
Object type: Null Object (NSC_NULL)
Reference object: 0
Inside of: 0
XYZ position: 0 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 µm = 1.00000000
Index at 0.587562 µm = 1.00000000
Index at 0.656273 µm = 1.00000000
Object 383: ILLUMINATOR_RECTANGLE.POB
Object type: Poly Object (NSC_POBJ)
CSG 0: User Defined Faces
Coating: (none)
Scattering: None TABLE 3-continued ZEMAX Software Output Describing Surface Data Summary and Detail for Each Individual Element within the Illumination Optical System illustrated in FIGS. 13-15

CSG 1: User Defined Faces
Coating: (none)
Scattering: None
CSG 2: User Defined Faces
Coating: (none)
Scattering: None
CSG 3: User Defined Faces
Coating: (none)
Scattering: None
Reference object: 0
Inside of: 0
XYZ position: 210 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 2.10000000E+002 |

Material: ACRYLIC
Index at 0.486133 μm = 1.49782763
Index at 0.587562 μm = 1.49166834
Index at 0.656273 μm = 1.48893834
Scale: 6
Is Volume?: 1
Object 384:
Object type: Detector Rect (NSC_DETE)
CSG 0: All Faces
Coating: (none)
Scattering: None
Reference object: −1
Inside of: 0
XYZ position: 350 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 5.60000000E+002 |

Material:
Index at 0.486133 μm = 1.00000000
Index at 0.587562 μm = 1.00000000
Index at 0.656273 μm = 1.00000000
X Half Width: 27
Y Half Width: 48
X Pixels: 400
Y Pixels: 400
Data Type: 0
Color: 0
Smoothing: 0
Scale: 0
Plot Scale: 0
Front Only: 1
PSF Wave#: 0
X Angle Min: −90
X Angle Max: 90
Y Angle Min: −90
Y Angle Max: 90
Polarization: 0
Object 385:
Object type: Standard Surface (NSC_SSUR)
CSG 0: All Faces
Coating: (none)
Scattering: None
Reference object: 0
Inside of: 0
XYZ position: 108 0 0
Tilt about XYZ: 0 0 0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 1.08000000E+002 |

Material
Index at 0.486133 μm = 1.00000000
Index at 0.587562 μm = 1.00000000
Index at 0.656273 μm = 1.00000000
Radius: 0
Conic: 0
Max Aper: 60
Min Aper: 0

TABLE 3-continued

ZEMAX Software Output Describing Surface Data Summary and Detail for Each Individual Element within the Illumination Optical System illustrated in FIGS. 13-15

COATING DEFINITIONS:

Coating Name: ILL_BRGT (TABLE)
Coating Name: ILL_RRGT (TABLE)
MULTI-CONFIGURATION DATA:

Configuration 1:
1 Comment:
Configuration 2:
1 Comment:
SOLVE AND VARIABLE DATA:

| | | | | | | | |
|---|---|---|---|---|---|---|---|
| Surf | 1 NSC Object | 4 Parameter | 2: Pickup From | 3 Scale | 1.0000E+000 Offset | 0.0000E+000 | Column Parameter −6 |
| Surf | 1 NSC Object | 4 Parameter | 3: Pickup From | 3 Scale | 1.0000E+000 Offset | 0.0000E+000 | Column Parameter −6 |
| Surf | 1 NSC Object | 4 Parameter | 5: Pickup From | 3 Scale | 1.0000E+000 Offset | 0.0000E+000 | Column Parameter −6 |
| Surf | 1 NSC Object | 4 Parameter | 6: Pickup From | 3 Scale | 1.0000E+000 Offset | 0.0000E+000 | Column Parameter −6 |
| Surf | 1 NSC Object | 4 Parameter | 7: Pickup From | 3 Scale | 1.0000E+000 Offset | 0.0000E+000 | Column Parameter −6 |
| Surf | 1 NSC Object | 4 Parameter | 8: Pickup From | 3 Scale | 1.0000E+000 Offset | 0.0000E+000 | Column Parameter −6 |
| Surf | 1 NSC Object | 5 Position | Y: Pickup From | 4 Scale | 1.0000E+000 Offset | 0.0000E+000 | Column Parameter −6 |
| Surf | 1 NSC Object | 5 Parameter | 1: Pickup From | 3 Scale | 1.0000E+000 Offset | 0.0000E+000 | Column Parameter −6 |
| Surf | 1 NSC Object | 5 Parameter | 2: Pickup From | 3 Scale | 1.0000E+000 Offset | 0.0000E+000 | Column Parameter −6 |
| Surf | 1 NSC Object | 5 Parameter | 3: Pickup From | 3 Scale | 1.0000E+000 Offset | 0.0000E+000 | Column Parameter −6 |
| Surf | 1 NSC Object | 5 Parameter | 5: Pickup From | 3 Scale | 1.0000E+000 Offset | 0.0000E+000 | Column Parameter −6 |
| Surf | 1 NSC Object | 5 Parameter | 6: Pickup From | 3 Scale | 1.0000E+000 Offset | 0.0000E+000 | Column Parameter −6 |
| Surf | 1 NSC Object | 5 Parameter | 7: Pickup From | 3 Scale | 1.0000E+000 Offset | 0.0000E+000 | Column Parameter −6 |
| Surf | 1 NSC Object | 5 Parameter | 8: Pickup From | 3 Scale | 1.0000E+000 Offset | 0.0000E+000 | Column Parameter −6 |
| Surf | 1 NSC Object | 6 Position | Y: Pickup From | 4 Scale | 1.0000E+000 Offset | 0.0000E+000 | Column Parameter −6 |
| Surf | 1 NSC Object | 6 Parameter | 1: Pickup From | 3 Scale | 1.0000E+000 Offset | 0.0000E+000 | Column Parameter −6 |
| Surf | 1 NSC Object | 6 Parameter | 2: Pickup From | 3 Scale | 1.0000E+000 Offset | 0.0000E+000 | Column Parameter −6 |
| Surf | 1 NSC Object | 6 Parameter | 3: Pickup From | 3 Scale | 1.0000E+000 Offset | 0.0000E+000 | Column Parameter −6 |
| Surf | 1 NSC Object | 6 Parameter | 5: Pickup From | 3 Scale | 1.0000E+000 Offset | 0.0000E+000 | Column Parameter −6 |
| Surf | 1 NSC Object | 6 Parameter | 6: Pickup From | 3 Scale | 1.0000E+000 Offset | 0.0000E+000 | Column Parameter −6 |
| Surf | 1 NSC Object | 6 Parameter | 7: Pickup From | 3 Scale | 1.0000E+000 Offset | 0.0000E+000 | Column Parameter −6 |
| Surf | 1 NSC Object | 6 Parameter | 8: Pickup From | 3 Scale | 1.0000E+000 Offset | 0.0000E+000 | Column Parameter −6 |
| Surf | 1 NSC Object | 7 Position | Y: Pickup From | 4 Scale | 1.0000E+000 Offset | 0.0000E+000 | Column Parameter −6 |
| Surf | 1 NSC Object | 7 Parameter | 1: Pickup From | 3 Scale | 1.0000E+000 Offset | 0.0000E+000 | Column Parameter −6 |
| Surf | 1 NSC Object | 7 Parameter | 2: Pickup From | 3 Scale | 1.0000E+000 Offset | 0.0000E+000 | Column Parameter −6 |
| Surf | 1 NSC Object | 7 Parameter | 3: Pickup From | 3 Scale | 1.0000E+000 Offset | 0.0000E+000 | Column Parameter −6 |
| Surf | 1 NSC Object | 7 Parameter | 5: Pickup From | 3 Scale | 1.0000E+000 Offset | 0.0000E+000 | Column Parameter −6 |
| Surf | 1 NSC Object | 7 Parameter | 6: Pickup From | 3 Scale | 1.0000E+000 Offset | 0.0000E+000 | Column Parameter −6 |
| Surf | 1 NSC Object | 7 Parameter | 7: Pickup From | 3 Scale | 1.0000E+000 Offset | 0.0000E+000 | Column Parameter −6 |
| Surf | 1 NSC Object | 7 Parameter | 8: Pickup From | 3 Scale | 1.0000E+000 Offset | 0.0000E+000 | Column Parameter −6 |
| Surf | 1 NSC Object | 8 Position | Y: Pickup From | 4 Scale | −1.0000E+000 Offset | 0.0000E+000 | Column Parameter −6 |
| Surf | 1 NSC Object | 8 Parameter | 1: Pickup From | 3 Scale | 1.0000E+000 Offset | 0.0000E+000 | Column Parameter −6 |
| Surf | 1 NSC Object | 8 Parameter | 2: Pickup From | 3 Scale | 1.0000E+000 Offset | 0.0000E+000 | Column Parameter −6 |
| Surf | 1 NSC Object | 8 Parameter | 3: Pickup From | 3 Scale | 1.0000E+000 Offset | 0.0000E+000 | Column Parameter −6 |
| Surf | 1 NSC Object | 8 Parameter | 5: Pickup From | 3 Scale | 1.0000E+000 Offset | 0.0000E+000 | Column Parameter −6 |
| Surf | 1 NSC Object | 8 Parameter | 6: Pickup From | 3 Scale | 1.0000E+000 Offset | 0.0000E+000 | Column Parameter −6 |
| Surf | 1 NSC Object | 8 Parameter | 7: Pickup From | 3 Scale | 1.0000E+000 Offset | 0.0000E+000 | Column Parameter −6 |
| Surf | 1 NSC Object | 8 Parameter | 8: Pickup From | 3 Scale | 1.0000E+000 Offset | 0.0000E+000 | Column Parameter −6 |
| Surf | 1 NSC Object | 9 Position | Y: Pickup From | 4 Scale | −1.0000E+000 Offset | 0.0000E+000 | Column Parameter −6 |
| Surf | 1 NSC Object | 9 Parameter | 1: Pickup From | 3 Scale | 1.0000E+000 Offset | 0.0000E+000 | Column Parameter −6 |
| Surf | 1 NSC Object | 9 Parameter | 2: Pickup From | 3 Scale | 1.0000E+000 Offset | 0.0000E+000 | Column Parameter −6 |
| Surf | 1 NSC Object | 9 Parameter | 3: Pickup From | 3 Scale | 1.0000E+000 Offset | 0.0000E+000 | Column Parameter −6 |
| Surf | 1 NSC Object | 9 Parameter | 5: Pickup From | 3 Scale | 1.0000E+000 Offset | 0.0000E+000 | Column Parameter −6 |
| Surf | 1 NSC Object | 9 Parameter | 6: Pickup From | 3 Scale | 1.0000E+000 Offset | 0.0000E+000 | Column Parameter −6 |
| Surf | 1 NSC Object | 9 Parameter | 7: Pickup From | 3 Scale | 1.0000E+000 Offset | 0.0000E+000 | Column Parameter −6 |
| Surf | 1 NSC Object | 9 Parameter | 8: Pickup From | 3 Scale | 1.0000E+000 Offset | 0.0000E+000 | Column Parameter −6 |
| Surf | 1 NSC Object | 10 Position | Y: Pickup From | 4 Scale | −1.0000E+000 Offset | 0.0000E+000 | Column Parameter −6 |
| Surf | 1 NSC Object | 10 Parameter | 1: Pickup From | 3 Scale | 1.0000E+000 Offset | 0.0000E+000 | Column Parameter −6 |
| Surf | 1 NSC Object | 10 Parameter | 2: Pickup From | 3 Scale | 1.0000E+000 Offset | 0.0000E+000 | Column Parameter −6 |
| Surf | 1 NSC Object | 10 Parameter | 3: Pickup From | 3 Scale | 1.0000E+000 Offset | 0.0000E+000 | Column Parameter −6 |
| Surf | 1 NSC Object | 10 Parameter | 5: Pickup From | 3 Scale | 1.0000E+000 Offset | 0.0000E+000 | Column Parameter −6 |
| Surf | 1 NSC Object | 10 Parameter | 6: Pickup From | 3 Scale | 1.0000E+000 Offset | 0.0000E+000 | Column Parameter −6 |
| Surf | 1 NSC Object | 10 Parameter | 7: Pickup From | 3 Scale | 1.0000E+000 Offset | 0.0000E+000 | Column Parameter −6 |
| Surf | 1 NSC Object | 10 Parameter | 8: Pickup From | 3 Scale | 1.0000E+000 Offset | 0.0000E+000 | Column Parameter −6 |
| Surf | 1 NSC Object | 11 Position | Y: Pickup From | 4 Scale | −1.0000E+000 Offset | 0.0000E+000 | Column Parameter −6 |
| Surf | 1 NSC Object | 11 Parameter | 1: Pickup From | 3 Scale | 1.0000E+000 Offset | 0.0000E+000 | Column Parameter −6 |
| Surf | 1 NSC Object | 11 Parameter | 2: Pickup From | 3 Scale | 1.0000E+000 Offset | 0.0000E+000 | Column Parameter −6 |
| Surf | 1 NSC Object | 11 Parameter | 3: Pickup From | 3 Scale | 1.0000E+000 Offset | 0.0000E+000 | Column Parameter −6 |
| Surf | 1 NSC Object | 11 Parameter | 5: Pickup From | 3 Scale | 1.0000E+000 Offset | 0.0000E+000 | Column Parameter −6 |
| Surf | 1 NSC Object | 11 Parameter | 6: Pickup From | 3 Scale | 1.0000E+000 Offset | 0.0000E+000 | Column Parameter −6 |
| Surf | 1 NSC Object | 11 Parameter | 7: Pickup From | 3 Scale | 1.0000E+000 Offset | 0.0000E+000 | Column Parameter −6 |
| Surf | 1 NSC Object | 11 Parameter | 8: Pickup From | 3 Scale | 1.0000E+000 Offset | 0.0000E+000 | Column Parameter −6 |
| Surf | 1 NSC Object | 13 Position | X: Pickup From | 2 Scale | 2.0000E+000 Offset | 0.0000E+000 | Column Parameter −6 |
| Surf | 1 NSC Object | 13 Parameter | 1: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 13 Parameter | 2: Pickup From | 3 Scale | 1.0000E+000 Offset | 0.0000E+000 | Column Parameter −6 |
| Surf | 1 NSC Object | 13 Parameter | 3: Pickup From | 3 Scale | 1.0000E+000 Offset | 0.0000E+000 | Column Parameter −6 |
| Surf | 1 NSC Object | 13 Parameter | 6: Pickup From | 3 Scale | 1.0000E+000 Offset | 0.0000E+000 | Column Parameter −6 |
| Surf | 1 NSC Object | 13 Parameter | 7: Pickup From | 3 Scale | 1.0000E+000 Offset | 0.0000E+000 | Column Parameter −6 |
| Surf | 1 NSC Object | 13 Parameter | 8: Pickup From | 3 Scale | 1.0000E+000 Offset | 0.0000E+000 | Column Parameter −6 |
| Surf | 1 NSC Object | 14 Position | Y: Pickup From | 4 Scale | 1.0000E+000 Offset | 0.0000E+000 | Column Parameter −6 |
| Surf | 1 NSC Object | 14 Parameter | 1: Pickup From | 3 Scale | 1.0000E+000 Offset | 0.0000E+000 | Column Parameter −6 |
| Surf | 1 NSC Object | 14 Parameter | 2: Pickup From | 3 Scale | 1.0000E+000 Offset | 0.0000E+000 | Column Parameter −6 |
| Surf | 1 NSC Object | 14 Parameter | 3: Pickup From | 3 Scale | 1.0000E+000 Offset | 0.0000E+000 | Column Parameter −6 |
| Surf | 1 NSC Object | 14 Parameter | 5: Pickup From | 13 Scale | 1.0000E+000 Offset | 0.0000E+000 | Column Parameter −6 |
| Surf | 1 NSC Object | 14 Parameter | 6: Pickup From | 3 Scale | 1.0000E+000 Offset | 0.0000E+000 | Column Parameter −6 |
| Surf | 1 NSC Object | 14 Parameter | 7: Pickup From | 3 Scale | 1.0000E+000 Offset | 0.0000E+000 | Column Parameter −6 |
| Surf | 1 NSC Object | 14 Parameter | 8: Pickup From | 3 Scale | 1.0000E+000 Offset | 0.0000E+000 | Column Parameter −6 |
| Surf | 1 NSC Object | 15 Position | Y: Pickup From | 4 Scale | 1.0000E+000 Offset | 0.0000E+000 | Column Parameter −6 |
| Surf | 1 NSC Object | 15 Parameter | 1: Pickup From | 3 Scale | 1.0000E+000 Offset | 0.0000E+000 | Column Parameter −6 |
| Surf | 1 NSC Object | 15 Parameter | 2: Pickup From | 3 Scale | 1.0000E+000 Offset | 0.0000E+000 | Column Parameter −6 |
| Surf | 1 NSC Object | 15 Parameter | 3: Pickup From | 3 Scale | 1.0000E+000 Offset | 0.0000E+000 | Column Parameter −6 |
| Surf | 1 NSC Object | 15 Parameter | 5: Pickup From | 13 Scale | 1.0000E+000 Offset | 0.0000E+000 | Column Parameter −6 |
| Surf | 1 NSC Object | 15 Parameter | 6: Pickup From | 3 Scale | 1.0000E+000 Offset | 0.0000E+000 | Column Parameter −6 |
| Surf | 1 NSC Object | 15 Parameter | 7: Pickup From | 3 Scale | 1.0000E+000 Offset | 0.0000E+000 | Column Parameter −6 |
| Surf | 1 NSC Object | 15 Parameter | 8: Pickup From | 3 Scale | 1.0000E+000 Offset | 0.0000E+000 | Column Parameter −6 |
| Surf | 1 NSC Object | 16 Position | Y: Pickup From | 4 Scale | 1.0000E+000 Offset | 0.0000E+000 | Column Parameter −6 |
| Surf | 1 NSC Object | 16 Parameter | 1: Pickup From | 3 Scale | 1.0000E+000 Offset | 0.0000E+000 | Column Parameter −6 |
| Surf | 1 NSC Object | 16 Parameter | 2: Pickup From | 3 Scale | 1.0000E+000 Offset | 0.0000E+000 | Column Parameter −6 |
| Surf | 1 NSC Object | 16 Parameter | 3: Pickup From | 3 Scale | 1.0000E+000 Offset | 0.0000E+000 | Column Parameter −6 |
| Surf | 1 NSC Object | 16 Parameter | 5: Pickup From | 13 Scale | 1.0000E+000 Offset | 0.0000E+000 | Column Parameter −6 |
| Surf | 1 NSC Object | 16 Parameter | 6: Pickup From | 3 Scale | 1.0000E+000 Offset | 0.0000E+000 | Column Parameter −6 |
| Surf | 1 NSC Object | 16 Parameter | 7: Pickup From | 3 Scale | 1.0000E+000 Offset | 0.0000E+000 | Column Parameter −6 |
| Surf | 1 NSC Object | 16 Parameter | 8: Pickup From | 3 Scale | 1.0000E+000 Offset | 0.0000E+000 | Column Parameter −6 |
| Surf | 1 NSC Object | 17 Position | Y: Pickup From | 4 Scale | 1.0000E+000 Offset | 0.0000E+000 | Column Parameter −6 |
| Surf | 1 NSC Object | 17 Parameter | 1: Pickup From | 3 Scale | 1.0000E+000 Offset | 0.0000E+000 | Column Parameter −6 |
| Surf | 1 NSC Object | 17 Parameter | 2: Pickup From | 3 Scale | 1.0000E+000 Offset | 0.0000E+000 | Column Parameter −6 |
| Surf | 1 NSC Object | 17 Parameter | 3: Pickup From | 3 Scale | 1.0000E+000 Offset | 0.0000E+000 | Column Parameter −6 |
| Surf | 1 NSC Object | 17 Parameter | 5: Pickup From | 13 Scale | 1.0000E+000 Offset | 0.0000E+000 | Column Parameter −6 |
| Surf | 1 NSC Object | 17 Parameter | 6: Pickup From | 3 Scale | 1.0000E+000 Offset | 0.0000E+000 | Column Parameter −6 |
| Surf | 1 NSC Object | 17 Parameter | 7: Pickup From | 3 Scale | 1.0000E+000 Offset | 0.0000E+000 | Column Parameter −6 |
| Surf | 1 NSC Object | 17 Parameter | 8: Pickup From | 3 Scale | 1.0000E+000 Offset | 0.0000E+000 | Column Parameter −6 |
| Surf | 1 NSC Object | 18 Position | Y: Pickup From | 4 Scale | −1.0000E+000 Offset | 0.0000E+000 | Column Parameter −6 |
| Surf | 1 NSC Object | 18 Parameter | 1: Pickup From | 3 Scale | 1.0000E+000 Offset | 0.0000E+000 | Column Parameter −6 |
| Surf | 1 NSC Object | 18 Parameter | 2: Pickup From | 3 Scale | 1.0000E+000 Offset | 0.0000E+000 | Column Parameter −6 |
| Surf | 1 NSC Object | 18 Parameter | 3: Pickup From | 3 Scale | 1.0000E+000 Offset | 0.0000E+000 | Column Parameter −6 |
| Surf | 1 NSC Object | 18 Parameter | 5: Pickup From | 13 Scale | 1.0000E+000 Offset | 0.0000E+000 | Column Parameter −6 |
| Surf | 1 NSC Object | 18 Parameter | 6: Pickup From | 3 Scale | 1.0000E+000 Offset | 0.0000E+000 | Column Parameter −6 |
| Surf | 1 NSC Object | 18 Parameter | 7: Pickup From | 3 Scale | 1.0000E+000 Offset | 0.0000E+000 | Column Parameter −6 |
| Surf | 1 NSC Object | 18 Parameter | 8: Pickup From | 3 Scale | 1.0000E+000 Offset | 0.0000E+000 | Column Parameter −6 |
| Surf | 1 NSC Object | 19 Position | Y: Pickup From | 4 Scale | −1.0000E+000 Offset | 0.0000E+000 | Column Parameter −6 |
| Surf | 1 NSC Object | 19 Parameter | 1: Pickup From | 3 Scale | 1.0000E+000 Offset | 0.0000E+000 | Column Parameter −6 |
| Surf | 1 NSC Object | 19 Parameter | 2: Pickup From | 3 Scale | 1.0000E+000 Offset | 0.0000E+000 | Column Parameter −6 |
| Surf | 1 NSC Object | 19 Parameter | 3: Pickup From | 3 Scale | 1.0000E+000 Offset | 0.0000E+000 | Column Parameter −6 |
| Surf | 1 NSC Object | 19 Parameter | 5: Pickup From | 13 Scale | 1.0000E+000 Offset | 0.0000E+000 | Column Parameter −6 |
| Surf | 1 NSC Object | 19 Parameter | 6: Pickup From | 3 Scale | 1.0000E+000 Offset | 0.0000E+000 | Column Parameter −6 |
| Surf | 1 NSC Object | 19 Parameter | 7: Pickup From | 3 Scale | 1.0000E+000 Offset | 0.0000E+000 | Column Parameter −6 |
| Surf | 1 NSC Object | 19 Parameter | 8: Pickup From | 3 Scale | 1.0000E+000 Offset | 0.0000E+000 | Column Parameter −6 |
| Surf | 1 NSC Object | 20 Position | Y: Pickup From | 4 Scale | −1.0000E+000 Offset | 0.0000E+000 | Column Parameter −6 |
| Surf | 1 NSC Object | 20 Parameter | 1: Pickup From | 3 Scale | 1.0000E+000 Offset | 0.0000E+000 | Column Parameter −6 |
| Surf | 1 NSC Object | 20 Parameter | 2: Pickup From | 3 Scale | 1.0000E+000 Offset | 0.0000E+000 | Column Parameter −6 |
| Surf | 1 NSC Object | 20 Parameter | 3: Pickup From | 3 Scale | 1.0000E+000 Offset | 0.0000E+000 | Column Parameter −6 |
| Surf | 1 NSC Object | 20 Parameter | 5: Pickup From | 13 Scale | 1.0000E+000 Offset | 0.0000E+000 | Column Parameter −6 |
| Surf | 1 NSC Object | 20 Parameter | 6: Pickup From | 3 Scale | 1.0000E+000 Offset | 0.0000E+000 | Column Parameter −6 |
| Surf | 1 NSC Object | 20 Parameter | 7: Pickup From | 3 Scale | 1.0000E+000 Offset | 0.0000E+000 | Column Parameter −6 |
| Surf | 1 NSC Object | 20 Parameter | 8: Pickup From | 3 Scale | 1.0000E+000 Offset | 0.0000E+000 | Column Parameter −6 |
| Surf | 1 NSC Object | 21 Position | Y: Pickup From | 4 Scale | −1.0000E+000 Offset | 0.0000E+000 | Column Parameter −6 |
| Surf | 1 NSC Object | 21 Parameter | 1: Pickup From | 3 Scale | 1.0000E+000 Offset | 0.0000E+000 | Column Parameter −6 |
| Surf | 1 NSC Object | 21 Parameter | 2: Pickup From | 3 Scale | 1.0000E+000 Offset | 0.0000E+000 | Column Parameter −6 |
| Surf | 1 NSC Object | 21 Parameter | 3: Pickup From | 3 Scale | 1.0000E+000 Offset | 0.0000E+000 | Column Parameter −6 |
| Surf | 1 NSC Object | 21 Parameter | 5: Pickup From | 13 Scale | 1.0000E+000 Offset | 0.0000E+000 | Column Parameter −6 |
| Surf | 1 NSC Object | 21 Parameter | 6: Pickup From | 3 Scale | 1.0000E+000 Offset | 0.0000E+000 | Column Parameter −6 |
| Surf | 1 NSC Object | 21 Parameter | 7: Pickup From | 3 Scale | 1.0000E+000 Offset | 0.0000E+000 | Column Parameter −6 |
| Surf | 1 NSC Object | 21 Parameter | 8: Pickup From | 3 Scale | 1.0000E+000 Offset | 0.0000E+000 | Column Parameter −6 |
| Surf | 1 NSC Object | 23 Position | X: Pickup From | 2 Scale | 4.0000E+000 Offset | 0.0000E+000 | Column Parameter −6 |
| Surf | 1 NSC Object | 23 Parameter | 1: Pickup From | 3 Scale | 1.0000E+000 Offset | 0.0000E+000 | Column Parameter −6 |
| Surf | 1 NSC Object | 23 Parameter | 2: Pickup From | 3 Scale | 1.0000E+000 Offset | 0.0000E+000 | Column Parameter −6 |
| Surf | 1 NSC Object | 23 Parameter | 3: Pickup From | 3 Scale | 1.0000E+000 Offset | 0.0000E+000 | Column Parameter −6 |
| Surf | 1 NSC Object | 23 Parameter | 6: Pickup From | 3 Scale | 1.0000E+000 Offset | 0.0000E+000 | Column Parameter −6 |
| Surf | 1 NSC Object | 23 Parameter | 7: Pickup From | 3 Scale | 1.0000E+000 Offset | 0.0000E+000 | Column Parameter −6 |
| Surf | 1 NSC Object | 23 Parameter | 8: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 24 Position | Y: Pickup From | 4 Scale | 1.0000E+000 Offset | 0.0000E+000 | Column Parameter −6 |
| Surf | 1 NSC Object | 24 Parameter | 1: Pickup From | 3 Scale | 1.0000E+000 Offset | 0.0000E+000 | Column Parameter −6 |
| Surf | 1 NSC Object | 24 Parameter | 2: Pickup From | 3 Scale | 1.0000E+000 Offset | 0.0000E+000 | Column Parameter −6 |
| Surf | 1 NSC Object | 24 Parameter | 3: Pickup From | 3 Scale | 1.0000E+000 Offset | 0.0000E+000 | Column Parameter −6 |
| Surf | 1 NSC Object | 24 Parameter | 5: Pickup From | 23 Scale | 1.0000E+000 Offset | 0.0000E+000 | Column Parameter −6 |
| Surf | 1 NSC Object | 24 Parameter | 6: Pickup From | 3 Scale | 1.0000E+000 Offset | 0.0000E+000 | Column Parameter −6 |
| Surf | 1 NSC Object | 24 Parameter | 7: Pickup From | 3 Scale | 1.0000E+000 Offset | 0.0000E+000 | Column Parameter −6 |
| Surf | 1 NSC Object | 24 Parameter | 8: Pickup From | 3 Scale | 1.0000E+000 Offset | 0.0000E+000 | Column Parameter −6 |
| Surf | 1 NSC Object | 25 Position | Y: Pickup From | 4 Scale | 1.0000E+000 Offset | 0.0000E+000 | Column Parameter −6 |
| Surf | 1 NSC Object | 25 Parameter | 1: Pickup From | 3 Scale | 1.0000E+000 Offset | 0.0000E+000 | Column Parameter −6 |
| Surf | 1 NSC Object | 25 Parameter | 2: Pickup From | 3 Scale | 1.0000E+000 Offset | 0.0000E+000 | Column Parameter −6 |
| Surf | 1 NSC Object | 25 Parameter | 3: Pickup From | 3 Scale | 1.0000E+000 Offset | 0.0000E+000 | Column Parameter −6 |
| Surf | 1 NSC Object | 25 Parameter | 5: Pickup From | 23 Scale | 1.0000E+000 Offset | 0.0000E+000 | Column Parameter −6 |
| Surf | 1 NSC Object | 25 Parameter | 6: Pickup From | 3 Scale | 1.0000E+000 Offset | 0.0000E+000 | Column Parameter −6 |
| Surf | 1 NSC Object | 25 Parameter | 7: Pickup From | 3 Scale | 1.0000E+000 Offset | 0.0000E+000 | Column Parameter −6 |
| Surf | 1 NSC Object | 25 Parameter | 8: Pickup From | 3 Scale | 1.0000E+000 Offset | 0.0000E+000 | Column Parameter −6 |
| Surf | 1 NSC Object | 26 Position | Y: Pickup From | 4 Scale | 1.0000E+000 Offset | 0.0000E+000 | Column Parameter −6 |
| Surf | 1 NSC Object | 26 Parameter | 1: Pickup From | 3 Scale | 1.0000E+000 Offset | 0.0000E+000 | Column Parameter −6 |
| Surf | 1 NSC Object | 26 Parameter | 2: Pickup From | 3 Scale | 1.0000E+000 Offset | 0.0000E+000 | Column Parameter −6 |
| Surf | 1 NSC Object | 26 Parameter | 3: Pickup From | 3 Scale | 1.0000E+000 Offset | 0.0000E+000 | Column Parameter −6 |
| Surf | 1 NSC Object | 26 Parameter | 5: Pickup From | 23 Scale | 1.0000E+000 Offset | 0.0000E+000 | Column Parameter −6 |
| Surf | 1 NSC Object | 26 Parameter | 6: Pickup From | 3 Scale | 1.0000E+000 Offset | 0.0000E+000 | Column Parameter −6 |
| Surf | 1 NSC Object | 26 Parameter | 7: Pickup From | 3 Scale | 1.0000E+000 Offset | 0.0000E+000 | Column Parameter −6 |
| Surf | 1 NSC Object | 26 Parameter | 8: Pickup From | 3 Scale | 1.0000E+000 Offset | 0.0000E+000 | Column Parameter −6 |
| Surf | 1 NSC Object | 27 Position | Y: Pickup From | 4 Scale | 1.0000E+000 Offset | 0.0000E+000 | Column Parameter −6 |
| Surf | 1 NSC Object | 27 Parameter | 2: Pickup From | 3 Scale | 1.0000E+000 Offset | 0.0000E+000 | Column Parameter −6 |
| Surf | 1 NSC Object | 27 Parameter | 3: Pickup From | 3 Scale | 1.0000E+000 Offset | 0.0000E+000 | Column Parameter −6 |
| Surf | 1 NSC Object | 27 Parameter | 5: Pickup From | 23 Scale | 1.0000E+000 Offset | 0.0000E+000 | Column Parameter −6 |
| Surf | 1 NSC Object | 27 Parameter | 6: Pickup From | 3 Scale | 1.0000E+000 Offset | 0.0000E+000 | Column Parameter −6 |
| Surf | 1 NSC Object | 27 Parameter | 7: Pickup From | 3 Scale | 1.0000E+000 Offset | 0.0000E+000 | Column Parameter −6 |
| Surf | 1 NSC Object | 27 Parameter | 8: Pickup From | 3 Scale | 1.0000E+000 Offset | 0.0000E+000 | Column Parameter −6 |
| Surf | 1 NSC Object | 28 Position | Y: Pickup From | 4 Scale | −1.0000E+000 Offset | 0.0000E+000 | Column Parameter −6 |
| Surf | 1 NSC Object | 28 Parameter | 1: Pickup From | 3 Scale | 1.0000E+000 Offset | 0.0000E+000 | Column Parameter −6 |
| Surf | 1 NSC Object | 28 Parameter | 2: Pickup From | 3 Scale | 1.0000E+000 Offset | 0.0000E+000 | Column Parameter −6 |
| Surf | 1 NSC Object | 28 Parameter | 3: Pickup From | 3 Scale | 1.0000E+000 Offset | 0.0000E+000 | Column Parameter −6 |
| Surf | 1 NSC Object | 28 Parameter | 5: Pickup From | 23 Scale | 1.0000E+000 Offset | 0.0000E+000 | Column Parameter −6 |
| Surf | 1 NSC Object | 28 Parameter | 6: Pickup From | 3 Scale | 1.0000E+000 Offset | 0.0000E+000 | Column Parameter −6 |
| Surf | 1 NSC Object | 28 Parameter | 7: Pickup From | 3 Scale | 1.0000E+000 Offset | 0.0000E+000 | Column Parameter −6 |
| Surf | 1 NSC Object | 28 Parameter | 8: Pickup From | 3 Scale | 1.0000E+000 Offset | 0.0000E+000 | Column Parameter −6 |
| Surf | 1 NSC Object | 29 Position | Y: Pickup From | 4 Scale | −1.0000E+000 Offset | 0.0000E+000 | Column Parameter −6 |
| Surf | 1 NSC Object | 29 Parameter | 1: Pickup From | 3 Scale | 1.0000E+000 Offset | 0.0000E+000 | Column Parameter −6 |
| Surf | 1 NSC Object | 29 Parameter | 2: Pickup From | 3 Scale | 1.0000E+000 Offset | 0.0000E+000 | Column Parameter −6 |
| Surf | 1 NSC Object | 29 Parameter | 3: Pickup From | 3 Scale | 1.0000E+000 Offset | 0.0000E+000 | Column Parameter −6 |
| Surf | 1 NSC Object | 29 Parameter | 5: Pickup From | 23 Scale | 1.0000E+000 Offset | 0.0000E+000 | Column Parameter −6 |
| Surf | 1 NSC Object | 29 Parameter | 6: Pickup From | 3 Scale | 1.0000E+000 Offset | 0.0000E+000 | Column Parameter −6 |
| Surf | 1 NSC Object | 29 Parameter | 7: Pickup From | 3 Scale | 1.0000E+000 Offset | 0.0000E+000 | Column Parameter −6 |
| Surf | 1 NSC Object | 29 Parameter | 8: Pickup From | 3 Scale | 1.0000E+000 Offset | 0.0000E+000 | Column Parameter −6 |
| Surf | 1 NSC Object | 30 Position | Y: Pickup From | 4 Scale | −1.0000E+000 Offset | 0.0000E+000 | Column Parameter −6 |
| Surf | 1 NSC Object | 30 Parameter | 1: Pickup From | 3 Scale | 1.0000E+000 Offset | 0.0000E+000 | Column Parameter −6 |
| Surf | 1 NSC Object | 30 Parameter | 2: Pickup From | 3 Scale | 1.0000E+000 Offset | 0.0000E+000 | Column Parameter −6 |
| Surf | 1 NSC Object | 30 Parameter | 3: Pickup From | 3 Scale | 1.0000E+000 Offset | 0.0000E+000 | Column Parameter −6 |
| Surf | 1 NSC Object | 30 Parameter | 5: Pickup From | 23 Scale | 1.0000E+000 Offset | 0.0000E+000 | Column Parameter −6 |
| Surf | 1 NSC Object | 30 Parameter | 6: Pickup From | 3 Scale | 1.0000E+000 Offset | 0.0000E+000 | Column Parameter −6 |
| Surf | 1 NSC Object | 30 Parameter | 7: Pickup From | 3 Scale | 1.0000E+000 Offset | 0.0000E+000 | Column Parameter −6 |
| Surf | 1 NSC Object | 30 Parameter | 8: Pickup From | 3 Scale | 1.0000E+000 Offset | 0.0000E+000 | Column Parameter −6 |
| Surf | 1 NSC Object | 31 Position | Y: Pickup From | 4 Scale | −1.0000E+000 Offset | 0.0000E+000 | Column Parameter −6 |
| Surf | 1 NSC Object | 31 Parameter | 1: Pickup From | 3 Scale | 1.0000E+000 Offset | 0.0000E+000 | Column Parameter −6 |
| Surf | 1 NSC Object | 31 Parameter | 2: Pickup From | 3 Scale | 1.0000E+000 Offset | 0.0000E+000 | Column Parameter −6 |
| Surf | 1 NSC Object | 31 Parameter | 3: Pickup From | 3 Scale | 1.0000E+000 Offset | 0.0000E+000 | Column Parameter −6 |
| Surf | 1 NSC Object | 31 Parameter | 5: Pickup From | 23 Scale | 1.0000E+000 Offset | 0.0000E+000 | Column Parameter −6 |
| Surf | 1 NSC Object | 31 Parameter | 6: Pickup From | 3 Scale | 1.0000E+000 Offset | 0.0000E+000 | Column Parameter −6 |
| Surf | 1 NSC Object | 31 Parameter | 7: Pickup From | 3 Scale | 1.0000E+000 Offset | 0.0000E+000 | Column Parameter −6 |
| Surf | 1 NSC Object | 31 Parameter | 8: Pickup From | 3 Scale | 1.0000E+000 Offset | 0.0000E+000 | Column Parameter −6 |
| Surf | 1 NSC Object | 33 Position | X: Pickup From | 2 Scale | 6.0000E+000 Offset | 0.0000E+000 | Column Parameter −6 |
| Surf | 1 NSC Object | 33 Parameter | 1: Pickup From | 3 Scale | 1.0000E+000 Offset | 0.0000E+000 | Column Parameter −6 |
| Surf | 1 NSC Object | 33 Parameter | 2: Pickup From | 3 Scale | 1.0000E+000 Offset | 0.0000E+000 | Column Parameter −6 |
| Surf | 1 NSC Object | 33 Parameter | 3: Pickup From | 3 Scale | 1.0000E+000 Offset | 0.0000E+000 | Column Parameter −6 |
| Surf | 1 NSC Object | 33 Parameter | 6: Pickup From | 3 Scale | 1.0000E+000 Offset | 0.0000E+000 | Column Parameter −6 |
| Surf | 1 NSC Object | 33 Parameter | 7: Pickup From | 3 Scale | 1.0000E+000 Offset | 0.0000E+000 | Column Parameter −6 |
| Surf | 1 NSC Object | 33 Parameter | 8: Pickup From | 3 Scale | 1.0000E+000 Offset | 0.0000E+000 | Column Parameter −6 |
| Surf | 1 NSC Object | 34 Position | Y: Pickup From | 4 Scale | 1.0000E+000 Offset | 0.0000E+000 | Column Parameter −6 |
| Surf | 1 NSC Object | 34 Parameter | 1: Pickup From | 3 Scale | 1.0000E+000 Offset | 0.0000E+000 | Column Parameter −6 |
| Surf | 1 NSC Object | 34 Parameter | 2: Pickup From | 3 Scale | 1.0000E+000 Offset | 0.0000E+000 | Column Parameter −6 |
| Surf | 1 NSC Object | 34 Parameter | 3: Pickup From | 3 Scale | 1.0000E+000 Offset | 0.0000E+000 | Column Parameter −6 |
| Surf | 1 NSC Object | 34 Parameter | 5: Pickup From | 33 Scale | 1.0000E+000 Offset | 0.0000E+000 | Column Parameter −6 |
| Surf | 1 NSC Object | 34 Parameter | 6: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 34 Parameter | 7: Pickup From | 3 Scale | 1.0000E+000 Offset | 0.0000E+000 | Column Parameter −6 |
| Surf | 1 NSC Object | 34 Parameter | 8: Pickup From | 3 Scale | 1.0000E+000 Offset | 0.0000E+000 | Column Parameter −6 |
| Surf | 1 NSC Object | 35 Position | Y: Pickup From | 4 Scale | 1.0000E+000 Offset | 0.0000E+000 | Column Parameter −6 |
| Surf | 1 NSC Object | 35 Parameter | 1: Pickup From | 3 Scale | 1.0000E+000 Offset | 0.0000E+000 | Column Parameter −6 |
| Surf | 1 NSC Object | 35 Parameter | 2: Pickup From | 3 Scale | 1.0000E+000 Offset | 0.0000E+000 | Column Parameter −6 |
| Surf | 1 NSC Object | 35 Parameter | 3: Pickup From | 3 Scale | 1.0000E+000 Offset | 0.0000E+000 | Column Parameter −6 |
| Surf | 1 NSC Object | 35 Parameter | 5: Pickup From | 33 Scale | 1.0000E+000 Offset | 0.0000E+000 | Column Parameter −6 |
| Surf | 1 NSC Object | 35 Parameter | 6: Pickup From | 3 Scale | 1.0000E+000 Offset | 0.0000E+000 | Column Parameter −6 |
| Surf | 1 NSC Object | 35 Parameter | 7: Pickup From | 3 Scale | 1.0000E+000 Offset | 0.0000E+000 | Column Parameter −6 |
| Surf | 1 NSC Object | 35 Parameter | 8: Pickup From | 3 Scale | 1.0000E+000 Offset | 0.0000E+000 | Column Parameter −6 |
| Surf | 1 NSC Object | 36 Position | Y: Pickup From | 4 Scale | 1.0000E+000 Offset | 0.0000E+000 | Column Parameter −6 |
| Surf | 1 NSC Object | 36 Parameter | 2: Pickup From | 3 Scale | 1.0000E+000 Offset | 0.0000E+000 | Column Parameter −6 |
| Surf | 1 NSC Object | 36 Parameter | 3: Pickup From | 3 Scale | 1.0000E+000 Offset | 0.0000E+000 | Column Parameter −6 |
| Surf | 1 NSC Object | 36 Parameter | 5: Pickup From | 33 Scale | 1.0000E+000 Offset | 0.0000E+000 | Column Parameter −6 |
| Surf | 1 NSC Object | 36 Parameter | 6: Pickup From | 3 Scale | 1.0000E+000 Offset | 0.0000E+000 | Column Parameter −6 |
| Surf | 1 NSC Object | 36 Parameter | 7: Pickup From | 3 Scale | 1.0000E+000 Offset | 0.0000E+000 | Column Parameter −6 |
| Surf | 1 NSC Object | 36 Parameter | 8: Pickup From | 3 Scale | 1.0000E+000 Offset | 0.0000E+000 | Column Parameter −6 |
| Surf | 1 NSC Object | 37 Position | Y: Pickup From | 4 Scale | 1.0000E+000 Offset | 0.0000E+000 | Column Parameter −6 |
| Surf | 1 NSC Object | 38 Position | Y: Pickup From | 4 Scale | −1.0000E+000 Offset | 0.0000E+000 | Column Parameter −6 |
| Surf | 1 NSC Object | 38 Parameter | 1: Pickup From | 3 Scale | 1.0000E+000 Offset | 0.0000E+000 | Column Parameter −6 |
| Surf | 1 NSC Object | 38 Parameter | 2: Pickup From | 3 Scale | 1.0000E+000 Offset | 0.0000E+000 | Column Parameter −6 |
| Surf | 1 NSC Object | 38 Parameter | 3: Pickup From | 3 Scale | 1.0000E+000 Offset | 0.0000E+000 | Column Parameter −6 |
| Surf | 1 NSC Object | 38 Parameter | 5: Pickup From | 33 Scale | 1.0000E+000 Offset | 0.0000E+000 | Column Parameter −6 |
| Surf | 1 NSC Object | 38 Parameter | 6: Pickup From | 3 Scale | 1.0000E+000 Offset | 0.0000E+000 | Column Parameter −6 |
| Surf | 1 NSC Object | 38 Parameter | 7: Pickup From | 3 Scale | 1.0000E+000 Offset | 0.0000E+000 | Column Parameter −6 |
| Surf | 1 NSC Object | 38 Parameter | 8: Pickup From | 3 Scale | 1.0000E+000 Offset | 0.0000E+000 | Column Parameter −6 |
| Surf | 1 NSC Object | 39 Position | Y: Pickup From | 4 Scale | −1.0000E+000 Offset | 0.0000E+000 | Column Parameter −6 |
| Surf | 1 NSC Object | 39 Parameter | 1: Pickup From | 3 Scale | 1.0000E+000 Offset | 0.0000E+000 | Column Parameter −6 |
| Surf | 1 NSC Object | 39 Parameter | 2: Pickup From | 3 Scale | 1.0000E+000 Offset | 0.0000E+000 | Column Parameter −6 |
| Surf | 1 NSC Object | 39 Parameter | 3: Pickup From | 3 Scale | 1.0000E+000 Offset | 0.0000E+000 | Column Parameter −6 |
| Surf | 1 NSC Object | 39 Parameter | 5: Pickup From | 33 Scale | 1.0000E+000 Offset | 0.0000E+000 | Column Parameter −6 |
| Surf | 1 NSC Object | 39 Parameter | 6: Pickup From | 3 Scale | 1.0000E+000 Offset | 0.0000E+000 | Column Parameter −6 |
| Surf | 1 NSC Object | 39 Parameter | 7: Pickup From | 3 Scale | 1.0000E+000 Offset | 0.0000E+000 | Column Parameter −6 |
| Surf | 1 NSC Object | 39 Parameter | 8: Pickup From | 3 Scale | 1.0000E+000 Offset | 0.0000E+000 | Column Parameter −6 |
| Surf | 1 NSC Object | 40 Position | Y: Pickup From | 4 Scale | −1.0000E+000 Offset | 0.0000E+000 | Column Parameter −6 |
| Surf | 1 NSC Object | 40 Parameter | 1: Pickup From | 3 Scale | 1.0000E+000 Offset | 0.0000E+000 | Column Parameter −6 |
| Surf | 1 NSC Object | 40 Parameter | 2: Pickup From | 3 Scale | 1.0000E+000 Offset | 0.0000E+000 | Column Parameter −6 |
| Surf | 1 NSC Object | 40 Parameter | 3: Pickup From | 3 Scale | 1.0000E+000 Offset | 0.0000E+000 | Column Parameter −6 |
| Surf | 1 NSC Object | 40 Parameter | 5: Pickup From | 33 Scale | 1.0000E+000 Offset | 0.0000E+000 | Column Parameter −6 |
| Surf | 1 NSC Object | 40 Parameter | 6: Pickup From | 3 Scale | 1.0000E+000 Offset | 0.0000E+000 | Column Parameter −6 |
| Surf | 1 NSC Object | 40 Parameter | 7: Pickup From | 3 Scale | 1.0000E+000 Offset | 0.0000E+000 | Column Parameter −6 |
| Surf | 1 NSC Object | 40 Parameter | 8: Pickup From | 3 Scale | 1.0000E+000 Offset | 0.0000E+000 | Column Parameter −6 |
| Surf | 1 NSC Object | 41 Position | Y: Pickup From | 4 Scale | −1.0000E+000 Offset | 0.0000E+000 | Column Parameter −6 |
| Surf | 1 NSC Object | 43 Position | X: Pickup From | 2 Scale | 8.0000E+000 Offset | 0.0000E+000 | Column Parameter −6 |
| Surf | 1 NSC Object | 43 Parameter | 1: Pickup From | 3 Scale | 1.0000E+000 Offset | 0.0000E+000 | Column Parameter −6 |
| Surf | 1 NSC Object | 43 Parameter | 2: Pickup From | 3 Scale | 1.0000E+000 Offset | 0.0000E+000 | Column Parameter −6 |
| Surf | 1 NSC Object | 43 Parameter | 3: Pickup From | 3 Scale | 1.0000E+000 Offset | 0.0000E+000 | Column Parameter −6 |
| Surf | 1 NSC Object | 43 Parameter | 6: Pickup From | 3 Scale | 1.0000E+000 Offset | 0.0000E+000 | Column Parameter −6 |
| Surf | 1 NSC Object | 43 Parameter | 7: Pickup From | 3 Scale | 1.0000E+000 Offset | 0.0000E+000 | Column Parameter −6 |
| Surf | 1 NSC Object | 43 Parameter | 8: Pickup From | 3 Scale | 1.0000E+000 Offset | 0.0000E+000 | Column Parameter −6 |
| Surf | 1 NSC Object | 44 Position | Y: Pickup From | 4 Scale | 1.0000E+000 Offset | 0.0000E+000 | Column Parameter −6 |
| Surf | 1 NSC Object | 44 Parameter | 1: Pickup From | 3 Scale | 1.0000E+000 Offset | 0.0000E+000 | Column Parameter −6 |
| Surf | 1 NSC Object | 44 Parameter | 2: Pickup From | 3 Scale | 1.0000E+000 Offset | 0.0000E+000 | Column Parameter −6 |
| Surf | 1 NSC Object | 44 Parameter | 3: Pickup From | 3 Scale | 1.0000E+000 Offset | 0.0000E+000 | Column Parameter −6 |
| Surf | 1 NSC Object | 44 Parameter | 5: Pickup From | 43 Scale | 1.0000E+000 Offset | 0.0000E+000 | Column Parameter −6 |
| Surf | 1 NSC Object | 44 Parameter | 6: Pickup From | 3 Scale | 1.0000E+000 Offset | 0.0000E+000 | Column Parameter −6 |
| Surf | 1 NSC Object | 44 Parameter | 7: Pickup From | 3 Scale | 1.0000E+000 Offset | 0.0000E+000 | Column Parameter −6 |
| Surf | 1 NSC Object | 44 Parameter | 8: Pickup From | 3 Scale | 1.0000E+000 Offset | 0.0000E+000 | Column Parameter −6 |
| Surf | 1 NSC Object | 45 Position | Y: Pickup From | 4 Scale | 1.0000E+000 Offset | 0.0000E+000 | Column Parameter −6 |
| Surf | 1 NSC Object | 45 Parameter | 1: Pickup From | 3 Scale | 1.0000E+000 Offset | 0.0000E+000 | Column Parameter −6 |
| Surf | 1 NSC Object | 45 Parameter | 2: Pickup From | 3 Scale | 1.0000E+000 Offset | 0.0000E+000 | Column Parameter −6 |
| Surf | 1 NSC Object | 45 Parameter | 3: Pickup From | 3 Scale | 1.0000E+000 Offset | 0.0000E+000 | Column Parameter −6 |
| Surf | 1 NSC Object | 45 Parameter | 5: Pickup From | 43 Scale | 1.0000E+000 Offset | 0.0000E+000 | Column Parameter −6 |
| Surf | 1 NSC Object | 45 Parameter | 6: Pickup From | 3 Scale | 1.0000E+000 Offset | 0.0000E+000 | Column Parameter −6 |
| Surf | 1 NSC Object | 45 Parameter | 7: Pickup From | 3 Scale | 1.0000E+000 Offset | 0.0000E+000 | Column Parameter −6 |
| Surf | 1 NSC Object | 45 Parameter | 8: Pickup From | 3 Scale | 1.0000E+000 Offset | 0.0000E+000 | Column Parameter −6 |
| Surf | 1 NSC Object | 46 Position | Y: Pickup From | 4 Scale | 1.0000E+000 Offset | 0.0000E+000 | Column Parameter −6 |
| Surf | 1 NSC Object | 47 Position | Y: Pickup From | 4 Scale | 1.0000E+000 Offset | 0.0000E+000 | Column Parameter −6 |
| Surf | 1 NSC Object | 48 Position | Y: Pickup From | 4 Scale | −1.0000E+000 Offset | 0.0000E+000 | Column Parameter −6 |
| Surf | 1 NSC Object | 48 Parameter | 1: Pickup From | 3 Scale | 1.0000E+000 Offset | 0.0000E+000 | Column Parameter −6 |
| Surf | 1 NSC Object | 48 Parameter | 2: Pickup From | 3 Scale | 1.0000E+000 Offset | 0.0000E+000 | Column Parameter −6 |
| Surf | 1 NSC Object | 48 Parameter | 3: Pickup From | 3 Scale | 1.0000E+000 Offset | 0.0000E+000 | Column Parameter −6 |
| Surf | 1 NSC Object | 48 Parameter | 5: Pickup From | 43 Scale | 1.0000E+000 Offset | 0.0000E+000 | Column Parameter −6 |
| Surf | 1 NSC Object | 48 Parameter | 6: Pickup From | 3 Scale | 1.0000E+000 Offset | 0.0000E+000 | Column Parameter −6 |
| Surf | 1 NSC Object | 48 Parameter | 7: Pickup From | 3 Scale | 1.0000E+000 Offset | 0.0000E+000 | Column Parameter −6 |
| Surf | 1 NSC Object | 48 Parameter | 8: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 49 Position | Y: Pickup From | 4 Scale | −1.0000E+000 Offset | 0.0000E+000 | Column Parameter −6 |
| Surf | 1 NSC Object | 49 Parameter | 1: Pickup From | 3 Scale | 1.0000E+000 Offset | 0.0000E+000 | Column Parameter −6 |
| Surf | 1 NSC Object | 49 Parameter | 2: Pickup From | 3 Scale | 1.0000E+000 Offset | 0.0000E+000 | Column Parameter −6 |
| Surf | 1 NSC Object | 49 Parameter | 3: Pickup From | 3 Scale | 1.0000E+000 Offset | 0.0000E+000 | Column Parameter −6 |
| Surf | 1 NSC Object | 49 Parameter | 5: Pickup From | 43 Scale | 1.0000E+000 Offset | 0.0000E+000 | Column Parameter −6 |
| Surf | 1 NSC Object | 49 Parameter | 6: Pickup From | 3 Scale | 1.0000E+000 Offset | 0.0000E+000 | Column Parameter −6 |
| Surf | 1 NSC Object | 49 Parameter | 7: Pickup From | 3 Scale | 1.0000E+000 Offset | 0.0000E+000 | Column Parameter −6 |
| Surf | 1 NSC Object | 49 Parameter | 8: Pickup From | 3 Scale | 1.0000E+000 Offset | 0.0000E+000 | Column Parameter −6 |
| Surf | 1 NSC Object | 50 Position | Y: Pickup From | 4 Scale | −1.0000E+000 Offset | 0.0000E+000 | Column Parameter −6 |
| Surf | 1 NSC Object | 51 Position | Y: Pickup From | 4 Scale | −1.0000E+000 Offset | 0.0000E+000 | Column Parameter −6 |
| Surf | 1 NSC Object | 53 Position | X: Pickup From | 2 Scale | −2.0000E+000 Offset | 0.0000E+000 | Column Parameter −6 |
| Surf | 1 NSC Object | 53 Parameter | 1: Pickup From | 3 Scale | 1.0000E+000 Offset | 0.0000E+000 | Column Parameter −6 |
| Surf | 1 NSC Object | 53 Parameter | 2: Pickup From | 3 Scale | 1.0000E+000 Offset | 0.0000E+000 | Column Parameter −6 |
| Surf | 1 NSC Object | 53 Parameter | 3: Pickup From | 3 Scale | 1.0000E+000 Offset | 0.0000E+000 | Column Parameter −6 |
| Surf | 1 NSC Object | 53 Parameter | 6: Pickup From | 3 Scale | 1.0000E+000 Offset | 0.0000E+000 | Column Parameter −6 |
| Surf | 1 NSC Object | 53 Parameter | 7: Pickup From | 3 Scale | 1.0000E+000 Offset | 0.0000E+000 | Column Parameter −6 |
| Surf | 1 NSC Object | 53 Parameter | 8: Pickup From | 3 Scale | 1.0000E+000 Offset | 0.0000E+000 | Column Parameter −6 |
| Surf | 1 NSC Object | 54 Position | Y: Pickup From | 4 Scale | 1.0000E+000 Offset | 0.0000E+000 | Column Parameter −6 |
| Surf | 1 NSC Object | 54 Parameter | 1: Pickup From | 3 Scale | 1.0000E+000 Offset | 0.0000E+000 | Column Parameter −6 |
| Surf | 1 NSC Object | 54 Parameter | 2: Pickup From | 3 Scale | 1.0000E+000 Offset | 0.0000E+000 | Column Parameter −6 |
| Surf | 1 NSC Object | 54 Parameter | 3: Pickup From | 3 Scale | 1.0000E+000 Offset | 0.0000E+000 | Column Parameter −6 |
| Surf | 1 NSC Object | 54 Parameter | 5: Pickup From | 53 Scale | 1.0000E+000 Offset | 0.0000E+000 | Column Parameter −6 |
| Surf | 1 NSC Object | 54 Parameter | 6: Pickup From | 3 Scale | 1.0000E+000 Offset | 0.0000E+000 | Column Parameter −6 |
| Surf | 1 NSC Object | 54 Parameter | 7: Pickup From | 3 Scale | 1.0000E+000 Offset | 0.0000E+000 | Column Parameter −6 |
| Surf | 1 NSC Object | 54 Parameter | 8: Pickup From | 3 Scale | 1.0000E+000 Offset | 0.0000E+000 | Column Parameter −6 |
| Surf | 1 NSC Object | 55 Position | Y: Pickup From | 4 Scale | 1.0000E+000 Offset | 0.0000E+000 | Column Parameter −6 |
| Surf | 1 NSC Object | 55 Parameter | 2: Pickup From | 3 Scale | 1.0000E+000 Offset | 0.0000E+000 | Column Parameter −6 |
| Surf | 1 NSC Object | 55 Parameter | 3: Pickup From | 3 Scale | 1.0000E+000 Offset | 0.0000E+000 | Column Parameter −6 |
| Surf | 1 NSC Object | 55 Parameter | 5: Pickup From | 53 Scale | 1.0000E+000 Offset | 0.0000E+000 | Column Parameter −6 |
| Surf | 1 NSC Object | 55 Parameter | 6: Pickup From | 3 Scale | 1.0000E+000 Offset | 0.0000E+000 | Column Parameter −6 |
| Surf | 1 NSC Object | 55 Parameter | 7: Pickup From | 3 Scale | 1.0000E+000 Offset | 0.0000E+000 | Column Parameter −6 |
| Surf | 1 NSC Object | 55 Parameter | 8: Pickup From | 3 Scale | 1.0000E+000 Offset | 0.0000E+000 | Column Parameter −6 |
| Surf | 1 NSC Object | 56 Position | Y: Pickup From | 4 Scale | 1.0000E+000 Offset | 0.0000E+000 | Column Parameter −6 |
| Surf | 1 NSC Object | 56 Parameter | 1: Pickup From | 3 Scale | 1.0000E+000 Offset | 0.0000E+000 | Column Parameter −6 |
| Surf | 1 NSC Object | 56 Parameter | 2: Pickup From | 3 Scale | 1.0000E+000 Offset | 0.0000E+000 | Column Parameter −6 |
| Surf | 1 NSC Object | 56 Parameter | 3: Pickup From | 3 Scale | 1.0000E+000 Offset | 0.0000E+000 | Column Parameter −6 |
| Surf | 1 NSC Object | 56 Parameter | 5: Pickup From | 53 Scale | 1.0000E+000 Offset | 0.0000E+000 | Column Parameter −6 |
| Surf | 1 NSC Object | 56 Parameter | 6: Pickup From | 3 Scale | 1.0000E+000 Offset | 0.0000E+000 | Column Parameter −6 |
| Surf | 1 NSC Object | 56 Parameter | 7: Pickup From | 3 Scale | 1.0000E+000 Offset | 0.0000E+000 | Column Parameter −6 |
| Surf | 1 NSC Object | 56 Parameter | 8: Pickup From | 3 Scale | 1.0000E+000 Offset | 0.0000E+000 | Column Parameter −6 |
| Surf | 1 NSC Object | 57 Position | Y: Pickup From | 4 Scale | 1.0000E+000 Offset | 0.0000E+000 | Column Parameter −6 |
| Surf | 1 NSC Object | 57 Parameter | 1: Pickup From | 3 Scale | 1.0000E+000 Offset | 0.0000E+000 | Column Parameter −6 |
| Surf | 1 NSC Object | 57 Parameter | 2: Pickup From | 3 Scale | 1.0000E+000 Offset | 0.0000E+000 | Column Parameter −6 |
| Surf | 1 NSC Object | 57 Parameter | 3: Pickup From | 3 Scale | 1.0000E+000 Offset | 0.0000E+000 | Column Parameter −6 |
| Surf | 1 NSC Object | 57 Parameter | 5: Pickup From | 53 Scale | 1.0000E+000 Offset | 0.0000E+000 | Column Parameter −6 |
| Surf | 1 NSC Object | 57 Parameter | 6: Pickup From | 3 Scale | 1.0000E+000 Offset | 0.0000E+000 | Column Parameter −6 |
| Surf | 1 NSC Object | 57 Parameter | 7: Pickup From | 3 Scale | 1.0000E+000 Offset | 0.0000E+000 | Column Parameter −6 |
| Surf | 1 NSC Object | 57 Parameter | 8: Pickup From | 3 Scale | 1.0000E+000 Offset | 0.0000E+000 | Column Parameter −6 |
| Surf | 1 NSC Object | 58 Position | Y: Pickup From | 4 Scale | −1.0000E+000 Offset | 0.0000E+000 | Column Parameter −6 |
| Surf | 1 NSC Object | 58 Parameter | 1: Pickup From | 3 Scale | 1.0000E+000 Offset | 0.0000E+000 | Column Parameter −6 |
| Surf | 1 NSC Object | 58 Parameter | 2: Pickup From | 3 Scale | 1.0000E+000 Offset | 0.0000E+000 | Column Parameter −6 |
| Surf | 1 NSC Object | 58 Parameter | 3: Pickup From | 3 Scale | 1.0000E+000 Offset | 0.0000E+000 | Column Parameter −6 |
| Surf | 1 NSC Object | 58 Parameter | 5: Pickup From | 53 Scale | 1.0000E+000 Offset | 0.0000E+000 | Column Parameter −6 |
| Surf | 1 NSC Object | 58 Parameter | 6: Pickup From | 3 Scale | 1.0000E+000 Offset | 0.0000E+000 | Column Parameter −6 |
| Surf | 1 NSC Object | 58 Parameter | 7: Pickup From | 3 Scale | 1.0000E+000 Offset | 0.0000E+000 | Column Parameter −6 |
| Surf | 1 NSC Object | 58 Parameter | 8: Pickup From | 3 Scale | 1.0000E+000 Offset | 0.0000E+000 | Column Parameter −6 |
| Surf | 1 NSC Object | 59 Position | Y: Pickup From | 4 Scale | −1.0000E+000 Offset | 0.0000E+000 | Column Parameter −6 |
| Surf | 1 NSC Object | 59 Parameter | 1: Pickup From | 3 Scale | 1.0000E+000 Offset | 0.0000E+000 | Column Parameter −6 |
| Surf | 1 NSC Object | 59 Parameter | 2: Pickup From | 3 Scale | 1.0000E+000 Offset | 0.0000E+000 | Column Parameter −6 |
| Surf | 1 NSC Object | 59 Parameter | 3: Pickup From | 3 Scale | 1.0000E+000 Offset | 0.0000E+000 | Column Parameter −6 |
| Surf | 1 NSC Object | 59 Parameter | 5: Pickup From | 53 Scale | 1.0000E+000 Offset | 0.0000E+000 | Column Parameter −6 |
| Surf | 1 NSC Object | 59 Parameter | 6: Pickup From | 3 Scale | 1.0000E+000 Offset | 0.0000E+000 | Column Parameter −6 |
| Surf | 1 NSC Object | 59 Parameter | 7: Pickup From | 3 Scale | 1.0000E+000 Offset | 0.0000E+000 | Column Parameter −6 |
| Surf | 1 NSC Object | 59 Parameter | 8: Pickup From | 3 Scale | 1.0000E+000 Offset | 0.0000E+000 | Column Parameter −6 |
| Surf | 1 NSC Object | 60 Position | Y: Pickup From | 4 Scale | −1.0000E+000 Offset | 0.0000E+000 | Column Parameter −6 |
| Surf | 1 NSC Object | 60 Parameter | 1: Pickup From | 3 Scale | 1.0000E+000 Offset | 0.0000E+000 | Column Parameter −6 |
| Surf | 1 NSC Object | 60 Parameter | 2: Pickup From | 3 Scale | 1.0000E+000 Offset | 0.0000E+000 | Column Parameter −6 |
| Surf | 1 NSC Object | 60 Parameter | 3: Pickup From | 3 Scale | 1.0000E+000 Offset | 0.0000E+000 | Column Parameter −6 |
| Surf | 1 NSC Object | 60 Parameter | 5: Pickup From | 53 Scale | 1.0000E+000 Offset | 0.0000E+000 | Column Parameter −6 |
| Surf | 1 NSC Object | 60 Parameter | 6: Pickup From | 3 Scale | 1.0000E+000 Offset | 0.0000E+000 | Column Parameter −6 |
| Surf | 1 NSC Object | 60 Parameter | 7: Pickup From | 3 Scale | 1.0000E+000 Offset | 0.0000E+000 | Column Parameter −6 |
| Surf | 1 NSC Object | 60 Parameter | 8: Pickup From | 3 Scale | 1.0000E+000 Offset | 0.0000E+000 | Column Parameter −6 |
| Surf | 1 NSC Object | 61 Position | Y: Pickup From | 4 Scale | −1.0000E+000 Offset | 0.0000E+000 | Column Parameter −6 |
| Surf | 1 NSC Object | 61 Parameter | 1: Pickup From | 3 Scale | 1.0000E+000 Offset | 0.0000E+000 | Column Parameter −6 |
| Surf | 1 NSC Object | 61 Parameter | 2: Pickup From | 3 Scale | 1.0000E+000 Offset | 0.0000E+000 | Column Parameter −6 |
| Surf | 1 NSC Object | 61 Parameter | 3: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 61 Parameter | 5: Pickup From | 53 Scale | 1.0000E+000 Offset | 0.0000E+000 | Column Parameter −6 |
| Surf | 1 NSC Object | 61 Parameter | 6: Pickup From | 3 Scale | 1.0000E+000 Offset | 0.0000E+000 | Column Parameter −6 |
| Surf | 1 NSC Object | 61 Parameter | 7: Pickup From | 3 Scale | 1.0000E+000 Offset | 0.0000E+000 | Column Parameter −6 |
| Surf | 1 NSC Object | 61 Parameter | 8: Pickup From | 3 Scale | 1.0000E+000 Offset | 0.0000E+000 | Column Parameter −6 |
| Surf | 1 NSC Object | 63 Position | X: Pickup From | 2 Scale | −4.0000E+000 Offset | 0.0000E+000 | Column Parameter −6 |
| Surf | 1 NSC Object | 63 Parameter | 1: Pickup From | 3 Scale | 1.0000E+000 Offset | 0.0000E+000 | Column Parameter −6 |
| Surf | 1 NSC Object | 63 Parameter | 2: Pickup From | 3 Scale | 1.0000E+000 Offset | 0.0000E+000 | Column Parameter −6 |
| Surf | 1 NSC Object | 63 Parameter | 3: Pickup From | 3 Scale | 1.0000E+000 Offset | 0.0000E+000 | Column Parameter −6 |
| Surf | 1 NSC Object | 63 Parameter | 6: Pickup From | 3 Scale | 1.0000E+000 Offset | 0.0000E+000 | Column Parameter −6 |
| Surf | 1 NSC Object | 63 Parameter | 7: Pickup From | 3 Scale | 1.0000E+000 Offset | 0.0000E+000 | Column Parameter −6 |
| Surf | 1 NSC Object | 63 Parameter | 8: Pickup From | 3 Scale | 1.0000E+000 Offset | 0.0000E+000 | Column Parameter −6 |
| Surf | 1 NSC Object | 64 Position | Y: Pickup From | 4 Scale | 1.0000E+000 Offset | 0.0000E+000 | Column Parameter −6 |
| Surf | 1 NSC Object | 64 Parameter | 1: Pickup From | 3 Scale | 1.0000E+000 Offset | 0.0000E+000 | Column Parameter −6 |
| Surf | 1 NSC Object | 64 Parameter | 2: Pickup From | 3 Scale | 1.0000E+000 Offset | 0.0000E+000 | Column Parameter −6 |
| Surf | 1 NSC Object | 64 Parameter | 3: Pickup From | 3 Scale | 1.0000E+000 Offset | 0.0000E+000 | Column Parameter −6 |
| Surf | 1 NSC Object | 64 Parameter | 5: Pickup From | 63 Scale | 1.0000E+000 Offset | 0.0000E+000 | Column Parameter −6 |
| Surf | 1 NSC Object | 64 Parameter | 6: Pickup From | 3 Scale | 1.0000E+000 Offset | 0.0000E+000 | Column Parameter −6 |
| Surf | 1 NSC Object | 64 Parameter | 7: Pickup From | 3 Scale | 1.0000E+000 Offset | 0.0000E+000 | Column Parameter −6 |
| Surf | 1 NSC Object | 64 Parameter | 8: Pickup From | 3 Scale | 1.0000E+000 Offset | 0.0000E+000 | Column Parameter −6 |
| Surf | 1 NSC Object | 65 Position | Y: Pickup From | 4 Scale | 1.0000E+000 Offset | 0.0000E+000 | Column Parameter −6 |
| Surf | 1 NSC Object | 65 Parameter | 1: Pickup From | 3 Scale | 1.0000E+000 Offset | 0.0000E+000 | Column Parameter −6 |
| Surf | 1 NSC Object | 65 Parameter | 2: Pickup From | 3 Scale | 1.0000E+000 Offset | 0.0000E+000 | Column Parameter −6 |
| Surf | 1 NSC Object | 65 Parameter | 3: Pickup From | 3 Scale | 1.0000E+000 Offset | 0.0000E+000 | Column Parameter −6 |
| Surf | 1 NSC Object | 65 Parameter | 5: Pickup From | 63 Scale | 1.0000E+000 Offset | 0.0000E+000 | Column Parameter −6 |
| Surf | 1 NSC Object | 65 Parameter | 6: Pickup From | 3 Scale | 1.0000E+000 Offset | 0.0000E+000 | Column Parameter −6 |
| Surf | 1 NSC Object | 65 Parameter | 7: Pickup From | 3 Scale | 1.0000E+000 Offset | 0.0000E+000 | Column Parameter −6 |
| Surf | 1 NSC Object | 65 Parameter | 8: Pickup From | 3 Scale | 1.0000E+000 Offset | 0.0000E+000 | Column Parameter −6 |
| Surf | 1 NSC Object | 66 Position | Y: Pickup From | 4 Scale | 1.0000E+000 Offset | 0.0000E+000 | Column Parameter −6 |
| Surf | 1 NSC Object | 66 Parameter | 1: Pickup From | 3 Scale | 1.0000E+000 Offset | 0.0000E+000 | Column Parameter −6 |
| Surf | 1 NSC Object | 66 Parameter | 2: Pickup From | 3 Scale | 1.0000E+000 Offset | 0.0000E+000 | Column Parameter −6 |
| Surf | 1 NSC Object | 66 Parameter | 3: Pickup From | 3 Scale | 1.0000E+000 Offset | 0.0000E+000 | Column Parameter −6 |
| Surf | 1 NSC Object | 66 Parameter | 5: Pickup From | 63 Scale | 1.0000E+000 Offset | 0.0000E+000 | Column Parameter −6 |
| Surf | 1 NSC Object | 66 Parameter | 6: Pickup From | 3 Scale | 1.0000E+000 Offset | 0.0000E+000 | Column Parameter −6 |
| Surf | 1 NSC Object | 66 Parameter | 7: Pickup From | 3 Scale | 1.0000E+000 Offset | 0.0000E+000 | Column Parameter −6 |
| Surf | 1 NSC Object | 66 Parameter | 8: Pickup From | 3 Scale | 1.0000E+000 Offset | 0.0000E+000 | Column Parameter −6 |
| Surf | 1 NSC Object | 67 Position | Y: Pickup From | 4 Scale | 1.0000E+000 Offset | 0.0000E+000 | Column Parameter −6 |
| Surf | 1 NSC Object | 67 Parameter | 1: Pickup From | 3 Scale | 1.0000E+000 Offset | 0.0000E+000 | Column Parameter −6 |
| Surf | 1 NSC Object | 67 Parameter | 2: Pickup From | 3 Scale | 1.0000E+000 Offset | 0.0000E+000 | Column Parameter −6 |
| Surf | 1 NSC Object | 67 Parameter | 3: Pickup From | 3 Scale | 1.0000E+000 Offset | 0.0000E+000 | Column Parameter −6 |
| Surf | 1 NSC Object | 67 Parameter | 5: Pickup From | 63 Scale | 1.0000E+000 Offset | 0.0000E+000 | Column Parameter −6 |
| Surf | 1 NSC Object | 67 Parameter | 6: Pickup From | 3 Scale | 1.0000E+000 Offset | 0.0000E+000 | Column Parameter −6 |
| Surf | 1 NSC Object | 67 Parameter | 7: Pickup From | 3 Scale | 1.0000E+000 Offset | 0.0000E+000 | Column Parameter −6 |
| Surf | 1 NSC Object | 67 Parameter | 8: Pickup From | 3 Scale | 1.0000E+000 Offset | 0.0000E+000 | Column Parameter −6 |
| Surf | 1 NSC Object | 68 Position | Y: Pickup From | 4 Scale | −1.0000E+000 Offset | 0.0000E+000 | Column Parameter −6 |
| Surf | 1 NSC Object | 68 Parameter | 1: Pickup From | 3 Scale | 1.0000E+000 Offset | 0.0000E+000 | Column Parameter −6 |
| Surf | 1 NSC Object | 68 Parameter | 2: Pickup From | 3 Scale | 1.0000E+000 Offset | 0.0000E+000 | Column Parameter −6 |
| Surf | 1 NSC Object | 68 Parameter | 3: Pickup From | 3 Scale | 1.0000E+000 Offset | 0.0000E+000 | Column Parameter −6 |
| Surf | 1 NSC Object | 68 Parameter | 5: Pickup From | 63 Scale | 1.0000E+000 Offset | 0.0000E+000 | Column Parameter −6 |
| Surf | 1 NSC Object | 68 Parameter | 6: Pickup From | 3 Scale | 1.0000E+000 Offset | 0.0000E+000 | Column Parameter −6 |
| Surf | 1 NSC Object | 68 Parameter | 7: Pickup From | 3 Scale | 1.0000E+000 Offset | 0.0000E+000 | Column Parameter −6 |
| Surf | 1 NSC Object | 68 Parameter | 8: Pickup From | 3 Scale | 1.0000E+000 Offset | 0.0000E+000 | Column Parameter −6 |
| Surf | 1 NSC Object | 69 Position | Y: Pickup From | 4 Scale | −1.0000E+000 Offset | 0.0000E+000 | Column Parameter −6 |
| Surf | 1 NSC Object | 69 Parameter | 1: Pickup From | 3 Scale | 1.0000E+000 Offset | 0.0000E+000 | Column Parameter −6 |
| Surf | 1 NSC Object | 69 Parameter | 2: Pickup From | 3 Scale | 1.0000E+000 Offset | 0.0000E+000 | Column Parameter −6 |
| Surf | 1 NSC Object | 69 Parameter | 3: Pickup From | 3 Scale | 1.0000E+000 Offset | 0.0000E+000 | Column Parameter −6 |
| Surf | 1 NSC Object | 69 Parameter | 5: Pickup From | 63 Scale | 1.0000E+000 Offset | 0.0000E+000 | Column Parameter −6 |
| Surf | 1 NSC Object | 69 Parameter | 6: Pickup From | 3 Scale | 1.0000E+000 Offset | 0.0000E+000 | Column Parameter −6 |
| Surf | 1 NSC Object | 69 Parameter | 7: Pickup From | 3 Scale | 1.0000E+000 Offset | 0.0000E+000 | Column Parameter −6 |
| Surf | 1 NSC Object | 69 Parameter | 8: Pickup From | 3 Scale | 1.0000E+000 Offset | 0.0000E+000 | Column Parameter −6 |
| Surf | 1 NSC Object | 70 Position | Y: Pickup From | 4 Scale | −1.0000E+000 Offset | 0.0000E+000 | Column Parameter −6 |
| Surf | 1 NSC Object | 70 Parameter | 1: Pickup From | 3 Scale | 1.0000E+000 Offset | 0.0000E+000 | Column Parameter −6 |
| Surf | 1 NSC Object | 70 Parameter | 2: Pickup From | 3 Scale | 1.0000E+000 Offset | 0.0000E+000 | Column Parameter −6 |
| Surf | 1 NSC Object | 70 Parameter | 3: Pickup From | 3 Scale | 1.0000E+000 Offset | 0.0000E+000 | Column Parameter −6 |
| Surf | 1 NSC Object | 70 Parameter | 5: Pickup From | 63 Scale | 1.0000E+000 Offset | 0.0000E+000 | Column Parameter −6 |
| Surf | 1 NSC Object | 70 Parameter | 6: Pickup From | 3 Scale | 1.0000E+000 Offset | 0.0000E+000 | Column Parameter −6 |
| Surf | 1 NSC Object | 70 Parameter | 7: Pickup From | 3 Scale | 1.0000E+000 Offset | 0.0000E+000 | Column Parameter −6 |
| Surf | 1 NSC Object | 70 Parameter | 8: Pickup From | 3 Scale | 1.0000E+000 Offset | 0.0000E+000 | Column Parameter −6 |
| Surf | 1 NSC Object | 71 Position | Y: Pickup From | 4 Scale | −1.0000E+000 Offset | 0.0000E+000 | Column Parameter −6 |
| Surf | 1 NSC Object | 71 Parameter | 1: Pickup From | 3 Scale | 1.0000E+000 Offset | 0.0000E+000 | Column Parameter −6 |
| Surf | 1 NSC Object | 71 Parameter | 2: Pickup From | 3 Scale | 1.0000E+000 Offset | 0.0000E+000 | Column Parameter −6 |
| Surf | 1 NSC Object | 71 Parameter | 3: Pickup From | 3 Scale | 1.0000E+000 Offset | 0.0000E+000 | Column Parameter −6 |
| Surf | 1 NSC Object | 71 Parameter | 5: Pickup From | 63 Scale | 1.0000E+000 Offset | 0.0000E+000 | Column Parameter −6 |
| Surf | 1 NSC Object | 71 Parameter | 6: Pickup From | 3 Scale | 1.0000E+000 Offset | 0.0000E+000 | Column Parameter −6 |
| Surf | 1 NSC Object | 71 Parameter | 7: Pickup From | 3 Scale | 1.0000E+000 Offset | 0.0000E+000 | Column Parameter −6 |
| Surf | 1 NSC Object | 71 Parameter | 8: Pickup From | 3 Scale | 1.0000E+000 Offset | 0.0000E+000 | Column Parameter −6 |
| Surf | 1 NSC Object | 73 Position | X: Pickup From | 2 Scale | −6.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 73 Parameter | 1: Pickup From | 3 Scale | 1.0000E+000 Offset | 0.0000E+000 | Column Parameter −6 |
| Surf | 1 NSC Object | 73 Parameter | 2: Pickup From | 3 Scale | 1.0000E+000 Offset | 0.0000E+000 | Column Parameter −6 |
| Surf | 1 NSC Object | 73 Parameter | 3: Pickup From | 3 Scale | 1.0000E+000 Offset | 0.0000E+000 | Column Parameter −6 |
| Surf | 1 NSC Object | 73 Parameter | 6: Pickup From | 3 Scale | 1.0000E+000 Offset | 0.0000E+000 | Column Parameter −6 |
| Surf | 1 NSC Object | 73 Parameter | 7: Pickup From | 3 Scale | 1.0000E+000 Offset | 0.0000E+000 | Column Parameter −6 |
| Surf | 1 NSC Object | 73 Parameter | 8: Pickup From | 3 Scale | 1.0000E+000 Offset | 0.0000E+000 | Column Parameter −6 |
| Surf | 1 NSC Object | 74 Position | Y: Pickup From | 4 Scale | 1.0000E+000 Offset | 0.0000E+000 | Column Parameter −6 |
| Surf | 1 NSC Object | 74 Parameter | 1: Pickup From | 3 Scale | 1.0000E+000 Offset | 0.0000E+000 | Column Parameter −6 |
| Surf | 1 NSC Object | 74 Parameter | 2: Pickup From | 3 Scale | 1.0000E+000 Offset | 0.0000E+000 | Column Parameter −6 |
| Surf | 1 NSC Object | 74 Parameter | 3: Pickup From | 3 Scale | 1.0000E+000 Offset | 0.0000E+000 | Column Parameter −6 |
| Surf | 1 NSC Object | 74 Parameter | 5: Pickup From | 73 Scale | 1.0000E+000 Offset | 0.0000E+000 | Column Parameter −6 |
| Surf | 1 NSC Object | 74 Parameter | 6: Pickup From | 3 Scale | 1.0000E+000 Offset | 0.0000E+000 | Column Parameter −6 |
| Surf | 1 NSC Object | 74 Parameter | 7: Pickup From | 3 Scale | 1.0000E+000 Offset | 0.0000E+000 | Column Parameter −6 |
| Surf | 1 NSC Object | 74 Parameter | 8: Pickup From | 3 Scale | 1.0000E+000 Offset | 0.0000E+000 | Column Parameter −6 |
| Surf | 1 NSC Object | 75 Position | Y: Pickup From | 4 Scale | 1.0000E+000 Offset | 0.0000E+000 | Column Parameter −6 |
| Surf | 1 NSC Object | 75 Parameter | 1: Pickup From | 3 Scale | 1.0000E+000 Offset | 0.0000E+000 | Column Parameter −6 |
| Surf | 1 NSC Object | 75 Parameter | 2: Pickup From | 3 Scale | 1.0000E+000 Offset | 0.0000E+000 | Column Parameter −6 |
| Surf | 1 NSC Object | 75 Parameter | 3: Pickup From | 3 Scale | 1.0000E+000 Offset | 0.0000E+000 | Column Parameter −6 |
| Surf | 1 NSC Object | 75 Parameter | 5: Pickup From | 73 Scale | 1.0000E+000 Offset | 0.0000E+000 | Column Parameter −6 |
| Surf | 1 NSC Object | 75 Parameter | 6: Pickup From | 3 Scale | 1.0000E+000 Offset | 0.0000E+000 | Column Parameter −6 |
| Surf | 1 NSC Object | 75 Parameter | 7: Pickup From | 3 Scale | 1.0000E+000 Offset | 0.0000E+000 | Column Parameter −6 |
| Surf | 1 NSC Object | 75 Parameter | 8: Pickup From | 3 Scale | 1.0000E+000 Offset | 0.0000E+000 | Column Parameter −6 |
| Surf | 1 NSC Object | 76 Position | Y: Pickup From | 4 Scale | 1.0000E+000 Offset | 0.0000E+000 | Column Parameter −6 |
| Surf | 1 NSC Object | 76 Parameter | 1: Pickup From | 3 Scale | 1.0000E+000 Offset | 0.0000E+000 | Column Parameter −6 |
| Surf | 1 NSC Object | 76 Parameter | 2: Pickup From | 3 Scale | 1.0000E+000 Offset | 0.0000E+000 | Column Parameter −6 |
| Surf | 1 NSC Object | 76 Parameter | 3: Pickup From | 3 Scale | 1.0000E+000 Offset | 0.0000E+000 | Column Parameter −6 |
| Surf | 1 NSC Object | 76 Parameter | 5: Pickup From | 73 Scale | 1.0000E+000 Offset | 0.0000E+000 | Column Parameter −6 |
| Surf | 1 NSC Object | 76 Parameter | 6: Pickup From | 3 Scale | 1.0000E+000 Offset | 0.0000E+000 | Column Parameter −6 |
| Surf | 1 NSC Object | 76 Parameter | 7: Pickup From | 3 Scale | 1.0000E+000 Offset | 0.0000E+000 | Column Parameter −6 |
| Surf | 1 NSC Object | 76 Parameter | 8: Pickup From | 3 Scale | 1.0000E+000 Offset | 0.0000E+000 | Column Parameter −6 |
| Surf | 1 NSC Object | 77 Position | Y: Pickup From | 4 Scale | 1.0000E+000 Offset | 0.0000E+000 | Column Parameter −6 |
| Surf | 1 NSC Object | 78 Position | Y: Pickup From | 4 Scale | −1.0000E+000 Offset | 0.0000E+000 | Column Parameter −6 |
| Surf | 1 NSC Object | 78 Parameter | 1: Pickup From | 3 Scale | 1.0000E+000 Offset | 0.0000E+000 | Column Parameter −6 |
| Surf | 1 NSC Object | 78 Parameter | 2: Pickup From | 3 Scale | 1.0000E+000 Offset | 0.0000E+000 | Column Parameter −6 |
| Surf | 1 NSC Object | 78 Parameter | 3: Pickup From | 3 Scale | 1.0000E+000 Offset | 0.0000E+000 | Column Parameter −6 |
| Surf | 1 NSC Object | 78 Parameter | 5: Pickup From | 73 Scale | 1.0000E+000 Offset | 0.0000E+000 | Column Parameter −6 |
| Surf | 1 NSC Object | 78 Parameter | 6: Pickup From | 3 Scale | 1.0000E+000 Offset | 0.0000E+000 | Column Parameter −6 |
| Surf | 1 NSC Object | 78 Parameter | 7: Pickup From | 3 Scale | 1.0000E+000 Offset | 0.0000E+000 | Column Parameter −6 |
| Surf | 1 NSC Object | 78 Parameter | 8: Pickup From | 3 Scale | 1.0000E+000 Offset | 0.0000E+000 | Column Parameter −6 |
| Surf | 1 NSC Object | 79 Position | Y: Pickup From | 4 Scale | −1.0000E+000 Offset | 0.0000E+000 | Column Parameter −6 |
| Surf | 1 NSC Object | 79 Parameter | 1: Pickup From | 3 Scale | 1.0000E+000 Offset | 0.0000E+000 | Column Parameter −6 |
| Surf | 1 NSC Object | 79 Parameter | 2: Pickup From | 3 Scale | 1.0000E+000 Offset | 0.0000E+000 | Column Parameter −6 |
| Surf | 1 NSC Object | 79 Parameter | 3: Pickup From | 3 Scale | 1.0000E+000 Offset | 0.0000E+000 | Column Parameter −6 |
| Surf | 1 NSC Object | 79 Parameter | 5: Pickup From | 73 Scale | 1.0000E+000 Offset | 0.0000E+000 | Column Parameter −6 |
| Surf | 1 NSC Object | 79 Parameter | 6: Pickup From | 3 Scale | 1.0000E+000 Offset | 0.0000E+000 | Column Parameter −6 |
| Surf | 1 NSC Object | 79 Parameter | 7: Pickup From | 3 Scale | 1.0000E+000 Offset | 0.0000E+000 | Column Parameter −6 |
| Surf | 1 NSC Object | 79 Parameter | 8: Pickup From | 3 Scale | 1.0000E+000 Offset | 0.0000E+000 | Column Parameter −6 |
| Surf | 1 NSC Object | 80 Position | Y: Pickup From | 4 Scale | −1.0000E+000 Offset | 0.0000E+000 | Column Parameter −6 |
| Surf | 1 NSC Object | 80 Parameter | 1: Pickup From | 3 Scale | 1.0000E+000 Offset | 0.0000E+000 | Column Parameter −6 |
| Surf | 1 NSC Object | 80 Parameter | 2: Pickup From | 3 Scale | 1.0000E+000 Offset | 0.0000E+000 | Column Parameter −6 |
| Surf | 1 NSC Object | 80 Parameter | 3: Pickup From | 3 Scale | 1.0000E+000 Offset | 0.0000E+000 | Column Parameter −6 |
| Surf | 1 NSC Object | 80 Parameter | 5: Pickup From | 73 Scale | 1.0000E+000 Offset | 0.0000E+000 | Column Parameter −6 |
| Surf | 1 NSC Object | 80 Parameter | 6: Pickup From | 3 Scale | 1.0000E+000 Offset | 0.0000E+000 | Column Parameter −6 |
| Surf | 1 NSC Object | 80 Parameter | 7: Pickup From | 3 Scale | 1.0000E+000 Offset | 0.0000E+000 | Column Parameter −6 |
| Surf | 1 NSC Object | 80 Parameter | 8: Pickup From | 3 Scale | 1.0000E+000 Offset | 0.0000E+000 | Column Parameter −6 |
| Surf | 1 NSC Object | 81 Position | Y: Pickup From | 4 Scale | −1.0000E+000 Offset | 0.0000E+000 | Column Parameter −6 |
| Surf | 1 NSC Object | 83 Position | X: Pickup From | 2 Scale | −8.0000E+000 Offset | 0.0000E+000 | Column Parameter −6 |
| Surf | 1 NSC Object | 83 Parameter | 1: Pickup From | 3 Scale | 1.0000E+000 Offset | 0.0000E+000 | Column Parameter −6 |
| Surf | 1 NSC Object | 83 Parameter | 2: Pickup From | 3 Scale | 1.0000E+000 Offset | 0.0000E+000 | Column Parameter −6 |
| Surf | 1 NSC Object | 83 Parameter | 3: Pickup From | 3 Scale | 1.0000E+000 Offset | 0.0000E+000 | Column Parameter −6 |
| Surf | 1 NSC Object | 83 Parameter | 6: Pickup From | 3 Scale | 1.0000E+000 Offset | 0.0000E+000 | Column Parameter −6 |
| Surf | 1 NSC Object | 83 Parameter | 7: Pickup From | 3 Scale | 1.0000E+000 Offset | 0.0000E+000 | Column Parameter −6 |
| Surf | 1 NSC Object | 83 Parameter | 8: Pickup From | 3 Scale | 1.0000E+000 Offset | 0.0000E+000 | Column Parameter −6 |
| Surf | 1 NSC Object | 84 Position | Y: Pickup From | 4 Scale | 1.0000E+000 Offset | 0.0000E+000 | Column Parameter −6 |
| Surf | 1 NSC Object | 84 Parameter | 1: Pickup From | 3 Scale | 1.0000E+000 Offset | 0.0000E+000 | Column Parameter −6 |
| Surf | 1 NSC Object | 84 Parameter | 2: Pickup From | 3 Scale | 1.0000E+000 Offset | 0.0000E+000 | Column Parameter −6 |
| Surf | 1 NSC Object | 84 Parameter | 3: Pickup From | 3 Scale | 1.0000E+000 Offset | 0.0000E+000 | Column Parameter −6 |
| Surf | 1 NSC Object | 84 Parameter | 5: Pickup From | 83 Scale | 1.0000E+000 Offset | 0.0000E+000 | Column Parameter −6 |
| Surf | 1 NSC Object | 84 Parameter | 6: Pickup From | 3 Scale | 1.0000E+000 Offset | 0.0000E+000 | Column Parameter −6 |
| Surf | 1 NSC Object | 84 Parameter | 7: Pickup From | 3 Scale | 1.0000E+000 Offset | 0.0000E+000 | Column Parameter −6 |
| Surf | 1 NSC Object | 84 Parameter | 8: Pickup From | 3 Scale | 1.0000E+000 Offset | 0.0000E+000 | Column Parameter −6 |
| Surf | 1 NSC Object | 85 Position | Y: Pickup From | 4 Scale | 1.0000E+000 Offset | 0.0000E+000 | Column Parameter −6 |
| Surf | 1 NSC Object | 85 Parameter | 1: Pickup From | 3 Scale | 1.0000E+000 Offset | 0.0000E+000 | Column Parameter −6 |
| Surf | 1 NSC Object | 85 Parameter | 2: Pickup From | 3 Scale | 1.0000E+000 Offset | 0.0000E+000 | Column Parameter −6 |
| Surf | 1 NSC Object | 85 Parameter | 3: Pickup From | 3 Scale | 1.0000E+000 Offset | 0.0000E+000 | Column Parameter −6 |
| Surf | 1 NSC Object | 85 Parameter | 5: Pickup From | 83 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 85 Parameter | 6: Pickup From | 3 Scale | 1.0000E+000 Offset | 0.0000E+000 | Column Parameter −6 |
| Surf | 1 NSC Object | 85 Parameter | 7: Pickup From | 3 Scale | 1.0000E+000 Offset | 0.0000E+000 | Column Parameter −6 |
| Surf | 1 NSC Object | 85 Parameter | 8: Pickup From | 3 Scale | 1.0000E+000 Offset | 0.0000E+000 | Column Parameter −6 |
| Surf | 1 NSC Object | 86 Position | Y: Pickup From | 4 Scale | 1.0000E+000 Offset | 0.0000E+000 | Column Parameter −6 |
| Surf | 1 NSC Object | 87 Position | Y: Pickup From | 4 Scale | 1.0000E+000 Offset | 0.0000E+000 | Column Parameter −6 |
| Surf | 1 NSC Object | 88 Position | Y: Pickup From | 4 Scale | −1.0000E+000 Offset | 0.0000E+000 | Column Parameter −6 |
| Surf | 1 NSC Object | 88 Parameter | 1: Pickup From | 3 Scale | 1.0000E+000 Offset | 0.0000E+000 | Column Parameter −6 |
| Surf | 1 NSC Object | 88 Parameter | 2: Pickup From | 3 Scale | 1.0000E+000 Offset | 0.0000E+000 | Column Parameter −6 |
| Surf | 1 NSC Object | 88 Parameter | 3: Pickup From | 3 Scale | 1.0000E+000 Offset | 0.0000E+000 | Column Parameter −6 |
| Surf | 1 NSC Object | 88 Parameter | 5: Pickup From | 83 Scale | 1.0000E+000 Offset | 0.0000E+000 | Column Parameter −6 |
| Surf | 1 NSC Object | 88 Parameter | 6: Pickup From | 3 Scale | 1.0000E+000 Offset | 0.0000E+000 | Column Parameter −6 |
| Surf | 1 NSC Object | 88 Parameter | 7: Pickup From | 3 Scale | 1.0000E+000 Offset | 0.0000E+000 | Column Parameter −6 |
| Surf | 1 NSC Object | 88 Parameter | 8: Pickup From | 3 Scale | 1.0000E+000 Offset | 0.0000E+000 | Column Parameter −6 |
| Surf | 1 NSC Object | 89 Position | Y: Pickup From | 4 Scale | −1.0000E+000 Offset | 0.0000E+000 | Column Parameter −6 |
| Surf | 1 NSC Object | 89 Parameter | 1: Pickup From | 3 Scale | 1.0000E+000 Offset | 0.0000E+000 | Column Parameter −6 |
| Surf | 1 NSC Object | 89 Parameter | 2: Pickup From | 3 Scale | 1.0000E+000 Offset | 0.0000E+000 | Column Parameter −6 |
| Surf | 1 NSC Object | 89 Parameter | 3: Pickup From | 3 Scale | 1.0000E+000 Offset | 0.0000E+000 | Column Parameter −6 |
| Surf | 1 NSC Object | 89 Parameter | 5: Pickup From | 83 Scale | 1.0000E+000 Offset | 0.0000E+000 | Column Parameter −6 |
| Surf | 1 NSC Object | 89 Parameter | 6: Pickup From | 3 Scale | 1.0000E+000 Offset | 0.0000E+000 | Column Parameter −6 |
| Surf | 1 NSC Object | 89 Parameter | 7: Pickup From | 3 Scale | 1.0000E+000 Offset | 0.0000E+000 | Column Parameter −6 |
| Surf | 1 NSC Object | 89 Parameter | 8: Pickup From | 3 Scale | 1.0000E+000 Offset | 0.0000E+000 | Column Parameter −6 |
| Surf | 1 NSC Object | 90 Position | Y: Pickup From | 4 Scale | −1.0000E+000 Offset | 0.0000E+000 | Column Parameter −6 |
| Surf | 1 NSC Object | 91 Position | Y: Pickup From | 4 Scale | −1.0000E+000 Offset | 0.0000E+000 | Column Parameter −6 |
| Surf | 1 NSC Object | 97 Parameter | 2: Pickup From | 3 Scale | 1.0000E+000 Offset | 0.0000E+000 | Column Parameter −6 |
| Surf | 1 NSC Object | 98 Parameter | 1: Pickup From | 3 Scale | 1.0000E+000 Offset | 0.0000E+000 | Column Parameter −6 |
| Surf | 1 NSC Object | 98 Parameter | 2: Pickup From | 3 Scale | 1.0000E+000 Offset | 0.0000E+000 | Column Parameter −6 |
| Surf | 1 NSC Object | 98 Parameter | 3: Pickup From | 3 Scale | 1.0000E+000 Offset | 0.0000E+000 | Column Parameter −6 |
| Surf | 1 NSC Object | 98 Parameter | 5: Pickup From | 3 Scale | 1.0000E+000 Offset | 0.0000E+000 | Column Parameter −6 |
| Surf | 1 NSC Object | 98 Parameter | 6: Pickup From | 3 Scale | 1.0000E+000 Offset | 0.0000E+000 | Column Parameter −6 |
| Surf | 1 NSC Object | 98 Parameter | 7: Pickup From | 3 Scale | 1.0000E+000 Offset | 0.0000E+000 | Column Parameter −6 |
| Surf | 1 NSC Object | 98 Parameter | 8: Pickup From | 3 Scale | 1.0000E+000 Offset | 0.0000E+000 | Column Parameter −6 |
| Surf | 1 NSC Object | 99 Position | Y: Pickup From | 4 Scale | 1.0000E+000 Offset | 0.0000E+000 | Column Parameter −6 |
| Surf | 1 NSC Object | 99 Parameter | 1: Pickup From | 3 Scale | 1.0000E+000 Offset | 0.0000E+000 | Column Parameter −6 |
| Surf | 1 NSC Object | 99 Parameter | 2: Pickup From | 3 Scale | 1.0000E+000 Offset | 0.0000E+000 | Column Parameter −6 |
| Surf | 1 NSC Object | 99 Parameter | 3: Pickup From | 3 Scale | 1.0000E+000 Offset | 0.0000E+000 | Column Parameter −6 |
| Surf | 1 NSC Object | 99 Parameter | 5: Pickup From | 3 Scale | 1.0000E+000 Offset | 0.0000E+000 | Column Parameter −6 |
| Surf | 1 NSC Object | 99 Parameter | 6: Pickup From | 3 Scale | 1.0000E+000 Offset | 0.0000E+000 | Column Parameter −6 |
| Surf | 1 NSC Object | 99 Parameter | 7: Pickup From | 3 Scale | 1.0000E+000 Offset | 0.0000E+000 | Column Parameter −6 |
| Surf | 1 NSC Object | 99 Parameter | 8: Pickup From | 3 Scale | 1.0000E+000 Offset | 0.0000E+000 | Column Parameter −6 |
| Surf | 1 NSC Object | 100 Position | Y: Pickup From | 4 Scale | 1.0000E+000 Offset | 0.0000E+000 | Column Parameter −6 |
| Surf | 1 NSC Object | 100 Parameter | 1: Pickup From | 3 Scale | 1.0000E+000 Offset | 0.0000E+000 | Column Parameter −6 |
| Surf | 1 NSC Object | 100 Parameter | 2: Pickup From | 3 Scale | 1.0000E+000 Offset | 0.0000E+000 | Column Parameter −6 |
| Surf | 1 NSC Object | 100 Parameter | 3: Pickup From | 3 Scale | 1.0000E+000 Offset | 0.0000E+000 | Column Parameter −6 |
| Surf | 1 NSC Object | 100 Parameter | 5: Pickup From | 3 Scale | 1.0000E+000 Offset | 0.0000E+000 | Column Parameter −6 |
| Surf | 1 NSC Object | 100 Parameter | 6: Pickup From | 3 Scale | 1.0000E+000 Offset | 0.0000E+000 | Column Parameter −6 |
| Surf | 1 NSC Object | 100 Parameter | 7: Pickup From | 3 Scale | 1.0000E+000 Offset | 0.0000E+000 | Column Parameter −6 |
| Surf | 1 NSC Object | 100 Parameter | 8: Pickup From | 3 Scale | 1.0000E+000 Offset | 0.0000E+000 | Column Parameter −6 |
| Surf | 1 NSC Object | 101 Position | Y: Pickup From | 4 Scale | 1.0000E+000 Offset | 0.0000E+000 | Column Parameter −6 |
| Surf | 1 NSC Object | 101 Parameter | 1: Pickup From | 3 Scale | 1.0000E+000 Offset | 0.0000E+000 | Column Parameter −6 |
| Surf | 1 NSC Object | 101 Parameter | 2: Pickup From | 3 Scale | 1.0000E+000 Offset | 0.0000E+000 | Column Parameter −6 |
| Surf | 1 NSC Object | 101 Parameter | 3: Pickup From | 3 Scale | 1.0000E+000 Offset | 0.0000E+000 | Column Parameter −6 |
| Surf | 1 NSC Object | 101 Parameter | 5: Pickup From | 3 Scale | 1.0000E+000 Offset | 0.0000E+000 | Column Parameter −6 |
| Surf | 1 NSC Object | 101 Parameter | 6: Pickup From | 3 Scale | 1.0000E+000 Offset | 0.0000E+000 | Column Parameter −6 |
| Surf | 1 NSC Object | 101 Parameter | 7: Pickup From | 3 Scale | 1.0000E+000 Offset | 0.0000E+000 | Column Parameter −6 |
| Surf | 1 NSC Object | 101 Parameter | 8: Pickup From | 3 Scale | 1.0000E+000 Offset | 0.0000E+000 | Column Parameter −6 |
| Surf | 1 NSC Object | 102 Position | Y: Pickup From | 4 Scale | −1.0000E+000 Offset | 0.0000E+000 | Column Parameter −6 |
| Surf | 1 NSC Object | 102 Parameter | 1: Pickup From | 3 Scale | 1.0000E+000 Offset | 0.0000E+000 | Column Parameter −6 |
| Surf | 1 NSC Object | 102 Parameter | 2: Pickup From | 3 Scale | 1.0000E+000 Offset | 0.0000E+000 | Column Parameter −6 |
| Surf | 1 NSC Object | 102 Parameter | 3: Pickup From | 3 Scale | 1.0000E+000 Offset | 0.0000E+000 | Column Parameter −6 |
| Surf | 1 NSC Object | 102 Parameter | 5: Pickup From | 3 Scale | 1.0000E+000 Offset | 0.0000E+000 | Column Parameter −6 |
| Surf | 1 NSC Object | 102 Parameter | 6: Pickup From | 3 Scale | 1.0000E+000 Offset | 0.0000E+000 | Column Parameter −6 |
| Surf | 1 NSC Object | 102 Parameter | 7: Pickup From | 3 Scale | 1.0000E+000 Offset | 0.0000E+000 | Column Parameter −6 |
| Surf | 1 NSC Object | 102 Parameter | 8: Pickup From | 3 Scale | 1.0000E+000 Offset | 0.0000E+000 | Column Parameter −6 |
| Surf | 1 NSC Object | 103 Position | Y: Pickup From | 4 Scale | −1.0000E+000 Offset | 0.0000E+000 | Column Parameter −6 |
| Surf | 1 NSC Object | 103 Parameter | 1: Pickup From | 3 Scale | 1.0000E+000 Offset | 0.0000E+000 | Column Parameter −6 |
| Surf | 1 NSC Object | 103 Parameter | 2: Pickup From | 3 Scale | 1.0000E+000 Offset | 0.0000E+000 | Column Parameter −6 |
| Surf | 1 NSC Object | 103 Parameter | 3: Pickup From | 3 Scale | 1.0000E+000 Offset | 0.0000E+000 | Column Parameter −6 |
| Surf | 1 NSC Object | 103 Parameter | 5: Pickup From | 3 Scale | 1.0000E+000 Offset | 0.0000E+000 | Column Parameter −6 |
| Surf | 1 NSC Object | 103 Parameter | 6: Pickup From | 3 Scale | 1.0000E+000 Offset | 0.0000E+000 | Column Parameter −6 |
| Surf | 1 NSC Object | 103 Parameter | 7: Pickup From | 3 Scale | 1.0000E+000 Offset | 0.0000E+000 | Column Parameter −6 |
| Surf | 1 NSC Object | 103 Parameter | 8: Pickup From | 3 Scale | 1.0000E+000 Offset | 0.0000E+000 | Column Parameter −6 |
| Surf | 1 NSC Object | 104 Position | Y: Pickup From | 4 Scale | −1.0000E+000 Offset | 0.0000E+000 | Column Parameter −6 |
| Surf | 1 NSC Object | 104 Parameter | 1: Pickup From | 3 Scale | 1.0000E+000 Offset | 0.0000E+000 | Column Parameter −6 |
| Surf | 1 NSC Object | 104 Parameter | 2: Pickup From | 3 Scale | 1.0000E+000 Offset | 0.0000E+000 | Column Parameter −6 |
| Surf | 1 NSC Object | 104 Parameter | 3: Pickup From | 3 Scale | 1.0000E+000 Offset | 0.0000E+000 | Column Parameter −6 |
| Surf | 1 NSC Object | 104 Parameter | 5: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 104 Parameter | 6: Pickup From | 3 Scale | 1.0000E+000 Offset | 0.0000E+000 | Column Parameter −6 |
| Surf | 1 NSC Object | 104 Parameter | 7: Pickup From | 3 Scale | 1.0000E+000 Offset | 0.0000E+000 | Column Parameter −6 |
| Surf | 1 NSC Object | 104 Parameter | 8: Pickup From | 3 Scale | 1.0000E+000 Offset | 0.0000E+000 | Column Parameter −6 |
| Surf | 1 NSC Object | 105 Position | Y: Pickup From | 4 Scale | −1.0000E+000 Offset | 0.0000E+000 | Column Parameter −6 |
| Surf | 1 NSC Object | 105 Parameter | 1: Pickup From | 3 Scale | 1.0000E+000 Offset | 0.0000E+000 | Column Parameter −6 |
| Surf | 1 NSC Object | 105 Parameter | 2: Pickup From | 3 Scale | 1.0000E+000 Offset | 0.0000E+000 | Column Parameter −6 |
| Surf | 1 NSC Object | 105 Parameter | 3: Pickup From | 3 Scale | 1.0000E+000 Offset | 0.0000E+000 | Column Parameter −6 |
| Surf | 1 NSC Object | 105 Parameter | 5: Pickup From | 3 Scale | 1.0000E+000 Offset | 0.0000E+000 | Column Parameter −6 |
| Surf | 1 NSC Object | 105 Parameter | 6: Pickup From | 3 Scale | 1.0000E+000 Offset | 0.0000E+000 | Column Parameter −6 |
| Surf | 1 NSC Object | 105 Parameter | 7: Pickup From | 3 Scale | 1.0000E+000 Offset | 0.0000E+000 | Column Parameter −6 |
| Surf | 1 NSC Object | 105 Parameter | 8: Pickup From | 3 Scale | 1.0000E+000 Offset | 0.0000E+000 | Column Parameter −6 |
| Surf | 1 NSC Object | 107 Position | X: Pickup From | 2 Scale | 2.0000E+000 Offset | 0.0000E+000 | Column Parameter −6 |
| Surf | 1 NSC Object | 107 Parameter | 1: Pickup From | 3 Scale | 1.0000E+000 Offset | 0.0000E+000 | Column Parameter −6 |
| Surf | 1 NSC Object | 107 Parameter | 2: Pickup From | 3 Scale | 1.0000E+000 Offset | 0.0000E+000 | Column Parameter −6 |
| Surf | 1 NSC Object | 107 Parameter | 3: Pickup From | 3 Scale | 1.0000E+000 Offset | 0.0000E+000 | Column Parameter −6 |
| Surf | 1 NSC Object | 107 Parameter | 6: Pickup From | 3 Scale | 1.0000E+000 Offset | 0.0000E+000 | Column Parameter −6 |
| Surf | 1 NSC Object | 107 Parameter | 7: Pickup From | 3 Scale | 1.0000E+000 Offset | 0.0000E+000 | Column Parameter −6 |
| Surf | 1 NSC Object | 107 Parameter | 8: Pickup From | 3 Scale | 1.0000E+000 Offset | 0.0000E+000 | Column Parameter −6 |
| Surf | 1 NSC Object | 108 Position | Y: Pickup From | 4 Scale | 1.0000E+000 Offset | 0.0000E+000 | Column Parameter −6 |
| Surf | 1 NSC Object | 108 Parameter | 1: Pickup From | 3 Scale | 1.0000E+000 Offset | 0.0000E+000 | Column Parameter −6 |
| Surf | 1 NSC Object | 108 Parameter | 2: Pickup From | 3 Scale | 1.0000E+000 Offset | 0.0000E+000 | Column Parameter −6 |
| Surf | 1 NSC Object | 108 Parameter | 3: Pickup From | 3 Scale | 1.0000E+000 Offset | 0.0000E+000 | Column Parameter −6 |
| Surf | 1 NSC Object | 108 Parameter | 5: Pickup From | 13 Scale | 1.0000E+000 Offset | 0.0000E+000 | Column Parameter −6 |
| Surf | 1 NSC Object | 108 Parameter | 6: Pickup From | 3 Scale | 1.0000E+000 Offset | 0.0000E+000 | Column Parameter −6 |
| Surf | 1 NSC Object | 108 Parameter | 7: Pickup From | 3 Scale | 1.0000E+000 Offset | 0.0000E+000 | Column Parameter −6 |
| Surf | 1 NSC Object | 108 Parameter | 8: Pickup From | 3 Scale | 1.0000E+000 Offset | 0.0000E+000 | Column Parameter −6 |
| Surf | 1 NSC Object | 109 Position | Y: Pickup From | 4 Scale | 1.0000E+000 Offset | 0.0000E+000 | Column Parameter −6 |
| Surf | 1 NSC Object | 109 Parameter | 1: Pickup From | 3 Scale | 1.0000E+000 Offset | 0.0000E+000 | Column Parameter −6 |
| Surf | 1 NSC Object | 109 Parameter | 2: Pickup From | 3 Scale | 1.0000E+000 Offset | 0.0000E+000 | Column Parameter −6 |
| Surf | 1 NSC Object | 109 Parameter | 3: Pickup From | 3 Scale | 1.0000E+000 Offset | 0.0000E+000 | Column Parameter −6 |
| Surf | 1 NSC Object | 109 Parameter | 5: Pickup From | 13 Scale | 1.0000E+000 Offset | 0.0000E+000 | Column Parameter −6 |
| Surf | 1 NSC Object | 109 Parameter | 6: Pickup From | 3 Scale | 1.0000E+000 Offset | 0.0000E+000 | Column Parameter −6 |
| Surf | 1 NSC Object | 109 Parameter | 7: Pickup From | 3 Scale | 1.0000E+000 Offset | 0.0000E+000 | Column Parameter −6 |
| Surf | 1 NSC Object | 109 Parameter | 8: Pickup From | 3 Scale | 1.0000E+000 Offset | 0.0000E+000 | Column Parameter −6 |
| Surf | 1 NSC Object | 110 Position | Y: Pickup From | 4 Scale | 1.0000E+000 Offset | 0.0000E+000 | Column Parameter −6 |
| Surf | 1 NSC Object | 110 Parameter | 1: Pickup From | 3 Scale | 1.0000E+000 Offset | 0.0000E+000 | Column Parameter −6 |
| Surf | 1 NSC Object | 110 Parameter | 2: Pickup From | 3 Scale | 1.0000E+000 Offset | 0.0000E+000 | Column Parameter −6 |
| Surf | 1 NSC Object | 110 Parameter | 3: Pickup From | 3 Scale | 1.0000E+000 Offset | 0.0000E+000 | Column Parameter −6 |
| Surf | 1 NSC Object | 110 Parameter | 5: Pickup From | 13 Scale | 1.0000E+000 Offset | 0.0000E+000 | Column Parameter −6 |
| Surf | 1 NSC Object | 110 Parameter | 6: Pickup From | 3 Scale | 1.0000E+000 Offset | 0.0000E+000 | Column Parameter −6 |
| Surf | 1 NSC Object | 110 Parameter | 7: Pickup From | 3 Scale | 1.0000E+000 Offset | 0.0000E+000 | Column Parameter −6 |
| Surf | 1 NSC Object | 110 Parameter | 8: Pickup From | 3 Scale | 1.0000E+000 Offset | 0.0000E+000 | Column Parameter −6 |
| Surf | 1 NSC Object | 111 Position | Y: Pickup From | 4 Scale | 1.0000E+000 Offset | 0.0000E+000 | Column Parameter −6 |
| Surf | 1 NSC Object | 111 Parameter | 1: Pickup From | 3 Scale | 1.0000E+000 Offset | 0.0000E+000 | Column Parameter −6 |
| Surf | 1 NSC Object | 111 Parameter | 2: Pickup From | 3 Scale | 1.0000E+000 Offset | 0.0000E+000 | Column Parameter −6 |
| Surf | 1 NSC Object | 111 Parameter | 3: Pickup From | 3 Scale | 1.0000E+000 Offset | 0.0000E+000 | Column Parameter −6 |
| Surf | 1 NSC Object | 111 Parameter | 5: Pickup From | 13 Scale | 1.0000E+000 Offset | 0.0000E+000 | Column Parameter −6 |
| Surf | 1 NSC Object | 111 Parameter | 6: Pickup From | 3 Scale | 1.0000E+000 Offset | 0.0000E+000 | Column Parameter −6 |
| Surf | 1 NSC Object | 111 Parameter | 7: Pickup From | 3 Scale | 1.0000E+000 Offset | 0.0000E+000 | Column Parameter −6 |
| Surf | 1 NSC Object | 111 Parameter | 8: Pickup From | 3 Scale | 1.0000E+000 Offset | 0.0000E+000 | Column Parameter −6 |
| Surf | 1 NSC Object | 112 Position | Y: Pickup From | 4 Scale | −1.0000E+000 Offset | 0.0000E+000 | Column Parameter −6 |
| Surf | 1 NSC Object | 112 Parameter | 2: Pickup From | 3 Scale | 1.0000E+000 Offset | 0.0000E+000 | Column Parameter −6 |
| Surf | 1 NSC Object | 112 Parameter | 3: Pickup From | 3 Scale | 1.0000E+000 Offset | 0.0000E+000 | Column Parameter −6 |
| Surf | 1 NSC Object | 112 Parameter | 5: Pickup From | 13 Scale | 1.0000E+000 Offset | 0.0000E+000 | Column Parameter −6 |
| Surf | 1 NSC Object | 112 Parameter | 6: Pickup From | 3 Scale | 1.0000E+000 Offset | 0.0000E+000 | Column Parameter −6 |
| Surf | 1 NSC Object | 112 Parameter | 7: Pickup From | 3 Scale | 1.0000E+000 Offset | 0.0000E+000 | Column Parameter −6 |
| Surf | 1 NSC Object | 112 Parameter | 8: Pickup From | 3 Scale | 1.0000E+000 Offset | 0.0000E+000 | Column Parameter −6 |
| Surf | 1 NSC Object | 113 Position | Y: Pickup From | 4 Scale | −1.0000E+000 Offset | 0.0000E+000 | Column Parameter −6 |
| Surf | 1 NSC Object | 113 Parameter | 1: Pickup From | 3 Scale | 1.0000E+000 Offset | 0.0000E+000 | Column Parameter −6 |
| Surf | 1 NSC Object | 113 Parameter | 2: Pickup From | 3 Scale | 1.0000E+000 Offset | 0.0000E+000 | Column Parameter −6 |
| Surf | 1 NSC Object | 113 Parameter | 3: Pickup From | 3 Scale | 1.0000E+000 Offset | 0.0000E+000 | Column Parameter −6 |
| Surf | 1 NSC Object | 113 Parameter | 5: Pickup From | 13 Scale | 1.0000E+000 Offset | 0.0000E+000 | Column Parameter −6 |
| Surf | 1 NSC Object | 113 Parameter | 6: Pickup From | 3 Scale | 1.0000E+000 Offset | 0.0000E+000 | Column Parameter −6 |
| Surf | 1 NSC Object | 113 Parameter | 7: Pickup From | 3 Scale | 1.0000E+000 Offset | 0.0000E+000 | Column Parameter −6 |
| Surf | 1 NSC Object | 113 Parameter | 8: Pickup From | 3 Scale | 1.0000E+000 Offset | 0.0000E+000 | Column Parameter −6 |
| Surf | 1 NSC Object | 114 Position | Y: Pickup From | 4 Scale | −1.0000E+000 Offset | 0.0000E+000 | Column Parameter −6 |
| Surf | 1 NSC Object | 114 Parameter | 1: Pickup From | 3 Scale | 1.0000E+000 Offset | 0.0000E+000 | Column Parameter −6 |
| Surf | 1 NSC Object | 114 Parameter | 2: Pickup From | 3 Scale | 1.0000E+000 Offset | 0.0000E+000 | Column Parameter −6 |
| Surf | 1 NSC Object | 114 Parameter | 3: Pickup From | 3 Scale | 1.0000E+000 Offset | 0.0000E+000 | Column Parameter −6 |
| Surf | 1 NSC Object | 114 Parameter | 5: Pickup From | 13 Scale | 1.0000E+000 Offset | 0.0000E+000 | Column Parameter −6 |
| Surf | 1 NSC Object | 114 Parameter | 6: Pickup From | 3 Scale | 1.0000E+000 Offset | 0.0000E+000 | Column Parameter −6 |
| Surf | 1 NSC Object | 114 Parameter | 7: Pickup From | 3 Scale | 1.0000E+000 Offset | 0.0000E+000 | Column Parameter −6 |
| Surf | 1 NSC Object | 114 Parameter | 8: Pickup From | 3 Scale | 1.0000E+000 Offset | 0.0000E+000 | Column Parameter −6 |
| Surf | 1 NSC Object | 115 Position | Y: Pickup From | 4 Scale | −1.0000E+000 Offset | 0.0000E+000 | Column Parameter −6 |
| Surf | 1 NSC Object | 115 Parameter | 1: Pickup From | 3 Scale | 1.0000E+000 Offset | 0.0000E+000 | Column Parameter −6 |
| Surf | 1 NSC Object | 115 Parameter | 2: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 115 Parameter | 3: Pickup From | 3 Scale | 1.0000E+000 Offset | 0.0000E+000 | Column Parameter −6 |
| Surf | 1 NSC Object | 115 Parameter | 5: Pickup From | 13 Scale | 1.0000E+000 Offset | 0.0000E+000 | Column Parameter −6 |
| Surf | 1 NSC Object | 115 Parameter | 6: Pickup From | 3 Scale | 1.0000E+000 Offset | 0.0000E+000 | Column Parameter −6 |
| Surf | 1 NSC Object | 115 Parameter | 7: Pickup From | 3 Scale | 1.0000E+000 Offset | 0.0000E+000 | Column Parameter −6 |
| Surf | 1 NSC Object | 115 Parameter | 8: Pickup From | 3 Scale | 1.0000E+000 Offset | 0.0000E+000 | Column Parameter −6 |
| Surf | 1 NSC Object | 117 Position | X: Pickup From | 2 Scale | 4.0000E+000 Offset | 0.0000E+000 | Column Parameter −6 |
| Surf | 1 NSC Object | 117 Parameter | 1: Pickup From | 3 Scale | 1.0000E+000 Offset | 0.0000E+000 | Column Parameter −6 |
| Surf | 1 NSC Object | 117 Parameter | 2: Pickup From | 3 Scale | 1.0000E+000 Offset | 0.0000E+000 | Column Parameter −6 |
| Surf | 1 NSC Object | 117 Parameter | 3: Pickup From | 3 Scale | 1.0000E+000 Offset | 0.0000E+000 | Column Parameter −6 |
| Surf | 1 NSC Object | 117 Parameter | 6: Pickup From | 3 Scale | 1.0000E+000 Offset | 0.0000E+000 | Column Parameter −6 |
| Surf | 1 NSC Object | 117 Parameter | 7: Pickup From | 3 Scale | 1.0000E+000 Offset | 0.0000E+000 | Column Parameter −6 |
| Surf | 1 NSC Object | 117 Parameter | 8: Pickup From | 3 Scale | 1.0000E+000 Offset | 0.0000E+000 | Column Parameter −6 |
| Surf | 1 NSC Object | 118 Position | Y: Pickup From | 4 Scale | 1.0000E+000 Offset | 0.0000E+000 | Column Parameter −6 |
| Surf | 1 NSC Object | 118 Parameter | 1: Pickup From | 3 Scale | 1.0000E+000 Offset | 0.0000E+000 | Column Parameter −6 |
| Surf | 1 NSC Object | 118 Parameter | 2: Pickup From | 3 Scale | 1.0000E+000 Offset | 0.0000E+000 | Column Parameter −6 |
| Surf | 1 NSC Object | 118 Parameter | 3: Pickup From | 3 Scale | 1.0000E+000 Offset | 0.0000E+000 | Column Parameter −6 |
| Surf | 1 NSC Object | 118 Parameter | 5: Pickup From | 23 Scale | 1.0000E+000 Offset | 0.0000E+000 | Column Parameter −6 |
| Surf | 1 NSC Object | 118 Parameter | 6: Pickup From | 3 Scale | 1.0000E+000 Offset | 0.0000E+000 | Column Parameter −6 |
| Surf | 1 NSC Object | 118 Parameter | 7: Pickup From | 3 Scale | 1.0000E+000 Offset | 0.0000E+000 | Column Parameter −6 |
| Surf | 1 NSC Object | 118 Parameter | 8: Pickup From | 3 Scale | 1.0000E+000 Offset | 0.0000E+000 | Column Parameter −6 |
| Surf | 1 NSC Object | 119 Position | Y: Pickup From | 4 Scale | 1.0000E+000 Offset | 0.0000E+000 | Column Parameter −6 |
| Surf | 1 NSC Object | 119 Parameter | 1: Pickup From | 3 Scale | 1.0000E+000 Offset | 0.0000E+000 | Column Parameter −6 |
| Surf | 1 NSC Object | 119 Parameter | 2: Pickup From | 3 Scale | 1.0000E+000 Offset | 0.0000E+000 | Column Parameter −6 |
| Surf | 1 NSC Object | 119 Parameter | 3: Pickup From | 3 Scale | 1.0000E+000 Offset | 0.0000E+000 | Column Parameter −6 |
| Surf | 1 NSC Object | 119 Parameter | 5: Pickup From | 23 Scale | 1.0000E+000 Offset | 0.0000E+000 | Column Parameter −6 |
| Surf | 1 NSC Object | 119 Parameter | 6: Pickup From | 3 Scale | 1.0000E+000 Offset | 0.0000E+000 | Column Parameter −6 |
| Surf | 1 NSC Object | 119 Parameter | 7: Pickup From | 3 Scale | 1.0000E+000 Offset | 0.0000E+000 | Column Parameter −6 |
| Surf | 1 NSC Object | 119 Parameter | 8: Pickup From | 3 Scale | 1.0000E+000 Offset | 0.0000E+000 | Column Parameter −6 |
| Surf | 1 NSC Object | 120 Position | Y: Pickup From | 4 Scale | 1.0000E+000 Offset | 0.0000E+000 | Column Parameter −6 |
| Surf | 1 NSC Object | 120 Parameter | 1: Pickup From | 3 Scale | 1.0000E+000 Offset | 0.0000E+000 | Column Parameter −6 |
| Surf | 1 NSC Object | 120 Parameter | 2: Pickup From | 3 Scale | 1.0000E+000 Offset | 0.0000E+000 | Column Parameter −6 |
| Surf | 1 NSC Object | 120 Parameter | 3: Pickup From | 3 Scale | 1.0000E+000 Offset | 0.0000E+000 | Column Parameter −6 |
| Surf | 1 NSC Object | 120 Parameter | 5: Pickup From | 23 Scale | 1.0000E+000 Offset | 0.0000E+000 | Column Parameter −6 |
| Surf | 1 NSC Object | 120 Parameter | 6: Pickup From | 3 Scale | 1.0000E+000 Offset | 0.0000E+000 | Column Parameter −6 |
| Surf | 1 NSC Object | 120 Parameter | 7: Pickup From | 3 Scale | 1.0000E+000 Offset | 0.0000E+000 | Column Parameter −6 |
| Surf | 1 NSC Object | 120 Parameter | 8: Pickup From | 3 Scale | 1.0000E+000 Offset | 0.0000E+000 | Column Parameter −6 |
| Surf | 1 NSC Object | 121 Position | Y: Pickup From | 4 Scale | 1.0000E+000 Offset | 0.0000E+000 | Column Parameter −6 |
| Surf | 1 NSC Object | 121 Parameter | 1: Pickup From | 3 Scale | 1.0000E+000 Offset | 0.0000E+000 | Column Parameter −6 |
| Surf | 1 NSC Object | 121 Parameter | 2: Pickup From | 3 Scale | 1.0000E+000 Offset | 0.0000E+000 | Column Parameter −6 |
| Surf | 1 NSC Object | 121 Parameter | 3: Pickup From | 3 Scale | 1.0000E+000 Offset | 0.0000E+000 | Column Parameter −6 |
| Surf | 1 NSC Object | 121 Parameter | 5: Pickup From | 23 Scale | 1.0000E+000 Offset | 0.0000E+000 | Column Parameter −6 |
| Surf | 1 NSC Object | 121 Parameter | 6: Pickup From | 3 Scale | 1.0000E+000 Offset | 0.0000E+000 | Column Parameter −6 |
| Surf | 1 NSC Object | 121 Parameter | 7: Pickup From | 3 Scale | 1.0000E+000 Offset | 0.0000E+000 | Column Parameter −6 |
| Surf | 1 NSC Object | 121 Parameter | 8: Pickup From | 3 Scale | 1.0000E+000 Offset | 0.0000E+000 | Column Parameter −6 |
| Surf | 1 NSC Object | 122 Position | Y: Pickup From | 4 Scale | −1.0000E+000 Offset | 0.0000E+000 | Column Parameter −6 |
| Surf | 1 NSC Object | 122 Parameter | 1: Pickup From | 3 Scale | 1.0000E+000 Offset | 0.0000E+000 | Column Parameter −6 |
| Surf | 1 NSC Object | 122 Parameter | 2: Pickup From | 3 Scale | 1.0000E+000 Offset | 0.0000E+000 | Column Parameter −6 |
| Surf | 1 NSC Object | 122 Parameter | 3: Pickup From | 3 Scale | 1.0000E+000 Offset | 0.0000E+000 | Column Parameter −6 |
| Surf | 1 NSC Object | 122 Parameter | 5: Pickup From | 23 Scale | 1.0000E+000 Offset | 0.0000E+000 | Column Parameter −6 |
| Surf | 1 NSC Object | 122 Parameter | 6: Pickup From | 3 Scale | 1.0000E+000 Offset | 0.0000E+000 | Column Parameter −6 |
| Surf | 1 NSC Object | 122 Parameter | 7: Pickup From | 3 Scale | 1.0000E+000 Offset | 0.0000E+000 | Column Parameter −6 |
| Surf | 1 NSC Object | 122 Parameter | 8: Pickup From | 3 Scale | 1.0000E+000 Offset | 0.0000E+000 | Column Parameter −6 |
| Surf | 1 NSC Object | 123 Position | Y: Pickup From | 4 Scale | −1.0000E+000 Offset | 0.0000E+000 | Column Parameter −6 |
| Surf | 1 NSC Object | 123 Parameter | 1: Pickup From | 3 Scale | 1.0000E+000 Offset | 0.0000E+000 | Column Parameter −6 |
| Surf | 1 NSC Object | 123 Parameter | 2: Pickup From | 3 Scale | 1.0000E+000 Offset | 0.0000E+000 | Column Parameter −6 |
| Surf | 1 NSC Object | 123 Parameter | 3: Pickup From | 3 Scale | 1.0000E+000 Offset | 0.0000E+000 | Column Parameter −6 |
| Surf | 1 NSC Object | 123 Parameter | 5: Pickup From | 23 Scale | 1.0000E+000 Offset | 0.0000E+000 | Column Parameter −6 |
| Surf | 1 NSC Object | 123 Parameter | 6: Pickup From | 3 Scale | 1.0000E+000 Offset | 0.0000E+000 | Column Parameter −6 |
| Surf | 1 NSC Object | 123 Parameter | 7: Pickup From | 3 Scale | 1.0000E+000 Offset | 0.0000E+000 | Column Parameter −6 |
| Surf | 1 NSC Object | 123 Parameter | 8: Pickup From | 3 Scale | 1.0000E+000 Offset | 0.0000E+000 | Column Parameter −6 |
| Surf | 1 NSC Object | 124 Position | Y: Pickup From | 4 Scale | −1.0000E+000 Offset | 0.0000E+000 | Column Parameter −6 |
| Surf | 1 NSC Object | 124 Parameter | 1: Pickup From | 3 Scale | 1.0000E+000 Offset | 0.0000E+000 | Column Parameter −6 |
| Surf | 1 NSC Object | 124 Parameter | 2: Pickup From | 3 Scale | 1.0000E+000 Offset | 0.0000E+000 | Column Parameter −6 |
| Surf | 1 NSC Object | 124 Parameter | 3: Pickup From | 3 Scale | 1.0000E+000 Offset | 0.0000E+000 | Column Parameter −6 |
| Surf | 1 NSC Object | 124 Parameter | 5: Pickup From | 23 Scale | 1.0000E+000 Offset | 0.0000E+000 | Column Parameter −6 |
| Surf | 1 NSC Object | 124 Parameter | 6: Pickup From | 3 Scale | 1.0000E+000 Offset | 0.0000E+000 | Column Parameter −6 |
| Surf | 1 NSC Object | 124 Parameter | 7: Pickup From | 3 Scale | 1.0000E+000 Offset | 0.0000E+000 | Column Parameter −6 |
| Surf | 1 NSC Object | 124 Parameter | 8: Pickup From | 3 Scale | 1.0000E+000 Offset | 0.0000E+000 | Column Parameter −6 |
| Surf | 1 NSC Object | 125 Position | Y: Pickup From | 4 Scale | −1.0000E+000 Offset | 0.0000E+000 | Column Parameter −6 |
| Surf | 1 NSC Object | 125 Parameter | 1: Pickup From | 3 Scale | 1.0000E+000 Offset | 0.0000E+000 | Column Parameter −6 |
| Surf | 1 NSC Object | 125 Parameter | 2: Pickup From | 3 Scale | 1.0000E+000 Offset | 0.0000E+000 | Column Parameter −6 |
| Surf | 1 NSC Object | 125 Parameter | 3: Pickup From | 3 Scale | 1.0000E+000 Offset | 0.0000E+000 | Column Parameter −6 |
| Surf | 1 NSC Object | 125 Parameter | 5: Pickup From | 23 Scale | 1.0000E+000 Offset | 0.0000E+000 | Column Parameter −6 |
| Surf | 1 NSC Object | 125 Parameter | 6: Pickup From | 3 Scale | 1.0000E+000 Offset | 0.0000E+000 | Column Parameter −6 |
| Surf | 1 NSC Object | 125 Parameter | 7: Pickup From | 3 Scale | 1.0000E+000 Offset | 0.0000E+000 | Column Parameter −6 |
| Surf | 1 NSC Object | 125 Parameter | 8: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 127 Position | X: Pickup From | 2 Scale | 6.0000E+000 Offset | 0.0000E+000 | Column Parameter −6 |
| Surf | 1 NSC Object | 127 Parameter | 1: Pickup From | 3 Scale | 1.0000E+000 Offset | 0.0000E+000 | Column Parameter −6 |
| Surf | 1 NSC Object | 127 Parameter | 2: Pickup From | 3 Scale | 1.0000E+000 Offset | 0.0000E+000 | Column Parameter −6 |
| Surf | 1 NSC Object | 127 Parameter | 3: Pickup From | 3 Scale | 1.0000E+000 Offset | 0.0000E+000 | Column Parameter −6 |
| Surf | 1 NSC Object | 127 Parameter | 6: Pickup From | 3 Scale | 1.0000E+000 Offset | 0.0000E+000 | Column Parameter −6 |
| Surf | 1 NSC Object | 127 Parameter | 7: Pickup From | 3 Scale | 1.0000E+000 Offset | 0.0000E+000 | Column Parameter −6 |
| Surf | 1 NSC Object | 127 Parameter | 8: Pickup From | 3 Scale | 1.0000E+000 Offset | 0.0000E+000 | Column Parameter −6 |
| Surf | 1 NSC Object | 128 Position | Y: Pickup From | 4 Scale | 1.0000E+000 Offset | 0.0000E+000 | Column Parameter −6 |
| Surf | 1 NSC Object | 128 Parameter | 1: Pickup From | 3 Scale | 1.0000E+000 Offset | 0.0000E+000 | Column Parameter −6 |
| Surf | 1 NSC Object | 128 Parameter | 2: Pickup From | 3 Scale | 1.0000E+000 Offset | 0.0000E+000 | Column Parameter −6 |
| Surf | 1 NSC Object | 128 Parameter | 3: Pickup From | 3 Scale | 1.0000E+000 Offset | 0.0000E+000 | Column Parameter −6 |
| Surf | 1 NSC Object | 128 Parameter | 5: Pickup From | 33 Scale | 1.0000E+000 Offset | 0.0000E+000 | Column Parameter −6 |
| Surf | 1 NSC Object | 128 Parameter | 6: Pickup From | 3 Scale | 1.0000E+000 Offset | 0.0000E+000 | Column Parameter −6 |
| Surf | 1 NSC Object | 128 Parameter | 7: Pickup From | 3 Scale | 1.0000E+000 Offset | 0.0000E+000 | Column Parameter −6 |
| Surf | 1 NSC Object | 128 Parameter | 8: Pickup From | 3 Scale | 1.0000E+000 Offset | 0.0000E+000 | Column Parameter −6 |
| Surf | 1 NSC Object | 129 Position | Y: Pickup From | 4 Scale | 1.0000E+000 Offset | 0.0000E+000 | Column Parameter −6 |
| Surf | 1 NSC Object | 129 Parameter | 1: Pickup From | 3 Scale | 1.0000E+000 Offset | 0.0000E+000 | Column Parameter −6 |
| Surf | 1 NSC Object | 129 Parameter | 2: Pickup From | 3 Scale | 1.0000E+000 Offset | 0.0000E+000 | Column Parameter −6 |
| Surf | 1 NSC Object | 129 Parameter | 3: Pickup From | 3 Scale | 1.0000E+000 Offset | 0.0000E+000 | Column Parameter −6 |
| Surf | 1 NSC Object | 129 Parameter | 5: Pickup From | 33 Scale | 1.0000E+000 Offset | 0.0000E+000 | Column Parameter −6 |
| Surf | 1 NSC Object | 129 Parameter | 6: Pickup From | 3 Scale | 1.0000E+000 Offset | 0.0000E+000 | Column Parameter −6 |
| Surf | 1 NSC Object | 129 Parameter | 7: Pickup From | 3 Scale | 1.0000E+000 Offset | 0.0000E+000 | Column Parameter −6 |
| Surf | 1 NSC Object | 129 Parameter | 8: Pickup From | 3 Scale | 1.0000E+000 Offset | 0.0000E+000 | Column Parameter −6 |
| Surf | 1 NSC Object | 130 Position | Y: Pickup From | 4 Scale | 1.0000E+000 Offset | 0.0000E+000 | Column Parameter −6 |
| Surf | 1 NSC Object | 130 Parameter | 1: Pickup From | 3 Scale | 1.0000E+000 Offset | 0.0000E+000 | Column Parameter −6 |
| Surf | 1 NSC Object | 130 Parameter | 2: Pickup From | 3 Scale | 1.0000E+000 Offset | 0.0000E+000 | Column Parameter −6 |
| Surf | 1 NSC Object | 130 Parameter | 3: Pickup From | 3 Scale | 1.0000E+000 Offset | 0.0000E+000 | Column Parameter −6 |
| Surf | 1 NSC Object | 130 Parameter | 5: Pickup From | 33 Scale | 1.0000E+000 Offset | 0.0000E+000 | Column Parameter −6 |
| Surf | 1 NSC Object | 130 Parameter | 6: Pickup From | 3 Scale | 1.0000E+000 Offset | 0.0000E+000 | Column Parameter −6 |
| Surf | 1 NSC Object | 130 Parameter | 7: Pickup From | 3 Scale | 1.0000E+000 Offset | 0.0000E+000 | Column Parameter −6 |
| Surf | 1 NSC Object | 130 Parameter | 8: Pickup From | 3 Scale | 1.0000E+000 Offset | 0.0000E+000 | Column Parameter −6 |
| Surf | 1 NSC Object | 131 Position | Y: Pickup From | 4 Scale | 1.0000E+000 Offset | 0.0000E+000 | Column Parameter −6 |
| Surf | 1 NSC Object | 132 Position | Y: Pickup From | 4 Scale | −1.0000E+000 Offset | 0.0000E+000 | Column Parameter −6 |
| Surf | 1 NSC Object | 132 Parameter | 1: Pickup From | 3 Scale | 1.0000E+000 Offset | 0.0000E+000 | Column Parameter −6 |
| Surf | 1 NSC Object | 132 Parameter | 2: Pickup From | 3 Scale | 1.0000E+000 Offset | 0.0000E+000 | Column Parameter −6 |
| Surf | 1 NSC Object | 132 Parameter | 3: Pickup From | 3 Scale | 1.0000E+000 Offset | 0.0000E+000 | Column Parameter −6 |
| Surf | 1 NSC Object | 132 Parameter | 5: Pickup From | 33 Scale | 1.0000E+000 Offset | 0.0000E+000 | Column Parameter −6 |
| Surf | 1 NSC Object | 132 Parameter | 6: Pickup From | 3 Scale | 1.0000E+000 Offset | 0.0000E+000 | Column Parameter −6 |
| Surf | 1 NSC Object | 132 Parameter | 7: Pickup From | 3 Scale | 1.0000E+000 Offset | 0.0000E+000 | Column Parameter −6 |
| Surf | 1 NSC Object | 132 Parameter | 8: Pickup From | 3 Scale | 1.0000E+000 Offset | 0.0000E+000 | Column Parameter −6 |
| Surf | 1 NSC Object | 133 Position | Y: Pickup From | 4 Scale | −1.0000E+000 Offset | 0.0000E+000 | Column Parameter −6 |
| Surf | 1 NSC Object | 133 Parameter | 1: Pickup From | 3 Scale | 1.0000E+000 Offset | 0.0000E+000 | Column Parameter −6 |
| Surf | 1 NSC Object | 133 Parameter | 2: Pickup From | 3 Scale | 1.0000E+000 Offset | 0.0000E+000 | Column Parameter −6 |
| Surf | 1 NSC Object | 133 Parameter | 3: Pickup From | 3 Scale | 1.0000E+000 Offset | 0.0000E+000 | Column Parameter −6 |
| Surf | 1 NSC Object | 133 Parameter | 5: Pickup From | 33 Scale | 1.0000E+000 Offset | 0.0000E+000 | Column Parameter −6 |
| Surf | 1 NSC Object | 133 Parameter | 6: Pickup From | 3 Scale | 1.0000E+000 Offset | 0.0000E+000 | Column Parameter −6 |
| Surf | 1 NSC Object | 133 Parameter | 7: Pickup From | 3 Scale | 1.0000E+000 Offset | 0.0000E+000 | Column Parameter −6 |
| Surf | 1 NSC Object | 133 Parameter | 8: Pickup From | 3 Scale | 1.0000E+000 Offset | 0.0000E+000 | Column Parameter −6 |
| Surf | 1 NSC Object | 134 Position | Y: Pickup From | 4 Scale | −1.0000E+000 Offset | 0.0000E+000 | Column Parameter −6 |
| Surf | 1 NSC Object | 134 Parameter | 1: Pickup From | 3 Scale | 1.0000E+000 Offset | 0.0000E+000 | Column Parameter −6 |
| Surf | 1 NSC Object | 134 Parameter | 2: Pickup From | 3 Scale | 1.0000E+000 Offset | 0.0000E+000 | Column Parameter −6 |
| Surf | 1 NSC Object | 134 Parameter | 3: Pickup From | 3 Scale | 1.0000E+000 Offset | 0.0000E+000 | Column Parameter −6 |
| Surf | 1 NSC Object | 134 Parameter | 5: Pickup From | 33 Scale | 1.0000E+000 Offset | 0.0000E+000 | Column Parameter −6 |
| Surf | 1 NSC Object | 134 Parameter | 6: Pickup From | 3 Scale | 1.0000E+000 Offset | 0.0000E+000 | Column Parameter −6 |
| Surf | 1 NSC Object | 134 Parameter | 7: Pickup From | 3 Scale | 1.0000E+000 Offset | 0.0000E+000 | Column Parameter −6 |
| Surf | 1 NSC Object | 134 Parameter | 8: Pickup From | 3 Scale | 1.0000E+000 Offset | 0.0000E+000 | Column Parameter −6 |
| Surf | 1 NSC Object | 135 Position | Y: Pickup From | 4 Scale | −1.0000E+000 Offset | 0.0000E+000 | Column Parameter −6 |
| Surf | 1 NSC Object | 137 Position | X: Pickup From | 2 Scale | 8.0000E+000 Offset | 0.0000E+000 | Column Parameter −6 |
| Surf | 1 NSC Object | 137 Parameter | 1: Pickup From | 3 Scale | 1.0000E+000 Offset | 0.0000E+000 | Column Parameter −6 |
| Surf | 1 NSC Object | 137 Parameter | 2: Pickup From | 3 Scale | 1.0000E+000 Offset | 0.0000E+000 | Column Parameter −6 |
| Surf | 1 NSC Object | 137 Parameter | 3: Pickup From | 3 Scale | 1.0000E+000 Offset | 0.0000E+000 | Column Parameter −6 |
| Surf | 1 NSC Object | 137 Parameter | 6: Pickup From | 3 Scale | 1.0000E+000 Offset | 0.0000E+000 | Column Parameter −6 |
| Surf | 1 NSC Object | 137 Parameter | 7: Pickup From | 3 Scale | 1.0000E+000 Offset | 0.0000E+000 | Column Parameter −6 |
| Surf | 1 NSC Object | 137 Parameter | 8: Pickup From | 3 Scale | 1.0000E+000 Offset | 0.0000E+000 | Column Parameter −6 |
| Surf | 1 NSC Object | 138 Position | Y: Pickup From | 4 Scale | 1.0000E+000 Offset | 0.0000E+000 | Column Parameter −6 |
| Surf | 1 NSC Object | 138 Parameter | 2: Pickup From | 3 Scale | 1.0000E+000 Offset | 0.0000E+000 | Column Parameter −6 |
| Surf | 1 NSC Object | 138 Parameter | 3: Pickup From | 3 Scale | 1.0000E+000 Offset | 0.0000E+000 | Column Parameter −6 |
| Surf | 1 NSC Object | 138 Parameter | 5: Pickup From | 43 Scale | 1.0000E+000 Offset | 0.0000E+000 | Column Parameter −6 |
| Surf | 1 NSC Object | 138 Parameter | 6: Pickup From | 3 Scale | 1.0000E+000 Offset | 0.0000E+000 | Column Parameter −6 |
| Surf | 1 NSC Object | 138 Parameter | 7: Pickup From | 3 Scale | 1.0000E+000 Offset | 0.0000E+000 | Column Parameter −6 |
| Surf | 1 NSC Object | 138 Parameter | 8: Pickup From | 3 Scale | 1.0000E+000 Offset | 0.0000E+000 | Column Parameter −6 |
| Surf | 1 NSC Object | 139 Position | Y: Pickup From | 4 Scale | 1.0000E+000 Offset | 0.0000E+000 | Column Parameter −6 |
| Surf | 1 NSC Object | 139 Parameter | 1: Pickup From | 3 Scale | 1.0000E+000 Offset | 0.0000E+000 | Column Parameter −6 |
| Surf | 1 NSC Object | 139 Parameter | 2: Pickup From | 3 Scale | 1.0000E+000 Offset | 0.0000E+000 | Column Parameter −6 |
| Surf | 1 NSC Object | 139 Parameter | 3: Pickup From | 3 Scale | 1.0000E+000 Offset | 0.0000E+000 | Column Parameter −6 |
| Surf | 1 NSC Object | 139 Parameter | 5: Pickup From | 43 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 139 Parameter | 6: Pickup From | 3 Scale | 1.0000E+000 Offset | 0.0000E+000 | Column Parameter −6 |
| Surf | 1 NSC Object | 139 Parameter | 7: Pickup From | 3 Scale | 1.0000E+000 Offset | 0.0000E+000 | Column Parameter −6 |
| Surf | 1 NSC Object | 139 Parameter | 8: Pickup From | 3 Scale | 1.0000E+000 Offset | 0.0000E+000 | Column Parameter −6 |
| Surf | 1 NSC Object | 140 Position | Y: Pickup From | 4 Scale | 1.0000E+000 Offset | 0.0000E+000 | Column Parameter −6 |
| Surf | 1 NSC Object | 141 Position | Y: Pickup From | 4 Scale | 1.0000E+000 Offset | 0.0000E+000 | Column Parameter −6 |
| Surf | 1 NSC Object | 142 Position | Y: Pickup From | 4 Scale | −1.0000E+000 Offset | 0.0000E+000 | Column Parameter −6 |
| Surf | 1 NSC Object | 142 Parameter | 1: Pickup From | 3 Scale | 1.0000E+000 Offset | 0.0000E+000 | Column Parameter −6 |
| Surf | 1 NSC Object | 142 Parameter | 2: Pickup From | 3 Scale | 1.0000E+000 Offset | 0.0000E+000 | Column Parameter −6 |
| Surf | 1 NSC Object | 142 Parameter | 3: Pickup From | 3 Scale | 1.0000E+000 Offset | 0.0000E+000 | Column Parameter −6 |
| Surf | 1 NSC Object | 142 Parameter | 5: Pickup From | 43 Scale | 1.0000E+000 Offset | 0.0000E+000 | Column Parameter −6 |
| Surf | 1 NSC Object | 142 Parameter | 6: Pickup From | 3 Scale | 1.0000E+000 Offset | 0.0000E+000 | Column Parameter −6 |
| Surf | 1 NSC Object | 142 Parameter | 7: Pickup From | 3 Scale | 1.0000E+000 Offset | 0.0000E+000 | Column Parameter −6 |
| Surf | 1 NSC Object | 142 Parameter | 8: Pickup From | 3 Scale | 1.0000E+000 Offset | 0.0000E+000 | Column Parameter −6 |
| Surf | 1 NSC Object | 143 Position | Y: Pickup From | 4 Scale | −1.0000E+000 Offset | 0.0000E+000 | Column Parameter −6 |
| Surf | 1 NSC Object | 143 Parameter | 1: Pickup From | 3 Scale | 1.0000E+000 Offset | 0.0000E+000 | Column Parameter −6 |
| Surf | 1 NSC Object | 143 Parameter | 2: Pickup From | 3 Scale | 1.0000E+000 Offset | 0.0000E+000 | Column Parameter −6 |
| Surf | 1 NSC Object | 143 Parameter | 3: Pickup From | 3 Scale | 1.0000E+000 Offset | 0.0000E+000 | Column Parameter −6 |
| Surf | 1 NSC Object | 143 Parameter | 5: Pickup From | 43 Scale | 1.0000E+000 Offset | 0.0000E+000 | Column Parameter −6 |
| Surf | 1 NSC Object | 143 Parameter | 6: Pickup From | 3 Scale | 1.0000E+000 Offset | 0.0000E+000 | Column Parameter −6 |
| Surf | 1 NSC Object | 143 Parameter | 7: Pickup From | 3 Scale | 1.0000E+000 Offset | 0.0000E+000 | Column Parameter −6 |
| Surf | 1 NSC Object | 143 Parameter | 8: Pickup From | 3 Scale | 1.0000E+000 Offset | 0.0000E+000 | Column Parameter −6 |
| Surf | 1 NSC Object | 144 Position | Y: Pickup From | 4 Scale | −1.0000E+000 Offset | 0.0000E+000 | Column Parameter −6 |
| Surf | 1 NSC Object | 145 Position | Y: Pickup From | 4 Scale | −1.0000E+000 Offset | 0.0000E+000 | Column Parameter −6 |
| Surf | 1 NSC Object | 147 Position | X: Pickup From | 2 Scale | −2.0000E+000 Offset | 0.0000E+000 | Column Parameter −6 |
| Surf | 1 NSC Object | 147 Parameter | 1: Pickup From | 3 Scale | 1.0000E+000 Offset | 0.0000E+000 | Column Parameter −6 |
| Surf | 1 NSC Object | 147 Parameter | 2: Pickup From | 3 Scale | 1.0000E+000 Offset | 0.0000E+000 | Column Parameter −6 |
| Surf | 1 NSC Object | 147 Parameter | 3: Pickup From | 3 Scale | 1.0000E+000 Offset | 0.0000E+000 | Column Parameter −6 |
| Surf | 1 NSC Object | 147 Parameter | 6: Pickup From | 3 Scale | 1.0000E+000 Offset | 0.0000E+000 | Column Parameter −6 |
| Surf | 1 NSC Object | 147 Parameter | 7: Pickup From | 3 Scale | 1.0000E+000 Offset | 0.0000E+000 | Column Parameter −6 |
| Surf | 1 NSC Object | 147 Parameter | 8: Pickup From | 3 Scale | 1.0000E+000 Offset | 0.0000E+000 | Column Parameter −6 |
| Surf | 1 NSC Object | 148 Position | Y: Pickup From | 4 Scale | 1.0000E+000 Offset | 0.0000E+000 | Column Parameter −6 |
| Surf | 1 NSC Object | 148 Parameter | 1: Pickup From | 3 Scale | 1.0000E+000 Offset | 0.0000E+000 | Column Parameter −6 |
| Surf | 1 NSC Object | 148 Parameter | 2: Pickup From | 3 Scale | 1.0000E+000 Offset | 0.0000E+000 | Column Parameter −6 |
| Surf | 1 NSC Object | 148 Parameter | 3: Pickup From | 3 Scale | 1.0000E+000 Offset | 0.0000E+000 | Column Parameter −6 |
| Surf | 1 NSC Object | 148 Parameter | 5: Pickup From | 53 Scale | 1.0000E+000 Offset | 0.0000E+000 | Column Parameter −6 |
| Surf | 1 NSC Object | 148 Parameter | 6: Pickup From | 3 Scale | 1.0000E+000 Offset | 0.0000E+000 | Column Parameter −6 |
| Surf | 1 NSC Object | 148 Parameter | 7: Pickup From | 3 Scale | 1.0000E+000 Offset | 0.0000E+000 | Column Parameter −6 |
| Surf | 1 NSC Object | 148 Parameter | 8: Pickup From | 3 Scale | 1.0000E+000 Offset | 0.0000E+000 | Column Parameter −6 |
| Surf | 1 NSC Object | 149 Position | Y: Pickup From | 4 Scale | 1.0000E+000 Offset | 0.0000E+000 | Column Parameter −6 |
| Surf | 1 NSC Object | 149 Parameter | 1: Pickup From | 3 Scale | 1.0000E+000 Offset | 0.0000E+000 | Column Parameter −6 |
| Surf | 1 NSC Object | 149 Parameter | 2: Pickup From | 3 Scale | 1.0000E+000 Offset | 0.0000E+000 | Column Parameter −6 |
| Surf | 1 NSC Object | 149 Parameter | 3: Pickup From | 3 Scale | 1.0000E+000 Offset | 0.0000E+000 | Column Parameter −6 |
| Surf | 1 NSC Object | 149 Parameter | 5: Pickup From | 53 Scale | 1.0000E+000 Offset | 0.0000E+000 | Column Parameter −6 |
| Surf | 1 NSC Object | 149 Parameter | 6: Pickup From | 3 Scale | 1.0000E+000 Offset | 0.0000E+000 | Column Parameter −6 |
| Surf | 1 NSC Object | 149 Parameter | 7: Pickup From | 3 Scale | 1.0000E+000 Offset | 0.0000E+000 | Column Parameter −6 |
| Surf | 1 NSC Object | 149 Parameter | 8: Pickup From | 3 Scale | 1.0000E+000 Offset | 0.0000E+000 | Column Parameter −6 |
| Surf | 1 NSC Object | 150 Position | Y: Pickup From | 4 Scale | 1.0000E+000 Offset | 0.0000E+000 | Column Parameter −6 |
| Surf | 1 NSC Object | 150 Parameter | 1: Pickup From | 3 Scale | 1.0000E+000 Offset | 0.0000E+000 | Column Parameter −6 |
| Surf | 1 NSC Object | 150 Parameter | 2: Pickup From | 3 Scale | 1.0000E+000 Offset | 0.0000E+000 | Column Parameter −6 |
| Surf | 1 NSC Object | 150 Parameter | 3: Pickup From | 3 Scale | 1.0000E+000 Offset | 0.0000E+000 | Column Parameter −6 |
| Surf | 1 NSC Object | 150 Parameter | 5: Pickup From | 53 Scale | 1.0000E+000 Offset | 0.0000E+000 | Column Parameter −6 |
| Surf | 1 NSC Object | 150 Parameter | 6: Pickup From | 3 Scale | 1.0000E+000 Offset | 0.0000E+000 | Column Parameter −6 |
| Surf | 1 NSC Object | 150 Parameter | 7: Pickup From | 3 Scale | 1.0000E+000 Offset | 0.0000E+000 | Column Parameter −6 |
| Surf | 1 NSC Object | 150 Parameter | 8: Pickup From | 3 Scale | 1.0000E+000 Offset | 0.0000E+000 | Column Parameter −6 |
| Surf | 1 NSC Object | 151 Position | Y: Pickup From | 4 Scale | 1.0000E+000 Offset | 0.0000E+000 | Column Parameter −6 |
| Surf | 1 NSC Object | 151 Parameter | 1: Pickup From | 3 Scale | 1.0000E+000 Offset | 0.0000E+000 | Column Parameter −6 |
| Surf | 1 NSC Object | 151 Parameter | 2: Pickup From | 3 Scale | 1.0000E+000 Offset | 0.0000E+000 | Column Parameter −6 |
| Surf | 1 NSC Object | 151 Parameter | 3: Pickup From | 3 Scale | 1.0000E+000 Offset | 0.0000E+000 | Column Parameter −6 |
| Surf | 1 NSC Object | 151 Parameter | 5: Pickup From | 53 Scale | 1.0000E+000 Offset | 0.0000E+000 | Column Parameter −6 |
| Surf | 1 NSC Object | 151 Parameter | 6: Pickup From | 3 Scale | 1.0000E+000 Offset | 0.0000E+000 | Column Parameter −6 |
| Surf | 1 NSC Object | 151 Parameter | 7: Pickup From | 3 Scale | 1.0000E+000 Offset | 0.0000E+000 | Column Parameter −6 |
| Surf | 1 NSC Object | 151 Parameter | 8: Pickup From | 3 Scale | 1.0000E+000 Offset | 0.0000E+000 | Column Parameter −6 |
| Surf | 1 NSC Object | 152 Position | Y: Pickup From | 4 Scale | −1.0000E+000 Offset | 0.0000E+000 | Column Parameter −6 |
| Surf | 1 NSC Object | 152 Parameter | 1: Pickup From | 3 Scale | 1.0000E+000 Offset | 0.0000E+000 | Column Parameter −6 |
| Surf | 1 NSC Object | 152 Parameter | 2: Pickup From | 3 Scale | 1.0000E+000 Offset | 0.0000E+000 | Column Parameter −6 |
| Surf | 1 NSC Object | 152 Parameter | 3: Pickup From | 3 Scale | 1.0000E+000 Offset | 0.0000E+000 | Column Parameter −6 |
| Surf | 1 NSC Object | 152 Parameter | 5: Pickup From | 53 Scale | 1.0000E+000 Offset | 0.0000E+000 | Column Parameter −6 |
| Surf | 1 NSC Object | 152 Parameter | 6: Pickup From | 3 Scale | 1.0000E+000 Offset | 0.0000E+000 | Column Parameter −6 |
| Surf | 1 NSC Object | 152 Parameter | 7: Pickup From | 3 Scale | 1.0000E+000 Offset | 0.0000E+000 | Column Parameter −6 |
| Surf | 1 NSC Object | 152 Parameter | 8: Pickup From | 3 Scale | 1.0000E+000 Offset | 0.0000E+000 | Column Parameter −6 |
| Surf | 1 NSC Object | 153 Position | Y: Pickup From | 4 Scale | −1.0000E+000 Offset | 0.0000E+000 | Column Parameter −6 |
| Surf | 1 NSC Object | 153 Parameter | 1: Pickup From | 3 Scale | 1.0000E+000 Offset | 0.0000E+000 | Column Parameter −6 |
| Surf | 1 NSC Object | 153 Parameter | 2: Pickup From | 3 Scale | 1.0000E+000 Offset | 0.0000E+000 | Column Parameter −6 |
| Surf | 1 NSC Object | 153 Parameter | 3: Pickup From | 3 Scale | 1.0000E+000 Offset | 0.0000E+000 | Column Parameter −6 |
| Surf | 1 NSC Object | 153 Parameter | 5: Pickup From | 53 Scale | 1.0000E+000 Offset | 0.0000E+000 | Column Parameter −6 |
| Surf | 1 NSC Object | 153 Parameter | 6: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 153 Parameter | 7: Pickup From | 3 Scale | 1.0000E+000 Offset | 0.0000E+000 | Column Parameter −6 |
| Surf | 1 NSC Object | 153 Parameter | 8: Pickup From | 3 Scale | 1.0000E+000 Offset | 0.0000E+000 | Column Parameter −6 |
| Surf | 1 NSC Object | 154 Position | Y: Pickup From | 4 Scale | −1.0000E+000 Offset | 0.0000E+000 | Column Parameter −6 |
| Surf | 1 NSC Object | 154 Parameter | 1: Pickup From | 3 Scale | 1.0000E+000 Offset | 0.0000E+000 | Column Parameter −6 |
| Surf | 1 NSC Object | 154 Parameter | 2: Pickup From | 3 Scale | 1.0000E+000 Offset | 0.0000E+000 | Column Parameter −6 |
| Surf | 1 NSC Object | 154 Parameter | 3: Pickup From | 3 Scale | 1.0000E+000 Offset | 0.0000E+000 | Column Parameter −6 |
| Surf | 1 NSC Object | 154 Parameter | 5: Pickup From | 53 Scale | 1.0000E+000 Offset | 0.0000E+000 | Column Parameter −6 |
| Surf | 1 NSC Object | 154 Parameter | 6: Pickup From | 3 Scale | 1.0000E+000 Offset | 0.0000E+000 | Column Parameter −6 |
| Surf | 1 NSC Object | 154 Parameter | 7: Pickup From | 3 Scale | 1.0000E+000 Offset | 0.0000E+000 | Column Parameter −6 |
| Surf | 1 NSC Object | 154 Parameter | 8: Pickup From | 3 Scale | 1.0000E+000 Offset | 0.0000E+000 | Column Parameter −6 |
| Surf | 1 NSC Object | 155 Position | Y: Pickup From | 4 Scale | −1.0000E+000 Offset | 0.0000E+000 | Column Parameter −6 |
| Surf | 1 NSC Object | 155 Parameter | 1: Pickup From | 3 Scale | 1.0000E+000 Offset | 0.0000E+000 | Column Parameter −6 |
| Surf | 1 NSC Object | 155 Parameter | 2: Pickup From | 3 Scale | 1.0000E+000 Offset | 0.0000E+000 | Column Parameter −6 |
| Surf | 1 NSC Object | 155 Parameter | 3: Pickup From | 3 Scale | 1.0000E+000 Offset | 0.0000E+000 | Column Parameter −6 |
| Surf | 1 NSC Object | 155 Parameter | 5: Pickup From | 53 Scale | 1.0000E+000 Offset | 0.0000E+000 | Column Parameter −6 |
| Surf | 1 NSC Object | 155 Parameter | 6: Pickup From | 3 Scale | 1.0000E+000 Offset | 0.0000E+000 | Column Parameter −6 |
| Surf | 1 NSC Object | 155 Parameter | 7: Pickup From | 3 Scale | 1.0000E+000 Offset | 0.0000E+000 | Column Parameter −6 |
| Surf | 1 NSC Object | 155 Parameter | 8: Pickup From | 3 Scale | 1.0000E+000 Offset | 0.0000E+000 | Column Parameter −6 |
| Surf | 1 NSC Object | 157 Position | X: Pickup From | 2 Scale | −4.0000E+000 Offset | 0.0000E+000 | Column Parameter −6 |
| Surf | 1 NSC Object | 157 Parameter | 1: Pickup From | 3 Scale | 1.0000E+000 Offset | 0.0000E+000 | Column Parameter −6 |
| Surf | 1 NSC Object | 157 Parameter | 2: Pickup From | 3 Scale | 1.0000E+000 Offset | 0.0000E+000 | Column Parameter −6 |
| Surf | 1 NSC Object | 157 Parameter | 3: Pickup From | 3 Scale | 1.0000E+000 Offset | 0.0000E+000 | Column Parameter −6 |
| Surf | 1 NSC Object | 157 Parameter | 6: Pickup From | 3 Scale | 1.0000E+000 Offset | 0.0000E+000 | Column Parameter −6 |
| Surf | 1 NSC Object | 157 Parameter | 7: Pickup From | 3 Scale | 1.0000E+000 Offset | 0.0000E+000 | Column Parameter −6 |
| Surf | 1 NSC Object | 157 Parameter | 8: Pickup From | 3 Scale | 1.0000E+000 Offset | 0.0000E+000 | Column Parameter −6 |
| Surf | 1 NSC Object | 158 Position | Y: Pickup From | 4 Scale | 1.0000E+000 Offset | 0.0000E+000 | Column Parameter −6 |
| Surf | 1 NSC Object | 158 Parameter | 1: Pickup From | 3 Scale | 1.0000E+000 Offset | 0.0000E+000 | Column Parameter −6 |
| Surf | 1 NSC Object | 158 Parameter | 2: Pickup From | 3 Scale | 1.0000E+000 Offset | 0.0000E+000 | Column Parameter −6 |
| Surf | 1 NSC Object | 158 Parameter | 3: Pickup From | 3 Scale | 1.0000E+000 Offset | 0.0000E+000 | Column Parameter −6 |
| Surf | 1 NSC Object | 158 Parameter | 5: Pickup From | 63 Scale | 1.0000E+000 Offset | 0.0000E+000 | Column Parameter −6 |
| Surf | 1 NSC Object | 158 Parameter | 6: Pickup From | 3 Scale | 1.0000E+000 Offset | 0.0000E+000 | Column Parameter −6 |
| Surf | 1 NSC Object | 158 Parameter | 7: Pickup From | 3 Scale | 1.0000E+000 Offset | 0.0000E+000 | Column Parameter −6 |
| Surf | 1 NSC Object | 158 Parameter | 8: Pickup From | 3 Scale | 1.0000E+000 Offset | 0.0000E+000 | Column Parameter −6 |
| Surf | 1 NSC Object | 159 Position | Y: Pickup From | 4 Scale | 1.0000E+000 Offset | 0.0000E+000 | Column Parameter −6 |
| Surf | 1 NSC Object | 159 Parameter | 1: Pickup From | 3 Scale | 1.0000E+000 Offset | 0.0000E+000 | Column Parameter −6 |
| Surf | 1 NSC Object | 159 Parameter | 2: Pickup From | 3 Scale | 1.0000E+000 Offset | 0.0000E+000 | Column Parameter −6 |
| Surf | 1 NSC Object | 159 Parameter | 3: Pickup From | 3 Scale | 1.0000E+000 Offset | 0.0000E+000 | Column Parameter −6 |
| Surf | 1 NSC Object | 159 Parameter | 5: Pickup From | 63 Scale | 1.0000E+000 Offset | 0.0000E+000 | Column Parameter −6 |
| Surf | 1 NSC Object | 159 Parameter | 6: Pickup From | 3 Scale | 1.0000E+000 Offset | 0.0000E+000 | Column Parameter −6 |
| Surf | 1 NSC Object | 159 Parameter | 7: Pickup From | 3 Scale | 1.0000E+000 Offset | 0.0000E+000 | Column Parameter −6 |
| Surf | 1 NSC Object | 159 Parameter | 8: Pickup From | 3 Scale | 1.0000E+000 Offset | 0.0000E+000 | Column Parameter −6 |
| Surf | 1 NSC Object | 160 Position | Y: Pickup From | 4 Scale | 1.0000E+000 Offset | 0.0000E+000 | Column Parameter −6 |
| Surf | 1 NSC Object | 160 Parameter | 1: Pickup From | 3 Scale | 1.0000E+000 Offset | 0.0000E+000 | Column Parameter −6 |
| Surf | 1 NSC Object | 160 Parameter | 2: Pickup From | 3 Scale | 1.0000E+000 Offset | 0.0000E+000 | Column Parameter −6 |
| Surf | 1 NSC Object | 160 Parameter | 3: Pickup From | 3 Scale | 1.0000E+000 Offset | 0.0000E+000 | Column Parameter −6 |
| Surf | 1 NSC Object | 160 Parameter | 5: Pickup From | 63 Scale | 1.0000E+000 Offset | 0.0000E+000 | Column Parameter −6 |
| Surf | 1 NSC Object | 160 Parameter | 6: Pickup From | 3 Scale | 1.0000E+000 Offset | 0.0000E+000 | Column Parameter −6 |
| Surf | 1 NSC Object | 160 Parameter | 7: Pickup From | 3 Scale | 1.0000E+000 Offset | 0.0000E+000 | Column Parameter −6 |
| Surf | 1 NSC Object | 160 Parameter | 8: Pickup From | 3 Scale | 1.0000E+000 Offset | 0.0000E+000 | Column Parameter −6 |
| Surf | 1 NSC Object | 161 Position | Y: Pickup From | 4 Scale | 1.0000E+000 Offset | 0.0000E+000 | Column Parameter −6 |
| Surf | 1 NSC Object | 161 Parameter | 1: Pickup From | 3 Scale | 1.0000E+000 Offset | 0.0000E+000 | Column Parameter −6 |
| Surf | 1 NSC Object | 161 Parameter | 2: Pickup From | 3 Scale | 1.0000E+000 Offset | 0.0000E+000 | Column Parameter −6 |
| Surf | 1 NSC Object | 161 Parameter | 3: Pickup From | 3 Scale | 1.0000E+000 Offset | 0.0000E+000 | Column Parameter −6 |
| Surf | 1 NSC Object | 161 Parameter | 5: Pickup From | 63 Scale | 1.0000E+000 Offset | 0.0000E+000 | Column Parameter −6 |
| Surf | 1 NSC Object | 161 Parameter | 6: Pickup From | 3 Scale | 1.0000E+000 Offset | 0.0000E+000 | Column Parameter −6 |
| Surf | 1 NSC Object | 161 Parameter | 7: Pickup From | 3 Scale | 1.0000E+000 Offset | 0.0000E+000 | Column Parameter −6 |
| Surf | 1 NSC Object | 161 Parameter | 8: Pickup From | 3 Scale | 1.0000E+000 Offset | 0.0000E+000 | Column Parameter −6 |
| Surf | 1 NSC Object | 162 Position | Y: Pickup From | 4 Scale | −1.0000E+000 Offset | 0.0000E+000 | Column Parameter −6 |
| Surf | 1 NSC Object | 162 Parameter | 1: Pickup From | 3 Scale | 1.0000E+000 Offset | 0.0000E+000 | Column Parameter −6 |
| Surf | 1 NSC Object | 162 Parameter | 2: Pickup From | 3 Scale | 1.0000E+000 Offset | 0.0000E+000 | Column Parameter −6 |
| Surf | 1 NSC Object | 162 Parameter | 3: Pickup From | 3 Scale | 1.0000E+000 Offset | 0.0000E+000 | Column Parameter −6 |
| Surf | 1 NSC Object | 162 Parameter | 5: Pickup From | 63 Scale | 1.0000E+000 Offset | 0.0000E+000 | Column Parameter −6 |
| Surf | 1 NSC Object | 162 Parameter | 6: Pickup From | 3 Scale | 1.0000E+000 Offset | 0.0000E+000 | Column Parameter −6 |
| Surf | 1 NSC Object | 162 Parameter | 7: Pickup From | 3 Scale | 1.0000E+000 Offset | 0.0000E+000 | Column Parameter −6 |
| Surf | 1 NSC Object | 162 Parameter | 8: Pickup From | 3 Scale | 1.0000E+000 Offset | 0.0000E+000 | Column Parameter −6 |
| Surf | 1 NSC Object | 163 Position | Y: Pickup From | 4 Scale | −1.0000E+000 Offset | 0.0000E+000 | Column Parameter −6 |
| Surf | 1 NSC Object | 163 Parameter | 1: Pickup From | 3 Scale | 1.0000E+000 Offset | 0.0000E+000 | Column Parameter −6 |
| Surf | 1 NSC Object | 163 Parameter | 2: Pickup From | 3 Scale | 1.0000E+000 Offset | 0.0000E+000 | Column Parameter −6 |
| Surf | 1 NSC Object | 163 Parameter | 3: Pickup From | 3 Scale | 1.0000E+000 Offset | 0.0000E+000 | Column Parameter −6 |
| Surf | 1 NSC Object | 163 Parameter | 5: Pickup From | 63 Scale | 1.0000E+000 Offset | 0.0000E+000 | Column Parameter −6 |
| Surf | 1 NSC Object | 163 Parameter | 6: Pickup From | 3 Scale | 1.0000E+000 Offset | 0.0000E+000 | Column Parameter −6 |
| Surf | 1 NSC Object | 163 Parameter | 7: Pickup From | 3 Scale | 1.0000E+000 Offset | 0.0000E+000 | Column Parameter −6 |
| Surf | 1 NSC Object | 163 Parameter | 8: Pickup From | 3 Scale | 1.0000E+000 Offset | 0.0000E+000 | Column Parameter −6 |
| Surf | 1 NSC Object | 164 Position | Y: Pickup From | 4 Scale | −1.0000E+000 Offset | 0.0000E+000 | Column Parameter −6 |
| Surf | 1 NSC Object | 164 Parameter | 1: Pickup From | 3 Scale | 1.0000E+000 Offset | 0.0000E+000 | Column Parameter −6 |
| Surf | 1 NSC Object | 164 Parameter | 2: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 164 Parameter | 3: Pickup From | 3 Scale | 1.0000E+000 Offset | 0.0000E+000 | Column Parameter −6 |
| Surf | 1 NSC Object | 164 Parameter | 5: Pickup From | 63 Scale | 1.0000E+000 Offset | 0.0000E+000 | Column Parameter −6 |
| Surf | 1 NSC Object | 164 Parameter | 6: Pickup From | 3 Scale | 1.0000E+000 Offset | 0.0000E+000 | Column Parameter −6 |
| Surf | 1 NSC Object | 164 Parameter | 7: Pickup From | 3 Scale | 1.0000E+000 Offset | 0.0000E+000 | Column Parameter −6 |
| Surf | 1 NSC Object | 164 Parameter | 8: Pickup From | 3 Scale | 1.0000E+000 Offset | 0.0000E+000 | Column Parameter −6 |
| Surf | 1 NSC Object | 165 Position | Y: Pickup From | 4 Scale | −1.0000E+000 Offset | 0.0000E+000 | Column Parameter −6 |
| Surf | 1 NSC Object | 165 Parameter | 1: Pickup From | 3 Scale | 1.0000E+000 Offset | 0.0000E+000 | Column Parameter −6 |
| Surf | 1 NSC Object | 165 Parameter | 2: Pickup From | 3 Scale | 1.0000E+000 Offset | 0.0000E+000 | Column Parameter −6 |
| Surf | 1 NSC Object | 165 Parameter | 3: Pickup From | 3 Scale | 1.0000E+000 Offset | 0.0000E+000 | Column Parameter −6 |
| Surf | 1 NSC Object | 165 Parameter | 5: Pickup From | 63 Scale | 1.0000E+000 Offset | 0.0000E+000 | Column Parameter −6 |
| Surf | 1 NSC Object | 165 Parameter | 6: Pickup From | 3 Scale | 1.0000E+000 Offset | 0.0000E+000 | Column Parameter −6 |
| Surf | 1 NSC Object | 165 Parameter | 7: Pickup From | 3 Scale | 1.0000E+000 Offset | 0.0000E+000 | Column Parameter −6 |
| Surf | 1 NSC Object | 165 Parameter | 8: Pickup From | 3 Scale | 1.0000E+000 Offset | 0.0000E+000 | Column Parameter −6 |
| Surf | 1 NSC Object | 167 Position | X: Pickup From | 2 Scale | −6.0000E+000 Offset | 0.0000E+000 | Column Parameter −6 |
| Surf | 1 NSC Object | 167 Parameter | 1: Pickup From | 3 Scale | 1.0000E+000 Offset | 0.0000E+000 | Column Parameter −6 |
| Surf | 1 NSC Object | 167 Parameter | 2: Pickup From | 3 Scale | 1.0000E+000 Offset | 0.0000E+000 | Column Parameter −6 |
| Surf | 1 NSC Object | 167 Parameter | 3: Pickup From | 3 Scale | 1.0000E+000 Offset | 0.0000E+000 | Column Parameter −6 |
| Surf | 1 NSC Object | 167 Parameter | 6: Pickup From | 3 Scale | 1.0000E+000 Offset | 0.0000E+000 | Column Parameter −6 |
| Surf | 1 NSC Object | 167 Parameter | 7: Pickup From | 3 Scale | 1.0000E+000 Offset | 0.0000E+000 | Column Parameter −6 |
| Surf | 1 NSC Object | 167 Parameter | 8: Pickup From | 3 Scale | 1.0000E+000 Offset | 0.0000E+000 | Column Parameter −6 |
| Surf | 1 NSC Object | 168 Position | Y: Pickup From | 4 Scale | 1.0000E+000 Offset | 0.0000E+000 | Column Parameter −6 |
| Surf | 1 NSC Object | 168 Parameter | 1: Pickup From | 3 Scale | 1.0000E+000 Offset | 0.0000E+000 | Column Parameter −6 |
| Surf | 1 NSC Object | 168 Parameter | 2: Pickup From | 3 Scale | 1.0000E+000 Offset | 0.0000E+000 | Column Parameter −6 |
| Surf | 1 NSC Object | 168 Parameter | 3: Pickup From | 3 Scale | 1.0000E+000 Offset | 0.0000E+000 | Column Parameter −6 |
| Surf | 1 NSC Object | 168 Parameter | 5: Pickup From | 73 Scale | 1.0000E+000 Offset | 0.0000E+000 | Column Parameter −6 |
| Surf | 1 NSC Object | 168 Parameter | 6: Pickup From | 3 Scale | 1.0000E+000 Offset | 0.0000E+000 | Column Parameter −6 |
| Surf | 1 NSC Object | 168 Parameter | 7: Pickup From | 3 Scale | 1.0000E+000 Offset | 0.0000E+000 | Column Parameter −6 |
| Surf | 1 NSC Object | 168 Parameter | 8: Pickup From | 3 Scale | 1.0000E+000 Offset | 0.0000E+000 | Column Parameter −6 |
| Surf | 1 NSC Object | 169 Position | Y: Pickup From | 4 Scale | 1.0000E+000 Offset | 0.0000E+000 | Column Parameter −6 |
| Surf | 1 NSC Object | 169 Parameter | 2: Pickup From | 3 Scale | 1.0000E+000 Offset | 0.0000E+000 | Column Parameter −6 |
| Surf | 1 NSC Object | 169 Parameter | 3: Pickup From | 3 Scale | 1.0000E+000 Offset | 0.0000E+000 | Column Parameter −6 |
| Surf | 1 NSC Object | 169 Parameter | 5: Pickup From | 73 Scale | 1.0000E+000 Offset | 0.0000E+000 | Column Parameter −6 |
| Surf | 1 NSC Object | 169 Parameter | 6: Pickup From | 3 Scale | 1.0000E+000 Offset | 0.0000E+000 | Column Parameter −6 |
| Surf | 1 NSC Object | 169 Parameter | 7: Pickup From | 3 Scale | 1.0000E+000 Offset | 0.0000E+000 | Column Parameter −6 |
| Surf | 1 NSC Object | 169 Parameter | 8: Pickup From | 3 Scale | 1.0000E+000 Offset | 0.0000E+000 | Column Parameter −6 |
| Surf | 1 NSC Object | 170 Position | Y: Pickup From | 4 Scale | 1.0000E+000 Offset | 0.0000E+000 | Column Parameter −6 |
| Surf | 1 NSC Object | 170 Parameter | 1: Pickup From | 3 Scale | 1.0000E+000 Offset | 0.0000E+000 | Column Parameter −6 |
| Surf | 1 NSC Object | 170 Parameter | 2: Pickup From | 3 Scale | 1.0000E+000 Offset | 0.0000E+000 | Column Parameter −6 |
| Surf | 1 NSC Object | 170 Parameter | 3: Pickup From | 3 Scale | 1.0000E+000 Offset | 0.0000E+000 | Column Parameter −6 |
| Surf | 1 NSC Object | 170 Parameter | 5: Pickup From | 73 Scale | 1.0000E+000 Offset | 0.0000E+000 | Column Parameter −6 |
| Surf | 1 NSC Object | 170 Parameter | 6: Pickup From | 3 Scale | 1.0000E+000 Offset | 0.0000E+000 | Column Parameter −6 |
| Surf | 1 NSC Object | 170 Parameter | 7: Pickup From | 3 Scale | 1.0000E+000 Offset | 0.0000E+000 | Column Parameter −6 |
| Surf | 1 NSC Object | 170 Parameter | 8: Pickup From | 3 Scale | 1.0000E+000 Offset | 0.0000E+000 | Column Parameter −6 |
| Surf | 1 NSC Object | 171 Position | Y: Pickup From | 4 Scale | 1.0000E+000 Offset | 0.0000E+000 | Column Parameter −6 |
| Surf | 1 NSC Object | 172 Position | Y: Pickup From | 4 Scale | −1.0000E+000 Offset | 0.0000E+000 | Column Parameter −6 |
| Surf | 1 NSC Object | 172 Parameter | 1: Pickup From | 3 Scale | 1.0000E+000 Offset | 0.0000E+000 | Column Parameter −6 |
| Surf | 1 NSC Object | 172 Parameter | 2: Pickup From | 3 Scale | 1.0000E+000 Offset | 0.0000E+000 | Column Parameter −6 |
| Surf | 1 NSC Object | 172 Parameter | 3: Pickup From | 3 Scale | 1.0000E+000 Offset | 0.0000E+000 | Column Parameter −6 |
| Surf | 1 NSC Object | 172 Parameter | 5: Pickup From | 73 Scale | 1.0000E+000 Offset | 0.0000E+000 | Column Parameter −6 |
| Surf | 1 NSC Object | 172 Parameter | 6: Pickup From | 3 Scale | 1.0000E+000 Offset | 0.0000E+000 | Column Parameter −6 |
| Surf | 1 NSC Object | 172 Parameter | 7: Pickup From | 3 Scale | 1.0000E+000 Offset | 0.0000E+000 | Column Parameter −6 |
| Surf | 1 NSC Object | 172 Parameter | 8: Pickup From | 3 Scale | 1.0000E+000 Offset | 0.0000E+000 | Column Parameter −6 |
| Surf | 1 NSC Object | 173 Position | Y: Pickup From | 4 Scale | −1.0000E+000 Offset | 0.0000E+000 | Column Parameter −6 |
| Surf | 1 NSC Object | 173 Parameter | 1: Pickup From | 3 Scale | 1.0000E+000 Offset | 0.0000E+000 | Column Parameter −6 |
| Surf | 1 NSC Object | 173 Parameter | 2: Pickup From | 3 Scale | 1.0000E+000 Offset | 0.0000E+000 | Column Parameter −6 |
| Surf | 1 NSC Object | 173 Parameter | 3: Pickup From | 3 Scale | 1.0000E+000 Offset | 0.0000E+000 | Column Parameter −6 |
| Surf | 1 NSC Object | 173 Parameter | 5: Pickup From | 73 Scale | 1.0000E+000 Offset | 0.0000E+000 | Column Parameter −6 |
| Surf | 1 NSC Object | 173 Parameter | 6: Pickup From | 3 Scale | 1.0000E+000 Offset | 0.0000E+000 | Column Parameter −6 |
| Surf | 1 NSC Object | 173 Parameter | 7: Pickup From | 3 Scale | 1.0000E+000 Offset | 0.0000E+000 | Column Parameter −6 |
| Surf | 1 NSC Object | 173 Parameter | 8: Pickup From | 3 Scale | 1.0000E+000 Offset | 0.0000E+000 | Column Parameter −6 |
| Surf | 1 NSC Object | 174 Position | Y: Pickup From | 4 Scale | −1.0000E+000 Offset | 0.0000E+000 | Column Parameter −6 |
| Surf | 1 NSC Object | 174 Parameter | 1: Pickup From | 3 Scale | 1.0000E+000 Offset | 0.0000E+000 | Column Parameter −6 |
| Surf | 1 NSC Object | 174 Parameter | 2: Pickup From | 3 Scale | 1.0000E+000 Offset | 0.0000E+000 | Column Parameter −6 |
| Surf | 1 NSC Object | 174 Parameter | 3: Pickup From | 3 Scale | 1.0000E+000 Offset | 0.0000E+000 | Column Parameter −6 |
| Surf | 1 NSC Object | 174 Parameter | 5: Pickup From | 73 Scale | 1.0000E+000 Offset | 0.0000E+000 | Column Parameter −6 |
| Surf | 1 NSC Object | 174 Parameter | 6: Pickup From | 3 Scale | 1.0000E+000 Offset | 0.0000E+000 | Column Parameter −6 |
| Surf | 1 NSC Object | 174 Parameter | 7: Pickup From | 3 Scale | 1.0000E+000 Offset | 0.0000E+000 | Column Parameter −6 |
| Surf | 1 NSC Object | 174 Parameter | 8: Pickup From | 3 Scale | 1.0000E+000 Offset | 0.0000E+000 | Column Parameter −6 |
| Surf | 1 NSC Object | 175 Position | Y: Pickup From | 4 Scale | −1.0000E+000 Offset | 0.0000E+000 | Column Parameter −6 |
| Surf | 1 NSC Object | 177 Position | X: Pickup From | 2 Scale | −8.0000E+000 Offset | 0.0000E+000 | Column Parameter −6 |
| Surf | 1 NSC Object | 177 Parameter | 1: Pickup From | 3 Scale | 1.0000E+000 Offset | 0.0000E+000 | Column Parameter −6 |
| Surf | 1 NSC Object | 177 Parameter | 2: Pickup From | 3 Scale | 1.0000E+000 Offset | 0.0000E+000 | Column Parameter −6 |
| Surf | 1 NSC Object | 177 Parameter | 3: Pickup From | 3 Scale | 1.0000E+000 Offset | 0.0000E+000 | Column Parameter −6 |
| Surf | 1 NSC Object | 177 Parameter | 6: Pickup From | 3 Scale | 1.0000E+000 Offset | 0.0000E+000 | Column Parameter −6 |
| Surf | 1 NSC Object | 177 Parameter | 7: Pickup From | 3 Scale | 1.0000E+000 Offset | 0.0000E+000 | Column Parameter −6 |
| Surf | 1 NSC Object | 177 Parameter | 8: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 178 Position | Y: Pickup From | 4 Scale | 1.0000E+000 Offset | 0.0000E+000 | Column Parameter −6 |
| Surf | 1 NSC Object | 178 Parameter | 1: Pickup From | 3 Scale | 1.0000E+000 Offset | 0.0000E+000 | Column Parameter −6 |
| Surf | 1 NSC Object | 178 Parameter | 2: Pickup From | 3 Scale | 1.0000E+000 Offset | 0.0000E+000 | Column Parameter −6 |
| Surf | 1 NSC Object | 178 Parameter | 3: Pickup From | 3 Scale | 1.0000E+000 Offset | 0.0000E+000 | Column Parameter −6 |
| Surf | 1 NSC Object | 178 Parameter | 5: Pickup From | 83 Scale | 1.0000E+000 Offset | 0.0000E+000 | Column Parameter −6 |
| Surf | 1 NSC Object | 178 Parameter | 6: Pickup From | 3 Scale | 1.0000E+000 Offset | 0.0000E+000 | Column Parameter −6 |
| Surf | 1 NSC Object | 178 Parameter | 7: Pickup From | 3 Scale | 1.0000E+000 Offset | 0.0000E+000 | Column Parameter −6 |
| Surf | 1 NSC Object | 178 Parameter | 8: Pickup From | 3 Scale | 1.0000E+000 Offset | 0.0000E+000 | Column Parameter −6 |
| Surf | 1 NSC Object | 179 Position | Y: Pickup From | 4 Scale | 1.0000E+000 Offset | 0.0000E+000 | Column Parameter −6 |
| Surf | 1 NSC Object | 179 Parameter | 1: Pickup From | 3 Scale | 1.0000E+000 Offset | 0.0000E+000 | Column Parameter −6 |
| Surf | 1 NSC Object | 179 Parameter | 2: Pickup From | 3 Scale | 1.0000E+000 Offset | 0.0000E+000 | Column Parameter −6 |
| Surf | 1 NSC Object | 179 Parameter | 3: Pickup From | 3 Scale | 1.0000E+000 Offset | 0.0000E+000 | Column Parameter −6 |
| Surf | 1 NSC Object | 179 Parameter | 5: Pickup From | 83 Scale | 1.0000E+000 Offset | 0.0000E+000 | Column Parameter −6 |
| Surf | 1 NSC Object | 179 Parameter | 6: Pickup From | 3 Scale | 1.0000E+000 Offset | 0.0000E+000 | Column Parameter −6 |
| Surf | 1 NSC Object | 179 Parameter | 7: Pickup From | 3 Scale | 1.0000E+000 Offset | 0.0000E+000 | Column Parameter −6 |
| Surf | 1 NSC Object | 179 Parameter | 8: Pickup From | 3 Scale | 1.0000E+000 Offset | 0.0000E+000 | Column Parameter −6 |
| Surf | 1 NSC Object | 180 Position | Y: Pickup From | 4 Scale | 1.0000E+000 Offset | 0.0000E+000 | Column Parameter −6 |
| Surf | 1 NSC Object | 181 Position | Y: Pickup From | 4 Scale | 1.0000E+000 Offset | 0.0000E+000 | Column Parameter −6 |
| Surf | 1 NSC Object | 182 Position | Y: Pickup From | 4 Scale | −1.0000E+000 Offset | 0.0000E+000 | Column Parameter −6 |
| Surf | 1 NSC Object | 182 Parameter | 1: Pickup From | 3 Scale | 1.0000E+000 Offset | 0.0000E+000 | Column Parameter −6 |
| Surf | 1 NSC Object | 182 Parameter | 2: Pickup From | 3 Scale | 1.0000E+000 Offset | 0.0000E+000 | Column Parameter −6 |
| Surf | 1 NSC Object | 182 Parameter | 3: Pickup From | 3 Scale | 1.0000E+000 Offset | 0.0000E+000 | Column Parameter −6 |
| Surf | 1 NSC Object | 182 Parameter | 5: Pickup From | 83 Scale | 1.0000E+000 Offset | 0.0000E+000 | Column Parameter −6 |
| Surf | 1 NSC Object | 182 Parameter | 6: Pickup From | 3 Scale | 1.0000E+000 Offset | 0.0000E+000 | Column Parameter −6 |
| Surf | 1 NSC Object | 182 Parameter | 7: Pickup From | 3 Scale | 1.0000E+000 Offset | 0.0000E+000 | Column Parameter −6 |
| Surf | 1 NSC Object | 182 Parameter | 8: Pickup From | 3 Scale | 1.0000E+000 Offset | 0.0000E+000 | Column Parameter −6 |
| Surf | 1 NSC Object | 183 Position | Y: Pickup From | 4 Scale | −1.0000E+000 Offset | 0.0000E+000 | Column Parameter −6 |
| Surf | 1 NSC Object | 183 Parameter | 1: Pickup From | 3 Scale | 1.0000E+000 Offset | 0.0000E+000 | Column Parameter −6 |
| Surf | 1 NSC Object | 183 Parameter | 2: Pickup From | 3 Scale | 1.0000E+000 Offset | 0.0000E+000 | Column Parameter −6 |
| Surf | 1 NSC Object | 183 Parameter | 3: Pickup From | 3 Scale | 1.0000E+000 Offset | 0.0000E+000 | Column Parameter −6 |
| Surf | 1 NSC Object | 183 Parameter | 5: Pickup From | 83 Scale | 1.0000E+000 Offset | 0.0000E+000 | Column Parameter −6 |
| Surf | 1 NSC Object | 183 Parameter | 6: Pickup From | 3 Scale | 1.0000E+000 Offset | 0.0000E+000 | Column Parameter −6 |
| Surf | 1 NSC Object | 183 Parameter | 7: Pickup From | 3 Scale | 1.0000E+000 Offset | 0.0000E+000 | Column Parameter −6 |
| Surf | 1 NSC Object | 183 Parameter | 8: Pickup From | 3 Scale | 1.0000E+000 Offset | 0.0000E+000 | Column Parameter −6 |
| Surf | 1 NSC Object | 184 Position | Y: Pickup From | 4 Scale | −1.0000E+000 Offset | 0.0000E+000 | Column Parameter −6 |
| Surf | 1 NSC Object | 185 Position | Y: Pickup From | 4 Scale | −1.0000E+000 Offset | 0.0000E+000 | Column Parameter −6 |
| Surf | 1 NSC Object | 187 Parameter | 1: Pickup From | 93 Scale | 1.0000E+000 Offset | 0.0000E+000 | Column Parameter −6 |
| Surf | 1 NSC Object | 187 Parameter | 2: Pickup From | 93 Scale | 1.0000E+000 Offset | 0.0000E+000 | Column Parameter −6 |
| Surf | 1 NSC Object | 187 Parameter | 3: Pickup From | 93 Scale | 1.0000E+000 Offset | 0.0000E+000 | Column Parameter −6 |
| Surf | 1 NSC Object | 187 Parameter | 4: Pickup From | 93 Scale | 1.0000E+000 Offset | 0.0000E+000 | Column Parameter −6 |
| Surf | 1 NSC Object | 187 Parameter | 5: Pickup From | 93 Scale | 1.0000E+000 Offset | 0.0000E+000 | Column Parameter −6 |
| Surf | 1 NSC Object | 187 Parameter | 6: Pickup From | 93 Scale | 1.0000E+000 Offset | 0.0000E+000 | Column Parameter −6 |
| Surf | 1 NSC Object | 187 Parameter | 7: Pickup From | 93 Scale | 1.0000E+000 Offset | 0.0000E+000 | Column Parameter −6 |
| Surf | 1 NSC Object | 187 Parameter | 8: Pickup From | 93 Scale | 1.0000E+000 Offset | 0.0000E+000 | Column Parameter −6 |
| Surf | 1 NSC Object | 187 Parameter | 9: Pickup From | 93 Scale | 1.0000E+000 Offset | 0.0000E+000 | Column Parameter −6 |
| Surf | 1 NSC Object | 189 Position | Y: Pickup From | 95 Scale | −1.0000E+000 Offset | 0.0000E+000 | Column Parameter −6 |
| Surf | 1 NSC Object | 189 Position | Z: Pickup From | 95 Scale | 1.0000E+000 Offset | 0.0000E+000 | Column Parameter −6 |
| Surf | 1 NSC Object | 191 Parameter | 1: Pickup From | 3 Scale | 1.0000E+000 Offset | 0.0000E+000 | Column Parameter −6 |
| Surf | 1 NSC Object | 191 Parameter | 2: Pickup From | 3 Scale | 1.0000E+000 Offset | 0.0000E+000 | Column Parameter −6 |
| Surf | 1 NSC Object | 192 Parameter | 1: Pickup From | 3 Scale | 1.0000E+000 Offset | 0.0000E+000 | Column Parameter −6 |
| Surf | 1 NSC Object | 192 Parameter | 2: Pickup From | 3 Scale | 1.0000E+000 Offset | 0.0000E+000 | Column Parameter −6 |
| Surf | 1 NSC Object | 192 Parameter | 3: Pickup From | 3 Scale | 1.0000E+000 Offset | 0.0000E+000 | Column Parameter −6 |
| Surf | 1 NSC Object | 192 Parameter | 5: Pickup From | 3 Scale | 1.0000E+000 Offset | 0.0000E+000 | Column Parameter −6 |
| Surf | 1 NSC Object | 192 Parameter | 6: Pickup From | 3 Scale | 1.0000E+000 Offset | 0.0000E+000 | Column Parameter −6 |
| Surf | 1 NSC Object | 192 Parameter | 7: Pickup From | 3 Scale | 1.0000E+000 Offset | 0.0000E+000 | Column Parameter −6 |
| Surf | 1 NSC Object | 192 Parameter | 8: Pickup From | 3 Scale | 1.0000E+000 Offset | 0.0000E+000 | Column Parameter −6 |
| Surf | 1 NSC Object | 193 Position | Y: Pickup From | 4 Scale | 1.0000E+000 Offset | 0.0000E+000 | Column Parameter −6 |
| Surf | 1 NSC Object | 193 Parameter | 1: Pickup From | 3 Scale | 1.0000E+000 Offset | 0.0000E+000 | Column Parameter −6 |
| Surf | 1 NSC Object | 193 Parameter | 2: Pickup From | 3 Scale | 1.0000E+000 Offset | 0.0000E+000 | Column Parameter −6 |
| Surf | 1 NSC Object | 193 Parameter | 3: Pickup From | 3 Scale | 1.0000E+000 Offset | 0.0000E+000 | Column Parameter −6 |
| Surf | 1 NSC Object | 193 Parameter | 5: Pickup From | 3 Scale | 1.0000E+000 Offset | 0.0000E+000 | Column Parameter −6 |
| Surf | 1 NSC Object | 193 Parameter | 6: Pickup From | 3 Scale | 1.0000E+000 Offset | 0.0000E+000 | Column Parameter −6 |
| Surf | 1 NSC Object | 193 Parameter | 7: Pickup From | 3 Scale | 1.0000E+000 Offset | 0.0000E+000 | Column Parameter −6 |
| Surf | 1 NSC Object | 193 Parameter | 8: Pickup From | 3 Scale | 1.0000E+000 Offset | 0.0000E+000 | Column Parameter −6 |
| Surf | 1 NSC Object | 194 Position | Y: Pickup From | 4 Scale | 1.0000E+000 Offset | 0.0000E+000 | Column Parameter −6 |
| Surf | 1 NSC Object | 194 Parameter | 2: Pickup From | 3 Scale | 1.0000E+000 Offset | 0.0000E+000 | Column Parameter −6 |
| Surf | 1 NSC Object | 194 Parameter | 3: Pickup From | 3 Scale | 1.0000E+000 Offset | 0.0000E+000 | Column Parameter −6 |
| Surf | 1 NSC Object | 194 Parameter | 5: Pickup From | 3 Scale | 1.0000E+000 Offset | 0.0000E+000 | Column Parameter −6 |
| Surf | 1 NSC Object | 194 Parameter | 6: Pickup From | 3 Scale | 1.0000E+000 Offset | 0.0000E+000 | Column Parameter −6 |
| Surf | 1 NSC Object | 194 Parameter | 7: Pickup From | 3 Scale | 1.0000E+000 Offset | 0.0000E+000 | Column Parameter −6 |
| Surf | 1 NSC Object | 194 Parameter | 8: Pickup From | 3 Scale | 1.0000E+000 Offset | 0.0000E+000 | Column Parameter −6 |
| Surf | 1 NSC Object | 195 Position | Y: Pickup From | 4 Scale | 1.0000E+000 Offset | 0.0000E+000 | Column Parameter −6 |
| Surf | 1 NSC Object | 195 Parameter | 1: Pickup From | 3 Scale | 1.0000E+000 Offset | 0.0000E+000 | Column Parameter −6 |
| Surf | 1 NSC Object | 195 Parameter | 2: Pickup From | 3 Scale | 1.0000E+000 Offset | 0.0000E+000 | Column Parameter −6 |
| Surf | 1 NSC Object | 195 Parameter | 3: Pickup From | 3 Scale | 1.0000E+000 Offset | 0.0000E+000 | Column Parameter −6 |
| Surf | 1 NSC Object | 195 Parameter | 5: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 195 Parameter | 6: Pickup From | 3 Scale | 1.0000E+000 Offset | 0.0000E+000 | Column Parameter −6 |
| Surf | 1 NSC Object | 195 Parameter | 7: Pickup From | 3 Scale | 1.0000E+000 Offset | 0.0000E+000 | Column Parameter −6 |
| Surf | 1 NSC Object | 195 Parameter | 8: Pickup From | 3 Scale | 1.0000E+000 Offset | 0.0000E+000 | Column Parameter −6 |
| Surf | 1 NSC Object | 196 Position | Y: Pickup From | 4 Scale | −1.0000E+000 Offset | 0.0000E+000 | Column Parameter −6 |
| Surf | 1 NSC Object | 196 Parameter | 1: Pickup From | 3 Scale | 1.0000E+000 Offset | 0.0000E+000 | Column Parameter −6 |
| Surf | 1 NSC Object | 196 Parameter | 2: Pickup From | 3 Scale | 1.0000E+000 Offset | 0.0000E+000 | Column Parameter −6 |
| Surf | 1 NSC Object | 196 Parameter | 3: Pickup From | 3 Scale | 1.0000E+000 Offset | 0.0000E+000 | Column Parameter −6 |
| Surf | 1 NSC Object | 196 Parameter | 5: Pickup From | 3 Scale | 1.0000E+000 Offset | 0.0000E+000 | Column Parameter −6 |
| Surf | 1 NSC Object | 196 Parameter | 6: Pickup From | 3 Scale | 1.0000E+000 Offset | 0.0000E+000 | Column Parameter −6 |
| Surf | 1 NSC Object | 196 Parameter | 7: Pickup From | 3 Scale | 1.0000E+000 Offset | 0.0000E+000 | Column Parameter −6 |
| Surf | 1 NSC Object | 196 Parameter | 8: Pickup From | 3 Scale | 1.0000E+000 Offset | 0.0000E+000 | Column Parameter −6 |
| Surf | 1 NSC Object | 197 Position | Y: Pickup From | 4 Scale | −1.0000E+000 Offset | 0.0000E+000 | Column Parameter −6 |
| Surf | 1 NSC Object | 197 Parameter | 1: Pickup From | 3 Scale | 1.0000E+000 Offset | 0.0000E+000 | Column Parameter −6 |
| Surf | 1 NSC Object | 197 Parameter | 2: Pickup From | 3 Scale | 1.0000E+000 Offset | 0.0000E+000 | Column Parameter −6 |
| Surf | 1 NSC Object | 197 Parameter | 3: Pickup From | 3 Scale | 1.0000E+000 Offset | 0.0000E+000 | Column Parameter −6 |
| Surf | 1 NSC Object | 197 Parameter | 5: Pickup From | 3 Scale | 1.0000E+000 Offset | 0.0000E+000 | Column Parameter −6 |
| Surf | 1 NSC Object | 197 Parameter | 6: Pickup From | 3 Scale | 1.0000E+000 Offset | 0.0000E+000 | Column Parameter −6 |
| Surf | 1 NSC Object | 197 Parameter | 7: Pickup From | 3 Scale | 1.0000E+000 Offset | 0.0000E+000 | Column Parameter −6 |
| Surf | 1 NSC Object | 197 Parameter | 8: Pickup From | 3 Scale | 1.0000E+000 Offset | 0.0000E+000 | Column Parameter −6 |
| Surf | 1 NSC Object | 198 Position | Y: Pickup From | 4 Scale | −1.0000E+000 Offset | 0.0000E+000 | Column Parameter −6 |
| Surf | 1 NSC Object | 198 Parameter | 1: Pickup From | 3 Scale | 1.0000E+000 Offset | 0.0000E+000 | Column Parameter −6 |
| Surf | 1 NSC Object | 198 Parameter | 2: Pickup From | 3 Scale | 1.0000E+000 Offset | 0.0000E+000 | Column Parameter −6 |
| Surf | 1 NSC Object | 198 Parameter | 3: Pickup From | 3 Scale | 1.0000E+000 Offset | 0.0000E+000 | Column Parameter −6 |
| Surf | 1 NSC Object | 198 Parameter | 5: Pickup From | 3 Scale | 1.0000E+000 Offset | 0.0000E+000 | Column Parameter −6 |
| Surf | 1 NSC Object | 198 Parameter | 6: Pickup From | 3 Scale | 1.0000E+000 Offset | 0.0000E+000 | Column Parameter −6 |
| Surf | 1 NSC Object | 198 Parameter | 7: Pickup From | 3 Scale | 1.0000E+000 Offset | 0.0000E+000 | Column Parameter −6 |
| Surf | 1 NSC Object | 198 Parameter | 8: Pickup From | 3 Scale | 1.0000E+000 Offset | 0.0000E+000 | Column Parameter −6 |
| Surf | 1 NSC Object | 199 Position | Y: Pickup From | 4 Scale | −1.0000E+000 Offset | 0.0000E+000 | Column Parameter −6 |
| Surf | 1 NSC Object | 199 Parameter | 1: Pickup From | 3 Scale | 1.0000E+000 Offset | 0.0000E+000 | Column Parameter −6 |
| Surf | 1 NSC Object | 199 Parameter | 2: Pickup From | 3 Scale | 1.0000E+000 Offset | 0.0000E+000 | Column Parameter −6 |
| Surf | 1 NSC Object | 199 Parameter | 3: Pickup From | 3 Scale | 1.0000E+000 Offset | 0.0000E+000 | Column Parameter −6 |
| Surf | 1 NSC Object | 199 Parameter | 5: Pickup From | 3 Scale | 1.0000E+000 Offset | 0.0000E+000 | Column Parameter −6 |
| Surf | 1 NSC Object | 199 Parameter | 6: Pickup From | 3 Scale | 1.0000E+000 Offset | 0.0000E+000 | Column Parameter −6 |
| Surf | 1 NSC Object | 199 Parameter | 7: Pickup From | 3 Scale | 1.0000E+000 Offset | 0.0000E+000 | Column Parameter −6 |
| Surf | 1 NSC Object | 199 Parameter | 8: Pickup From | 3 Scale | 1.0000E+000 Offset | 0.0000E+000 | Column Parameter −6 |
| Surf | 1 NSC Object | 201 Position | X: Pickup From | 2 Scale | 2.0000E+000 Offset | 0.0000E+000 | Column Parameter −6 |
| Surf | 1 NSC Object | 201 Parameter | 1: Pickup From | 3 Scale | 1.0000E+000 Offset | 0.0000E+000 | Column Parameter −6 |
| Surf | 1 NSC Object | 201 Parameter | 2: Pickup From | 3 Scale | 1.0000E+000 Offset | 0.0000E+000 | Column Parameter −6 |
| Surf | 1 NSC Object | 201 Parameter | 3: Pickup From | 3 Scale | 1.0000E+000 Offset | 0.0000E+000 | Column Parameter −6 |
| Surf | 1 NSC Object | 201 Parameter | 6: Pickup From | 3 Scale | 1.0000E+000 Offset | 0.0000E+000 | Column Parameter −6 |
| Surf | 1 NSC Object | 201 Parameter | 7: Pickup From | 3 Scale | 1.0000E+000 Offset | 0.0000E+000 | Column Parameter −6 |
| Surf | 1 NSC Object | 201 Parameter | 8: Pickup From | 3 Scale | 1.0000E+000 Offset | 0.0000E+000 | Column Parameter −6 |
| Surf | 1 NSC Object | 202 Position | Y: Pickup From | 4 Scale | 1.0000E+000 Offset | 0.0000E+000 | Column Parameter −6 |
| Surf | 1 NSC Object | 202 Parameter | 1: Pickup From | 3 Scale | 1.0000E+000 Offset | 0.0000E+000 | Column Parameter −6 |
| Surf | 1 NSC Object | 202 Parameter | 2: Pickup From | 3 Scale | 1.0000E+000 Offset | 0.0000E+000 | Column Parameter −6 |
| Surf | 1 NSC Object | 202 Parameter | 3: Pickup From | 3 Scale | 1.0000E+000 Offset | 0.0000E+000 | Column Parameter −6 |
| Surf | 1 NSC Object | 202 Parameter | 5: Pickup From | 13 Scale | 1.0000E+000 Offset | 0.0000E+000 | Column Parameter −6 |
| Surf | 1 NSC Object | 202 Parameter | 6: Pickup From | 3 Scale | 1.0000E+000 Offset | 0.0000E+000 | Column Parameter −6 |
| Surf | 1 NSC Object | 202 Parameter | 7: Pickup From | 3 Scale | 1.0000E+000 Offset | 0.0000E+000 | Column Parameter −6 |
| Surf | 1 NSC Object | 202 Parameter | 8: Pickup From | 3 Scale | 1.0000E+000 Offset | 0.0000E+000 | Column Parameter −6 |
| Surf | 1 NSC Object | 203 Position | Y: Pickup From | 4 Scale | 1.0000E+000 Offset | 0.0000E+000 | Column Parameter −6 |
| Surf | 1 NSC Object | 203 Parameter | 1: Pickup From | 3 Scale | 1.0000E+000 Offset | 0.0000E+000 | Column Parameter −6 |
| Surf | 1 NSC Object | 203 Parameter | 2: Pickup From | 3 Scale | 1.0000E+000 Offset | 0.0000E+000 | Column Parameter −6 |
| Surf | 1 NSC Object | 203 Parameter | 3: Pickup From | 3 Scale | 1.0000E+000 Offset | 0.0000E+000 | Column Parameter −6 |
| Surf | 1 NSC Object | 203 Parameter | 5: Pickup From | 13 Scale | 1.0000E+000 Offset | 0.0000E+000 | Column Parameter −6 |
| Surf | 1 NSC Object | 203 Parameter | 6: Pickup From | 3 Scale | 1.0000E+000 Offset | 0.0000E+000 | Column Parameter −6 |
| Surf | 1 NSC Object | 203 Parameter | 7: Pickup From | 3 Scale | 1.0000E+000 Offset | 0.0000E+000 | Column Parameter −6 |
| Surf | 1 NSC Object | 203 Parameter | 8: Pickup From | 3 Scale | 1.0000E+000 Offset | 0.0000E+000 | Column Parameter −6 |
| Surf | 1 NSC Object | 204 Position | Y: Pickup From | 4 Scale | 1.0000E+000 Offset | 0.0000E+000 | Column Parameter −6 |
| Surf | 1 NSC Object | 204 Parameter | 1: Pickup From | 3 Scale | 1.0000E+000 Offset | 0.0000E+000 | Column Parameter −6 |
| Surf | 1 NSC Object | 204 Parameter | 2: Pickup From | 3 Scale | 1.0000E+000 Offset | 0.0000E+000 | Column Parameter −6 |
| Surf | 1 NSC Object | 204 Parameter | 3: Pickup From | 3 Scale | 1.0000E+000 Offset | 0.0000E+000 | Column Parameter −6 |
| Surf | 1 NSC Object | 204 Parameter | 5: Pickup From | 13 Scale | 1.0000E+000 Offset | 0.0000E+000 | Column Parameter −6 |
| Surf | 1 NSC Object | 204 Parameter | 6: Pickup From | 3 Scale | 1.0000E+000 Offset | 0.0000E+000 | Column Parameter −6 |
| Surf | 1 NSC Object | 204 Parameter | 7: Pickup From | 3 Scale | 1.0000E+000 Offset | 0.0000E+000 | Column Parameter −6 |
| Surf | 1 NSC Object | 204 Parameter | 8: Pickup From | 3 Scale | 1.0000E+000 Offset | 0.0000E+000 | Column Parameter −6 |
| Surf | 1 NSC Object | 205 Position | Y: Pickup From | 4 Scale | 1.0000E+000 Offset | 0.0000E+000 | Column Parameter −6 |
| Surf | 1 NSC Object | 205 Parameter | 1: Pickup From | 3 Scale | 1.0000E+000 Offset | 0.0000E+000 | Column Parameter −6 |
| Surf | 1 NSC Object | 205 Parameter | 2: Pickup From | 3 Scale | 1.0000E+000 Offset | 0.0000E+000 | Column Parameter −6 |
| Surf | 1 NSC Object | 205 Parameter | 3: Pickup From | 3 Scale | 1.0000E+000 Offset | 0.0000E+000 | Column Parameter −6 |
| Surf | 1 NSC Object | 205 Parameter | 5: Pickup From | 13 Scale | 1.0000E+000 Offset | 0.0000E+000 | Column Parameter −6 |
| Surf | 1 NSC Object | 205 Parameter | 6: Pickup From | 3 Scale | 1.0000E+000 Offset | 0.0000E+000 | Column Parameter −6 |
| Surf | 1 NSC Object | 205 Parameter | 7: Pickup From | 3 Scale | 1.0000E+000 Offset | 0.0000E+000 | Column Parameter −6 |
| Surf | 1 NSC Object | 205 Parameter | 8: Pickup From | 3 Scale | 1.0000E+000 Offset | 0.0000E+000 | Column Parameter −6 |
| Surf | 1 NSC Object | 206 Position | Y: Pickup From | 4 Scale | −1.0000E+000 Offset | 0.0000E+000 | Column Parameter −6 |
| Surf | 1 NSC Object | 206 Parameter | 1: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 206 Parameter | 2: Pickup From | 3 Scale | 1.0000E+000 Offset | 0.0000E+000 | Column Parameter −6 |
| Surf | 1 NSC Object | 206 Parameter | 3: Pickup From | 3 Scale | 1.0000E+000 Offset | 0.0000E+000 | Column Parameter −6 |
| Surf | 1 NSC Object | 206 Parameter | 5: Pickup From | 13 Scale | 1.0000E+000 Offset | 0.0000E+000 | Column Parameter −6 |
| Surf | 1 NSC Object | 206 Parameter | 6: Pickup From | 3 Scale | 1.0000E+000 Offset | 0.0000E+000 | Column Parameter −6 |
| Surf | 1 NSC Object | 206 Parameter | 7: Pickup From | 3 Scale | 1.0000E+000 Offset | 0.0000E+000 | Column Parameter −6 |
| Surf | 1 NSC Object | 206 Parameter | 8: Pickup From | 3 Scale | 1.0000E+000 Offset | 0.0000E+000 | Column Parameter −6 |
| Surf | 1 NSC Object | 207 Position | Y: Pickup From | 4 Scale | −1.0000E+000 Offset | 0.0000E+000 | Column Parameter −6 |
| Surf | 1 NSC Object | 207 Parameter | 1: Pickup From | 3 Scale | 1.0000E+000 Offset | 0.0000E+000 | Column Parameter −6 |
| Surf | 1 NSC Object | 207 Parameter | 2: Pickup From | 3 Scale | 1.0000E+000 Offset | 0.0000E+000 | Column Parameter −6 |
| Surf | 1 NSC Object | 207 Parameter | 3: Pickup From | 3 Scale | 1.0000E+000 Offset | 0.0000E+000 | Column Parameter −6 |
| Surf | 1 NSC Object | 207 Parameter | 5: Pickup From | 13 Scale | 1.0000E+000 Offset | 0.0000E+000 | Column Parameter −6 |
| Surf | 1 NSC Object | 207 Parameter | 6: Pickup From | 3 Scale | 1.0000E+000 Offset | 0.0000E+000 | Column Parameter −6 |
| Surf | 1 NSC Object | 207 Parameter | 7: Pickup From | 3 Scale | 1.0000E+000 Offset | 0.0000E+000 | Column Parameter −6 |
| Surf | 1 NSC Object | 207 Parameter | 8: Pickup From | 3 Scale | 1.0000E+000 Offset | 0.0000E+000 | Column Parameter −6 |
| Surf | 1 NSC Object | 208 Position | Y: Pickup From | 4 Scale | −1.0000E+000 Offset | 0.0000E+000 | Column Parameter −6 |
| Surf | 1 NSC Object | 208 Parameter | 1: Pickup From | 3 Scale | 1.0000E+000 Offset | 0.0000E+000 | Column Parameter −6 |
| Surf | 1 NSC Object | 208 Parameter | 2: Pickup From | 3 Scale | 1.0000E+000 Offset | 0.0000E+000 | Column Parameter −6 |
| Surf | 1 NSC Object | 208 Parameter | 3: Pickup From | 3 Scale | 1.0000E+000 Offset | 0.0000E+000 | Column Parameter −6 |
| Surf | 1 NSC Object | 208 Parameter | 5: Pickup From | 13 Scale | 1.0000E+000 Offset | 0.0000E+000 | Column Parameter −6 |
| Surf | 1 NSC Object | 208 Parameter | 6: Pickup From | 3 Scale | 1.0000E+000 Offset | 0.0000E+000 | Column Parameter −6 |
| Surf | 1 NSC Object | 208 Parameter | 7: Pickup From | 3 Scale | 1.0000E+000 Offset | 0.0000E+000 | Column Parameter −6 |
| Surf | 1 NSC Object | 208 Parameter | 8: Pickup From | 3 Scale | 1.0000E+000 Offset | 0.0000E+000 | Column Parameter −6 |
| Surf | 1 NSC Object | 209 Position | Y: Pickup From | 4 Scale | −1.0000E+000 Offset | 0.0000E+000 | Column Parameter −6 |
| Surf | 1 NSC Object | 209 Parameter | 1: Pickup From | 3 Scale | 1.0000E+000 Offset | 0.0000E+000 | Column Parameter −6 |
| Surf | 1 NSC Object | 209 Parameter | 2: Pickup From | 3 Scale | 1.0000E+000 Offset | 0.0000E+000 | Column Parameter −6 |
| Surf | 1 NSC Object | 209 Parameter | 3: Pickup From | 3 Scale | 1.0000E+000 Offset | 0.0000E+000 | Column Parameter −6 |
| Surf | 1 NSC Object | 209 Parameter | 5: Pickup From | 13 Scale | 1.0000E+000 Offset | 0.0000E+000 | Column Parameter −6 |
| Surf | 1 NSC Object | 209 Parameter | 6: Pickup From | 3 Scale | 1.0000E+000 Offset | 0.0000E+000 | Column Parameter −6 |
| Surf | 1 NSC Object | 209 Parameter | 7: Pickup From | 3 Scale | 1.0000E+000 Offset | 0.0000E+000 | Column Parameter −6 |
| Surf | 1 NSC Object | 209 Parameter | 8: Pickup From | 3 Scale | 1.0000E+000 Offset | 0.0000E+000 | Column Parameter −6 |
| Surf | 1 NSC Object | 211 Position | X: Pickup From | 2 Scale | 4.0000E+000 Offset | 0.0000E+000 | Column Parameter −6 |
| Surf | 1 NSC Object | 211 Parameter | 1: Pickup From | 3 Scale | 1.0000E+000 Offset | 0.0000E+000 | Column Parameter −6 |
| Surf | 1 NSC Object | 211 Parameter | 2: Pickup From | 3 Scale | 1.0000E+000 Offset | 0.0000E+000 | Column Parameter −6 |
| Surf | 1 NSC Object | 211 Parameter | 3: Pickup From | 3 Scale | 1.0000E+000 Offset | 0.0000E+000 | Column Parameter −6 |
| Surf | 1 NSC Object | 211 Parameter | 6: Pickup From | 3 Scale | 1.0000E+000 Offset | 0.0000E+000 | Column Parameter −6 |
| Surf | 1 NSC Object | 211 Parameter | 7: Pickup From | 3 Scale | 1.0000E+000 Offset | 0.0000E+000 | Column Parameter −6 |
| Surf | 1 NSC Object | 211 Parameter | 8: Pickup From | 3 Scale | 1.0000E+000 Offset | 0.0000E+000 | Column Parameter −6 |
| Surf | 1 NSC Object | 212 Position | Y: Pickup From | 4 Scale | 1.0000E+000 Offset | 0.0000E+000 | Column Parameter −6 |
| Surf | 1 NSC Object | 212 Parameter | 1: Pickup From | 3 Scale | 1.0000E+000 Offset | 0.0000E+000 | Column Parameter −6 |
| Surf | 1 NSC Object | 212 Parameter | 2: Pickup From | 3 Scale | 1.0000E+000 Offset | 0.0000E+000 | Column Parameter −6 |
| Surf | 1 NSC Object | 212 Parameter | 3: Pickup From | 3 Scale | 1.0000E+000 Offset | 0.0000E+000 | Column Parameter −6 |
| Surf | 1 NSC Object | 212 Parameter | 5: Pickup From | 23 Scale | 1.0000E+000 Offset | 0.0000E+000 | Column Parameter −6 |
| Surf | 1 NSC Object | 212 Parameter | 6: Pickup From | 3 Scale | 1.0000E+000 Offset | 0.0000E+000 | Column Parameter −6 |
| Surf | 1 NSC Object | 212 Parameter | 7: Pickup From | 3 Scale | 1.0000E+000 Offset | 0.0000E+000 | Column Parameter −6 |
| Surf | 1 NSC Object | 212 Parameter | 8: Pickup From | 3 Scale | 1.0000E+000 Offset | 0.0000E+000 | Column Parameter −6 |
| Surf | 1 NSC Object | 213 Position | Y: Pickup From | 4 Scale | 1.0000E+000 Offset | 0.0000E+000 | Column Parameter −6 |
| Surf | 1 NSC Object | 213 Parameter | 1: Pickup From | 3 Scale | 1.0000E+000 Offset | 0.0000E+000 | Column Parameter −6 |
| Surf | 1 NSC Object | 213 Parameter | 2: Pickup From | 3 Scale | 1.0000E+000 Offset | 0.0000E+000 | Column Parameter −6 |
| Surf | 1 NSC Object | 213 Parameter | 3: Pickup From | 3 Scale | 1.0000E+000 Offset | 0.0000E+000 | Column Parameter −6 |
| Surf | 1 NSC Object | 213 Parameter | 5: Pickup From | 23 Scale | 1.0000E+000 Offset | 0.0000E+000 | Column Parameter −6 |
| Surf | 1 NSC Object | 213 Parameter | 6: Pickup From | 3 Scale | 1.0000E+000 Offset | 0.0000E+000 | Column Parameter −6 |
| Surf | 1 NSC Object | 213 Parameter | 7: Pickup From | 3 Scale | 1.0000E+000 Offset | 0.0000E+000 | Column Parameter −6 |
| Surf | 1 NSC Object | 213 Parameter | 8: Pickup From | 3 Scale | 1.0000E+000 Offset | 0.0000E+000 | Column Parameter −6 |
| Surf | 1 NSC Object | 214 Position | Y: Pickup From | 4 Scale | 1.0000E+000 Offset | 0.0000E+000 | Column Parameter −6 |
| Surf | 1 NSC Object | 214 Parameter | 1: Pickup From | 3 Scale | 1.0000E+000 Offset | 0.0000E+000 | Column Parameter −6 |
| Surf | 1 NSC Object | 214 Parameter | 2: Pickup From | 3 Scale | 1.0000E+000 Offset | 0.0000E+000 | Column Parameter −6 |
| Surf | 1 NSC Object | 214 Parameter | 3: Pickup From | 3 Scale | 1.0000E+000 Offset | 0.0000E+000 | Column Parameter −6 |
| Surf | 1 NSC Object | 214 Parameter | 5: Pickup From | 23 Scale | 1.0000E+000 Offset | 0.0000E+000 | Column Parameter −6 |
| Surf | 1 NSC Object | 214 Parameter | 6: Pickup From | 3 Scale | 1.0000E+000 Offset | 0.0000E+000 | Column Parameter −6 |
| Surf | 1 NSC Object | 214 Parameter | 7: Pickup From | 3 Scale | 1.0000E+000 Offset | 0.0000E+000 | Column Parameter −6 |
| Surf | 1 NSC Object | 214 Parameter | 8: Pickup From | 3 Scale | 1.0000E+000 Offset | 0.0000E+000 | Column Parameter −6 |
| Surf | 1 NSC Object | 215 Position | Y: Pickup From | 4 Scale | 1.0000E+000 Offset | 0.0000E+000 | Column Parameter −6 |
| Surf | 1 NSC Object | 215 Parameter | 1: Pickup From | 3 Scale | 1.0000E+000 Offset | 0.0000E+000 | Column Parameter −6 |
| Surf | 1 NSC Object | 215 Parameter | 2: Pickup From | 3 Scale | 1.0000E+000 Offset | 0.0000E+000 | Column Parameter −6 |
| Surf | 1 NSC Object | 215 Parameter | 3: Pickup From | 3 Scale | 1.0000E+000 Offset | 0.0000E+000 | Column Parameter −6 |
| Surf | 1 NSC Object | 215 Parameter | 5: Pickup From | 23 Scale | 1.0000E+000 Offset | 0.0000E+000 | Column Parameter −6 |
| Surf | 1 NSC Object | 215 Parameter | 6: Pickup From | 3 Scale | 1.0000E+000 Offset | 0.0000E+000 | Column Parameter −6 |
| Surf | 1 NSC Object | 215 Parameter | 7: Pickup From | 3 Scale | 1.0000E+000 Offset | 0.0000E+000 | Column Parameter −6 |
| Surf | 1 NSC Object | 215 Parameter | 8: Pickup From | 3 Scale | 1.0000E+000 Offset | 0.0000E+000 | Column Parameter −6 |
| Surf | 1 NSC Object | 216 Position | Y: Pickup From | 4 Scale | −1.0000E+000 Offset | 0.0000E+000 | Column Parameter −6 |
| Surf | 1 NSC Object | 216 Parameter | 1: Pickup From | 3 Scale | 1.0000E+000 Offset | 0.0000E+000 | Column Parameter −6 |
| Surf | 1 NSC Object | 216 Parameter | 2: Pickup From | 3 Scale | 1.0000E+000 Offset | 0.0000E+000 | Column Parameter −6 |
| Surf | 1 NSC Object | 216 Parameter | 3: Pickup From | 3 Scale | 1.0000E+000 Offset | 0.0000E+000 | Column Parameter −6 |
| Surf | 1 NSC Object | 216 Parameter | 5: Pickup From | 23 Scale | 1.0000E+000 Offset | 0.0000E+000 | Column Parameter −6 |
| Surf | 1 NSC Object | 216 Parameter | 6: Pickup From | 3 Scale | 1.0000E+000 Offset | 0.0000E+000 | Column Parameter −6 |
| Surf | 1 NSC Object | 216 Parameter | 7: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 216 Parameter | 8: Pickup From | 3 Scale | 1.0000E+000 Offset | 0.0000E+000 | Column Parameter −6 |
| Surf | 1 NSC Object | 217 Position | Y: Pickup From | 4 Scale | −1.0000E+000 Offset | 0.0000E+000 | Column Parameter −6 |
| Surf | 1 NSC Object | 217 Parameter | 1: Pickup From | 3 Scale | 1.0000E+000 Offset | 0.0000E+000 | Column Parameter −6 |
| Surf | 1 NSC Object | 217 Parameter | 2: Pickup From | 3 Scale | 1.0000E+000 Offset | 0.0000E+000 | Column Parameter −6 |
| Surf | 1 NSC Object | 217 Parameter | 3: Pickup From | 3 Scale | 1.0000E+000 Offset | 0.0000E+000 | Column Parameter −6 |
| Surf | 1 NSC Object | 217 Parameter | 5: Pickup From | 23 Scale | 1.0000E+000 Offset | 0.0000E+000 | Column Parameter −6 |
| Surf | 1 NSC Object | 217 Parameter | 6: Pickup From | 3 Scale | 1.0000E+000 Offset | 0.0000E+000 | Column Parameter −6 |
| Surf | 1 NSC Object | 217 Parameter | 7: Pickup From | 3 Scale | 1.0000E+000 Offset | 0.0000E+000 | Column Parameter −6 |
| Surf | 1 NSC Object | 217 Parameter | 8: Pickup From | 3 Scale | 1.0000E+000 Offset | 0.0000E+000 | Column Parameter −6 |
| Surf | 1 NSC Object | 218 Position | Y: Pickup From | 4 Scale | −1.0000E+000 Offset | 0.0000E+000 | Column Parameter −6 |
| Surf | 1 NSC Object | 218 Parameter | 1: Pickup From | 3 Scale | 1.0000E+000 Offset | 0.0000E+000 | Column Parameter −6 |
| Surf | 1 NSC Object | 218 Parameter | 2: Pickup From | 3 Scale | 1.0000E+000 Offset | 0.0000E+000 | Column Parameter −6 |
| Surf | 1 NSC Object | 218 Parameter | 3: Pickup From | 3 Scale | 1.0000E+000 Offset | 0.0000E+000 | Column Parameter −6 |
| Surf | 1 NSC Object | 218 Parameter | 5: Pickup From | 23 Scale | 1.0000E+000 Offset | 0.0000E+000 | Column Parameter −6 |
| Surf | 1 NSC Object | 218 Parameter | 6: Pickup From | 3 Scale | 1.0000E+000 Offset | 0.0000E+000 | Column Parameter −6 |
| Surf | 1 NSC Object | 218 Parameter | 7: Pickup From | 3 Scale | 1.0000E+000 Offset | 0.0000E+000 | Column Parameter −6 |
| Surf | 1 NSC Object | 218 Parameter | 8: Pickup From | 3 Scale | 1.0000E+000 Offset | 0.0000E+000 | Column Parameter −6 |
| Surf | 1 NSC Object | 219 Position | Y: Pickup From | 4 Scale | −1.0000E+000 Offset | 0.0000E+000 | Column Parameter −6 |
| Surf | 1 NSC Object | 219 Parameter | 1: Pickup From | 3 Scale | 1.0000E+000 Offset | 0.0000E+000 | Column Parameter −6 |
| Surf | 1 NSC Object | 219 Parameter | 2: Pickup From | 3 Scale | 1.0000E+000 Offset | 0.0000E+000 | Column Parameter −6 |
| Surf | 1 NSC Object | 219 Parameter | 3: Pickup From | 3 Scale | 1.0000E+000 Offset | 0.0000E+000 | Column Parameter −6 |
| Surf | 1 NSC Object | 219 Parameter | 5: Pickup From | 23 Scale | 1.0000E+000 Offset | 0.0000E+000 | Column Parameter −6 |
| Surf | 1 NSC Object | 219 Parameter | 6: Pickup From | 3 Scale | 1.0000E+000 Offset | 0.0000E+000 | Column Parameter −6 |
| Surf | 1 NSC Object | 219 Parameter | 7: Pickup From | 3 Scale | 1.0000E+000 Offset | 0.0000E+000 | Column Parameter −6 |
| Surf | 1 NSC Object | 219 Parameter | 8: Pickup From | 3 Scale | 1.0000E+000 Offset | 0.0000E+000 | Column Parameter −6 |
| Surf | 1 NSC Object | 221 Position | X: Pickup From | 2 Scale | 6.0000E+000 Offset | 0.0000E+000 | Column Parameter −6 |
| Surf | 1 NSC Object | 221 Parameter | 1: Pickup From | 3 Scale | 1.0000E+000 Offset | 0.0000E+000 | Column Parameter −6 |
| Surf | 1 NSC Object | 221 Parameter | 2: Pickup From | 3 Scale | 1.0000E+000 Offset | 0.0000E+000 | Column Parameter −6 |
| Surf | 1 NSC Object | 221 Parameter | 3: Pickup From | 3 Scale | 1.0000E+000 Offset | 0.0000E+000 | Column Parameter −6 |
| Surf | 1 NSC Object | 221 Parameter | 6: Pickup From | 3 Scale | 1.0000E+000 Offset | 0.0000E+000 | Column Parameter −6 |
| Surf | 1 NSC Object | 221 Parameter | 7: Pickup From | 3 Scale | 1.0000E+000 Offset | 0.0000E+000 | Column Parameter −6 |
| Surf | 1 NSC Object | 221 Parameter | 8: Pickup From | 3 Scale | 1.0000E+000 Offset | 0.0000E+000 | Column Parameter −6 |
| Surf | 1 NSC Object | 222 Position | Y: Pickup From | 4 Scale | 1.0000E+000 Offset | 0.0000E+000 | Column Parameter −6 |
| Surf | 1 NSC Object | 222 Parameter | 1: Pickup From | 3 Scale | 1.0000E+000 Offset | 0.0000E+000 | Column Parameter −6 |
| Surf | 1 NSC Object | 222 Parameter | 2: Pickup From | 3 Scale | 1.0000E+000 Offset | 0.0000E+000 | Column Parameter −6 |
| Surf | 1 NSC Object | 222 Parameter | 3: Pickup From | 3 Scale | 1.0000E+000 Offset | 0.0000E+000 | Column Parameter −6 |
| Surf | 1 NSC Object | 222 Parameter | 5: Pickup From | 33 Scale | 1.0000E+000 Offset | 0.0000E+000 | Column Parameter −6 |
| Surf | 1 NSC Object | 222 Parameter | 6: Pickup From | 3 Scale | 1.0000E+000 Offset | 0.0000E+000 | Column Parameter −6 |
| Surf | 1 NSC Object | 222 Parameter | 7: Pickup From | 3 Scale | 1.0000E+000 Offset | 0.0000E+000 | Column Parameter −6 |
| Surf | 1 NSC Object | 222 Parameter | 8: Pickup From | 3 Scale | 1.0000E+000 Offset | 0.0000E+000 | Column Parameter −6 |
| Surf | 1 NSC Object | 223 Position | Y: Pickup From | 4 Scale | 1.0000E+000 Offset | 0.0000E+000 | Column Parameter −6 |
| Surf | 1 NSC Object | 223 Parameter | 1: Pickup From | 3 Scale | 1.0000E+000 Offset | 0.0000E+000 | Column Parameter −6 |
| Surf | 1 NSC Object | 223 Parameter | 2: Pickup From | 3 Scale | 1.0000E+000 Offset | 0.0000E+000 | Column Parameter −6 |
| Surf | 1 NSC Object | 223 Parameter | 3: Pickup From | 3 Scale | 1.0000E+000 Offset | 0.0000E+000 | Column Parameter −6 |
| Surf | 1 NSC Object | 223 Parameter | 5: Pickup From | 33 Scale | 1.0000E+000 Offset | 0.0000E+000 | Column Parameter −6 |
| Surf | 1 NSC Object | 223 Parameter | 6: Pickup From | 3 Scale | 1.0000E+000 Offset | 0.0000E+000 | Column Parameter −6 |
| Surf | 1 NSC Object | 223 Parameter | 7: Pickup From | 3 Scale | 1.0000E+000 Offset | 0.0000E+000 | Column Parameter −6 |
| Surf | 1 NSC Object | 223 Parameter | 8: Pickup From | 3 Scale | 1.0000E+000 Offset | 0.0000E+000 | Column Parameter −6 |
| Surf | 1 NSC Object | 224 Position | Y: Pickup From | 4 Scale | 1.0000E+000 Offset | 0.0000E+000 | Column Parameter −6 |
| Surf | 1 NSC Object | 224 Parameter | 1: Pickup From | 3 Scale | 1.0000E+000 Offset | 0.0000E+000 | Column Parameter −6 |
| Surf | 1 NSC Object | 224 Parameter | 2: Pickup From | 3 Scale | 1.0000E+000 Offset | 0.0000E+000 | Column Parameter −6 |
| Surf | 1 NSC Object | 224 Parameter | 3: Pickup From | 3 Scale | 1.0000E+000 Offset | 0.0000E+000 | Column Parameter −6 |
| Surf | 1 NSC Object | 224 Parameter | 5: Pickup From | 33 Scale | 1.0000E+000 Offset | 0.0000E+000 | Column Parameter −6 |
| Surf | 1 NSC Object | 224 Parameter | 6: Pickup From | 3 Scale | 1.0000E+000 Offset | 0.0000E+000 | Column Parameter −6 |
| Surf | 1 NSC Object | 224 Parameter | 7: Pickup From | 3 Scale | 1.0000E+000 Offset | 0.0000E+000 | Column Parameter −6 |
| Surf | 1 NSC Object | 224 Parameter | 8: Pickup From | 3 Scale | 1.0000E+000 Offset | 0.0000E+000 | Column Parameter −6 |
| Surf | 1 NSC Object | 225 Position | Y: Pickup From | 4 Scale | 1.0000E+000 Offset | 0.0000E+000 | Column Parameter −6 |
| Surf | 1 NSC Object | 226 Position | Y: Pickup From | 4 Scale | −1.0000E+000 Offset | 0.0000E+000 | Column Parameter −6 |
| Surf | 1 NSC Object | 226 Parameter | 1: Pickup From | 3 Scale | 1.0000E+000 Offset | 0.0000E+000 | Column Parameter −6 |
| Surf | 1 NSC Object | 226 Parameter | 2: Pickup From | 3 Scale | 1.0000E+000 Offset | 0.0000E+000 | Column Parameter −6 |
| Surf | 1 NSC Object | 226 Parameter | 3: Pickup From | 3 Scale | 1.0000E+000 Offset | 0.0000E+000 | Column Parameter −6 |
| Surf | 1 NSC Object | 226 Parameter | 5: Pickup From | 33 Scale | 1.0000E+000 Offset | 0.0000E+000 | Column Parameter −6 |
| Surf | 1 NSC Object | 226 Parameter | 6: Pickup From | 3 Scale | 1.0000E+000 Offset | 0.0000E+000 | Column Parameter −6 |
| Surf | 1 NSC Object | 226 Parameter | 7: Pickup From | 3 Scale | 1.0000E+000 Offset | 0.0000E+000 | Column Parameter −6 |
| Surf | 1 NSC Object | 226 Parameter | 8: Pickup From | 3 Scale | 1.0000E+000 Offset | 0.0000E+000 | Column Parameter −6 |
| Surf | 1 NSC Object | 227 Position | Y: Pickup From | 4 Scale | −1.0000E+000 Offset | 0.0000E+000 | Column Parameter −6 |
| Surf | 1 NSC Object | 227 Parameter | 1: Pickup From | 3 Scale | 1.0000E+000 Offset | 0.0000E+000 | Column Parameter −6 |
| Surf | 1 NSC Object | 227 Parameter | 2: Pickup From | 3 Scale | 1.0000E+000 Offset | 0.0000E+000 | Column Parameter −6 |
| Surf | 1 NSC Object | 227 Parameter | 3: Pickup From | 3 Scale | 1.0000E+000 Offset | 0.0000E+000 | Column Parameter −6 |
| Surf | 1 NSC Object | 227 Parameter | 5: Pickup From | 33 Scale | 1.0000E+000 Offset | 0.0000E+000 | Column Parameter −6 |
| Surf | 1 NSC Object | 227 Parameter | 6: Pickup From | 3 Scale | 1.0000E+000 Offset | 0.0000E+000 | Column Parameter −6 |
| Surf | 1 NSC Object | 227 Parameter | 7: Pickup From | 3 Scale | 1.0000E+000 Offset | 0.0000E+000 | Column Parameter −6 |
| Surf | 1 NSC Object | 227 Parameter | 8: Pickup From | 3 Scale | 1.0000E+000 Offset | 0.0000E+000 | Column Parameter −6 |
| Surf | 1 NSC Object | 228 Position | Y: Pickup From | 4 Scale | −1.0000E+000 Offset | 0.0000E+000 | Column Parameter −6 |
| Surf | 1 NSC Object | 228 Parameter | 1: Pickup From | 3 Scale | 1.0000E+000 Offset | 0.0000E+000 | Column Parameter −6 |
| Surf | 1 NSC Object | 228 Parameter | 2: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 228 Parameter | 3: Pickup From | 3 Scale | 1.0000E+000 Offset | 0.0000E+000 | Column Parameter −6 |
| Surf | 1 NSC Object | 228 Parameter | 5: Pickup From | 33 Scale | 1.0000E+000 Offset | 0.0000E+000 | Column Parameter −6 |
| Surf | 1 NSC Object | 228 Parameter | 6: Pickup From | 3 Scale | 1.0000E+000 Offset | 0.0000E+000 | Column Parameter −6 |
| Surf | 1 NSC Object | 228 Parameter | 7: Pickup From | 3 Scale | 1.0000E+000 Offset | 0.0000E+000 | Column Parameter −6 |
| Surf | 1 NSC Object | 228 Parameter | 8: Pickup From | 3 Scale | 1.0000E+000 Offset | 0.0000E+000 | Column Parameter −6 |
| Surf | 1 NSC Object | 229 Position | Y: Pickup From | 4 Scale | −1.0000E+000 Offset | 0.0000E+000 | Column Parameter −6 |
| Surf | 1 NSC Object | 231 Position | X: Pickup From | 2 Scale | 8.0000E+000 Offset | 0.0000E+000 | Column Parameter −6 |
| Surf | 1 NSC Object | 231 Parameter | 1: Pickup From | 3 Scale | 1.0000E+000 Offset | 0.0000E+000 | Column Parameter −6 |
| Surf | 1 NSC Object | 231 Parameter | 2: Pickup From | 3 Scale | 1.0000E+000 Offset | 0.0000E+000 | Column Parameter −6 |
| Surf | 1 NSC Object | 231 Parameter | 3: Pickup From | 3 Scale | 1.0000E+000 Offset | 0.0000E+000 | Column Parameter −6 |
| Surf | 1 NSC Object | 231 Parameter | 6: Pickup From | 3 Scale | 1.0000E+000 Offset | 0.0000E+000 | Column Parameter −6 |
| Surf | 1 NSC Object | 231 Parameter | 7: Pickup From | 3 Scale | 1.0000E+000 Offset | 0.0000E+000 | Column Parameter −6 |
| Surf | 1 NSC Object | 231 Parameter | 8: Pickup From | 3 Scale | 1.0000E+000 Offset | 0.0000E+000 | Column Parameter −6 |
| Surf | 1 NSC Object | 232 Position | Y: Pickup From | 4 Scale | 1.0000E+000 Offset | 0.0000E+000 | Column Parameter −6 |
| Surf | 1 NSC Object | 232 Parameter | 1: Pickup From | 3 Scale | 1.0000E+000 Offset | 0.0000E+000 | Column Parameter −6 |
| Surf | 1 NSC Object | 232 Parameter | 2: Pickup From | 3 Scale | 1.0000E+000 Offset | 0.0000E+000 | Column Parameter −6 |
| Surf | 1 NSC Object | 232 Parameter | 3: Pickup From | 3 Scale | 1.0000E+000 Offset | 0.0000E+000 | Column Parameter −6 |
| Surf | 1 NSC Object | 232 Parameter | 5: Pickup From | 43 Scale | 1.0000E+000 Offset | 0.0000E+000 | Column Parameter −6 |
| Surf | 1 NSC Object | 232 Parameter | 6: Pickup From | 3 Scale | 1.0000E+000 Offset | 0.0000E+000 | Column Parameter −6 |
| Surf | 1 NSC Object | 232 Parameter | 7: Pickup From | 3 Scale | 1.0000E+000 Offset | 0.0000E+000 | Column Parameter −6 |
| Surf | 1 NSC Object | 232 Parameter | 8: Pickup From | 3 Scale | 1.0000E+000 Offset | 0.0000E+000 | Column Parameter −6 |
| Surf | 1 NSC Object | 233 Position | Y: Pickup From | 4 Scale | 1.0000E+000 Offset | 0.0000E+000 | Column Parameter −6 |
| Surf | 1 NSC Object | 233 Parameter | 1: Pickup From | 3 Scale | 1.0000E+000 Offset | 0.0000E+000 | Column Parameter −6 |
| Surf | 1 NSC Object | 233 Parameter | 2: Pickup From | 3 Scale | 1.0000E+000 Offset | 0.0000E+000 | Column Parameter −6 |
| Surf | 1 NSC Object | 233 Parameter | 3: Pickup From | 3 Scale | 1.0000E+000 Offset | 0.0000E+000 | Column Parameter −6 |
| Surf | 1 NSC Object | 233 Parameter | 5: Pickup From | 43 Scale | 1.0000E+000 Offset | 0.0000E+000 | Column Parameter −6 |
| Surf | 1 NSC Object | 233 Parameter | 6: Pickup From | 3 Scale | 1.0000E+000 Offset | 0.0000E+000 | Column Parameter −6 |
| Surf | 1 NSC Object | 233 Parameter | 7: Pickup From | 3 Scale | 1.0000E+000 Offset | 0.0000E+000 | Column Parameter −6 |
| Surf | 1 NSC Object | 233 Parameter | 8: Pickup From | 3 Scale | 1.0000E+000 Offset | 0.0000E+000 | Column Parameter −6 |
| Surf | 1 NSC Object | 234 Position | Y: Pickup From | 4 Scale | 1.0000E+000 Offset | 0.0000E+000 | Column Parameter −6 |
| Surf | 1 NSC Object | 235 Position | Y: Pickup From | 4 Scale | 1.0000E+000 Offset | 0.0000E+000 | Column Parameter −6 |
| Surf | 1 NSC Object | 236 Position | Y: Pickup From | 4 Scale | −1.0000E+000 Offset | 0.0000E+000 | Column Parameter −6 |
| Surf | 1 NSC Object | 236 Parameter | 1: Pickup From | 3 Scale | 1.0000E+000 Offset | 0.0000E+000 | Column Parameter −6 |
| Surf | 1 NSC Object | 236 Parameter | 2: Pickup From | 3 Scale | 1.0000E+000 Offset | 0.0000E+000 | Column Parameter −6 |
| Surf | 1 NSC Object | 236 Parameter | 3: Pickup From | 3 Scale | 1.0000E+000 Offset | 0.0000E+000 | Column Parameter −6 |
| Surf | 1 NSC Object | 236 Parameter | 5: Pickup From | 43 Scale | 1.0000E+000 Offset | 0.0000E+000 | Column Parameter −6 |
| Surf | 1 NSC Object | 236 Parameter | 6: Pickup From | 3 Scale | 1.0000E+000 Offset | 0.0000E+000 | Column Parameter −6 |
| Surf | 1 NSC Object | 236 Parameter | 7: Pickup From | 3 Scale | 1.0000E+000 Offset | 0.0000E+000 | Column Parameter −6 |
| Surf | 1 NSC Object | 236 Parameter | 8: Pickup From | 3 Scale | 1.0000E+000 Offset | 0.0000E+000 | Column Parameter −6 |
| Surf | 1 NSC Object | 237 Position | Y: Pickup From | 4 Scale | −1.0000E+000 Offset | 0.0000E+000 | Column Parameter −6 |
| Surf | 1 NSC Object | 237 Parameter | 1: Pickup From | 3 Scale | 1.0000E+000 Offset | 0.0000E+000 | Column Parameter −6 |
| Surf | 1 NSC Object | 237 Parameter | 2: Pickup From | 3 Scale | 1.0000E+000 Offset | 0.0000E+000 | Column Parameter −6 |
| Surf | 1 NSC Object | 237 Parameter | 3: Pickup From | 3 Scale | 1.0000E+000 Offset | 0.0000E+000 | Column Parameter −6 |
| Surf | 1 NSC Object | 237 Parameter | 5: Pickup From | 43 Scale | 1.0000E+000 Offset | 0.0000E+000 | Column Parameter −6 |
| Surf | 1 NSC Object | 237 Parameter | 6: Pickup From | 3 Scale | 1.0000E+000 Offset | 0.0000E+000 | Column Parameter −6 |
| Surf | 1 NSC Object | 237 Parameter | 7: Pickup From | 3 Scale | 1.0000E+000 Offset | 0.0000E+000 | Column Parameter −6 |
| Surf | 1 NSC Object | 237 Parameter | 8: Pickup From | 3 Scale | 1.0000E+000 Offset | 0.0000E+000 | Column Parameter −6 |
| Surf | 1 NSC Object | 238 Position | Y: Pickup From | 4 Scale | −1.0000E+000 Offset | 0.0000E+000 | Column Parameter −6 |
| Surf | 1 NSC Object | 239 Position | Y: Pickup From | 4 Scale | −1.0000E+000 Offset | 0.0000E+000 | Column Parameter −6 |
| Surf | 1 NSC Object | 241 Position | X: Pickup From | 2 Scale | −2.0000E+000 Offset | 0.0000E+000 | Column Parameter −6 |
| Surf | 1 NSC Object | 241 Parameter | 1: Pickup From | 3 Scale | 1.0000E+000 Offset | 0.0000E+000 | Column Parameter −6 |
| Surf | 1 NSC Object | 241 Parameter | 2: Pickup From | 3 Scale | 1.0000E+000 Offset | 0.0000E+000 | Column Parameter −6 |
| Surf | 1 NSC Object | 241 Parameter | 3: Pickup From | 3 Scale | 1.0000E+000 Offset | 0.0000E+000 | Column Parameter −6 |
| Surf | 1 NSC Object | 241 Parameter | 6: Pickup From | 3 Scale | 1.0000E+000 Offset | 0.0000E+000 | Column Parameter −6 |
| Surf | 1 NSC Object | 241 Parameter | 7: Pickup From | 3 Scale | 1.0000E+000 Offset | 0.0000E+000 | Column Parameter −6 |
| Surf | 1 NSC Object | 241 Parameter | 8: Pickup From | 3 Scale | 1.0000E+000 Offset | 0.0000E+000 | Column Parameter −6 |
| Surf | 1 NSC Object | 242 Position | Y: Pickup From | 4 Scale | 1.0000E+000 Offset | 0.0000E+000 | Column Parameter −6 |
| Surf | 1 NSC Object | 242 Parameter | 1: Pickup From | 3 Scale | 1.0000E+000 Offset | 0.0000E+000 | Column Parameter −6 |
| Surf | 1 NSC Object | 242 Parameter | 2: Pickup From | 3 Scale | 1.0000E+000 Offset | 0.0000E+000 | Column Parameter −6 |
| Surf | 1 NSC Object | 242 Parameter | 3: Pickup From | 3 Scale | 1.0000E+000 Offset | 0.0000E+000 | Column Parameter −6 |
| Surf | 1 NSC Object | 242 Parameter | 5: Pickup From | 53 Scale | 1.0000E+000 Offset | 0.0000E+000 | Column Parameter −6 |
| Surf | 1 NSC Object | 242 Parameter | 6: Pickup From | 3 Scale | 1.0000E+000 Offset | 0.0000E+000 | Column Parameter −6 |
| Surf | 1 NSC Object | 242 Parameter | 7: Pickup From | 3 Scale | 1.0000E+000 Offset | 0.0000E+000 | Column Parameter −6 |
| Surf | 1 NSC Object | 242 Parameter | 8: Pickup From | 3 Scale | 1.0000E+000 Offset | 0.0000E+000 | Column Parameter −6 |
| Surf | 1 NSC Object | 243 Position | Y: Pickup From | 4 Scale | 1.0000E+000 Offset | 0.0000E+000 | Column Parameter −6 |
| Surf | 1 NSC Object | 243 Parameter | 1: Pickup From | 3 Scale | 1.0000E+000 Offset | 0.0000E+000 | Column Parameter −6 |
| Surf | 1 NSC Object | 243 Parameter | 2: Pickup From | 3 Scale | 1.0000E+000 Offset | 0.0000E+000 | Column Parameter −6 |
| Surf | 1 NSC Object | 243 Parameter | 3: Pickup From | 3 Scale | 1.0000E+000 Offset | 0.0000E+000 | Column Parameter −6 |
| Surf | 1 NSC Object | 243 Parameter | 5: Pickup From | 53 Scale | 1.0000E+000 Offset | 0.0000E+000 | Column Parameter −6 |
| Surf | 1 NSC Object | 243 Parameter | 6: Pickup From | 3 Scale | 1.0000E+000 Offset | 0.0000E+000 | Column Parameter −6 |
| Surf | 1 NSC Object | 243 Parameter | 7: Pickup From | 3 Scale | 1.0000E+000 Offset | 0.0000E+000 | Column Parameter −6 |
| Surf | 1 NSC Object | 243 Parameter | 8: Pickup From | 3 Scale | 1.0000E+000 Offset | 0.0000E+000 | Column Parameter −6 |
| Surf | 1 NSC Object | 244 Position | Y: Pickup From | 4 Scale | 1.0000E+000 Offset | 0.0000E+000 | Column Parameter −6 |
| Surf | 1 NSC Object | 244 Parameter | 1: Pickup From | 3 Scale | 1.0000E+000 Offset | 0.0000E+000 | Column Parameter −6 |
| Surf | 1 NSC Object | 244 Parameter | 2: Pickup From | 3 Scale | 1.0000E+000 Offset | 0.0000E+000 | Column Parameter −6 |
| Surf | 1 NSC Object | 244 Parameter | 3: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 244 Parameter | 5: Pickup From | 53 Scale | 1.0000E+000 Offset | 0.0000E+000 | Column Parameter −6 |
| Surf | 1 NSC Object | 244 Parameter | 6: Pickup From | 3 Scale | 1.0000E+000 Offset | 0.0000E+000 | Column Parameter −6 |
| Surf | 1 NSC Object | 244 Parameter | 7: Pickup From | 3 Scale | 1.0000E+000 Offset | 0.0000E+000 | Column Parameter −6 |
| Surf | 1 NSC Object | 244 Parameter | 8: Pickup From | 3 Scale | 1.0000E+000 Offset | 0.0000E+000 | Column Parameter −6 |
| Surf | 1 NSC Object | 245 Position | Y: Pickup From | 4 Scale | 1.0000E+000 Offset | 0.0000E+000 | Column Parameter −6 |
| Surf | 1 NSC Object | 245 Parameter | 1: Pickup From | 3 Scale | 1.0000E+000 Offset | 0.0000E+000 | Column Parameter −6 |
| Surf | 1 NSC Object | 245 Parameter | 2: Pickup From | 3 Scale | 1.0000E+000 Offset | 0.0000E+000 | Column Parameter −6 |
| Surf | 1 NSC Object | 245 Parameter | 3: Pickup From | 3 Scale | 1.0000E+000 Offset | 0.0000E+000 | Column Parameter −6 |
| Surf | 1 NSC Object | 245 Parameter | 5: Pickup From | 53 Scale | 1.0000E+000 Offset | 0.0000E+000 | Column Parameter −6 |
| Surf | 1 NSC Object | 245 Parameter | 6: Pickup From | 3 Scale | 1.0000E+000 Offset | 0.0000E+000 | Column Parameter −6 |
| Surf | 1 NSC Object | 245 Parameter | 7: Pickup From | 3 Scale | 1.0000E+000 Offset | 0.0000E+000 | Column Parameter −6 |
| Surf | 1 NSC Object | 245 Parameter | 8: Pickup From | 3 Scale | 1.0000E+000 Offset | 0.0000E+000 | Column Parameter −6 |
| Surf | 1 NSC Object | 246 Position | Y: Pickup From | 4 Scale | −1.0000E+000 Offset | 0.0000E+000 | Column Parameter −6 |
| Surf | 1 NSC Object | 246 Parameter | 1: Pickup From | 3 Scale | 1.0000E+000 Offset | 0.0000E+000 | Column Parameter −6 |
| Surf | 1 NSC Object | 246 Parameter | 2: Pickup From | 3 Scale | 1.0000E+000 Offset | 0.0000E+000 | Column Parameter −6 |
| Surf | 1 NSC Object | 246 Parameter | 3: Pickup From | 3 Scale | 1.0000E+000 Offset | 0.0000E+000 | Column Parameter −6 |
| Surf | 1 NSC Object | 246 Parameter | 5: Pickup From | 53 Scale | 1.0000E+000 Offset | 0.0000E+000 | Column Parameter −6 |
| Surf | 1 NSC Object | 246 Parameter | 6: Pickup From | 3 Scale | 1.0000E+000 Offset | 0.0000E+000 | Column Parameter −6 |
| Surf | 1 NSC Object | 246 Parameter | 7: Pickup From | 3 Scale | 1.0000E+000 Offset | 0.0000E+000 | Column Parameter −6 |
| Surf | 1 NSC Object | 246 Parameter | 8: Pickup From | 3 Scale | 1.0000E+000 Offset | 0.0000E+000 | Column Parameter −6 |
| Surf | 1 NSC Object | 247 Position | Y: Pickup From | 4 Scale | −1.0000E+000 Offset | 0.0000E+000 | Column Parameter −6 |
| Surf | 1 NSC Object | 247 Parameter | 1: Pickup From | 3 Scale | 1.0000E+000 Offset | 0.0000E+000 | Column Parameter −6 |
| Surf | 1 NSC Object | 247 Parameter | 2: Pickup From | 3 Scale | 1.0000E+000 Offset | 0.0000E+000 | Column Parameter −6 |
| Surf | 1 NSC Object | 247 Parameter | 3: Pickup From | 3 Scale | 1.0000E+000 Offset | 0.0000E+000 | Column Parameter −6 |
| Surf | 1 NSC Object | 247 Parameter | 5: Pickup From | 53 Scale | 1.0000E+000 Offset | 0.0000E+000 | Column Parameter −6 |
| Surf | 1 NSC Object | 247 Parameter | 6: Pickup From | 3 Scale | 1.0000E+000 Offset | 0.0000E+000 | Column Parameter −6 |
| Surf | 1 NSC Object | 247 Parameter | 7: Pickup From | 3 Scale | 1.0000E+000 Offset | 0.0000E+000 | Column Parameter −6 |
| Surf | 1 NSC Object | 247 Parameter | 8: Pickup From | 3 Scale | 1.0000E+000 Offset | 0.0000E+000 | Column Parameter −6 |
| Surf | 1 NSC Object | 248 Position | Y: Pickup From | 4 Scale | −1.0000E+000 Offset | 0.0000E+000 | Column Parameter −6 |
| Surf | 1 NSC Object | 248 Parameter | 1: Pickup From | 3 Scale | 1.0000E+000 Offset | 0.0000E+000 | Column Parameter −6 |
| Surf | 1 NSC Object | 248 Parameter | 2: Pickup From | 3 Scale | 1.0000E+000 Offset | 0.0000E+000 | Column Parameter −6 |
| Surf | 1 NSC Object | 248 Parameter | 3: Pickup From | 3 Scale | 1.0000E+000 Offset | 0.0000E+000 | Column Parameter −6 |
| Surf | 1 NSC Object | 248 Parameter | 5: Pickup From | 53 Scale | 1.0000E+000 Offset | 0.0000E+000 | Column Parameter −6 |
| Surf | 1 NSC Object | 248 Parameter | 6: Pickup From | 3 Scale | 1.0000E+000 Offset | 0.0000E+000 | Column Parameter −6 |
| Surf | 1 NSC Object | 248 Parameter | 7: Pickup From | 3 Scale | 1.0000E+000 Offset | 0.0000E+000 | Column Parameter −6 |
| Surf | 1 NSC Object | 248 Parameter | 8: Pickup From | 3 Scale | 1.0000E+000 Offset | 0.0000E+000 | Column Parameter −6 |
| Surf | 1 NSC Object | 249 Position | Y: Pickup From | 4 Scale | −1.0000E+000 Offset | 0.0000E+000 | Column Parameter −6 |
| Surf | 1 NSC Object | 249 Parameter | 2: Pickup From | 3 Scale | 1.0000E+000 Offset | 0.0000E+000 | Column Parameter −6 |
| Surf | 1 NSC Object | 249 Parameter | 3: Pickup From | 3 Scale | 1.0000E+000 Offset | 0.0000E+000 | Column Parameter −6 |
| Surf | 1 NSC Object | 249 Parameter | 5: Pickup From | 53 Scale | 1.0000E+000 Offset | 0.0000E+000 | Column Parameter −6 |
| Surf | 1 NSC Object | 249 Parameter | 6: Pickup From | 3 Scale | 1.0000E+000 Offset | 0.0000E+000 | Column Parameter −6 |
| Surf | 1 NSC Object | 249 Parameter | 7: Pickup From | 3 Scale | 1.0000E+000 Offset | 0.0000E+000 | Column Parameter −6 |
| Surf | 1 NSC Object | 249 Parameter | 8: Pickup From | 3 Scale | 1.0000E+000 Offset | 0.0000E+000 | Column Parameter −6 |
| Surf | 1 NSC Object | 251 Position | X: Pickup From | 2 Scale | −4.0000E+000 Offset | 0.0000E+000 | Column Parameter −6 |
| Surf | 1 NSC Object | 251 Parameter | 1: Pickup From | 3 Scale | 1.0000E+000 Offset | 0.0000E+000 | Column Parameter −6 |
| Surf | 1 NSC Object | 251 Parameter | 2: Pickup From | 3 Scale | 1.0000E+000 Offset | 0.0000E+000 | Column Parameter −6 |
| Surf | 1 NSC Object | 251 Parameter | 3: Pickup From | 3 Scale | 1.0000E+000 Offset | 0.0000E+000 | Column Parameter −6 |
| Surf | 1 NSC Object | 251 Parameter | 6: Pickup From | 3 Scale | 1.0000E+000 Offset | 0.0000E+000 | Column Parameter −6 |
| Surf | 1 NSC Object | 251 Parameter | 7: Pickup From | 3 Scale | 1.0000E+000 Offset | 0.0000E+000 | Column Parameter −6 |
| Surf | 1 NSC Object | 251 Parameter | 8: Pickup From | 3 Scale | 1.0000E+000 Offset | 0.0000E+000 | Column Parameter −6 |
| Surf | 1 NSC Object | 252 Position | Y: Pickup From | 4 Scale | 1.0000E+000 Offset | 0.0000E+000 | Column Parameter −6 |
| Surf | 1 NSC Object | 252 Parameter | 1: Pickup From | 3 Scale | 1.0000E+000 Offset | 0.0000E+000 | Column Parameter −6 |
| Surf | 1 NSC Object | 252 Parameter | 2: Pickup From | 3 Scale | 1.0000E+000 Offset | 0.0000E+000 | Column Parameter −6 |
| Surf | 1 NSC Object | 252 Parameter | 3: Pickup From | 3 Scale | 1.0000E+000 Offset | 0.0000E+000 | Column Parameter −6 |
| Surf | 1 NSC Object | 252 Parameter | 5: Pickup From | 63 Scale | 1.0000E+000 Offset | 0.0000E+000 | Column Parameter −6 |
| Surf | 1 NSC Object | 252 Parameter | 6: Pickup From | 3 Scale | 1.0000E+000 Offset | 0.0000E+000 | Column Parameter −6 |
| Surf | 1 NSC Object | 252 Parameter | 7: Pickup From | 3 Scale | 1.0000E+000 Offset | 0.0000E+000 | Column Parameter −6 |
| Surf | 1 NSC Object | 252 Parameter | 8: Pickup From | 3 Scale | 1.0000E+000 Offset | 0.0000E+000 | Column Parameter −6 |
| Surf | 1 NSC Object | 253 Position | Y: Pickup From | 4 Scale | 1.0000E+000 Offset | 0.0000E+000 | Column Parameter −6 |
| Surf | 1 NSC Object | 253 Parameter | 1: Pickup From | 3 Scale | 1.0000E+000 Offset | 0.0000E+000 | Column Parameter −6 |
| Surf | 1 NSC Object | 253 Parameter | 2: Pickup From | 3 Scale | 1.0000E+000 Offset | 0.0000E+000 | Column Parameter −6 |
| Surf | 1 NSC Object | 253 Parameter | 3: Pickup From | 3 Scale | 1.0000E+000 Offset | 0.0000E+000 | Column Parameter −6 |
| Surf | 1 NSC Object | 253 Parameter | 5: Pickup From | 63 Scale | 1.0000E+000 Offset | 0.0000E+000 | Column Parameter −6 |
| Surf | 1 NSC Object | 253 Parameter | 6: Pickup From | 3 Scale | 1.0000E+000 Offset | 0.0000E+000 | Column Parameter −6 |
| Surf | 1 NSC Object | 253 Parameter | 7: Pickup From | 3 Scale | 1.0000E+000 Offset | 0.0000E+000 | Column Parameter −6 |
| Surf | 1 NSC Object | 253 Parameter | 8: Pickup From | 3 Scale | 1.0000E+000 Offset | 0.0000E+000 | Column Parameter −6 |
| Surf | 1 NSC Object | 254 Position | Y: Pickup From | 4 Scale | 1.0000E+000 Offset | 0.0000E+000 | Column Parameter −6 |
| Surf | 1 NSC Object | 254 Parameter | 1: Pickup From | 3 Scale | 1.0000E+000 Offset | 0.0000E+000 | Column Parameter −6 |
| Surf | 1 NSC Object | 254 Parameter | 2: Pickup From | 3 Scale | 1.0000E+000 Offset | 0.0000E+000 | Column Parameter −6 |
| Surf | 1 NSC Object | 254 Parameter | 3: Pickup From | 3 Scale | 1.0000E+000 Offset | 0.0000E+000 | Column Parameter −6 |
| Surf | 1 NSC Object | 254 Parameter | 5: Pickup From | 63 Scale | 1.0000E+000 Offset | 0.0000E+000 | Column Parameter −6 |
| Surf | 1 NSC Object | 254 Parameter | 6: Pickup From | 3 Scale | 1.0000E+000 Offset | 0.0000E+000 | Column Parameter −6 |
| Surf | 1 NSC Object | 254 Parameter | 7: Pickup From | 3 Scale | 1.0000E+000 Offset | 0.0000E+000 | Column Parameter −6 |
| Surf | 1 NSC Object | 254 Parameter | 8: Pickup From | 3 Scale | 1.0000E+000 Offset | 0.0000E+000 | Column Parameter −6 |
| Surf | 1 NSC Object | 255 Position | Y: Pickup From | 4 Scale | 1.0000E+000 Offset | 0.0000E+000 | Column Parameter −6 |
| Surf | 1 NSC Object | 255 Parameter | 1: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 255 Parameter | 2: Pickup From | 3 Scale | 1.0000E+000 Offset | 0.0000E+000 | Column Parameter −6 |
| Surf | 1 NSC Object | 255 Parameter | 3: Pickup From | 3 Scale | 1.0000E+000 Offset | 0.0000E+000 | Column Parameter −6 |
| Surf | 1 NSC Object | 255 Parameter | 5: Pickup From | 63 Scale | 1.0000E+000 Offset | 0.0000E+000 | Column Parameter −6 |
| Surf | 1 NSC Object | 255 Parameter | 6: Pickup From | 3 Scale | 1.0000E+000 Offset | 0.0000E+000 | Column Parameter −6 |
| Surf | 1 NSC Object | 255 Parameter | 7: Pickup From | 3 Scale | 1.0000E+000 Offset | 0.0000E+000 | Column Parameter −6 |
| Surf | 1 NSC Object | 255 Parameter | 8: Pickup From | 3 Scale | 1.0000E+000 Offset | 0.0000E+000 | Column Parameter −6 |
| Surf | 1 NSC Object | 256 Position | Y: Pickup From | 4 Scale | −1.0000E+000 Offset | 0.0000E+000 | Column Parameter −6 |
| Surf | 1 NSC Object | 256 Parameter | 1: Pickup From | 3 Scale | 1.0000E+000 Offset | 0.0000E+000 | Column Parameter −6 |
| Surf | 1 NSC Object | 256 Parameter | 2: Pickup From | 3 Scale | 1.0000E+000 Offset | 0.0000E+000 | Column Parameter −6 |
| Surf | 1 NSC Object | 256 Parameter | 3: Pickup From | 3 Scale | 1.0000E+000 Offset | 0.0000E+000 | Column Parameter −6 |
| Surf | 1 NSC Object | 256 Parameter | 5: Pickup From | 63 Scale | 1.0000E+000 Offset | 0.0000E+000 | Column Parameter −6 |
| Surf | 1 NSC Object | 256 Parameter | 6: Pickup From | 3 Scale | 1.0000E+000 Offset | 0.0000E+000 | Column Parameter −6 |
| Surf | 1 NSC Object | 256 Parameter | 7: Pickup From | 3 Scale | 1.0000E+000 Offset | 0.0000E+000 | Column Parameter −6 |
| Surf | 1 NSC Object | 256 Parameter | 8: Pickup From | 3 Scale | 1.0000E+000 Offset | 0.0000E+000 | Column Parameter −6 |
| Surf | 1 NSC Object | 257 Position | Y: Pickup From | 4 Scale | −1.0000E+000 Offset | 0.0000E+000 | Column Parameter −6 |
| Surf | 1 NSC Object | 257 Parameter | 1: Pickup From | 3 Scale | 1.0000E+000 Offset | 0.0000E+000 | Column Parameter −6 |
| Surf | 1 NSC Object | 257 Parameter | 2: Pickup From | 3 Scale | 1.0000E+000 Offset | 0.0000E+000 | Column Parameter −6 |
| Surf | 1 NSC Object | 257 Parameter | 3: Pickup From | 3 Scale | 1.0000E+000 Offset | 0.0000E+000 | Column Parameter −6 |
| Surf | 1 NSC Object | 257 Parameter | 5: Pickup From | 63 Scale | 1.0000E+000 Offset | 0.0000E+000 | Column Parameter −6 |
| Surf | 1 NSC Object | 257 Parameter | 6: Pickup From | 3 Scale | 1.0000E+000 Offset | 0.0000E+000 | Column Parameter −6 |
| Surf | 1 NSC Object | 257 Parameter | 7: Pickup From | 3 Scale | 1.0000E+000 Offset | 0.0000E+000 | Column Parameter −6 |
| Surf | 1 NSC Object | 257 Parameter | 8: Pickup From | 3 Scale | 1.0000E+000 Offset | 0.0000E+000 | Column Parameter −6 |
| Surf | 1 NSC Object | 258 Position | Y: Pickup From | 4 Scale | −1.0000E+000 Offset | 0.0000E+000 | Column Parameter −6 |
| Surf | 1 NSC Object | 258 Parameter | 1: Pickup From | 3 Scale | 1.0000E+000 Offset | 0.0000E+000 | Column Parameter −6 |
| Surf | 1 NSC Object | 258 Parameter | 2: Pickup From | 3 Scale | 1.0000E+000 Offset | 0.0000E+000 | Column Parameter −6 |
| Surf | 1 NSC Object | 258 Parameter | 3: Pickup From | 3 Scale | 1.0000E+000 Offset | 0.0000E+000 | Column Parameter −6 |
| Surf | 1 NSC Object | 258 Parameter | 5: Pickup From | 63 Scale | 1.0000E+000 Offset | 0.0000E+000 | Column Parameter −6 |
| Surf | 1 NSC Object | 258 Parameter | 6: Pickup From | 3 Scale | 1.0000E+000 Offset | 0.0000E+000 | Column Parameter −6 |
| Surf | 1 NSC Object | 258 Parameter | 7: Pickup From | 3 Scale | 1.0000E+000 Offset | 0.0000E+000 | Column Parameter −6 |
| Surf | 1 NSC Object | 258 Parameter | 8: Pickup From | 3 Scale | 1.0000E+000 Offset | 0.0000E+000 | Column Parameter −6 |
| Surf | 1 NSC Object | 259 Position | Y: Pickup From | 4 Scale | −1.0000E+000 Offset | 0.0000E+000 | Column Parameter −6 |
| Surf | 1 NSC Object | 259 Parameter | 1: Pickup From | 3 Scale | 1.0000E+000 Offset | 0.0000E+000 | Column Parameter −6 |
| Surf | 1 NSC Object | 259 Parameter | 2: Pickup From | 3 Scale | 1.0000E+000 Offset | 0.0000E+000 | Column Parameter −6 |
| Surf | 1 NSC Object | 259 Parameter | 3: Pickup From | 3 Scale | 1.0000E+000 Offset | 0.0000E+000 | Column Parameter −6 |
| Surf | 1 NSC Object | 259 Parameter | 5: Pickup From | 63 Scale | 1.0000E+000 Offset | 0.0000E+000 | Column Parameter −6 |
| Surf | 1 NSC Object | 259 Parameter | 6: Pickup From | 3 Scale | 1.0000E+000 Offset | 0.0000E+000 | Column Parameter −6 |
| Surf | 1 NSC Object | 259 Parameter | 7: Pickup From | 3 Scale | 1.0000E+000 Offset | 0.0000E+000 | Column Parameter −6 |
| Surf | 1 NSC Object | 259 Parameter | 8: Pickup From | 3 Scale | 1.0000E+000 Offset | 0.0000E+000 | Column Parameter −6 |
| Surf | 1 NSC Object | 261 Position | X: Pickup From | 2 Scale | −6.0000E+000 Offset | 0.0000E+000 | Column Parameter −6 |
| Surf | 1 NSC Object | 261 Parameter | 1: Pickup From | 3 Scale | 1.0000E+000 Offset | 0.0000E+000 | Column Parameter −6 |
| Surf | 1 NSC Object | 261 Parameter | 2: Pickup From | 3 Scale | 1.0000E+000 Offset | 0.0000E+000 | Column Parameter −6 |
| Surf | 1 NSC Object | 261 Parameter | 3: Pickup From | 3 Scale | 1.0000E+000 Offset | 0.0000E+000 | Column Parameter −6 |
| Surf | 1 NSC Object | 261 Parameter | 6: Pickup From | 3 Scale | 1.0000E+000 Offset | 0.0000E+000 | Column Parameter −6 |
| Surf | 1 NSC Object | 261 Parameter | 7: Pickup From | 3 Scale | 1.0000E+000 Offset | 0.0000E+000 | Column Parameter −6 |
| Surf | 1 NSC Object | 261 Parameter | 8: Pickup From | 3 Scale | 1.0000E+000 Offset | 0.0000E+000 | Column Parameter −6 |
| Surf | 1 NSC Object | 262 Position | Y: Pickup From | 4 Scale | 1.0000E+000 Offset | 0.0000E+000 | Column Parameter −6 |
| Surf | 1 NSC Object | 262 Parameter | 1: Pickup From | 3 Scale | 1.0000E+000 Offset | 0.0000E+000 | Column Parameter −6 |
| Surf | 1 NSC Object | 262 Parameter | 2: Pickup From | 3 Scale | 1.0000E+000 Offset | 0.0000E+000 | Column Parameter −6 |
| Surf | 1 NSC Object | 262 Parameter | 3: Pickup From | 3 Scale | 1.0000E+000 Offset | 0.0000E+000 | Column Parameter −6 |
| Surf | 1 NSC Object | 262 Parameter | 5: Pickup From | 73 Scale | 1.0000E+000 Offset | 0.0000E+000 | Column Parameter −6 |
| Surf | 1 NSC Object | 262 Parameter | 6: Pickup From | 3 Scale | 1.0000E+000 Offset | 0.0000E+000 | Column Parameter −6 |
| Surf | 1 NSC Object | 262 Parameter | 7: Pickup From | 3 Scale | 1.0000E+000 Offset | 0.0000E+000 | Column Parameter −6 |
| Surf | 1 NSC Object | 262 Parameter | 8: Pickup From | 3 Scale | 1.0000E+000 Offset | 0.0000E+000 | Column Parameter −6 |
| Surf | 1 NSC Object | 263 Position | Y: Pickup From | 4 Scale | 1.0000E+000 Offset | 0.0000E+000 | Column Parameter −6 |
| Surf | 1 NSC Object | 263 Parameter | 1: Pickup From | 3 Scale | 1.0000E+000 Offset | 0.0000E+000 | Column Parameter −6 |
| Surf | 1 NSC Object | 263 Parameter | 2: Pickup From | 3 Scale | 1.0000E+000 Offset | 0.0000E+000 | Column Parameter −6 |
| Surf | 1 NSC Object | 263 Parameter | 3: Pickup From | 3 Scale | 1.0000E+000 Offset | 0.0000E+000 | Column Parameter −6 |
| Surf | 1 NSC Object | 263 Parameter | 5: Pickup From | 73 Scale | 1.0000E+000 Offset | 0.0000E+000 | Column Parameter −6 |
| Surf | 1 NSC Object | 263 Parameter | 6: Pickup From | 3 Scale | 1.0000E+000 Offset | 0.0000E+000 | Column Parameter −6 |
| Surf | 1 NSC Object | 263 Parameter | 7: Pickup From | 3 Scale | 1.0000E+000 Offset | 0.0000E+000 | Column Parameter −6 |
| Surf | 1 NSC Object | 263 Parameter | 8: Pickup From | 3 Scale | 1.0000E+000 Offset | 0.0000E+000 | Column Parameter −6 |
| Surf | 1 NSC Object | 264 Position | Y: Pickup From | 4 Scale | 1.0000E+000 Offset | 0.0000E+000 | Column Parameter −6 |
| Surf | 1 NSC Object | 264 Parameter | 1: Pickup From | 3 Scale | 1.0000E+000 Offset | 0.0000E+000 | Column Parameter −6 |
| Surf | 1 NSC Object | 264 Parameter | 2: Pickup From | 3 Scale | 1.0000E+000 Offset | 0.0000E+000 | Column Parameter −6 |
| Surf | 1 NSC Object | 264 Parameter | 3: Pickup From | 3 Scale | 1.0000E+000 Offset | 0.0000E+000 | Column Parameter −6 |
| Surf | 1 NSC Object | 264 Parameter | 5: Pickup From | 73 Scale | 1.0000E+000 Offset | 0.0000E+000 | Column Parameter −6 |
| Surf | 1 NSC Object | 264 Parameter | 6: Pickup From | 3 Scale | 1.0000E+000 Offset | 0.0000E+000 | Column Parameter −6 |
| Surf | 1 NSC Object | 264 Parameter | 7: Pickup From | 3 Scale | 1.0000E+000 Offset | 0.0000E+000 | Column Parameter −6 |
| Surf | 1 NSC Object | 264 Parameter | 8: Pickup From | 3 Scale | 1.0000E+000 Offset | 0.0000E+000 | Column Parameter −6 |
| Surf | 1 NSC Object | 265 Position | Y: Pickup From | 4 Scale | 1.0000E+000 Offset | 0.0000E+000 | Column Parameter −6 |
| Surf | 1 NSC Object | 266 Position | Y: Pickup From | 4 Scale | −1.0000E+000 Offset | 0.0000E+000 | Column Parameter −6 |
| Surf | 1 NSC Object | 266 Parameter | 1: Pickup From | 3 Scale | 1.0000E+000 Offset | 0.0000E+000 | Column Parameter −6 |
| Surf | 1 NSC Object | 266 Parameter | 2: Pickup From | 3 Scale | 1.0000E+000 Offset | 0.0000E+000 | Column Parameter −6 |
| Surf | 1 NSC Object | 266 Parameter | 3: Pickup From | 3 Scale | 1.0000E+000 Offset | 0.0000E+000 | Column Parameter −6 |
| Surf | 1 NSC Object | 266 Parameter | 5: Pickup From | 73 Scale | 1.0000E+000 Offset | 0.0000E+000 | Column Parameter −6 |
| Surf | 1 NSC Object | 266 Parameter | 6: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 266 Parameter | 7: Pickup From | 3 Scale | 1.0000E+000 Offset | 0.0000E+000 | Column Parameter −6 |
| Surf | 1 NSC Object | 266 Parameter | 8: Pickup From | 3 Scale | 1.0000E+000 Offset | 0.0000E+000 | Column Parameter −6 |
| Surf | 1 NSC Object | 267 Position | Y: Pickup From | 4 Scale | −1.0000E+000 Offset | 0.0000E+000 | Column Parameter −6 |
| Surf | 1 NSC Object | 267 Parameter | 1: Pickup From | 3 Scale | 1.0000E+000 Offset | 0.0000E+000 | Column Parameter −6 |
| Surf | 1 NSC Object | 267 Parameter | 2: Pickup From | 3 Scale | 1.0000E+000 Offset | 0.0000E+000 | Column Parameter −6 |
| Surf | 1 NSC Object | 267 Parameter | 3: Pickup From | 3 Scale | 1.0000E+000 Offset | 0.0000E+000 | Column Parameter −6 |
| Surf | 1 NSC Object | 267 Parameter | 5: Pickup From | 73 Scale | 1.0000E+000 Offset | 0.0000E+000 | Column Parameter −6 |
| Surf | 1 NSC Object | 267 Parameter | 6: Pickup From | 3 Scale | 1.0000E+000 Offset | 0.0000E+000 | Column Parameter −6 |
| Surf | 1 NSC Object | 267 Parameter | 7: Pickup From | 3 Scale | 1.0000E+000 Offset | 0.0000E+000 | Column Parameter −6 |
| Surf | 1 NSC Object | 267 Parameter | 8: Pickup From | 3 Scale | 1.0000E+000 Offset | 0.0000E+000 | Column Parameter −6 |
| Surf | 1 NSC Object | 268 Position | Y: Pickup From | 4 Scale | −1.0000E+000 Offset | 0.0000E+000 | Column Parameter −6 |
| Surf | 1 NSC Object | 268 Parameter | 1: Pickup From | 3 Scale | 1.0000E+000 Offset | 0.0000E+000 | Column Parameter −6 |
| Surf | 1 NSC Object | 268 Parameter | 2: Pickup From | 3 Scale | 1.0000E+000 Offset | 0.0000E+000 | Column Parameter −6 |
| Surf | 1 NSC Object | 268 Parameter | 3: Pickup From | 3 Scale | 1.0000E+000 Offset | 0.0000E+000 | Column Parameter −6 |
| Surf | 1 NSC Object | 268 Parameter | 5: Pickup From | 73 Scale | 1.0000E+000 Offset | 0.0000E+000 | Column Parameter −6 |
| Surf | 1 NSC Object | 268 Parameter | 6: Pickup From | 3 Scale | 1.0000E+000 Offset | 0.0000E+000 | Column Parameter −6 |
| Surf | 1 NSC Object | 268 Parameter | 7: Pickup From | 3 Scale | 1.0000E+000 Offset | 0.0000E+000 | Column Parameter −6 |
| Surf | 1 NSC Object | 268 Parameter | 8: Pickup From | 3 Scale | 1.0000E+000 Offset | 0.0000E+000 | Column Parameter −6 |
| Surf | 1 NSC Object | 269 Position | Y: Pickup From | 4 Scale | −1.0000E+000 Offset | 0.0000E+000 | Column Parameter −6 |
| Surf | 1 NSC Object | 271 Position | X: Pickup From | 2 Scale | −8.0000E+000 Offset | 0.0000E+000 | Column Parameter −6 |
| Surf | 1 NSC Object | 271 Parameter | 1: Pickup From | 3 Scale | 1.0000E+000 Offset | 0.0000E+000 | Column Parameter −6 |
| Surf | 1 NSC Object | 271 Parameter | 2: Pickup From | 3 Scale | 1.0000E+000 Offset | 0.0000E+000 | Column Parameter −6 |
| Surf | 1 NSC Object | 271 Parameter | 3: Pickup From | 3 Scale | 1.0000E+000 Offset | 0.0000E+000 | Column Parameter −6 |
| Surf | 1 NSC Object | 271 Parameter | 6: Pickup From | 3 Scale | 1.0000E+000 Offset | 0.0000E+000 | Column Parameter −6 |
| Surf | 1 NSC Object | 271 Parameter | 7: Pickup From | 3 Scale | 1.0000E+000 Offset | 0.0000E+000 | Column Parameter −6 |
| Surf | 1 NSC Object | 271 Parameter | 8: Pickup From | 3 Scale | 1.0000E+000 Offset | 0.0000E+000 | Column Parameter −6 |
| Surf | 1 NSC Object | 272 Position | Y: Pickup From | 4 Scale | 1.0000E+000 Offset | 0.0000E+000 | Column Parameter −6 |
| Surf | 1 NSC Object | 272 Parameter | 1: Pickup From | 3 Scale | 1.0000E+000 Offset | 0.0000E+000 | Column Parameter −6 |
| Surf | 1 NSC Object | 272 Parameter | 2: Pickup From | 3 Scale | 1.0000E+000 Offset | 0.0000E+000 | Column Parameter −6 |
| Surf | 1 NSC Object | 272 Parameter | 3: Pickup From | 3 Scale | 1.0000E+000 Offset | 0.0000E+000 | Column Parameter −6 |
| Surf | 1 NSC Object | 272 Parameter | 5: Pickup From | 83 Scale | 1.0000E+000 Offset | 0.0000E+000 | Column Parameter −6 |
| Surf | 1 NSC Object | 272 Parameter | 6: Pickup From | 3 Scale | 1.0000E+000 Offset | 0.0000E+000 | Column Parameter −6 |
| Surf | 1 NSC Object | 272 Parameter | 7: Pickup From | 3 Scale | 1.0000E+000 Offset | 0.0000E+000 | Column Parameter −6 |
| Surf | 1 NSC Object | 272 Parameter | 8: Pickup From | 3 Scale | 1.0000E+000 Offset | 0.0000E+000 | Column Parameter −6 |
| Surf | 1 NSC Object | 273 Position | Y: Pickup From | 4 Scale | 1.0000E+000 Offset | 0.0000E+000 | Column Parameter −6 |
| Surf | 1 NSC Object | 273 Parameter | 1: Pickup From | 3 Scale | 1.0000E+000 Offset | 0.0000E+000 | Column Parameter −6 |
| Surf | 1 NSC Object | 273 Parameter | 2: Pickup From | 3 Scale | 1.0000E+000 Offset | 0.0000E+000 | Column Parameter −6 |
| Surf | 1 NSC Object | 273 Parameter | 3: Pickup From | 3 Scale | 1.0000E+000 Offset | 0.0000E+000 | Column Parameter −6 |
| Surf | 1 NSC Object | 273 Parameter | 5: Pickup From | 83 Scale | 1.0000E+000 Offset | 0.0000E+000 | Column Parameter −6 |
| Surf | 1 NSC Object | 273 Parameter | 6: Pickup From | 3 Scale | 1.0000E+000 Offset | 0.0000E+000 | Column Parameter −6 |
| Surf | 1 NSC Object | 273 Parameter | 7: Pickup From | 3 Scale | 1.0000E+000 Offset | 0.0000E+000 | Column Parameter −6 |
| Surf | 1 NSC Object | 273 Parameter | 8: Pickup From | 3 Scale | 1.0000E+000 Offset | 0.0000E+000 | Column Parameter −6 |
| Surf | 1 NSC Object | 274 Position | Y: Pickup From | 4 Scale | 1.0000E+000 Offset | 0.0000E+000 | Column Parameter −6 |
| Surf | 1 NSC Object | 275 Position | Y: Pickup From | 4 Scale | 1.0000E+000 Offset | 0.0000E+000 | Column Parameter −6 |
| Surf | 1 NSC Object | 276 Position | Y: Pickup From | 4 Scale | −1.0000E+000 Offset | 0.0000E+000 | Column Parameter −6 |
| Surf | 1 NSC Object | 276 Parameter | 1: Pickup From | 3 Scale | 1.0000E+000 Offset | 0.0000E+000 | Column Parameter −6 |
| Surf | 1 NSC Object | 276 Parameter | 2: Pickup From | 3 Scale | 1.0000E+000 Offset | 0.0000E+000 | Column Parameter −6 |
| Surf | 1 NSC Object | 276 Parameter | 3: Pickup From | 3 Scale | 1.0000E+000 Offset | 0.0000E+000 | Column Parameter −6 |
| Surf | 1 NSC Object | 276 Parameter | 5: Pickup From | 83 Scale | 1.0000E+000 Offset | 0.0000E+000 | Column Parameter −6 |
| Surf | 1 NSC Object | 276 Parameter | 6: Pickup From | 3 Scale | 1.0000E+000 Offset | 0.0000E+000 | Column Parameter −6 |
| Surf | 1 NSC Object | 276 Parameter | 7: Pickup From | 3 Scale | 1.0000E+000 Offset | 0.0000E+000 | Column Parameter −6 |
| Surf | 1 NSC Object | 276 Parameter | 8: Pickup From | 3 Scale | 1.0000E+000 Offset | 0.0000E+000 | Column Parameter −6 |
| Surf | 1 NSC Object | 277 Position | Y: Pickup From | 4 Scale | −1.0000E+000 Offset | 0.0000E+000 | Column Parameter −6 |
| Surf | 1 NSC Object | 277 Parameter | 1: Pickup From | 3 Scale | 1.0000E+000 Offset | 0.0000E+000 | Column Parameter −6 |
| Surf | 1 NSC Object | 277 Parameter | 2: Pickup From | 3 Scale | 1.0000E+000 Offset | 0.0000E+000 | Column Parameter −6 |
| Surf | 1 NSC Object | 277 Parameter | 3: Pickup From | 3 Scale | 1.0000E+000 Offset | 0.0000E+000 | Column Parameter −6 |
| Surf | 1 NSC Object | 277 Parameter | 5: Pickup From | 83 Scale | 1.0000E+000 Offset | 0.0000E+000 | Column Parameter −6 |
| Surf | 1 NSC Object | 277 Parameter | 6: Pickup From | 3 Scale | 1.0000E+000 Offset | 0.0000E+000 | Column Parameter −6 |
| Surf | 1 NSC Object | 277 Parameter | 7: Pickup From | 3 Scale | 1.0000E+000 Offset | 0.0000E+000 | Column Parameter −6 |
| Surf | 1 NSC Object | 277 Parameter | 8: Pickup From | 3 Scale | 1.0000E+000 Offset | 0.0000E+000 | Column Parameter −6 |
| Surf | 1 NSC Object | 278 Position | Y: Pickup From | 4 Scale | −1.0000E+000 Offset | 0.0000E+000 | Column Parameter −6 |
| Surf | 1 NSC Object | 279 Position | Y: Pickup From | 4 Scale | −1.0000E+000 Offset | 0.0000E+000 | Column Parameter −6 |
| Surf | 1 NSC Object | 281 Parameter | 1: Pickup From | 93 Scale | 1.0000E+000 Offset | 0.0000E+000 | Column Parameter −6 |
| Surf | 1 NSC Object | 281 Parameter | 2: Pickup From | 93 Scale | 1.0000E+000 Offset | 0.0000E+000 | Column Parameter −6 |
| Surf | 1 NSC Object | 281 Parameter | 3: Pickup From | 93 Scale | 1.0000E+000 Offset | 0.0000E+000 | Column Parameter −6 |
| Surf | 1 NSC Object | 281 Parameter | 4: Pickup From | 93 Scale | 1.0000E+000 Offset | 0.0000E+000 | Column Parameter −6 |
| Surf | 1 NSC Object | 281 Parameter | 5: Pickup From | 93 Scale | 1.0000E+000 Offset | 0.0000E+000 | Column Parameter −6 |
| Surf | 1 NSC Object | 281 Parameter | 6: Pickup From | 93 Scale | 1.0000E+000 Offset | 0.0000E+000 | Column Parameter −6 |
| Surf | 1 NSC Object | 281 Parameter | 7: Pickup From | 93 Scale | 1.0000E+000 Offset | 0.0000E+000 | Column Parameter −6 |
| Surf | 1 NSC Object | 281 Parameter | 8: Pickup From | 93 Scale | 1.0000E+000 Offset | 0.0000E+000 | Column Parameter −6 |
| Surf | 1 NSC Object | 281 Parameter | 9: Pickup From | 93 Scale | 1.0000E+000 Offset | 0.0000E+000 | Column Parameter −6 |
| Surf | 1 NSC Object | 283 Position | Y: Pickup From | 1 Scale | −1.0000E+000 Offset | 0.0000E+000 | Column Parameter −6 |
| Surf | 1 NSC Object | 283 Position | Z: Pickup From | 1 Scale | 1.0000E+000 Offset | 0.0000E+000 | Column Parameter −6 |
| Surf | 1 NSC Object | 285 Parameter | 1: Pickup From | 3 Scale | 1.0000E+000 Offset | 0.0000E+000 | Column Parameter −6 |
| Surf | 1 NSC Object | 285 Parameter | 2: Pickup From | 3 Scale | 1.0000E+000 Offset | 0.0000E+000 | Column Parameter −6 |
| Surf | 1 NSC Object | 286 Parameter | 1: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 286 Parameter | 2: Pickup From | 3 Scale | 1.0000E+000 Offset | 0.0000E+000 | Column Parameter −6 |
| Surf | 1 NSC Object | 286 Parameter | 3: Pickup From | 3 Scale | 1.0000E+000 Offset | 0.0000E+000 | Column Parameter −6 |
| Surf | 1 NSC Object | 286 Parameter | 5: Pickup From | 3 Scale | 1.0000E+000 Offset | 0.0000E+000 | Column Parameter −6 |
| Surf | 1 NSC Object | 286 Parameter | 6: Pickup From | 3 Scale | 1.0000E+000 Offset | 0.0000E+000 | Column Parameter −6 |
| Surf | 1 NSC Object | 286 Parameter | 7: Pickup From | 3 Scale | 1.0000E+000 Offset | 0.0000E+000 | Column Parameter −6 |
| Surf | 1 NSC Object | 286 Parameter | 8: Pickup From | 3 Scale | 1.0000E+000 Offset | 0.0000E+000 | Column Parameter −6 |
| Surf | 1 NSC Object | 287 Position | Y: Pickup From | 4 Scale | 1.0000E+000 Offset | 0.0000E+000 | Column Parameter −6 |
| Surf | 1 NSC Object | 287 Parameter | 1: Pickup From | 3 Scale | 1.0000E+000 Offset | 0.0000E+000 | Column Parameter −6 |
| Surf | 1 NSC Object | 287 Parameter | 2: Pickup From | 3 Scale | 1.0000E+000 Offset | 0.0000E+000 | Column Parameter −6 |
| Surf | 1 NSC Object | 287 Parameter | 3: Pickup From | 3 Scale | 1.0000E+000 Offset | 0.0000E+000 | Column Parameter −6 |
| Surf | 1 NSC Object | 287 Parameter | 5: Pickup From | 3 Scale | 1.0000E+000 Offset | 0.0000E+000 | Column Parameter −6 |
| Surf | 1 NSC Object | 287 Parameter | 6: Pickup From | 3 Scale | 1.0000E+000 Offset | 0.0000E+000 | Column Parameter −6 |
| Surf | 1 NSC Object | 287 Parameter | 7: Pickup From | 3 Scale | 1.0000E+000 Offset | 0.0000E+000 | Column Parameter −6 |
| Surf | 1 NSC Object | 287 Parameter | 8: Pickup From | 3 Scale | 1.0000E+000 Offset | 0.0000E+000 | Column Parameter −6 |
| Surf | 1 NSC Object | 288 Position | Y: Pickup From | 4 Scale | 1.0000E+000 Offset | 0.0000E+000 | Column Parameter −6 |
| Surf | 1 NSC Object | 288 Parameter | 1: Pickup From | 3 Scale | 1.0000E+000 Offset | 0.0000E+000 | Column Parameter −6 |
| Surf | 1 NSC Object | 288 Parameter | 2: Pickup From | 3 Scale | 1.0000E+000 Offset | 0.0000E+000 | Column Parameter −6 |
| Surf | 1 NSC Object | 288 Parameter | 3: Pickup From | 3 Scale | 1.0000E+000 Offset | 0.0000E+000 | Column Parameter −6 |
| Surf | 1 NSC Object | 288 Parameter | 5: Pickup From | 3 Scale | 1.0000E+000 Offset | 0.0000E+000 | Column Parameter −6 |
| Surf | 1 NSC Object | 288 Parameter | 6: Pickup From | 3 Scale | 1.0000E+000 Offset | 0.0000E+000 | Column Parameter −6 |
| Surf | 1 NSC Object | 288 Parameter | 7: Pickup From | 3 Scale | 1.0000E+000 Offset | 0.0000E+000 | Column Parameter −6 |
| Surf | 1 NSC Object | 288 Parameter | 8: Pickup From | 3 Scale | 1.0000E+000 Offset | 0.0000E+000 | Column Parameter −6 |
| Surf | 1 NSC Object | 289 Position | Y: Pickup From | 4 Scale | 1.0000E+000 Offset | 0.0000E+000 | Column Parameter −6 |
| Surf | 1 NSC Object | 289 Parameter | 2: Pickup From | 3 Scale | 1.0000E+000 Offset | 0.0000E+000 | Column Parameter −6 |
| Surf | 1 NSC Object | 289 Parameter | 3: Pickup From | 3 Scale | 1.0000E+000 Offset | 0.0000E+000 | Column Parameter −6 |
| Surf | 1 NSC Object | 289 Parameter | 5: Pickup From | 3 Scale | 1.0000E+000 Offset | 0.0000E+000 | Column Parameter −6 |
| Surf | 1 NSC Object | 289 Parameter | 6: Pickup From | 3 Scale | 1.0000E+000 Offset | 0.0000E+000 | Column Parameter −6 |
| Surf | 1 NSC Object | 289 Parameter | 7: Pickup From | 3 Scale | 1.0000E+000 Offset | 0.0000E+000 | Column Parameter −6 |
| Surf | 1 NSC Object | 289 Parameter | 8: Pickup From | 3 Scale | 1.0000E+000 Offset | 0.0000E+000 | Column Parameter −6 |
| Surf | 1 NSC Object | 290 Position | Y: Pickup From | 4 Scale | −1.0000E+000 Offset | 0.0000E+000 | Column Parameter −6 |
| Surf | 1 NSC Object | 290 Parameter | 1: Pickup From | 3 Scale | 1.0000E+000 Offset | 0.0000E+000 | Column Parameter −6 |
| Surf | 1 NSC Object | 290 Parameter | 2: Pickup From | 3 Scale | 1.0000E+000 Offset | 0.0000E+000 | Column Parameter −6 |
| Surf | 1 NSC Object | 290 Parameter | 3: Pickup From | 3 Scale | 1.0000E+000 Offset | 0.0000E+000 | Column Parameter −6 |
| Surf | 1 NSC Object | 290 Parameter | 5: Pickup From | 3 Scale | 1.0000E+000 Offset | 0.0000E+000 | Column Parameter −6 |
| Surf | 1 NSC Object | 290 Parameter | 6: Pickup From | 3 Scale | 1.0000E+000 Offset | 0.0000E+000 | Column Parameter −6 |
| Surf | 1 NSC Object | 290 Parameter | 7: Pickup From | 3 Scale | 1.0000E+000 Offset | 0.0000E+000 | Column Parameter −6 |
| Surf | 1 NSC Object | 290 Parameter | 8: Pickup From | 3 Scale | 1.0000E+000 Offset | 0.0000E+000 | Column Parameter −6 |
| Surf | 1 NSC Object | 291 Position | Y: Pickup From | 4 Scale | −1.0000E+000 Offset | 0.0000E+000 | Column Parameter −6 |
| Surf | 1 NSC Object | 291 Parameter | 1: Pickup From | 3 Scale | 1.0000E+000 Offset | 0.0000E+000 | Column Parameter −6 |
| Surf | 1 NSC Object | 291 Parameter | 2: Pickup From | 3 Scale | 1.0000E+000 Offset | 0.0000E+000 | Column Parameter −6 |
| Surf | 1 NSC Object | 291 Parameter | 3: Pickup From | 3 Scale | 1.0000E+000 Offset | 0.0000E+000 | Column Parameter −6 |
| Surf | 1 NSC Object | 291 Parameter | 5: Pickup From | 3 Scale | 1.0000E+000 Offset | 0.0000E+000 | Column Parameter −6 |
| Surf | 1 NSC Object | 291 Parameter | 6: Pickup From | 3 Scale | 1.0000E+000 Offset | 0.0000E+000 | Column Parameter −6 |
| Surf | 1 NSC Object | 291 Parameter | 7: Pickup From | 3 Scale | 1.0000E+000 Offset | 0.0000E+000 | Column Parameter −6 |
| Surf | 1 NSC Object | 291 Parameter | 8: Pickup From | 3 Scale | 1.0000E+000 Offset | 0.0000E+000 | Column Parameter −6 |
| Surf | 1 NSC Object | 292 Position | Y: Pickup From | 4 Scale | −1.0000E+000 Offset | 0.0000E+000 | Column Parameter −6 |
| Surf | 1 NSC Object | 292 Parameter | 1: Pickup From | 3 Scale | 1.0000E+000 Offset | 0.0000E+000 | Column Parameter −6 |
| Surf | 1 NSC Object | 292 Parameter | 2: Pickup From | 3 Scale | 1.0000E+000 Offset | 0.0000E+000 | Column Parameter −6 |
| Surf | 1 NSC Object | 292 Parameter | 3: Pickup From | 3 Scale | 1.0000E+000 Offset | 0.0000E+000 | Column Parameter −6 |
| Surf | 1 NSC Object | 292 Parameter | 5: Pickup From | 3 Scale | 1.0000E+000 Offset | 0.0000E+000 | Column Parameter −6 |
| Surf | 1 NSC Object | 292 Parameter | 6: Pickup From | 3 Scale | 1.0000E+000 Offset | 0.0000E+000 | Column Parameter −6 |
| Surf | 1 NSC Object | 292 Parameter | 7: Pickup From | 3 Scale | 1.0000E+000 Offset | 0.0000E+000 | Column Parameter −6 |
| Surf | 1 NSC Object | 292 Parameter | 8: Pickup From | 3 Scale | 1.0000E+000 Offset | 0.0000E+000 | Column Parameter −6 |
| Surf | 1 NSC Object | 293 Position | Y: Pickup From | 4 Scale | −1.0000E+000 Offset | 0.0000E+000 | Column Parameter −6 |
| Surf | 1 NSC Object | 293 Parameter | 1: Pickup From | 3 Scale | 1.0000E+000 Offset | 0.0000E+000 | Column Parameter −6 |
| Surf | 1 NSC Object | 293 Parameter | 2: Pickup From | 3 Scale | 1.0000E+000 Offset | 0.0000E+000 | Column Parameter −6 |
| Surf | 1 NSC Object | 293 Parameter | 3: Pickup From | 3 Scale | 1.0000E+000 Offset | 0.0000E+000 | Column Parameter −6 |
| Surf | 1 NSC Object | 293 Parameter | 5: Pickup From | 3 Scale | 1.0000E+000 Offset | 0.0000E+000 | Column Parameter −6 |
| Surf | 1 NSC Object | 293 Parameter | 6: Pickup From | 3 Scale | 1.0000E+000 Offset | 0.0000E+000 | Column Parameter −6 |
| Surf | 1 NSC Object | 293 Parameter | 7: Pickup From | 3 Scale | 1.0000E+000 Offset | 0.0000E+000 | Column Parameter −6 |
| Surf | 1 NSC Object | 293 Parameter | 8: Pickup From | 3 Scale | 1.0000E+000 Offset | 0.0000E+000 | Column Parameter −6 |
| Surf | 1 NSC Object | 295 Position | X: Pickup From | 2 Scale | 2.0000E+000 Offset | 0.0000E+000 | Column Parameter −6 |
| Surf | 1 NSC Object | 295 Parameter | 1: Pickup From | 3 Scale | 1.0000E+000 Offset | 0.0000E+000 | Column Parameter −6 |
| Surf | 1 NSC Object | 295 Parameter | 2: Pickup From | 3 Scale | 1.0000E+000 Offset | 0.0000E+000 | Column Parameter −6 |
| Surf | 1 NSC Object | 295 Parameter | 3: Pickup From | 3 Scale | 1.0000E+000 Offset | 0.0000E+000 | Column Parameter −6 |
| Surf | 1 NSC Object | 295 Parameter | 6: Pickup From | 3 Scale | 1.0000E+000 Offset | 0.0000E+000 | Column Parameter −6 |
| Surf | 1 NSC Object | 295 Parameter | 7: Pickup From | 3 Scale | 1.0000E+000 Offset | 0.0000E+000 | Column Parameter −6 |
| Surf | 1 NSC Object | 295 Parameter | 8: Pickup From | 3 Scale | 1.0000E+000 Offset | 0.0000E+000 | Column Parameter −6 |
| Surf | 1 NSC Object | 296 Position | Y: Pickup From | 4 Scale | 1.0000E+000 Offset | 0.0000E+000 | Column Parameter −6 |
| Surf | 1 NSC Object | 296 Parameter | 1: Pickup From | 3 Scale | 1.0000E+000 Offset | 0.0000E+000 | Column Parameter −6 |
| Surf | 1 NSC Object | 296 Parameter | 2: Pickup From | 3 Scale | 1.0000E+000 Offset | 0.0000E+000 | Column Parameter −6 |
| Surf | 1 NSC Object | 296 Parameter | 3: Pickup From | 3 Scale | 1.0000E+000 Offset | 0.0000E+000 | Column Parameter −6 |
| Surf | 1 NSC Object | 296 Parameter | 5: Pickup From | 13 Scale | 1.0000E+000 Offset | 0.0000E+000 | Column Parameter −6 |
| Surf | 1 NSC Object | 296 Parameter | 6: Pickup From | 3 Scale | 1.0000E+000 Offset | 0.0000E+000 | Column Parameter −6 |
| Surf | 1 NSC Object | 296 Parameter | 7: Pickup From | 3 Scale | 1.0000E+000 Offset | 0.0000E+000 | Column Parameter −6 |
| Surf | 1 NSC Object | 296 Parameter | 8: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 297 Position | Y: Pickup From | 4 Scale | 1.0000E+000 Offset | 0.0000E+000 | Column Parameter −6 |
| Surf | 1 NSC Object | 297 Parameter | 1: Pickup From | 3 Scale | 1.0000E+000 Offset | 0.0000E+000 | Column Parameter −6 |
| Surf | 1 NSC Object | 297 Parameter | 2: Pickup From | 3 Scale | 1.0000E+000 Offset | 0.0000E+000 | Column Parameter −6 |
| Surf | 1 NSC Object | 297 Parameter | 3: Pickup From | 3 Scale | 1.0000E+000 Offset | 0.0000E+000 | Column Parameter −6 |
| Surf | 1 NSC Object | 297 Parameter | 5: Pickup From | 13 Scale | 1.0000E+000 Offset | 0.0000E+000 | Column Parameter −6 |
| Surf | 1 NSC Object | 297 Parameter | 6: Pickup From | 3 Scale | 1.0000E+000 Offset | 0.0000E+000 | Column Parameter −6 |
| Surf | 1 NSC Object | 297 Parameter | 7: Pickup From | 3 Scale | 1.0000E+000 Offset | 0.0000E+000 | Column Parameter −6 |
| Surf | 1 NSC Object | 297 Parameter | 8: Pickup From | 3 Scale | 1.0000E+000 Offset | 0.0000E+000 | Column Parameter −6 |
| Surf | 1 NSC Object | 298 Position | Y: Pickup From | 4 Scale | 1.0000E+000 Offset | 0.0000E+000 | Column Parameter −6 |
| Surf | 1 NSC Object | 298 Parameter | 1: Pickup From | 3 Scale | 1.0000E+000 Offset | 0.0000E+000 | Column Parameter −6 |
| Surf | 1 NSC Object | 298 Parameter | 2: Pickup From | 3 Scale | 1.0000E+000 Offset | 0.0000E+000 | Column Parameter −6 |
| Surf | 1 NSC Object | 298 Parameter | 3: Pickup From | 3 Scale | 1.0000E+000 Offset | 0.0000E+000 | Column Parameter −6 |
| Surf | 1 NSC Object | 298 Parameter | 5: Pickup From | 13 Scale | 1.0000E+000 Offset | 0.0000E+000 | Column Parameter −6 |
| Surf | 1 NSC Object | 298 Parameter | 6: Pickup From | 3 Scale | 1.0000E+000 Offset | 0.0000E+000 | Column Parameter −6 |
| Surf | 1 NSC Object | 298 Parameter | 7: Pickup From | 3 Scale | 1.0000E+000 Offset | 0.0000E+000 | Column Parameter −6 |
| Surf | 1 NSC Object | 298 Parameter | 8: Pickup From | 3 Scale | 1.0000E+000 Offset | 0.0000E+000 | Column Parameter −6 |
| Surf | 1 NSC Object | 299 Position | Y: Pickup From | 4 Scale | 1.0000E+000 Offset | 0.0000E+000 | Column Parameter −6 |
| Surf | 1 NSC Object | 299 Parameter | 1: Pickup From | 3 Scale | 1.0000E+000 Offset | 0.0000E+000 | Column Parameter −6 |
| Surf | 1 NSC Object | 299 Parameter | 2: Pickup From | 3 Scale | 1.0000E+000 Offset | 0.0000E+000 | Column Parameter −6 |
| Surf | 1 NSC Object | 299 Parameter | 3: Pickup From | 3 Scale | 1.0000E+000 Offset | 0.0000E+000 | Column Parameter −6 |
| Surf | 1 NSC Object | 299 Parameter | 5: Pickup From | 13 Scale | 1.0000E+000 Offset | 0.0000E+000 | Column Parameter −6 |
| Surf | 1 NSC Object | 299 Parameter | 6: Pickup From | 3 Scale | 1.0000E+000 Offset | 0.0000E+000 | Column Parameter −6 |
| Surf | 1 NSC Object | 299 Parameter | 7: Pickup From | 3 Scale | 1.0000E+000 Offset | 0.0000E+000 | Column Parameter −6 |
| Surf | 1 NSC Object | 299 Parameter | 8: Pickup From | 3 Scale | 1.0000E+000 Offset | 0.0000E+000 | Column Parameter −6 |
| Surf | 1 NSC Object | 300 Position | Y: Pickup From | 4 Scale | −1.0000E+000 Offset | 0.0000E+000 | Column Parameter −6 |
| Surf | 1 NSC Object | 300 Parameter | 1: Pickup From | 3 Scale | 1.0000E+000 Offset | 0.0000E+000 | Column Parameter −6 |
| Surf | 1 NSC Object | 300 Parameter | 2: Pickup From | 3 Scale | 1.0000E+000 Offset | 0.0000E+000 | Column Parameter −6 |
| Surf | 1 NSC Object | 300 Parameter | 3: Pickup From | 3 Scale | 1.0000E+000 Offset | 0.0000E+000 | Column Parameter −6 |
| Surf | 1 NSC Object | 300 Parameter | 5: Pickup From | 13 Scale | 1.0000E+000 Offset | 0.0000E+000 | Column Parameter −6 |
| Surf | 1 NSC Object | 300 Parameter | 6: Pickup From | 3 Scale | 1.0000E+000 Offset | 0.0000E+000 | Column Parameter −6 |
| Surf | 1 NSC Object | 300 Parameter | 7: Pickup From | 3 Scale | 1.0000E+000 Offset | 0.0000E+000 | Column Parameter −6 |
| Surf | 1 NSC Object | 300 Parameter | 8: Pickup From | 3 Scale | 1.0000E+000 Offset | 0.0000E+000 | Column Parameter −6 |
| Surf | 1 NSC Object | 301 Position | Y: Pickup From | 4 Scale | −1.0000E+000 Offset | 0.0000E+000 | Column Parameter −6 |
| Surf | 1 NSC Object | 301 Parameter | 1: Pickup From | 3 Scale | 1.0000E+000 Offset | 0.0000E+000 | Column Parameter −6 |
| Surf | 1 NSC Object | 301 Parameter | 2: Pickup From | 3 Scale | 1.0000E+000 Offset | 0.0000E+000 | Column Parameter −6 |
| Surf | 1 NSC Object | 301 Parameter | 3: Pickup From | 3 Scale | 1.0000E+000 Offset | 0.0000E+000 | Column Parameter −6 |
| Surf | 1 NSC Object | 301 Parameter | 5: Pickup From | 13 Scale | 1.0000E+000 Offset | 0.0000E+000 | Column Parameter −6 |
| Surf | 1 NSC Object | 301 Parameter | 6: Pickup From | 3 Scale | 1.0000E+000 Offset | 0.0000E+000 | Column Parameter −6 |
| Surf | 1 NSC Object | 301 Parameter | 7: Pickup From | 3 Scale | 1.0000E+000 Offset | 0.0000E+000 | Column Parameter −6 |
| Surf | 1 NSC Object | 301 Parameter | 8: Pickup From | 3 Scale | 1.0000E+000 Offset | 0.0000E+000 | Column Parameter −6 |
| Surf | 1 NSC Object | 302 Position | Y: Pickup From | 4 Scale | −1.0000E+000 Offset | 0.0000E+000 | Column Parameter −6 |
| Surf | 1 NSC Object | 302 Parameter | 1: Pickup From | 3 Scale | 1.0000E+000 Offset | 0.0000E+000 | Column Parameter −6 |
| Surf | 1 NSC Object | 302 Parameter | 2: Pickup From | 3 Scale | 1.0000E+000 Offset | 0.0000E+000 | Column Parameter −6 |
| Surf | 1 NSC Object | 302 Parameter | 3: Pickup From | 3 Scale | 1.0000E+000 Offset | 0.0000E+000 | Column Parameter −6 |
| Surf | 1 NSC Object | 302 Parameter | 5: Pickup From | 13 Scale | 1.0000E+000 Offset | 0.0000E+000 | Column Parameter −6 |
| Surf | 1 NSC Object | 302 Parameter | 6: Pickup From | 3 Scale | 1.0000E+000 Offset | 0.0000E+000 | Column Parameter −6 |
| Surf | 1 NSC Object | 302 Parameter | 7: Pickup From | 3 Scale | 1.0000E+000 Offset | 0.0000E+000 | Column Parameter −6 |
| Surf | 1 NSC Object | 302 Parameter | 8: Pickup From | 3 Scale | 1.0000E+000 Offset | 0.0000E+000 | Column Parameter −6 |
| Surf | 1 NSC Object | 303 Position | Y: Pickup From | 4 Scale | −1.0000E+000 Offset | 0.0000E+000 | Column Parameter −6 |
| Surf | 1 NSC Object | 303 Parameter | 1: Pickup From | 3 Scale | 1.0000E+000 Offset | 0.0000E+000 | Column Parameter −6 |
| Surf | 1 NSC Object | 303 Parameter | 2: Pickup From | 3 Scale | 1.0000E+000 Offset | 0.0000E+000 | Column Parameter −6 |
| Surf | 1 NSC Object | 303 Parameter | 3: Pickup From | 3 Scale | 1.0000E+000 Offset | 0.0000E+000 | Column Parameter −6 |
| Surf | 1 NSC Object | 303 Parameter | 5: Pickup From | 13 Scale | 1.0000E+000 Offset | 0.0000E+000 | Column Parameter −6 |
| Surf | 1 NSC Object | 303 Parameter | 6: Pickup From | 3 Scale | 1.0000E+000 Offset | 0.0000E+000 | Column Parameter −6 |
| Surf | 1 NSC Object | 303 Parameter | 7: Pickup From | 3 Scale | 1.0000E+000 Offset | 0.0000E+000 | Column Parameter −6 |
| Surf | 1 NSC Object | 303 Parameter | 8: Pickup From | 3 Scale | 1.0000E+000 Offset | 0.0000E+000 | Column Parameter −6 |
| Surf | 1 NSC Object | 305 Position | X: Pickup From | 2 Scale | 4.0000E+000 Offset | 0.0000E+000 | Column Parameter −6 |
| Surf | 1 NSC Object | 305 Parameter | 1: Pickup From | 3 Scale | 1.0000E+000 Offset | 0.0000E+000 | Column Parameter −6 |
| Surf | 1 NSC Object | 305 Parameter | 2: Pickup From | 3 Scale | 1.0000E+000 Offset | 0.0000E+000 | Column Parameter −6 |
| Surf | 1 NSC Object | 305 Parameter | 3: Pickup From | 3 Scale | 1.0000E+000 Offset | 0.0000E+000 | Column Parameter −6 |
| Surf | 1 NSC Object | 305 Parameter | 6: Pickup From | 3 Scale | 1.0000E+000 Offset | 0.0000E+000 | Column Parameter −6 |
| Surf | 1 NSC Object | 305 Parameter | 7: Pickup From | 3 Scale | 1.0000E+000 Offset | 0.0000E+000 | Column Parameter −6 |
| Surf | 1 NSC Object | 305 Parameter | 8: Pickup From | 3 Scale | 1.0000E+000 Offset | 0.0000E+000 | Column Parameter −6 |
| Surf | 1 NSC Object | 306 Position | Y: Pickup From | 4 Scale | 1.0000E+000 Offset | 0.0000E+000 | Column Parameter −6 |
| Surf | 1 NSC Object | 306 Parameter | 1: Pickup From | 3 Scale | 1.0000E+000 Offset | 0.0000E+000 | Column Parameter −6 |
| Surf | 1 NSC Object | 306 Parameter | 2: Pickup From | 3 Scale | 1.0000E+000 Offset | 0.0000E+000 | Column Parameter −6 |
| Surf | 1 NSC Object | 306 Parameter | 3: Pickup From | 3 Scale | 1.0000E+000 Offset | 0.0000E+000 | Column Parameter −6 |
| Surf | 1 NSC Object | 306 Parameter | 5: Pickup From | 23 Scale | 1.0000E+000 Offset | 0.0000E+000 | Column Parameter −6 |
| Surf | 1 NSC Object | 306 Parameter | 6: Pickup From | 3 Scale | 1.0000E+000 Offset | 0.0000E+000 | Column Parameter −6 |
| Surf | 1 NSC Object | 306 Parameter | 7: Pickup From | 3 Scale | 1.0000E+000 Offset | 0.0000E+000 | Column Parameter −6 |
| Surf | 1 NSC Object | 306 Parameter | 8: Pickup From | 3 Scale | 1.0000E+000 Offset | 0.0000E+000 | Column Parameter −6 |
| Surf | 1 NSC Object | 307 Position | Y: Pickup From | 4 Scale | 1.0000E+000 Offset | 0.0000E+000 | Column Parameter −6 |
| Surf | 1 NSC Object | 307 Parameter | 1: Pickup From | 3 Scale | 1.0000E+000 Offset | 0.0000E+000 | Column Parameter −6 |
| Surf | 1 NSC Object | 307 Parameter | 2: Pickup From | 3 Scale | 1.0000E+000 Offset | 0.0000E+000 | Column Parameter −6 |
| Surf | 1 NSC Object | 307 Parameter | 3: Pickup From | 3 Scale | 1.0000E+000 Offset | 0.0000E+000 | Column Parameter −6 |
| Surf | 1 NSC Object | 307 Parameter | 5: Pickup From | 23 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 307 Parameter | 6: Pickup From | 3 Scale | 1.0000E+000 Offset | 0.0000E+000 | Column Parameter −6 |
| Surf | 1 NSC Object | 307 Parameter | 7: Pickup From | 3 Scale | 1.0000E+000 Offset | 0.0000E+000 | Column Parameter −6 |
| Surf | 1 NSC Object | 307 Parameter | 8: Pickup From | 3 Scale | 1.0000E+000 Offset | 0.0000E+000 | Column Parameter −6 |
| Surf | 1 NSC Object | 308 Position | Y: Pickup From | 4 Scale | 1.0000E+000 Offset | 0.0000E+000 | Column Parameter −6 |
| Surf | 1 NSC Object | 308 Parameter | 1: Pickup From | 3 Scale | 1.0000E+000 Offset | 0.0000E+000 | Column Parameter −6 |
| Surf | 1 NSC Object | 308 Parameter | 2: Pickup From | 3 Scale | 1.0000E+000 Offset | 0.0000E+000 | Column Parameter −6 |
| Surf | 1 NSC Object | 308 Parameter | 3: Pickup From | 3 Scale | 1.0000E+000 Offset | 0.0000E+000 | Column Parameter −6 |
| Surf | 1 NSC Object | 308 Parameter | 5: Pickup From | 23 Scale | 1.0000E+000 Offset | 0.0000E+000 | Column Parameter −6 |
| Surf | 1 NSC Object | 308 Parameter | 6: Pickup From | 3 Scale | 1.0000E+000 Offset | 0.0000E+000 | Column Parameter −6 |
| Surf | 1 NSC Object | 308 Parameter | 7: Pickup From | 3 Scale | 1.0000E+000 Offset | 0.0000E+000 | Column Parameter −6 |
| Surf | 1 NSC Object | 308 Parameter | 8: Pickup From | 3 Scale | 1.0000E+000 Offset | 0.0000E+000 | Column Parameter −6 |
| Surf | 1 NSC Object | 309 Position | Y: Pickup From | 4 Scale | 1.0000E+000 Offset | 0.0000E+000 | Column Parameter −6 |
| Surf | 1 NSC Object | 309 Parameter | 1: Pickup From | 3 Scale | 1.0000E+000 Offset | 0.0000E+000 | Column Parameter −6 |
| Surf | 1 NSC Object | 309 Parameter | 2: Pickup From | 3 Scale | 1.0000E+000 Offset | 0.0000E+000 | Column Parameter −6 |
| Surf | 1 NSC Object | 309 Parameter | 3: Pickup From | 3 Scale | 1.0000E+000 Offset | 0.0000E+000 | Column Parameter −6 |
| Surf | 1 NSC Object | 309 Parameter | 5: Pickup From | 23 Scale | 1.0000E+000 Offset | 0.0000E+000 | Column Parameter −6 |
| Surf | 1 NSC Object | 309 Parameter | 6: Pickup From | 3 Scale | 1.0000E+000 Offset | 0.0000E+000 | Column Parameter −6 |
| Surf | 1 NSC Object | 309 Parameter | 7: Pickup From | 3 Scale | 1.0000E+000 Offset | 0.0000E+000 | Column Parameter −6 |
| Surf | 1 NSC Object | 309 Parameter | 8: Pickup From | 3 Scale | 1.0000E+000 Offset | 0.0000E+000 | Column Parameter −6 |
| Surf | 1 NSC Object | 310 Position | Y: Pickup From | 4 Scale | −1.0000E+000 Offset | 0.0000E+000 | Column Parameter −6 |
| Surf | 1 NSC Object | 310 Parameter | 1: Pickup From | 3 Scale | 1.0000E+000 Offset | 0.0000E+000 | Column Parameter −6 |
| Surf | 1 NSC Object | 310 Parameter | 2: Pickup From | 3 Scale | 1.0000E+000 Offset | 0.0000E+000 | Column Parameter −6 |
| Surf | 1 NSC Object | 310 Parameter | 3: Pickup From | 3 Scale | 1.0000E+000 Offset | 0.0000E+000 | Column Parameter −6 |
| Surf | 1 NSC Object | 310 Parameter | 5: Pickup From | 23 Scale | 1.0000E+000 Offset | 0.0000E+000 | Column Parameter −6 |
| Surf | 1 NSC Object | 310 Parameter | 6: Pickup From | 3 Scale | 1.0000E+000 Offset | 0.0000E+000 | Column Parameter −6 |
| Surf | 1 NSC Object | 310 Parameter | 7: Pickup From | 3 Scale | 1.0000E+000 Offset | 0.0000E+000 | Column Parameter −6 |
| Surf | 1 NSC Object | 310 Parameter | 8: Pickup From | 3 Scale | 1.0000E+000 Offset | 0.0000E+000 | Column Parameter −6 |
| Surf | 1 NSC Object | 311 Position | Y: Pickup From | 4 Scale | −1.0000E+000 Offset | 0.0000E+000 | Column Parameter −6 |
| Surf | 1 NSC Object | 311 Parameter | 1: Pickup From | 3 Scale | 1.0000E+000 Offset | 0.0000E+000 | Column Parameter −6 |
| Surf | 1 NSC Object | 311 Parameter | 2: Pickup From | 3 Scale | 1.0000E+000 Offset | 0.0000E+000 | Column Parameter −6 |
| Surf | 1 NSC Object | 311 Parameter | 3: Pickup From | 3 Scale | 1.0000E+000 Offset | 0.0000E+000 | Column Parameter −6 |
| Surf | 1 NSC Object | 311 Parameter | 5: Pickup From | 23 Scale | 1.0000E+000 Offset | 0.0000E+000 | Column Parameter −6 |
| Surf | 1 NSC Object | 311 Parameter | 6: Pickup From | 3 Scale | 1.0000E+000 Offset | 0.0000E+000 | Column Parameter −6 |
| Surf | 1 NSC Object | 311 Parameter | 7: Pickup From | 3 Scale | 1.0000E+000 Offset | 0.0000E+000 | Column Parameter −6 |
| Surf | 1 NSC Object | 311 Parameter | 8: Pickup From | 3 Scale | 1.0000E+000 Offset | 0.0000E+000 | Column Parameter −6 |
| Surf | 1 NSC Object | 312 Position | Y: Pickup From | 4 Scale | −1.0000E+000 Offset | 0.0000E+000 | Column Parameter −6 |
| Surf | 1 NSC Object | 312 Parameter | 1: Pickup From | 3 Scale | 1.0000E+000 Offset | 0.0000E+000 | Column Parameter −6 |
| Surf | 1 NSC Object | 312 Parameter | 2: Pickup From | 3 Scale | 1.0000E+000 Offset | 0.0000E+000 | Column Parameter −6 |
| Surf | 1 NSC Object | 312 Parameter | 3: Pickup From | 3 Scale | 1.0000E+000 Offset | 0.0000E+000 | Column Parameter −6 |
| Surf | 1 NSC Object | 312 Parameter | 5: Pickup From | 23 Scale | 1.0000E+000 Offset | 0.0000E+000 | Column Parameter −6 |
| Surf | 1 NSC Object | 312 Parameter | 6: Pickup From | 3 Scale | 1.0000E+000 Offset | 0.0000E+000 | Column Parameter −6 |
| Surf | 1 NSC Object | 312 Parameter | 7: Pickup From | 3 Scale | 1.0000E+000 Offset | 0.0000E+000 | Column Parameter −6 |
| Surf | 1 NSC Object | 312 Parameter | 8: Pickup From | 3 Scale | 1.0000E+000 Offset | 0.0000E+000 | Column Parameter −6 |
| Surf | 1 NSC Object | 313 Position | Y: Pickup From | 4 Scale | −1.0000E+000 Offset | 0.0000E+000 | Column Parameter −6 |
| Surf | 1 NSC Object | 313 Parameter | 1: Pickup From | 3 Scale | 1.0000E+000 Offset | 0.0000E+000 | Column Parameter −6 |
| Surf | 1 NSC Object | 313 Parameter | 2: Pickup From | 3 Scale | 1.0000E+000 Offset | 0.0000E+000 | Column Parameter −6 |
| Surf | 1 NSC Object | 313 Parameter | 3: Pickup From | 3 Scale | 1.0000E+000 Offset | 0.0000E+000 | Column Parameter −6 |
| Surf | 1 NSC Object | 313 Parameter | 5: Pickup From | 23 Scale | 1.0000E+000 Offset | 0.0000E+000 | Column Parameter −6 |
| Surf | 1 NSC Object | 313 Parameter | 6: Pickup From | 3 Scale | 1.0000E+000 Offset | 0.0000E+000 | Column Parameter −6 |
| Surf | 1 NSC Object | 313 Parameter | 7: Pickup From | 3 Scale | 1.0000E+000 Offset | 0.0000E+000 | Column Parameter −6 |
| Surf | 1 NSC Object | 313 Parameter | 8: Pickup From | 3 Scale | 1.0000E+000 Offset | 0.0000E+000 | Column Parameter −6 |
| Surf | 1 NSC Object | 315 Position | X: Pickup From | 2 Scale | 6.0000E+000 Offset | 0.0000E+000 | Column Parameter −6 |
| Surf | 1 NSC Object | 315 Parameter | 1: Pickup From | 3 Scale | 1.0000E+000 Offset | 0.0000E+000 | Column Parameter −6 |
| Surf | 1 NSC Object | 315 Parameter | 2: Pickup From | 3 Scale | 1.0000E+000 Offset | 0.0000E+000 | Column Parameter −6 |
| Surf | 1 NSC Object | 315 Parameter | 3: Pickup From | 3 Scale | 1.0000E+000 Offset | 0.0000E+000 | Column Parameter −6 |
| Surf | 1 NSC Object | 315 Parameter | 6: Pickup From | 3 Scale | 1.0000E+000 Offset | 0.0000E+000 | Column Parameter −6 |
| Surf | 1 NSC Object | 315 Parameter | 7: Pickup From | 3 Scale | 1.0000E+000 Offset | 0.0000E+000 | Column Parameter −6 |
| Surf | 1 NSC Object | 315 Parameter | 8: Pickup From | 3 Scale | 1.0000E+000 Offset | 0.0000E+000 | Column Parameter −6 |
| Surf | 1 NSC Object | 316 Position | Y: Pickup From | 4 Scale | 1.0000E+000 Offset | 0.0000E+000 | Column Parameter −6 |
| Surf | 1 NSC Object | 316 Parameter | 1: Pickup From | 3 Scale | 1.0000E+000 Offset | 0.0000E+000 | Column Parameter −6 |
| Surf | 1 NSC Object | 316 Parameter | 2: Pickup From | 3 Scale | 1.0000E+000 Offset | 0.0000E+000 | Column Parameter −6 |
| Surf | 1 NSC Object | 316 Parameter | 3: Pickup From | 3 Scale | 1.0000E+000 Offset | 0.0000E+000 | Column Parameter −6 |
| Surf | 1 NSC Object | 316 Parameter | 5: Pickup From | 33 Scale | 1.0000E+000 Offset | 0.0000E+000 | Column Parameter −6 |
| Surf | 1 NSC Object | 316 Parameter | 6: Pickup From | 3 Scale | 1.0000E+000 Offset | 0.0000E+000 | Column Parameter −6 |
| Surf | 1 NSC Object | 316 Parameter | 7: Pickup From | 3 Scale | 1.0000E+000 Offset | 0.0000E+000 | Column Parameter −6 |
| Surf | 1 NSC Object | 316 Parameter | 8: Pickup From | 3 Scale | 1.0000E+000 Offset | 0.0000E+000 | Column Parameter −6 |
| Surf | 1 NSC Object | 317 Position | Y: Pickup From | 4 Scale | 1.0000E+000 Offset | 0.0000E+000 | Column Parameter −6 |
| Surf | 1 NSC Object | 317 Parameter | 1: Pickup From | 3 Scale | 1.0000E+000 Offset | 0.0000E+000 | Column Parameter −6 |
| Surf | 1 NSC Object | 317 Parameter | 2: Pickup From | 3 Scale | 1.0000E+000 Offset | 0.0000E+000 | Column Parameter −6 |
| Surf | 1 NSC Object | 317 Parameter | 3: Pickup From | 3 Scale | 1.0000E+000 Offset | 0.0000E+000 | Column Parameter −6 |
| Surf | 1 NSC Object | 317 Parameter | 5: Pickup From | 33 Scale | 1.0000E+000 Offset | 0.0000E+000 | Column Parameter −6 |
| Surf | 1 NSC Object | 317 Parameter | 6: Pickup From | 3 Scale | 1.0000E+000 Offset | 0.0000E+000 | Column Parameter −6 |
| Surf | 1 NSC Object | 317 Parameter | 7: Pickup From | 3 Scale | 1.0000E+000 Offset | 0.0000E+000 | Column Parameter −6 |
| Surf | 1 NSC Object | 317 Parameter | 8: Pickup From | 3 Scale | 1.0000E+000 Offset | 0.0000E+000 | Column Parameter −6 |
| Surf | 1 NSC Object | 318 Position | Y: Pickup From | 4 Scale | 1.0000E+000 Offset | 0.0000E+000 | Column Parameter −6 |
| Surf | 1 NSC Object | 318 Parameter | 1: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 318 Parameter | 2: Pickup From | 3 Scale | 1.0000E+000 Offset | 0.0000E+000 | Column Parameter −6 |
| Surf | 1 NSC Object | 318 Parameter | 3: Pickup From | 3 Scale | 1.0000E+000 Offset | 0.0000E+000 | Column Parameter −6 |
| Surf | 1 NSC Object | 318 Parameter | 5: Pickup From | 33 Scale | 1.0000E+000 Offset | 0.0000E+000 | Column Parameter −6 |
| Surf | 1 NSC Object | 318 Parameter | 6: Pickup From | 3 Scale | 1.0000E+000 Offset | 0.0000E+000 | Column Parameter −6 |
| Surf | 1 NSC Object | 318 Parameter | 7: Pickup From | 3 Scale | 1.0000E+000 Offset | 0.0000E+000 | Column Parameter −6 |
| Surf | 1 NSC Object | 318 Parameter | 8: Pickup From | 3 Scale | 1.0000E+000 Offset | 0.0000E+000 | Column Parameter −6 |
| Surf | 1 NSC Object | 319 Position | Y: Pickup From | 4 Scale | 1.0000E+000 Offset | 0.0000E+000 | Column Parameter −6 |
| Surf | 1 NSC Object | 320 Position | Y: Pickup From | 4 Scale | −1.0000E+000 Offset | 0.0000E+000 | Column Parameter −6 |
| Surf | 1 NSC Object | 320 Parameter | 1: Pickup From | 3 Scale | 1.0000E+000 Offset | 0.0000E+000 | Column Parameter −6 |
| Surf | 1 NSC Object | 320 Parameter | 2: Pickup From | 3 Scale | 1.0000E+000 Offset | 0.0000E+000 | Column Parameter −6 |
| Surf | 1 NSC Object | 320 Parameter | 3: Pickup From | 3 Scale | 1.0000E+000 Offset | 0.0000E+000 | Column Parameter −6 |
| Surf | 1 NSC Object | 320 Parameter | 5: Pickup From | 33 Scale | 1.0000E+000 Offset | 0.0000E+000 | Column Parameter −6 |
| Surf | 1 NSC Object | 320 Parameter | 6: Pickup From | 3 Scale | 1.0000E+000 Offset | 0.0000E+000 | Column Parameter −6 |
| Surf | 1 NSC Object | 320 Parameter | 7: Pickup From | 3 Scale | 1.0000E+000 Offset | 0.0000E+000 | Column Parameter −6 |
| Surf | 1 NSC Object | 320 Parameter | 8: Pickup From | 3 Scale | 1.0000E+000 Offset | 0.0000E+000 | Column Parameter −6 |
| Surf | 1 NSC Object | 321 Position | Y: Pickup From | 4 Scale | −1.0000E+000 Offset | 0.0000E+000 | Column Parameter −6 |
| Surf | 1 NSC Object | 321 Parameter | 1: Pickup From | 3 Scale | 1.0000E+000 Offset | 0.0000E+000 | Column Parameter −6 |
| Surf | 1 NSC Object | 321 Parameter | 2: Pickup From | 3 Scale | 1.0000E+000 Offset | 0.0000E+000 | Column Parameter −6 |
| Surf | 1 NSC Object | 321 Parameter | 3: Pickup From | 3 Scale | 1.0000E+000 Offset | 0.0000E+000 | Column Parameter −6 |
| Surf | 1 NSC Object | 321 Parameter | 5: Pickup From | 33 Scale | 1.0000E+000 Offset | 0.0000E+000 | Column Parameter −6 |
| Surf | 1 NSC Object | 321 Parameter | 6: Pickup From | 3 Scale | 1.0000E+000 Offset | 0.0000E+000 | Column Parameter −6 |
| Surf | 1 NSC Object | 321 Parameter | 7: Pickup From | 3 Scale | 1.0000E+000 Offset | 0.0000E+000 | Column Parameter −6 |
| Surf | 1 NSC Object | 321 Parameter | 8: Pickup From | 3 Scale | 1.0000E+000 Offset | 0.0000E+000 | Column Parameter −6 |
| Surf | 1 NSC Object | 322 Position | Y: Pickup From | 4 Scale | −1.0000E+000 Offset | 0.0000E+000 | Column Parameter −6 |
| Surf | 1 NSC Object | 322 Parameter | 1: Pickup From | 3 Scale | 1.0000E+000 Offset | 0.0000E+000 | Column Parameter −6 |
| Surf | 1 NSC Object | 322 Parameter | 2: Pickup From | 3 Scale | 1.0000E+000 Offset | 0.0000E+000 | Column Parameter −6 |
| Surf | 1 NSC Object | 322 Parameter | 3: Pickup From | 3 Scale | 1.0000E+000 Offset | 0.0000E+000 | Column Parameter −6 |
| Surf | 1 NSC Object | 322 Parameter | 5: Pickup From | 33 Scale | 1.0000E+000 Offset | 0.0000E+000 | Column Parameter −6 |
| Surf | 1 NSC Object | 322 Parameter | 6: Pickup From | 3 Scale | 1.0000E+000 Offset | 0.0000E+000 | Column Parameter −6 |
| Surf | 1 NSC Object | 322 Parameter | 7: Pickup From | 3 Scale | 1.0000E+000 Offset | 0.0000E+000 | Column Parameter −6 |
| Surf | 1 NSC Object | 322 Parameter | 8: Pickup From | 3 Scale | 1.0000E+000 Offset | 0.0000E+000 | Column Parameter −6 |
| Surf | 1 NSC Object | 323 Position | Y: Pickup From | 4 Scale | −1.0000E+000 Offset | 0.0000E+000 | Column Parameter −6 |
| Surf | 1 NSC Object | 325 Position | X: Pickup From | 2 Scale | 8.0000E+000 Offset | 0.0000E+000 | Column Parameter −6 |
| Surf | 1 NSC Object | 325 Parameter | 1: Pickup From | 3 Scale | 1.0000E+000 Offset | 0.0000E+000 | Column Parameter −6 |
| Surf | 1 NSC Object | 325 Parameter | 2: Pickup From | 3 Scale | 1.0000E+000 Offset | 0.0000E+000 | Column Parameter −6 |
| Surf | 1 NSC Object | 325 Parameter | 3: Pickup From | 3 Scale | 1.0000E+000 Offset | 0.0000E+000 | Column Parameter −6 |
| Surf | 1 NSC Object | 325 Parameter | 6: Pickup From | 3 Scale | 1.0000E+000 Offset | 0.0000E+000 | Column Parameter −6 |
| Surf | 1 NSC Object | 325 Parameter | 7: Pickup From | 3 Scale | 1.0000E+000 Offset | 0.0000E+000 | Column Parameter −6 |
| Surf | 1 NSC Object | 325 Parameter | 8: Pickup From | 3 Scale | 1.0000E+000 Offset | 0.0000E+000 | Column Parameter −6 |
| Surf | 1 NSC Object | 326 Position | Y: Pickup From | 4 Scale | 1.0000E+000 Offset | 0.0000E+000 | Column Parameter −6 |
| Surf | 1 NSC Object | 326 Parameter | 1: Pickup From | 3 Scale | 1.0000E+000 Offset | 0.0000E+000 | Column Parameter −6 |
| Surf | 1 NSC Object | 326 Parameter | 2: Pickup From | 3 Scale | 1.0000E+000 Offset | 0.0000E+000 | Column Parameter −6 |
| Surf | 1 NSC Object | 326 Parameter | 3: Pickup From | 3 Scale | 1.0000E+000 Offset | 0.0000E+000 | Column Parameter −6 |
| Surf | 1 NSC Object | 326 Parameter | 5: Pickup From | 43 Scale | 1.0000E+000 Offset | 0.0000E+000 | Column Parameter −6 |
| Surf | 1 NSC Object | 326 Parameter | 6: Pickup From | 3 Scale | 1.0000E+000 Offset | 0.0000E+000 | Column Parameter −6 |
| Surf | 1 NSC Object | 326 Parameter | 7: Pickup From | 3 Scale | 1.0000E+000 Offset | 0.0000E+000 | Column Parameter −6 |
| Surf | 1 NSC Object | 326 Parameter | 8: Pickup From | 3 Scale | 1.0000E+000 Offset | 0.0000E+000 | Column Parameter −6 |
| Surf | 1 NSC Object | 327 Position | Y: Pickup From | 4 Scale | 1.0000E+000 Offset | 0.0000E+000 | Column Parameter −6 |
| Surf | 1 NSC Object | 327 Parameter | 1: Pickup From | 3 Scale | 1.0000E+000 Offset | 0.0000E+000 | Column Parameter −6 |
| Surf | 1 NSC Object | 327 Parameter | 2: Pickup From | 3 Scale | 1.0000E+000 Offset | 0.0000E+000 | Column Parameter −6 |
| Surf | 1 NSC Object | 327 Parameter | 3: Pickup From | 3 Scale | 1.0000E+000 Offset | 0.0000E+000 | Column Parameter −6 |
| Surf | 1 NSC Object | 327 Parameter | 5: Pickup From | 43 Scale | 1.0000E+000 Offset | 0.0000E+000 | Column Parameter −6 |
| Surf | 1 NSC Object | 327 Parameter | 6: Pickup From | 3 Scale | 1.0000E+000 Offset | 0.0000E+000 | Column Parameter −6 |
| Surf | 1 NSC Object | 327 Parameter | 7: Pickup From | 3 Scale | 1.0000E+000 Offset | 0.0000E+000 | Column Parameter −6 |
| Surf | 1 NSC Object | 327 Parameter | 8: Pickup From | 3 Scale | 1.0000E+000 Offset | 0.0000E+000 | Column Parameter −6 |
| Surf | 1 NSC Object | 328 Position | Y: Pickup From | 4 Scale | 1.0000E+000 Offset | 0.0000E+000 | Column Parameter −6 |
| Surf | 1 NSC Object | 329 Position | Y: Pickup From | 4 Scale | 1.0000E+000 Offset | 0.0000E+000 | Column Parameter −6 |
| Surf | 1 NSC Object | 330 Position | Y: Pickup From | 4 Scale | −1.0000E+000 Offset | 0.0000E+000 | Column Parameter −6 |
| Surf | 1 NSC Object | 330 Parameter | 1: Pickup From | 3 Scale | 1.0000E+000 Offset | 0.0000E+000 | Column Parameter −6 |
| Surf | 1 NSC Object | 330 Parameter | 2: Pickup From | 3 Scale | 1.0000E+000 Offset | 0.0000E+000 | Column Parameter −6 |
| Surf | 1 NSC Object | 330 Parameter | 3: Pickup From | 3 Scale | 1.0000E+000 Offset | 0.0000E+000 | Column Parameter −6 |
| Surf | 1 NSC Object | 330 Parameter | 5: Pickup From | 43 Scale | 1.0000E+000 Offset | 0.0000E+000 | Column Parameter −6 |
| Surf | 1 NSC Object | 330 Parameter | 6: Pickup From | 3 Scale | 1.0000E+000 Offset | 0.0000E+000 | Column Parameter −6 |
| Surf | 1 NSC Object | 330 Parameter | 7: Pickup From | 3 Scale | 1.0000E+000 Offset | 0.0000E+000 | Column Parameter −6 |
| Surf | 1 NSC Object | 330 Parameter | 8: Pickup From | 3 Scale | 1.0000E+000 Offset | 0.0000E+000 | Column Parameter −6 |
| Surf | 1 NSC Object | 331 Position | Y: Pickup From | 4 Scale | −1.0000E+000 Offset | 0.0000E+000 | Column Parameter −6 |
| Surf | 1 NSC Object | 331 Parameter | 1: Pickup From | 3 Scale | 1.0000E+000 Offset | 0.0000E+000 | Column Parameter −6 |
| Surf | 1 NSC Object | 331 Parameter | 2: Pickup From | 3 Scale | 1.0000E+000 Offset | 0.0000E+000 | Column Parameter −6 |
| Surf | 1 NSC Object | 331 Parameter | 3: Pickup From | 3 Scale | 1.0000E+000 Offset | 0.0000E+000 | Column Parameter −6 |
| Surf | 1 NSC Object | 331 Parameter | 5: Pickup From | 43 Scale | 1.0000E+000 Offset | 0.0000E+000 | Column Parameter −6 |
| Surf | 1 NSC Object | 331 Parameter | 6: Pickup From | 3 Scale | 1.0000E+000 Offset | 0.0000E+000 | Column Parameter −6 |
| Surf | 1 NSC Object | 331 Parameter | 7: Pickup From | 3 Scale | 1.0000E+000 Offset | 0.0000E+000 | Column Parameter −6 |
| Surf | 1 NSC Object | 331 Parameter | 8: Pickup From | 3 Scale | 1.0000E+000 Offset | 0.0000E+000 | Column Parameter −6 |
| Surf | 1 NSC Object | 332 Position | Y: Pickup From | 4 Scale | −1.0000E+000 Offset | 0.0000E+000 | Column Parameter −6 |
| Surf | 1 NSC Object | 333 Position | Y: Pickup From | 4 Scale | −1.0000E+000 Offset | 0.0000E+000 | Column Parameter −6 |
| Surf | 1 NSC Object | 335 Position | X: Pickup From | 2 Scale | −2.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 335 Parameter | 1: Pickup From | 3 Scale | 1.0000E+000 Offset | 0.0000E+000 | Column Parameter −6 |
| Surf | 1 NSC Object | 335 Parameter | 2: Pickup From | 3 Scale | 1.0000E+000 Offset | 0.0000E+000 | Column Parameter −6 |
| Surf | 1 NSC Object | 335 Parameter | 3: Pickup From | 3 Scale | 1.0000E+000 Offset | 0.0000E+000 | Column Parameter −6 |
| Surf | 1 NSC Object | 335 Parameter | 6: Pickup From | 3 Scale | 1.0000E+000 Offset | 0.0000E+000 | Column Parameter −6 |
| Surf | 1 NSC Object | 335 Parameter | 7: Pickup From | 3 Scale | 1.0000E+000 Offset | 0.0000E+000 | Column Parameter −6 |
| Surf | 1 NSC Object | 335 Parameter | 8: Pickup From | 3 Scale | 1.0000E+000 Offset | 0.0000E+000 | Column Parameter −6 |
| Surf | 1 NSC Object | 336 Position | Y: Pickup From | 4 Scale | 1.0000E+000 Offset | 0.0000E+000 | Column Parameter −6 |
| Surf | 1 NSC Object | 336 Parameter | 1: Pickup From | 3 Scale | 1.0000E+000 Offset | 0.0000E+000 | Column Parameter −6 |
| Surf | 1 NSC Object | 336 Parameter | 2: Pickup From | 3 Scale | 1.0000E+000 Offset | 0.0000E+000 | Column Parameter −6 |
| Surf | 1 NSC Object | 336 Parameter | 3: Pickup From | 3 Scale | 1.0000E+000 Offset | 0.0000E+000 | Column Parameter −6 |
| Surf | 1 NSC Object | 336 Parameter | 5: Pickup From | 53 Scale | 1.0000E+000 Offset | 0.0000E+000 | Column Parameter −6 |
| Surf | 1 NSC Object | 336 Parameter | 6: Pickup From | 3 Scale | 1.0000E+000 Offset | 0.0000E+000 | Column Parameter −6 |
| Surf | 1 NSC Object | 336 Parameter | 7: Pickup From | 3 Scale | 1.0000E+000 Offset | 0.0000E+000 | Column Parameter −6 |
| Surf | 1 NSC Object | 336 Parameter | 8: Pickup From | 3 Scale | 1.0000E+000 Offset | 0.0000E+000 | Column Parameter −6 |
| Surf | 1 NSC Object | 337 Position | Y: Pickup From | 4 Scale | 1.0000E+000 Offset | 0.0000E+000 | Column Parameter −6 |
| Surf | 1 NSC Object | 337 Parameter | 1: Pickup From | 3 Scale | 1.0000E+000 Offset | 0.0000E+000 | Column Parameter −6 |
| Surf | 1 NSC Object | 337 Parameter | 2: Pickup From | 3 Scale | 1.0000E+000 Offset | 0.0000E+000 | Column Parameter −6 |
| Surf | 1 NSC Object | 337 Parameter | 3: Pickup From | 3 Scale | 1.0000E+000 Offset | 0.0000E+000 | Column Parameter −6 |
| Surf | 1 NSC Object | 337 Parameter | 5: Pickup From | 53 Scale | 1.0000E+000 Offset | 0.0000E+000 | Column Parameter −6 |
| Surf | 1 NSC Object | 337 Parameter | 6: Pickup From | 3 Scale | 1.0000E+000 Offset | 0.0000E+000 | Column Parameter −6 |
| Surf | 1 NSC Object | 337 Parameter | 7: Pickup From | 3 Scale | 1.0000E+000 Offset | 0.0000E+000 | Column Parameter −6 |
| Surf | 1 NSC Object | 337 Parameter | 8: Pickup From | 3 Scale | 1.0000E+000 Offset | 0.0000E+000 | Column Parameter −6 |
| Surf | 1 NSC Object | 338 Position | Y: Pickup From | 4 Scale | 1.0000E+000 Offset | 0.0000E+000 | Column Parameter −6 |
| Surf | 1 NSC Object | 338 Parameter | 1: Pickup From | 3 Scale | 1.0000E+000 Offset | 0.0000E+000 | Column Parameter −6 |
| Surf | 1 NSC Object | 338 Parameter | 2: Pickup From | 3 Scale | 1.0000E+000 Offset | 0.0000E+000 | Column Parameter −6 |
| Surf | 1 NSC Object | 338 Parameter | 3: Pickup From | 3 Scale | 1.0000E+000 Offset | 0.0000E+000 | Column Parameter −6 |
| Surf | 1 NSC Object | 338 Parameter | 5: Pickup From | 53 Scale | 1.0000E+000 Offset | 0.0000E+000 | Column Parameter −6 |
| Surf | 1 NSC Object | 338 Parameter | 6: Pickup From | 3 Scale | 1.0000E+000 Offset | 0.0000E+000 | Column Parameter −6 |
| Surf | 1 NSC Object | 338 Parameter | 7: Pickup From | 3 Scale | 1.0000E+000 Offset | 0.0000E+000 | Column Parameter −6 |
| Surf | 1 NSC Object | 338 Parameter | 8: Pickup From | 3 Scale | 1.0000E+000 Offset | 0.0000E+000 | Column Parameter −6 |
| Surf | 1 NSC Object | 339 Position | Y: Pickup From | 4 Scale | 1.0000E+000 Offset | 0.0000E+000 | Column Parameter −6 |
| Surf | 1 NSC Object | 339 Parameter | 1: Pickup From | 3 Scale | 1.0000E+000 Offset | 0.0000E+000 | Column Parameter −6 |
| Surf | 1 NSC Object | 339 Parameter | 2: Pickup From | 3 Scale | 1.0000E+000 Offset | 0.0000E+000 | Column Parameter −6 |
| Surf | 1 NSC Object | 339 Parameter | 3: Pickup From | 3 Scale | 1.0000E+000 Offset | 0.0000E+000 | Column Parameter −6 |
| Surf | 1 NSC Object | 339 Parameter | 5: Pickup From | 53 Scale | 1.0000E+000 Offset | 0.0000E+000 | Column Parameter −6 |
| Surf | 1 NSC Object | 339 Parameter | 6: Pickup From | 3 Scale | 1.0000E+000 Offset | 0.0000E+000 | Column Parameter −6 |
| Surf | 1 NSC Object | 339 Parameter | 7: Pickup From | 3 Scale | 1.0000E+000 Offset | 0.0000E+000 | Column Parameter −6 |
| Surf | 1 NSC Object | 339 Parameter | 8: Pickup From | 3 Scale | 1.0000E+000 Offset | 0.0000E+000 | Column Parameter −6 |
| Surf | 1 NSC Object | 340 Position | Y: Pickup From | 4 Scale | −1.0000E+000 Offset | 0.0000E+000 | Column Parameter −6 |
| Surf | 1 NSC Object | 340 Parameter | 1: Pickup From | 3 Scale | 1.0000E+000 Offset | 0.0000E+000 | Column Parameter −6 |
| Surf | 1 NSC Object | 340 Parameter | 2: Pickup From | 3 Scale | 1.0000E+000 Offset | 0.0000E+000 | Column Parameter −6 |
| Surf | 1 NSC Object | 340 Parameter | 3: Pickup From | 3 Scale | 1.0000E+000 Offset | 0.0000E+000 | Column Parameter −6 |
| Surf | 1 NSC Object | 340 Parameter | 5: Pickup From | 53 Scale | 1.0000E+000 Offset | 0.0000E+000 | Column Parameter −6 |
| Surf | 1 NSC Object | 340 Parameter | 6: Pickup From | 3 Scale | 1.0000E+000 Offset | 0.0000E+000 | Column Parameter −6 |
| Surf | 1 NSC Object | 340 Parameter | 7: Pickup From | 3 Scale | 1.0000E+000 Offset | 0.0000E+000 | Column Parameter −6 |
| Surf | 1 NSC Object | 340 Parameter | 8: Pickup From | 3 Scale | 1.0000E+000 Offset | 0.0000E+000 | Column Parameter −6 |
| Surf | 1 NSC Object | 341 Position | Y: Pickup From | 4 Scale | −1.0000E+000 Offset | 0.0000E+000 | Column Parameter −6 |
| Surf | 1 NSC Object | 341 Parameter | 1: Pickup From | 3 Scale | 1.0000E+000 Offset | 0.0000E+000 | Column Parameter −6 |
| Surf | 1 NSC Object | 341 Parameter | 2: Pickup From | 3 Scale | 1.0000E+000 Offset | 0.0000E+000 | Column Parameter −6 |
| Surf | 1 NSC Object | 341 Parameter | 3: Pickup From | 3 Scale | 1.0000E+000 Offset | 0.0000E+000 | Column Parameter −6 |
| Surf | 1 NSC Object | 341 Parameter | 5: Pickup From | 53 Scale | 1.0000E+000 Offset | 0.0000E+000 | Column Parameter −6 |
| Surf | 1 NSC Object | 341 Parameter | 6: Pickup From | 3 Scale | 1.0000E+000 Offset | 0.0000E+000 | Column Parameter −6 |
| Surf | 1 NSC Object | 341 Parameter | 7: Pickup From | 3 Scale | 1.0000E+000 Offset | 0.0000E+000 | Column Parameter −6 |
| Surf | 1 NSC Object | 341 Parameter | 8: Pickup From | 3 Scale | 1.0000E+000 Offset | 0.0000E+000 | Column Parameter −6 |
| Surf | 1 NSC Object | 342 Position | Y: Pickup From | 4 Scale | −1.0000E+000 Offset | 0.0000E+000 | Column Parameter −6 |
| Surf | 1 NSC Object | 342 Parameter | 1: Pickup From | 3 Scale | 1.0000E+000 Offset | 0.0000E+000 | Column Parameter −6 |
| Surf | 1 NSC Object | 342 Parameter | 2: Pickup From | 3 Scale | 1.0000E+000 Offset | 0.0000E+000 | Column Parameter −6 |
| Surf | 1 NSC Object | 342 Parameter | 3: Pickup From | 3 Scale | 1.0000E+000 Offset | 0.0000E+000 | Column Parameter −6 |
| Surf | 1 NSC Object | 342 Parameter | 5: Pickup From | 53 Scale | 1.0000E+000 Offset | 0.0000E+000 | Column Parameter −6 |
| Surf | 1 NSC Object | 342 Parameter | 6: Pickup From | 3 Scale | 1.0000E+000 Offset | 0.0000E+000 | Column Parameter −6 |
| Surf | 1 NSC Object | 342 Parameter | 7: Pickup From | 3 Scale | 1.0000E+000 Offset | 0.0000E+000 | Column Parameter −6 |
| Surf | 1 NSC Object | 342 Parameter | 8: Pickup From | 3 Scale | 1.0000E+000 Offset | 0.0000E+000 | Column Parameter −6 |
| Surf | 1 NSC Object | 343 Position | Y: Pickup From | 4 Scale | −1.0000E+000 Offset | 0.0000E+000 | Column Parameter −6 |
| Surf | 1 NSC Object | 343 Parameter | 1: Pickup From | 3 Scale | 1.0000E+000 Offset | 0.0000E+000 | Column Parameter −6 |
| Surf | 1 NSC Object | 343 Parameter | 2: Pickup From | 3 Scale | 1.0000E+000 Offset | 0.0000E+000 | Column Parameter −6 |
| Surf | 1 NSC Object | 343 Parameter | 3: Pickup From | 3 Scale | 1.0000E+000 Offset | 0.0000E+000 | Column Parameter −6 |
| Surf | 1 NSC Object | 343 Parameter | 5: Pickup From | 53 Scale | 1.0000E+000 Offset | 0.0000E+000 | Column Parameter −6 |
| Surf | 1 NSC Object | 343 Parameter | 6: Pickup From | 3 Scale | 1.0000E+000 Offset | 0.0000E+000 | Column Parameter −6 |
| Surf | 1 NSC Object | 343 Parameter | 7: Pickup From | 3 Scale | 1.0000E+000 Offset | 0.0000E+000 | Column Parameter −6 |
| Surf | 1 NSC Object | 343 Parameter | 8: Pickup From | 3 Scale | 1.0000E+000 Offset | 0.0000E+000 | Column Parameter −6 |
| Surf | 1 NSC Object | 345 Position | X: Pickup From | 2 Scale | −4.0000E+000 Offset | 0.0000E+000 | Column Parameter −6 |
| Surf | 1 NSC Object | 345 Parameter | 1: Pickup From | 3 Scale | 1.0000E+000 Offset | 0.0000E+000 | Column Parameter −6 |
| Surf | 1 NSC Object | 345 Parameter | 2: Pickup From | 3 Scale | 1.0000E+000 Offset | 0.0000E+000 | Column Parameter −6 |
| Surf | 1 NSC Object | 345 Parameter | 3: Pickup From | 3 Scale | 1.0000E+000 Offset | 0.0000E+000 | Column Parameter −6 |
| Surf | 1 NSC Object | 345 Parameter | 6: Pickup From | 3 Scale | 1.0000E+000 Offset | 0.0000E+000 | Column Parameter −6 |
| Surf | 1 NSC Object | 345 Parameter | 7: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 345 Parameter | 8: Pickup From | 3 Scale | 1.0000E+000 Offset | 0.0000E+000 | Column Parameter −6 |
| Surf | 1 NSC Object | 346 Position | Y: Pickup From | 4 Scale | 1.0000E+000 Offset | 0.0000E+000 | Column Parameter −6 |
| Surf | 1 NSC Object | 346 Parameter | 1: Pickup From | 3 Scale | 1.0000E+000 Offset | 0.0000E+000 | Column Parameter −6 |
| Surf | 1 NSC Object | 346 Parameter | 2: Pickup From | 3 Scale | 1.0000E+000 Offset | 0.0000E+000 | Column Parameter −6 |
| Surf | 1 NSC Object | 346 Parameter | 3: Pickup From | 3 Scale | 1.0000E+000 Offset | 0.0000E+000 | Column Parameter −6 |
| Surf | 1 NSC Object | 346 Parameter | 5: Pickup From | 63 Scale | 1.0000E+000 Offset | 0.0000E+000 | Column Parameter −6 |
| Surf | 1 NSC Object | 346 Parameter | 6: Pickup From | 3 Scale | 1.0000E+000 Offset | 0.0000E+000 | Column Parameter −6 |
| Surf | 1 NSC Object | 346 Parameter | 7: Pickup From | 3 Scale | 1.0000E+000 Offset | 0.0000E+000 | Column Parameter −6 |
| Surf | 1 NSC Object | 346 Parameter | 8: Pickup From | 3 Scale | 1.0000E+000 Offset | 0.0000E+000 | Column Parameter −6 |
| Surf | 1 NSC Object | 347 Position | Y: Pickup From | 4 Scale | 1.0000E+000 Offset | 0.0000E+000 | Column Parameter −6 |
| Surf | 1 NSC Object | 347 Parameter | 1: Pickup From | 3 Scale | 1.0000E+000 Offset | 0.0000E+000 | Column Parameter −6 |
| Surf | 1 NSC Object | 347 Parameter | 2: Pickup From | 3 Scale | 1.0000E+000 Offset | 0.0000E+000 | Column Parameter −6 |
| Surf | 1 NSC Object | 347 Parameter | 3: Pickup From | 3 Scale | 1.0000E+000 Offset | 0.0000E+000 | Column Parameter −6 |
| Surf | 1 NSC Object | 347 Parameter | 5: Pickup From | 63 Scale | 1.0000E+000 Offset | 0.0000E+000 | Column Parameter −6 |
| Surf | 1 NSC Object | 347 Parameter | 6: Pickup From | 3 Scale | 1.0000E+000 Offset | 0.0000E+000 | Column Parameter −6 |
| Surf | 1 NSC Object | 347 Parameter | 7: Pickup From | 3 Scale | 1.0000E+000 Offset | 0.0000E+000 | Column Parameter −6 |
| Surf | 1 NSC Object | 347 Parameter | 8: Pickup From | 3 Scale | 1.0000E+000 Offset | 0.0000E+000 | Column Parameter −6 |
| Surf | 1 NSC Object | 348 Position | Y: Pickup From | 4 Scale | 1.0000E+000 Offset | 0.0000E+000 | Column Parameter −6 |
| Surf | 1 NSC Object | 348 Parameter | 1: Pickup From | 3 Scale | 1.0000E+000 Offset | 0.0000E+000 | Column Parameter −6 |
| Surf | 1 NSC Object | 348 Parameter | 2: Pickup From | 3 Scale | 1.0000E+000 Offset | 0.0000E+000 | Column Parameter −6 |
| Surf | 1 NSC Object | 348 Parameter | 3: Pickup From | 3 Scale | 1.0000E+000 Offset | 0.0000E+000 | Column Parameter −6 |
| Surf | 1 NSC Object | 348 Parameter | 5: Pickup From | 63 Scale | 1.0000E+000 Offset | 0.0000E+000 | Column Parameter −6 |
| Surf | 1 NSC Object | 348 Parameter | 6: Pickup From | 3 Scale | 1.0000E+000 Offset | 0.0000E+000 | Column Parameter −6 |
| Surf | 1 NSC Object | 348 Parameter | 7: Pickup From | 3 Scale | 1.0000E+000 Offset | 0.0000E+000 | Column Parameter −6 |
| Surf | 1 NSC Object | 348 Parameter | 8: Pickup From | 3 Scale | 1.0000E+000 Offset | 0.0000E+000 | Column Parameter −6 |
| Surf | 1 NSC Object | 349 Position | Y: Pickup From | 4 Scale | 1.0000E+000 Offset | 0.0000E+000 | Column Parameter −6 |
| Surf | 1 NSC Object | 349 Parameter | 1: Pickup From | 3 Scale | 1.0000E+000 Offset | 0.0000E+000 | Column Parameter −6 |
| Surf | 1 NSC Object | 349 Parameter | 2: Pickup From | 3 Scale | 1.0000E+000 Offset | 0.0000E+000 | Column Parameter −6 |
| Surf | 1 NSC Object | 349 Parameter | 3: Pickup From | 3 Scale | 1.0000E+000 Offset | 0.0000E+000 | Column Parameter −6 |
| Surf | 1 NSC Object | 349 Parameter | 5: Pickup From | 63 Scale | 1.0000E+000 Offset | 0.0000E+000 | Column Parameter −6 |
| Surf | 1 NSC Object | 349 Parameter | 6: Pickup From | 3 Scale | 1.0000E+000 Offset | 0.0000E+000 | Column Parameter −6 |
| Surf | 1 NSC Object | 349 Parameter | 7: Pickup From | 3 Scale | 1.0000E+000 Offset | 0.0000E+000 | Column Parameter −6 |
| Surf | 1 NSC Object | 349 Parameter | 8: Pickup From | 3 Scale | 1.0000E+000 Offset | 0.0000E+000 | Column Parameter −6 |
| Surf | 1 NSC Object | 350 Position | Y: Pickup From | 4 Scale | −1.0000E+000 Offset | 0.0000E+000 | Column Parameter −6 |
| Surf | 1 NSC Object | 350 Parameter | 2: Pickup From | 3 Scale | 1.0000E+000 Offset | 0.0000E+000 | Column Parameter −6 |
| Surf | 1 NSC Object | 350 Parameter | 3: Pickup From | 3 Scale | 1.0000E+000 Offset | 0.0000E+000 | Column Parameter −6 |
| Surf | 1 NSC Object | 350 Parameter | 5: Pickup From | 63 Scale | 1.0000E+000 Offset | 0.0000E+000 | Column Parameter −6 |
| Surf | 1 NSC Object | 350 Parameter | 6: Pickup From | 3 Scale | 1.0000E+000 Offset | 0.0000E+000 | Column Parameter −6 |
| Surf | 1 NSC Object | 350 Parameter | 7: Pickup From | 3 Scale | 1.0000E+000 Offset | 0.0000E+000 | Column Parameter −6 |
| Surf | 1 NSC Object | 350 Parameter | 8: Pickup From | 3 Scale | 1.0000E+000 Offset | 0.0000E+000 | Column Parameter −6 |
| Surf | 1 NSC Object | 351 Position | Y: Pickup From | 4 Scale | −1.0000E+000 Offset | 0.0000E+000 | Column Parameter −6 |
| Surf | 1 NSC Object | 351 Parameter | 1: Pickup From | 3 Scale | 1.0000E+000 Offset | 0.0000E+000 | Column Parameter −6 |
| Surf | 1 NSC Object | 351 Parameter | 2: Pickup From | 3 Scale | 1.0000E+000 Offset | 0.0000E+000 | Column Parameter −6 |
| Surf | 1 NSC Object | 351 Parameter | 3: Pickup From | 3 Scale | 1.0000E+000 Offset | 0.0000E+000 | Column Parameter −6 |
| Surf | 1 NSC Object | 351 Parameter | 5: Pickup From | 63 Scale | 1.0000E+000 Offset | 0.0000E+000 | Column Parameter −6 |
| Surf | 1 NSC Object | 351 Parameter | 6: Pickup From | 3 Scale | 1.0000E+000 Offset | 0.0000E+000 | Column Parameter −6 |
| Surf | 1 NSC Object | 351 Parameter | 7: Pickup From | 3 Scale | 1.0000E+000 Offset | 0.0000E+000 | Column Parameter −6 |
| Surf | 1 NSC Object | 351 Parameter | 8: Pickup From | 3 Scale | 1.0000E+000 Offset | 0.0000E+000 | Column Parameter −6 |
| Surf | 1 NSC Object | 352 Position | Y: Pickup From | 4 Scale | −1.0000E+000 Offset | 0.0000E+000 | Column Parameter −6 |
| Surf | 1 NSC Object | 352 Parameter | 1: Pickup From | 3 Scale | 1.0000E+000 Offset | 0.0000E+000 | Column Parameter −6 |
| Surf | 1 NSC Object | 352 Parameter | 2: Pickup From | 3 Scale | 1.0000E+000 Offset | 0.0000E+000 | Column Parameter −6 |
| Surf | 1 NSC Object | 352 Parameter | 3: Pickup From | 3 Scale | 1.0000E+000 Offset | 0.0000E+000 | Column Parameter −6 |
| Surf | 1 NSC Object | 352 Parameter | 5: Pickup From | 63 Scale | 1.0000E+000 Offset | 0.0000E+000 | Column Parameter −6 |
| Surf | 1 NSC Object | 352 Parameter | 6: Pickup From | 3 Scale | 1.0000E+000 Offset | 0.0000E+000 | Column Parameter −6 |
| Surf | 1 NSC Object | 352 Parameter | 7: Pickup From | 3 Scale | 1.0000E+000 Offset | 0.0000E+000 | Column Parameter −6 |
| Surf | 1 NSC Object | 352 Parameter | 8: Pickup From | 3 Scale | 1.0000E+000 Offset | 0.0000E+000 | Column Parameter −6 |
| Surf | 1 NSC Object | 353 Position | Y: Pickup From | 4 Scale | −1.0000E+000 Offset | 0.0000E+000 | Column Parameter −6 |
| Surf | 1 NSC Object | 353 Parameter | 1: Pickup From | 3 Scale | 1.0000E+000 Offset | 0.0000E+000 | Column Parameter −6 |
| Surf | 1 NSC Object | 353 Parameter | 2: Pickup From | 3 Scale | 1.0000E+000 Offset | 0.0000E+000 | Column Parameter −6 |
| Surf | 1 NSC Object | 353 Parameter | 3: Pickup From | 3 Scale | 1.0000E+000 Offset | 0.0000E+000 | Column Parameter −6 |
| Surf | 1 NSC Object | 353 Parameter | 5: Pickup From | 63 Scale | 1.0000E+000 Offset | 0.0000E+000 | Column Parameter −6 |
| Surf | 1 NSC Object | 353 Parameter | 6: Pickup From | 3 Scale | 1.0000E+000 Offset | 0.0000E+000 | Column Parameter −6 |
| Surf | 1 NSC Object | 353 Parameter | 7: Pickup From | 3 Scale | 1.0000E+000 Offset | 0.0000E+000 | Column Parameter −6 |
| Surf | 1 NSC Object | 353 Parameter | 8: Pickup From | 3 Scale | 1.0000E+000 Offset | 0.0000E+000 | Column Parameter −6 |
| Surf | 1 NSC Object | 355 Position | X: Pickup From | 2 Scale | −6.0000E+000 Offset | 0.0000E+000 | Column Parameter −6 |
| Surf | 1 NSC Object | 355 Parameter | 1: Pickup From | 3 Scale | 1.0000E+000 Offset | 0.0000E+000 | Column Parameter −6 |
| Surf | 1 NSC Object | 355 Parameter | 2: Pickup From | 3 Scale | 1.0000E+000 Offset | 0.0000E+000 | Column Parameter −6 |
| Surf | 1 NSC Object | 355 Parameter | 3: Pickup From | 3 Scale | 1.0000E+000 Offset | 0.0000E+000 | Column Parameter −6 |
| Surf | 1 NSC Object | 355 Parameter | 6: Pickup From | 3 Scale | 1.0000E+000 Offset | 0.0000E+000 | Column Parameter −6 |
| Surf | 1 NSC Object | 355 Parameter | 7: Pickup From | 3 Scale | 1.0000E+000 Offset | 0.0000E+000 | Column Parameter −6 |
| Surf | 1 NSC Object | 355 Parameter | 8: Pickup From | 3 Scale | 1.0000E+000 Offset | 0.0000E+000 | Column Parameter −6 |
| Surf | 1 NSC Object | 356 Position | Y: Pickup From | 4 Scale | 1.0000E+000 Offset | 0.0000E+000 | Column Parameter −6 |
| Surf | 1 NSC Object | 356 Parameter | 1: Pickup From | 3 Scale | 1.0000E+000 Offset | 0.0000E+000 | Column Parameter −6 |
| Surf | 1 NSC Object | 356 Parameter | 2: Pickup From | 3 Scale | 1.0000E+000 Offset | 0.0000E+000 | Column Parameter −6 |
| Surf | 1 NSC Object | 356 Parameter | 3: Pickup From | 3 Scale | 1.0000E+000 Offset | 0.0000E+000 | Column Parameter −6 |
| Surf | 1 NSC Object | 356 Parameter | 5: Pickup From | 73 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 356 Parameter | 6: Pickup From | 3 Scale | 1.0000E+000 Offset | 0.0000E+000 | Column Parameter −6 |
| Surf | 1 NSC Object | 356 Parameter | 7: Pickup From | 3 Scale | 1.0000E+000 Offset | 0.0000E+000 | Column Parameter −6 |
| Surf | 1 NSC Object | 356 Parameter | 8: Pickup From | 3 Scale | 1.0000E+000 Offset | 0.0000E+000 | Column Parameter −6 |
| Surf | 1 NSC Object | 357 Position | Y: Pickup From | 4 Scale | 1.0000E+000 Offset | 0.0000E+000 | Column Parameter −6 |
| Surf | 1 NSC Object | 357 Parameter | 1: Pickup From | 3 Scale | 1.0000E+000 Offset | 0.0000E+000 | Column Parameter −6 |
| Surf | 1 NSC Object | 357 Parameter | 2: Pickup From | 3 Scale | 1.0000E+000 Offset | 0.0000E+000 | Column Parameter −6 |
| Surf | 1 NSC Object | 357 Parameter | 3: Pickup From | 3 Scale | 1.0000E+000 Offset | 0.0000E+000 | Column Parameter −6 |
| Surf | 1 NSC Object | 357 Parameter | 5: Pickup From | 73 Scale | 1.0000E+000 Offset | 0.0000E+000 | Column Parameter −6 |
| Surf | 1 NSC Object | 357 Parameter | 6: Pickup From | 3 Scale | 1.0000E+000 Offset | 0.0000E+000 | Column Parameter −6 |
| Surf | 1 NSC Object | 357 Parameter | 7: Pickup From | 3 Scale | 1.0000E+000 Offset | 0.0000E+000 | Column Parameter −6 |
| Surf | 1 NSC Object | 357 Parameter | 8: Pickup From | 3 Scale | 1.0000E+000 Offset | 0.0000E+000 | Column Parameter −6 |
| Surf | 1 NSC Object | 358 Position | Y: Pickup From | 4 Scale | 1.0000E+000 Offset | 0.0000E+000 | Column Parameter −6 |
| Surf | 1 NSC Object | 358 Parameter | 1: Pickup From | 3 Scale | 1.0000E+000 Offset | 0.0000E+000 | Column Parameter −6 |
| Surf | 1 NSC Object | 358 Parameter | 2: Pickup From | 3 Scale | 1.0000E+000 Offset | 0.0000E+000 | Column Parameter −6 |
| Surf | 1 NSC Object | 358 Parameter | 3: Pickup From | 3 Scale | 1.0000E+000 Offset | 0.0000E+000 | Column Parameter −6 |
| Surf | 1 NSC Object | 358 Parameter | 5: Pickup From | 73 Scale | 1.0000E+000 Offset | 0.0000E+000 | Column Parameter −6 |
| Surf | 1 NSC Object | 358 Parameter | 6: Pickup From | 3 Scale | 1.0000E+000 Offset | 0.0000E+000 | Column Parameter −6 |
| Surf | 1 NSC Object | 358 Parameter | 7: Pickup From | 3 Scale | 1.0000E+000 Offset | 0.0000E+000 | Column Parameter −6 |
| Surf | 1 NSC Object | 358 Parameter | 8: Pickup From | 3 Scale | 1.0000E+000 Offset | 0.0000E+000 | Column Parameter −6 |
| Surf | 1 NSC Object | 359 Position | Y: Pickup From | 4 Scale | 1.0000E+000 Offset | 0.0000E+000 | Column Parameter −6 |
| Surf | 1 NSC Object | 360 Position | Y: Pickup From | 4 Scale | −1.0000E+000 Offset | 0.0000E+000 | Column Parameter −6 |
| Surf | 1 NSC Object | 360 Parameter | 1: Pickup From | 3 Scale | 1.0000E+000 Offset | 0.0000E+000 | Column Parameter −6 |
| Surf | 1 NSC Object | 360 Parameter | 2: Pickup From | 3 Scale | 1.0000E+000 Offset | 0.0000E+000 | Column Parameter −6 |
| Surf | 1 NSC Object | 360 Parameter | 3: Pickup From | 3 Scale | 1.0000E+000 Offset | 0.0000E+000 | Column Parameter −6 |
| Surf | 1 NSC Object | 360 Parameter | 5: Pickup From | 73 Scale | 1.0000E+000 Offset | 0.0000E+000 | Column Parameter −6 |
| Surf | 1 NSC Object | 360 Parameter | 6: Pickup From | 3 Scale | 1.0000E+000 Offset | 0.0000E+000 | Column Parameter −6 |
| Surf | 1 NSC Object | 360 Parameter | 7: Pickup From | 3 Scale | 1.0000E+000 Offset | 0.0000E+000 | Column Parameter −6 |
| Surf | 1 NSC Object | 360 Parameter | 8: Pickup From | 3 Scale | 1.0000E+000 Offset | 0.0000E+000 | Column Parameter −6 |
| Surf | 1 NSC Object | 361 Position | Y: Pickup From | 4 Scale | −1.0000E+000 Offset | 0.0000E+000 | Column Parameter −6 |
| Surf | 1 NSC Object | 361 Parameter | 1: Pickup From | 3 Scale | 1.0000E+000 Offset | 0.0000E+000 | Column Parameter −6 |
| Surf | 1 NSC Object | 361 Parameter | 2: Pickup From | 3 Scale | 1.0000E+000 Offset | 0.0000E+000 | Column Parameter −6 |
| Surf | 1 NSC Object | 361 Parameter | 3: Pickup From | 3 Scale | 1.0000E+000 Offset | 0.0000E+000 | Column Parameter −6 |
| Surf | 1 NSC Object | 361 Parameter | 5: Pickup From | 73 Scale | 1.0000E+000 Offset | 0.0000E+000 | Column Parameter −6 |
| Surf | 1 NSC Object | 361 Parameter | 6: Pickup From | 3 Scale | 1.0000E+000 Offset | 0.0000E+000 | Column Parameter −6 |
| Surf | 1 NSC Object | 361 Parameter | 7: Pickup From | 3 Scale | 1.0000E+000 Offset | 0.0000E+000 | Column Parameter −6 |
| Surf | 1 NSC Object | 361 Parameter | 8: Pickup From | 3 Scale | 1.0000E+000 Offset | 0.0000E+000 | Column Parameter −6 |
| Surf | 1 NSC Object | 362 Position | Y: Pickup From | 4 Scale | −1.0000E+000 Offset | 0.0000E+000 | Column Parameter −6 |
| Surf | 1 NSC Object | 362 Parameter | 1: Pickup From | 3 Scale | 1.0000E+000 Offset | 0.0000E+000 | Column Parameter −6 |
| Surf | 1 NSC Object | 362 Parameter | 2: Pickup From | 3 Scale | 1.0000E+000 Offset | 0.0000E+000 | Column Parameter −6 |
| Surf | 1 NSC Object | 362 Parameter | 3: Pickup From | 3 Scale | 1.0000E+000 Offset | 0.0000E+000 | Column Parameter −6 |
| Surf | 1 NSC Object | 362 Parameter | 5: Pickup From | 73 Scale | 1.0000E+000 Offset | 0.0000E+000 | Column Parameter −6 |
| Surf | 1 NSC Object | 362 Parameter | 6: Pickup From | 3 Scale | 1.0000E+000 Offset | 0.0000E+000 | Column Parameter −6 |
| Surf | 1 NSC Object | 362 Parameter | 7: Pickup From | 3 Scale | 1.0000E+000 Offset | 0.0000E+000 | Column Parameter −6 |
| Surf | 1 NSC Object | 362 Parameter | 8: Pickup From | 3 Scale | 1.0000E+000 Offset | 0.0000E+000 | Column Parameter −6 |
| Surf | 1 NSC Object | 363 Position | Y: Pickup From | 4 Scale | −1.0000E+000 Offset | 0.0000E+000 | Column Parameter −6 |
| Surf | 1 NSC Object | 365 Position | X: Pickup From | 2 Scale | −8.0000E+000 Offset | 0.0000E+000 | Column Parameter −6 |
| Surf | 1 NSC Object | 365 Parameter | 1: Pickup From | 3 Scale | 1.0000E+000 Offset | 0.0000E+000 | Column Parameter −6 |
| Surf | 1 NSC Object | 365 Parameter | 2: Pickup From | 3 Scale | 1.0000E+000 Offset | 0.0000E+000 | Column Parameter −6 |
| Surf | 1 NSC Object | 365 Parameter | 3: Pickup From | 3 Scale | 1.0000E+000 Offset | 0.0000E+000 | Column Parameter −6 |
| Surf | 1 NSC Object | 365 Parameter | 6: Pickup From | 3 Scale | 1.0000E+000 Offset | 0.0000E+000 | Column Parameter −6 |
| Surf | 1 NSC Object | 365 Parameter | 7: Pickup From | 3 Scale | 1.0000E+000 Offset | 0.0000E+000 | Column Parameter −6 |
| Surf | 1 NSC Object | 365 Parameter | 8: Pickup From | 3 Scale | 1.0000E+000 Offset | 0.0000E+000 | Column Parameter −6 |
| Surf | 1 NSC Object | 366 Position | Y: Pickup From | 4 Scale | 1.0000E+000 Offset | 0.0000E+000 | Column Parameter −6 |
| Surf | 1 NSC Object | 366 Parameter | 1: Pickup From | 3 Scale | 1.0000E+000 Offset | 0.0000E+000 | Column Parameter −6 |
| Surf | 1 NSC Object | 366 Parameter | 2: Pickup From | 3 Scale | 1.0000E+000 Offset | 0.0000E+000 | Column Parameter −6 |
| Surf | 1 NSC Object | 366 Parameter | 3: Pickup From | 3 Scale | 1.0000E+000 Offset | 0.0000E+000 | Column Parameter −6 |
| Surf | 1 NSC Object | 366 Parameter | 5: Pickup From | 83 Scale | 1.0000E+000 Offset | 0.0000E+000 | Column Parameter −6 |
| Surf | 1 NSC Object | 366 Parameter | 6: Pickup From | 3 Scale | 1.0000E+000 Offset | 0.0000E+000 | Column Parameter −6 |
| Surf | 1 NSC Object | 366 Parameter | 7: Pickup From | 3 Scale | 1.0000E+000 Offset | 0.0000E+000 | Column Parameter −6 |
| Surf | 1 NSC Object | 366 Parameter | 8: Pickup From | 3 Scale | 1.0000E+000 Offset | 0.0000E+000 | Column Parameter −6 |
| Surf | 1 NSC Object | 367 Position | Y: Pickup From | 4 Scale | 1.0000E+000 Offset | 0.0000E+000 | Column Parameter −6 |
| Surf | 1 NSC Object | 367 Parameter | 1: Pickup From | 3 Scale | 1.0000E+000 Offset | 0.0000E+000 | Column Parameter −6 |
| Surf | 1 NSC Object | 367 Parameter | 2: Pickup From | 3 Scale | 1.0000E+000 Offset | 0.0000E+000 | Column Parameter −6 |
| Surf | 1 NSC Object | 367 Parameter | 3: Pickup From | 3 Scale | 1.0000E+000 Offset | 0.0000E+000 | Column Parameter −6 |
| Surf | 1 NSC Object | 367 Parameter | 5: Pickup From | 83 Scale | 1.0000E+000 Offset | 0.0000E+000 | Column Parameter −6 |
| Surf | 1 NSC Object | 367 Parameter | 6: Pickup From | 3 Scale | 1.0000E+000 Offset | 0.0000E+000 | Column Parameter −6 |
| Surf | 1 NSC Object | 367 Parameter | 7: Pickup From | 3 Scale | 1.0000E+000 Offset | 0.0000E+000 | Column Parameter −6 |
| Surf | 1 NSC Object | 367 Parameter | 8: Pickup From | 3 Scale | 1.0000E+000 Offset | 0.0000E+000 | Column Parameter −6 |
| Surf | 1 NSC Object | 368 Position | Y: Pickup From | 4 Scale | 1.0000E+000 Offset | 0.0000E+000 | Column Parameter −6 |
| Surf | 1 NSC Object | 369 Position | Y: Pickup From | 4 Scale | 1.0000E+000 Offset | 0.0000E+000 | Column Parameter −6 |
| Surf | 1 NSC Object | 370 Position | Y: Pickup From | 4 Scale | −1.0000E+000 Offset | 0.0000E+000 | Column Parameter −6 |
| Surf | 1 NSC Object | 370 Parameter | 1: Pickup From | 3 Scale | 1.0000E+000 Offset | 0.0000E+000 | Column Parameter −6 |
| Surf | 1 NSC Object | 370 Parameter | 2: Pickup From | 3 Scale | 1.0000E+000 Offset | 0.0000E+000 | Column Parameter −6 |
| Surf | 1 NSC Object | 370 Parameter | 3: Pickup From | 3 Scale | 1.0000E+000 Offset | 0.0000E+000 | Column Parameter −6 |
| Surf | 1 NSC Object | 370 Parameter | 5: Pickup From | 83 Scale | 1.0000E+000 Offset | 0.0000E+000 | Column Parameter −6 |
| Surf | 1 NSC Object | 370 Parameter | 6: Pickup From | 3 Scale | 1.0000E+000 Offset | 0.0000E+000 | Column Parameter −6 |

TABLE 3-continued

ZEMAX Software Output Describing Surface Data Summary and Detail for Each Individual Element within the Illumination Optical System illustrated in FIGS. 13-15

| | | | | | | | |
|---|---|---|---|---|---|---|---|
| Surf | 1 NSC Object | 370 Parameter | 7: Pickup From | 3 Scale | 1.0000E+000 Offset | 0.0000E+000 | Column Parameter −6 |
| Surf | 1 NSC Object | 370 Parameter | 8: Pickup From | 3 Scale | 1.0000E+000 Offset | 0.0000E+000 | Column Parameter −6 |
| Surf | 1 NSC Object | 371 Position | Y: Pickup From | 4 Scale | −1.0000E+000 Offset | 0.0000E+000 | Column Parameter −6 |
| Surf | 1 NSC Object | 371 Parameter | 1: Pickup From | 3 Scale | 1.0000E+000 Offset | 0.0000E+000 | Column Parameter −6 |
| Surf | 1 NSC Object | 371 Parameter | 2: Pickup From | 3 Scale | 1.0000E+000 Offset | 0.0000E+000 | Column Parameter −6 |
| Surf | 1 NSC Object | 371 Parameter | 3: Pickup From | 3 Scale | 1.0000E+000 Offset | 0.0000E+000 | Column Parameter −6 |
| Surf | 1 NSC Object | 371 Parameter | 5: Pickup From | 83 Scale | 1.0000E+000 Offset | 0.0000E+000 | Column Parameter −6 |
| Surf | 1 NSC Object | 371 Parameter | 6: Pickup From | 3 Scale | 1.0000E+000 Offset | 0.0000E+000 | Column Parameter −6 |
| Surf | 1 NSC Object | 371 Parameter | 7: Pickup From | 3 Scale | 1.0000E+000 Offset | 0.0000E+000 | Column Parameter −6 |
| Surf | 1 NSC Object | 371 Parameter | 8: Pickup From | 3 Scale | 1.0000E+000 Offset | 0.0000E+000 | Column Parameter −6 |
| Surf | 1 NSC Object | 372 Position | Y: Pickup From | 4 Scale | −1.0000E+000 Offset | 0.0000E+000 | Column Parameter −6 |
| Surf | 1 NSC Object | 373 Position | Y: Pickup From | 4 Scale | −1.0000E+000 Offset | 0.0000E+000 | Column Parameter −6 |
| Surf | 1 NSC Object | 375 Parameter | 1: Pickup From | 93 Scale | 1.0000E+000 Offset | 0.0000E+000 | Column Parameter −6 |
| Surf | 1 NSC Object | 375 Parameter | 2: Pickup From | 93 Scale | 1.0000E+000 Offset | 0.0000E+000 | Column Parameter −6 |
| Surf | 1 NSC Object | 375 Parameter | 3: Pickup From | 93 Scale | 1.0000E+000 Offset | 0.0000E+000 | Column Parameter −6 |
| Surf | 1 NSC Object | 375 Parameter | 4: Pickup From | 93 Scale | 1.0000E+000 Offset | 0.0000E+000 | Column Parameter −6 |
| Surf | 1 NSC Object | 375 Parameter | 5: Pickup From | 93 Scale | 1.0000E+000 Offset | 0.0000E+000 | Column Parameter −6 |
| Surf | 1 NSC Object | 375 Parameter | 6: Pickup From | 93 Scale | 1.0000E+000 Offset | 0.0000E+000 | Column Parameter −6 |
| Surf | 1 NSC Object | 375 Parameter | 7: Pickup From | 93 Scale | 1.0000E+000 Offset | 0.0000E+000 | Column Parameter −6 |
| Surf | 1 NSC Object | 375 Parameter | 8: Pickup From | 93 Scale | 1.0000E+000 Offset | 0.0000E+000 | Column Parameter −6 |
| Surf | 1 NSC Object | 375 Parameter | 9: Pickup From | 93 Scale | 1.0000E+000 Offset | 0.0000E+000 | Column Parameter −6 |
| Surf | 1 NSC Object | 377 Parameter | 2: Pickup From | 377 Scale | 1.0000E+000 Offset | 0.0000E+000 | Column Parameter 1 |
| Surf | 1 NSC Object | 377 Parameter | 4: Pickup From | 377 Scale | 1.0000E+000 Offset | 0.0000E+000 | Column Parameter 1 |
| Surf | 1 NSC Object | 377 Parameter | 5: Pickup From | 377 Scale | 1.0000E+000 Offset | 0.0000E+000 | Column Parameter 1 |
| Surf | 1 NSC Object | 378 Position | Y: Pickup From | 377 Scale | −1.0000E+000 Offset | 0.0000E+000 | Column Parameter −6 |
| Surf | 1 NSC Object | 378 Position | Z: Pickup From | 377 Scale | 1.0000E+000 Offset | 0.0000E+000 | Column Parameter −6 |
| Surf | 1 NSC Object | 378 Tilt About | X: Pickup From | 377 Scale | −1.0000E+000 Offset | 0.0000E+000 | Column Parameter −6 |
| Surf | 1 NSC Object | 378 Parameter | 1: Pickup From | 377 Scale | 1.0000E+000 Offset | 0.0000E+000 | Column Parameter −6 |
| Surf | 1 NSC Object | 378 Parameter | 2: Pickup From | 377 Scale | 1.0000E+000 Offset | 0.0000E+000 | Column Parameter −6 |
| Surf | 1 NSC Object | 378 Parameter | 3: Pickup From | 377 Scale | 1.0000E+000 Offset | 0.0000E+000 | Column Parameter −6 |
| Surf | 1 NSC Object | 378 Parameter | 4: Pickup From | 377 Scale | 1.0000E+000 Offset | 0.0000E+000 | Column Parameter −6 |
| Surf | 1 NSC Object | 378 Parameter | 5: Pickup From | 377 Scale | 1.0000E+000 Offset | 0.0000E+000 | Column Parameter −6 |
| Semi Diameter 2: Fixed | | | | | | | |

Figure 17:
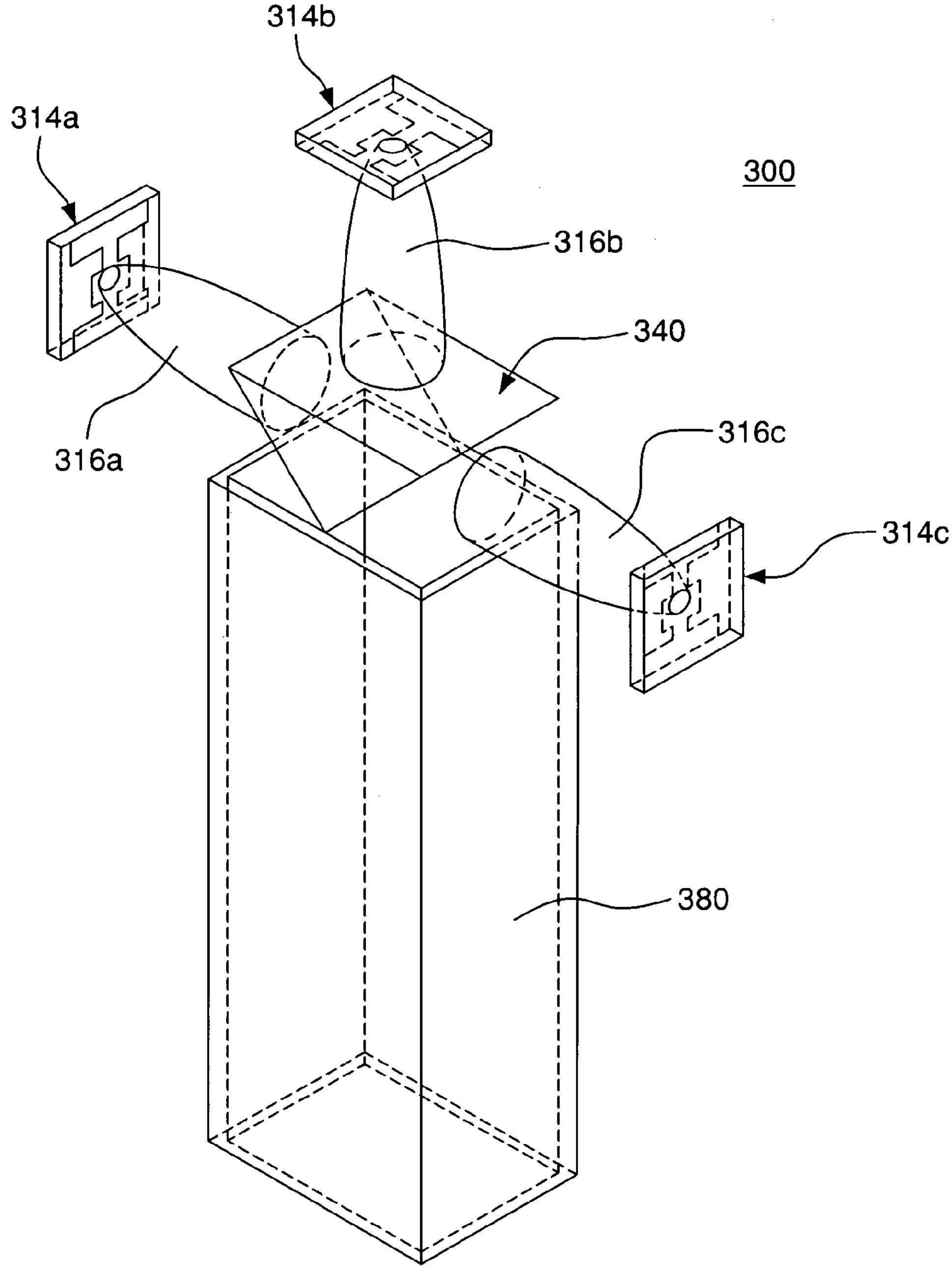
FIG. 17 is an isometric view illustrating a portion of another digital light projection system including a prismatic 3-channel LED array configuration, in accordance with a preferred embodiment of the present invention.
Figure 18:
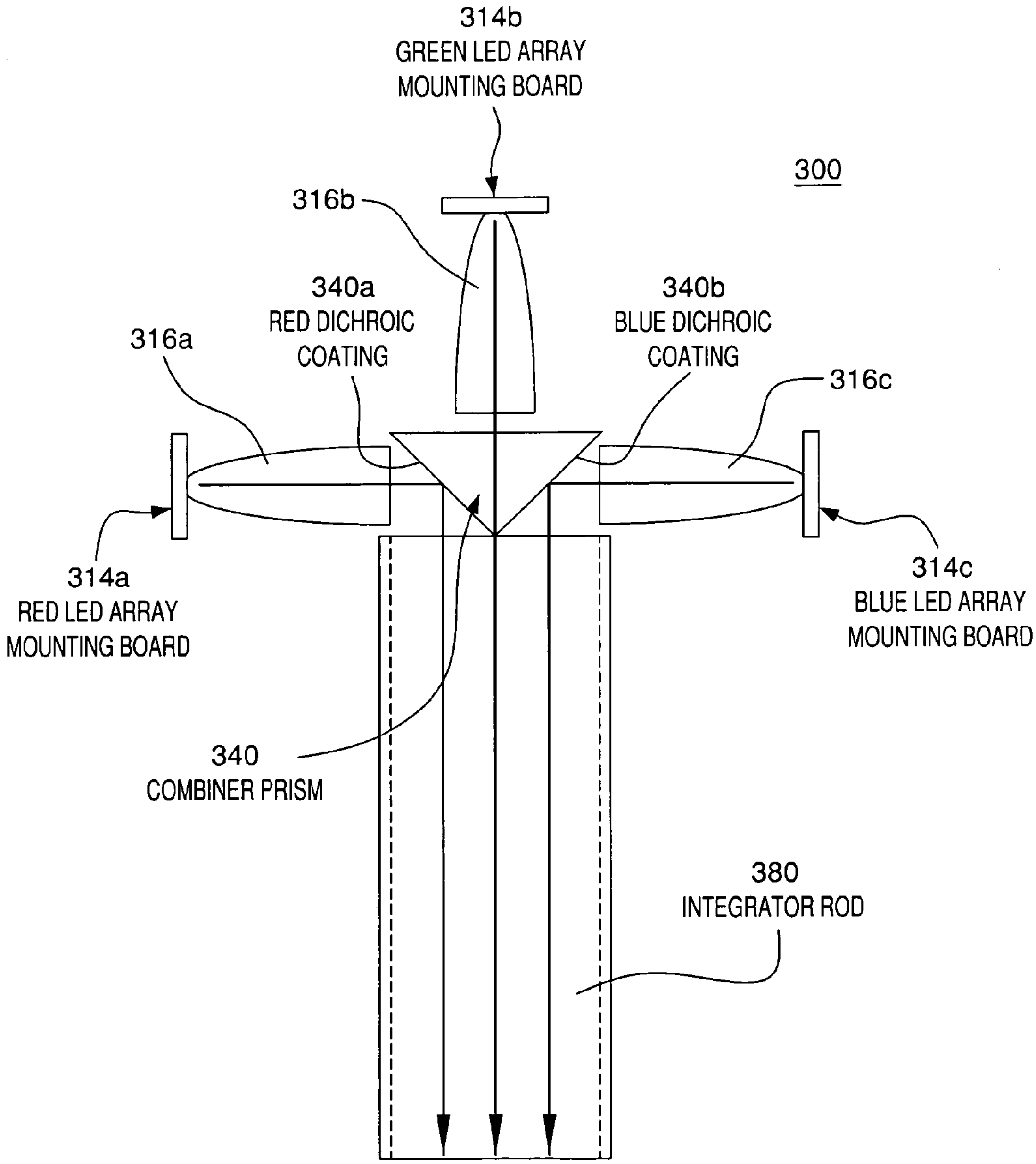
FIG. 18 is a side view of the portion of the digital light projection system shown in FIG. 17.

FIG. 17 is an isometric view illustrating a portion 300 of another digital light projection system including a prismatic 3-channel LED array configuration, in accordance with a preferred embodiment of the present invention. FIG. 18 is a side view of the portion 300 of the digital light projection system shown in FIG. 17. Combiner element 340 is a prism having dichroic coatings 340*a*,340*b* thereon. LED array mounting board 314*a-c* correspond with concentrator elements 316*a-c*, respectively. Functioning of the dichroic plates in this embodiment are similar to that of the dichroic plates in the FIG. 13 embodiment above.

As shown in FIGS. 17 and 18, the combiner element is in the form of a prism wherein the first dichroic element/coating 340*a* spatially combines the substantially uniform light provided at the output surface of each of a first and a second of the concentrator elements (i.e. 316*a*,316*b*), and wherein the second dichroic element/coating 340*b* spatially combines the substantially uniform light provided at the output surface of each of the second and a third of the concentrator elements (i.e. 316*b*,316*c*). The first dichroic element 340*a* reflects the substantially uniform light provided at the output surface of the first concentrator element 316*a*, and wherein the first dichroic element 340*a* transmits the substantially uniform light provided at the output surface of the second concentrator element 316*b*. The second dichroic element 340*b* reflects the substantially uniform light provided at the output surface of the third concentrator element 316*c*, and wherein the second dichroic element 340*b* transmits the substantially uniform light provided at the output surface of the second concentrator element 316*b*.

The first concentrator element 316*a* and the third concentrator element 316*c* are oriented in substantially opposite directions from each other such that the output surfaces of the first concentrator element and the third concentrator element are optically aligned with opposite sides of the combiner element, wherein the output surface of the second concentrator element 316*b* is optically aligned with an intermediary side of the combiner element 340, and wherein the intermediary side of the combiner element joins the opposite sides of the combiner element.

The plurality of LED arrays preferably consists of 3 LED arrays, wherein the 3 LED arrays consist of 3 single-color LED arrays, and wherein each of the 3 single-color LED arrays is of a different color from one another. The 3 single-color LED arrays more preferably consist of an LED array consisting of only red LEDs, an LED array consisting of only green LEDs, and an LED array consisting of only blue LEDs.

Figure 19:
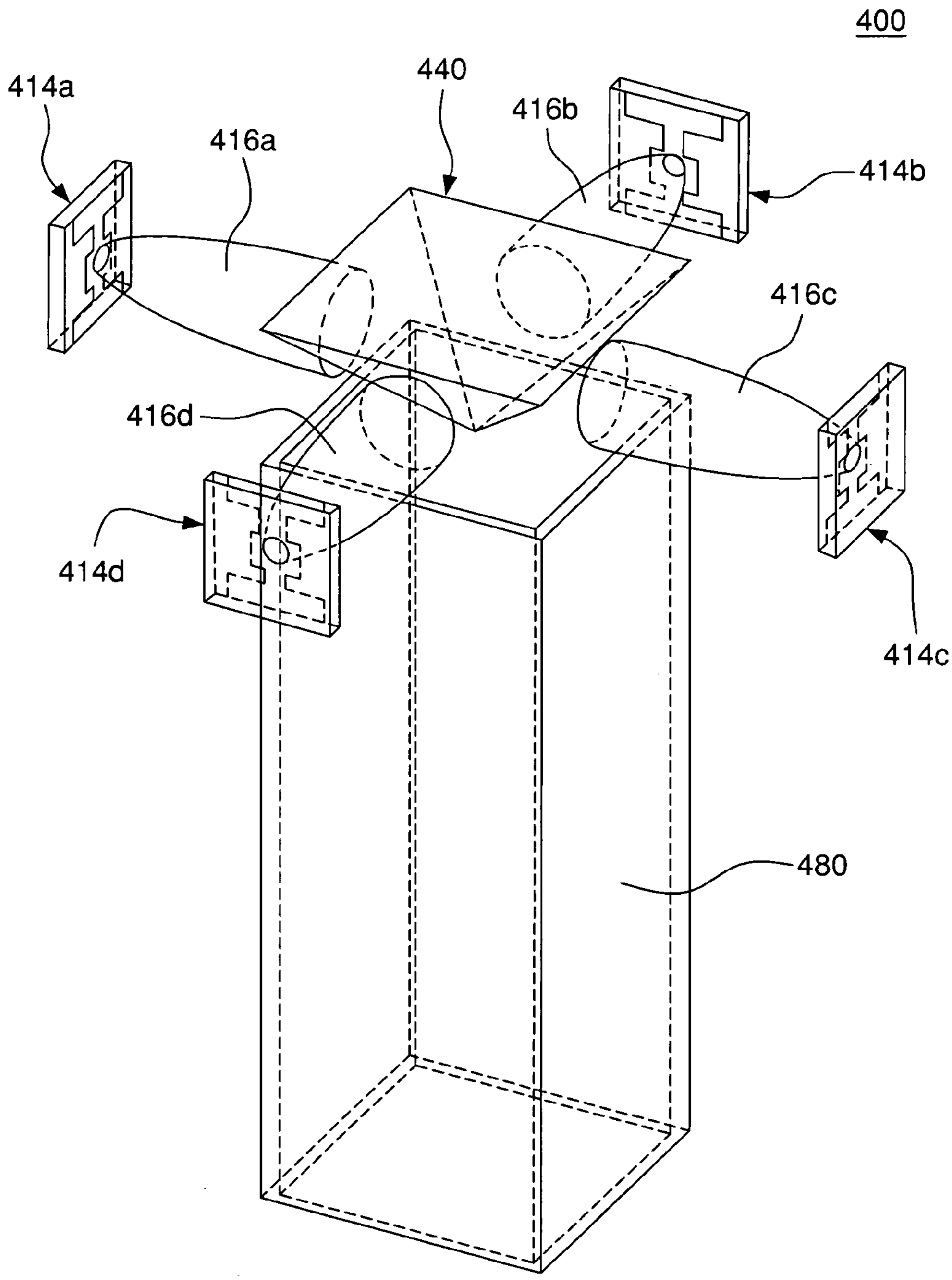
FIG. 19 is an isometric view illustrating a portion of another digital light projection system including a pyramidal 4-channel LED array configuration, in accordance with a preferred embodiment of the present invention.
Figure 20:
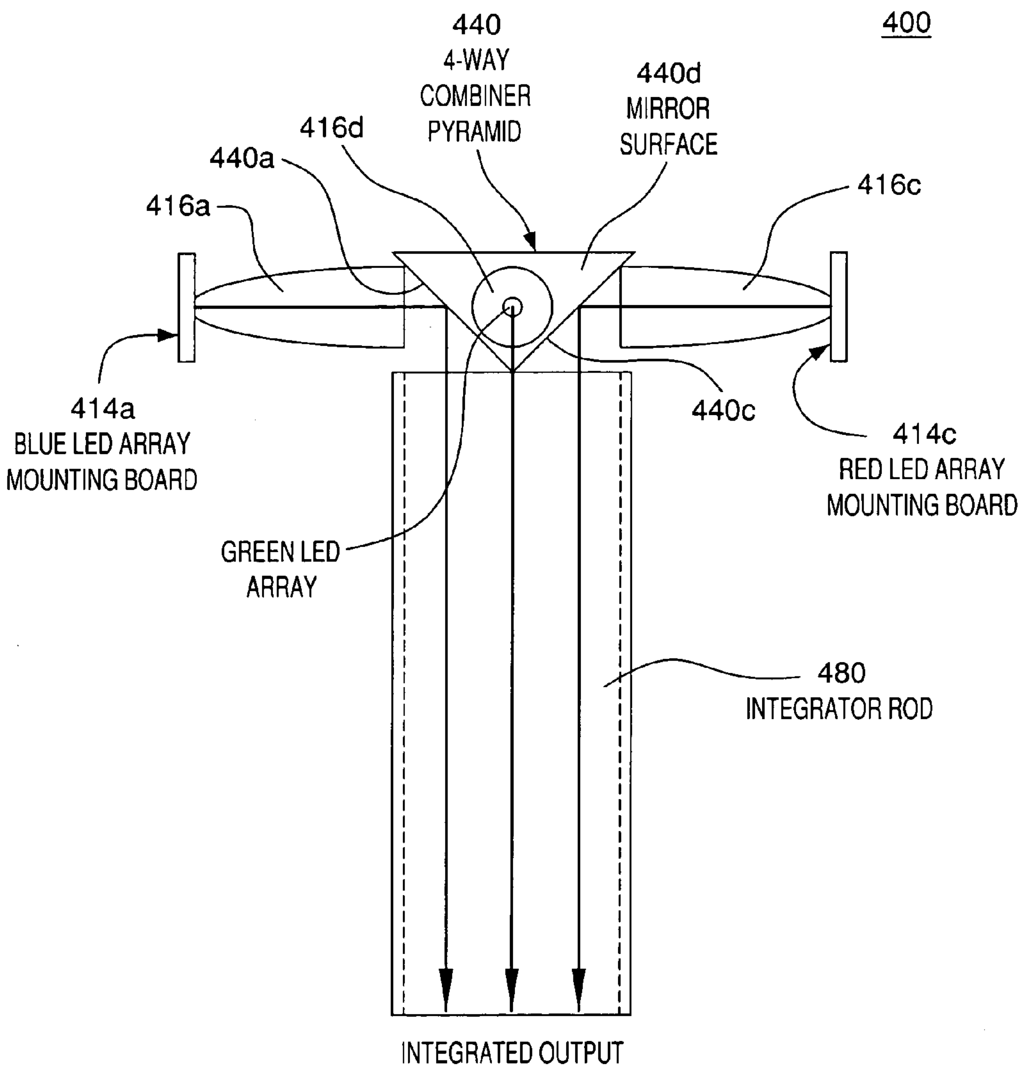
FIG. 20 is a side view of the portion of the digital light projection system shown in FIG. 19.

FIG. 19 is an isometric view illustrating a portion 400 of another digital light projection system including a pyramidal 4-channel LED array configuration, in accordance with a preferred embodiment of the present invention. FIG. 20 is a side view of the portion 400 of the digital light projection system shown in FIG. 19. In this embodiment, light output from the concentrator elements 416*a-d* is specularly reflected by four sides of the combiner element 440 via mirror surfaces (three of which are labeled in FIG. 20 as 440*a,c,d*). Although this embodiment is described using four combiner element sides/channels, any number of combiner element sides/channels may be contemplated.

Figure 21:
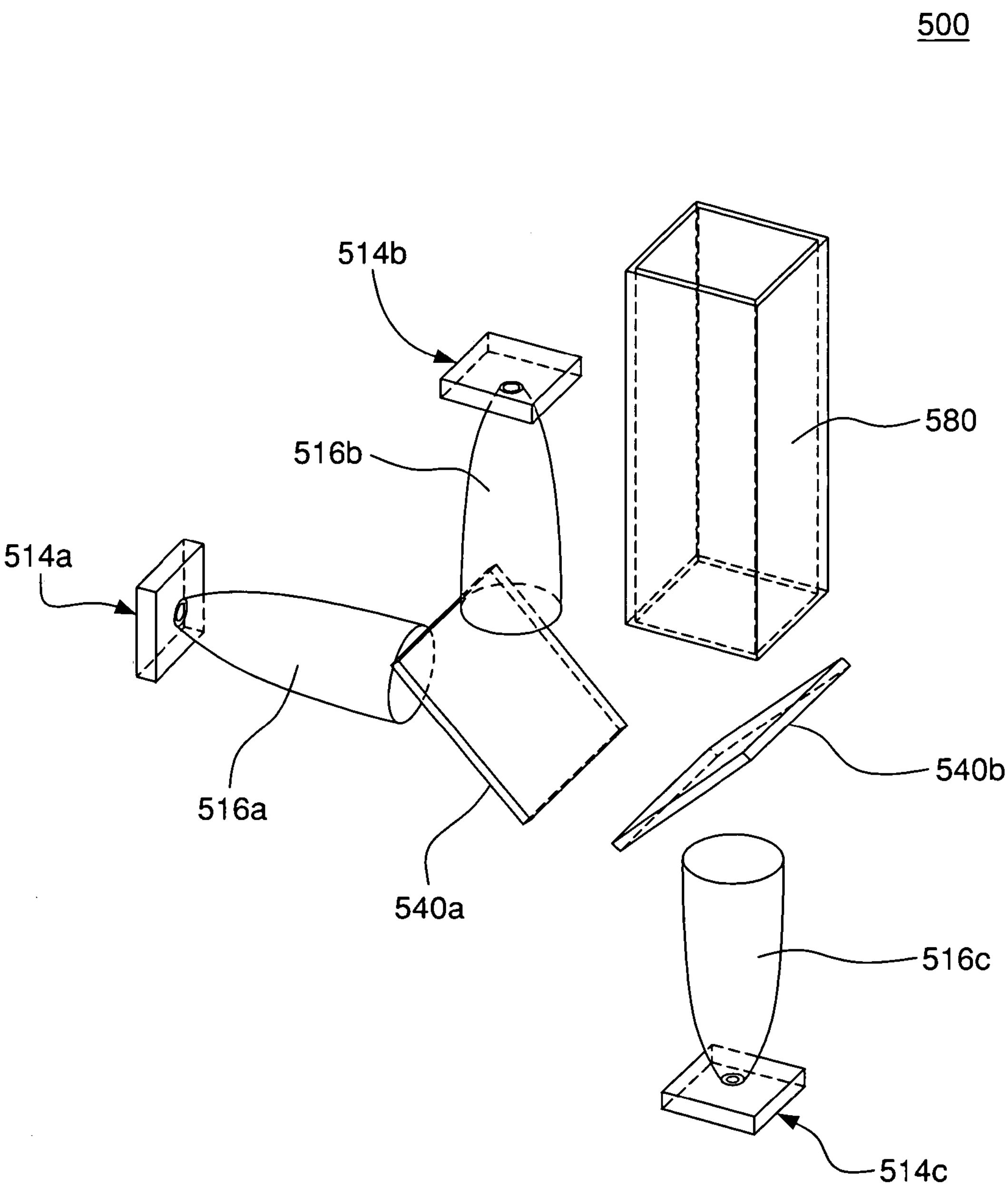
FIG. 21 is an isometric view illustrating a portion of another digital light projection system including a 3-channel LED array configuration, in accordance with a preferred embodiment of the present invention.
Figure 22:
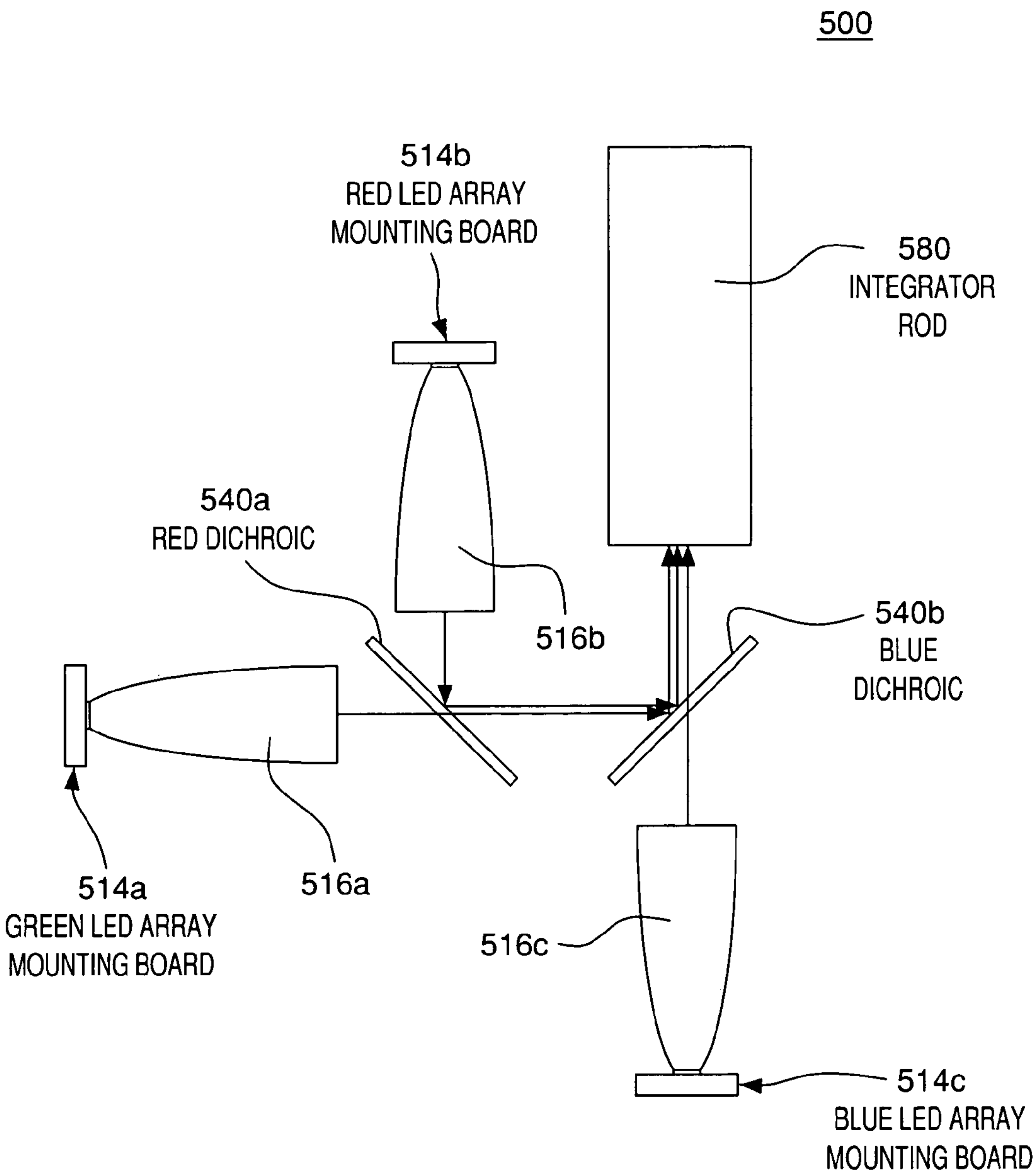
FIG. 22 is a side view of the portion of the digital light projection system shown in FIG. 21.

FIG. 21 is an isometric view illustrating a portion 500 of another digital light projection system including a 3-channel LED array configuration, in accordance with a preferred embodiment of the present invention. FIG. 22 is a side view of the portion 500 of the digital light projection system shown in FIG. 21. A first dichroic element 540*a* combines light from concentrator elements 516*a*,516*b*, while a second dichroic element 540*b* combines light output from the first dichroic element 540*a* and concentrator element 516*c*.

Figure 23:
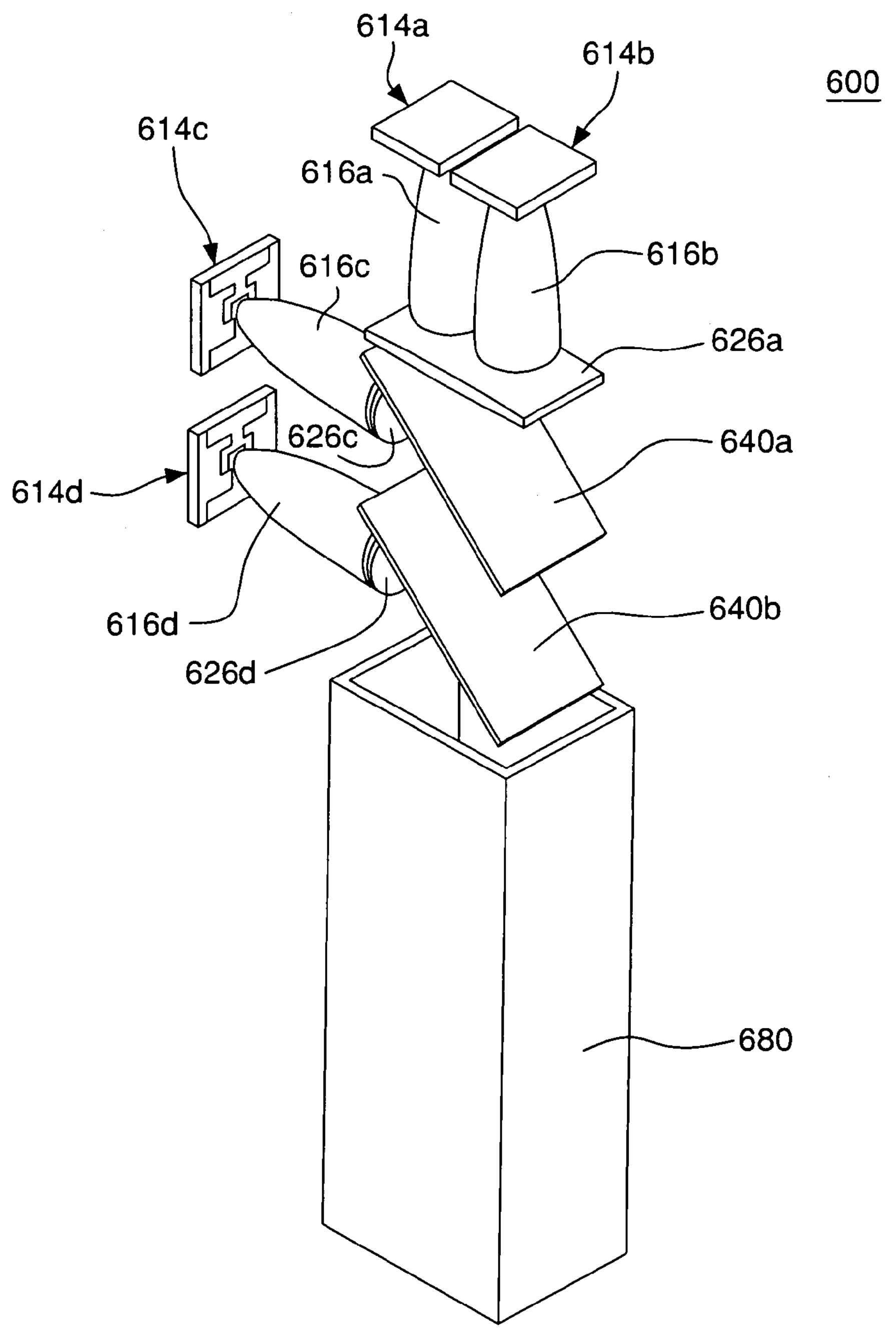
FIG. 23 is an isometric view illustrating a portion of another digital light projection system including a 4-channel LED array configuration, in accordance with a preferred embodiment of the present invention.
Figure 24:
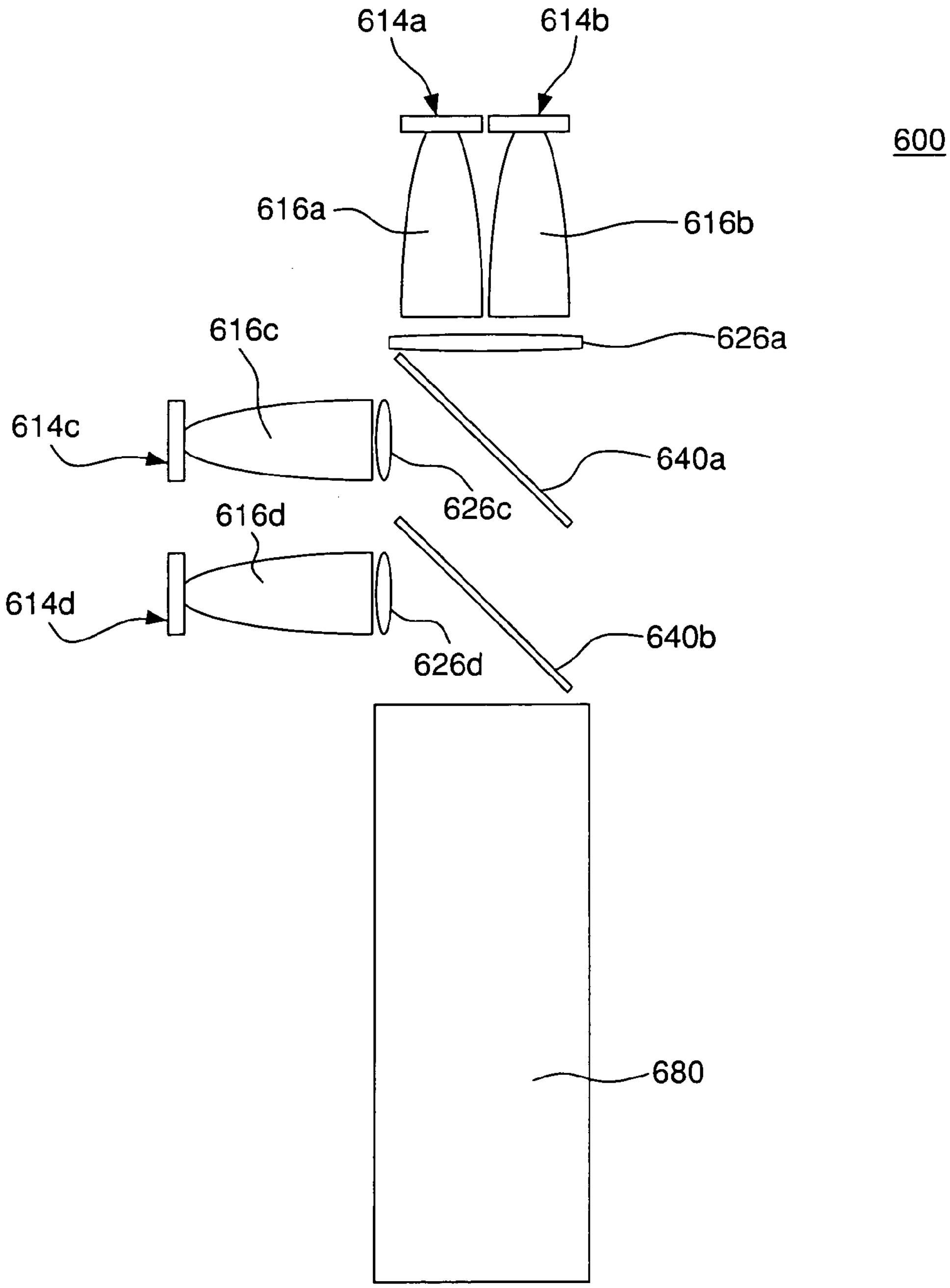
FIG. 24 is a side view of the portion of the digital light projection system shown in FIG. 23.

FIG. 23 is an isometric view illustrating a portion 600 of another digital light projection system including a 4-channel LED array configuration, in accordance with a preferred embodiment of the present invention. FIG. 24 is a side view of the portion 600 of the digital light projection system shown in FIG. 23. A first dichroic element 640*a* combines light from adjacent concentrator elements 616*a*,616*b* and concentrator element 616*c*, while a second dichroic element 640*b* combines light output from the first dichroic element 640*a* and concentrator element 616*d*.

Figure 25:
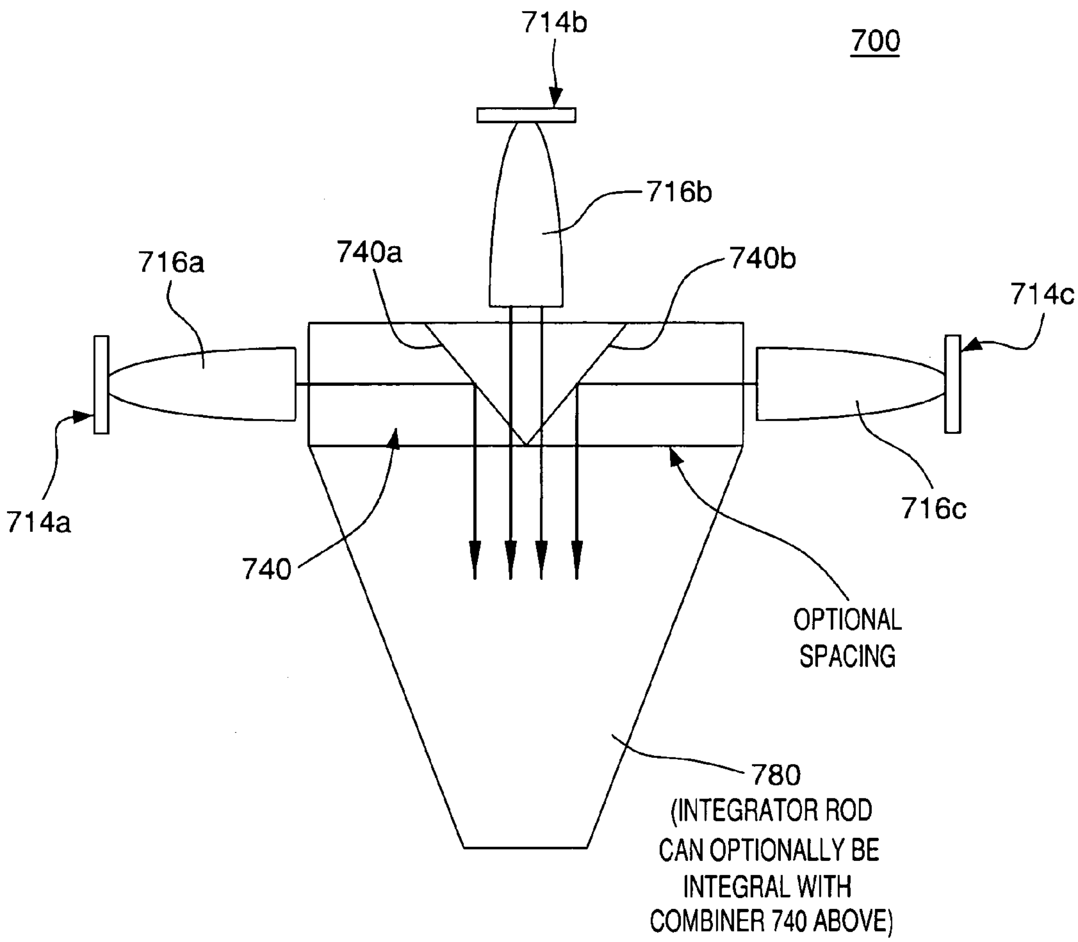
FIG. 25 is a side view illustrating a portion of another digital light projection system including a 3-channel LED array configuration, in accordance with a preferred embodiment of the present invention.

FIG. 25 is a side view illustrating a portion 700 of another digital light projection system including a 3-channel LED array configuration, in accordance with a preferred embodiment of the present invention. The combiner element 740 is in solid form and includes dichroic coatings 740*a*,740*b*. Integrator element 780 may be formed integrally with the combiner element 740, or formed separately. If formed separately, the integrator element 780 may be spaced from the combiner element 740, with at least one optional imaging lens therebetween.

Figure 26:
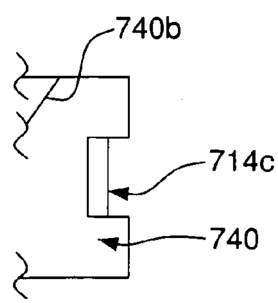
FIG. 26 is a partial side view of the portion of the digital light projection system shown in FIG. 25 with the LED array mounting board **714*c* embedded directly within the optical combiner element 740, i.e. without utilizing optical concentrator element 716*c***.

FIG. 26 is a partial side view of the portion 700 of the digital light projection system shown in FIG. 25 with the LED array mounting board 714*c* embedded directly within the combiner element 740, i.e. without utilizing optical concentrator element 716*c*.

Figure 27:
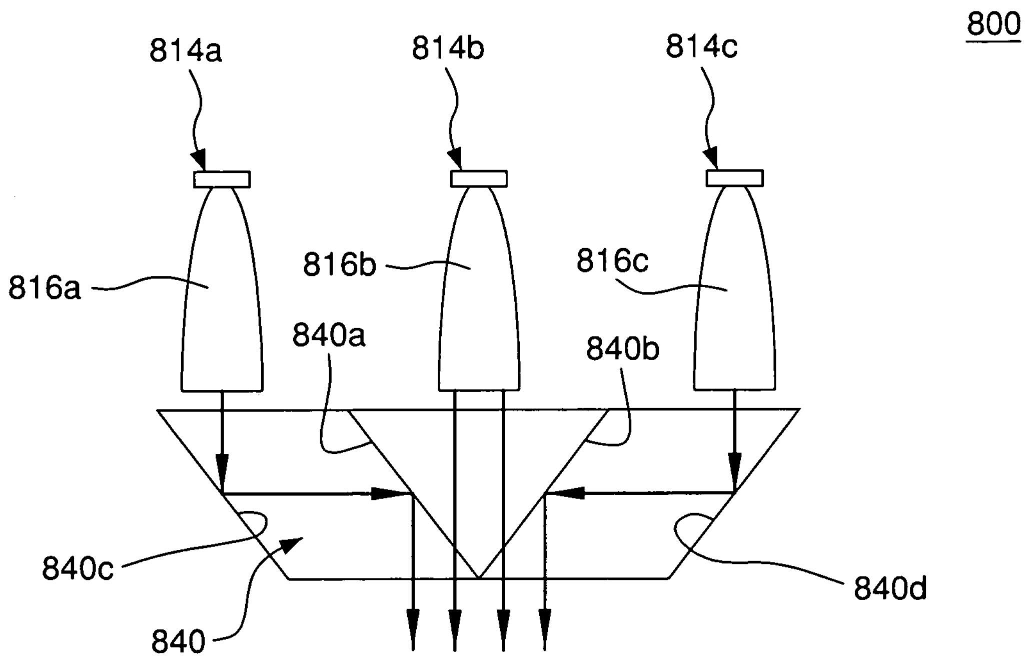
FIG. 27 is a side view illustrating a portion of another digital light projection system including a linear 3-channel LED array configuration, in accordance with a preferred embodiment of the present invention.

In another embodiment, the output surfaces of the first, second, third, and fourth concentrator elements may be optically aligned with a common side of the combiner element, wherein the combiner element further comprises a first reflector and a second reflector, wherein the first reflector is provided in the optical path between the output surface of the first concentrator element and the first dichroic element, and wherein the second reflector is provided in the optical path between the output surface of the fourth concentrator element and the second dichroic element. FIG. 27 illustrates a similar configuration wherein a single concentrator element 816*b* replaces the second and third concentrator elements.

FIG. 27 is a side view illustrating a portion 800 of another digital light projection system including a linear 3-channel LED array configuration, in accordance with a preferred embodiment of the present invention. The output surfaces of the first, second, and third concentrator elements 816*a-c* are optically aligned with a common side of the combiner element 840, wherein the combiner element comprises a first reflector 840*c* and a second reflector 840*d*, wherein the first reflector 840*c* is provided in the optical path between the output surface of the first concentrator element 816*a* and the first dichroic element 840*a*, and wherein the second reflector 840*d* is provided in the optical path between the output surface of the third concentrator element 816*c* and the second dichroic element 840*b*.

The field lens(es) at the output of the concentrator elements in the above embodiments may be provided to focus the output of the concentrators into the input of the integrator element. And, the imaging lens(es) at the input of the integrator element spreads and combines the light for entry into the integrator element. The integrator element preferably transforms a circular input light beam into a homogenized rectangular output beam which preferably slightly overfills the geometry of the imaging device.

An anti-reflective coating is preferably also utilized in conjunction with the dichroic coatings in any of the above embodiments.

The contemplated modifications and variations specifically mentioned above are considered to be within the spirit and scope of the present invention.

Those of ordinary skill in the art will recognize that various modifications and variations may be made to the embodiments described above without departing from the spirit and scope of the present invention. For example, other colored LEDs may be employed for the LED arrays 150 instead of the red, green, or blue LEDs mentioned in the above embodiment. As another example, although FIGS. 1-7, 13-15, 17-25, and 27 utilize concentrator elements 16, 216*a-d*, 316*a-c*, 416*a-d*, 516*a-c*, 616*a-d*, 716*a-c*, 816*a-c*, it may be envisioned to position a select number or all the LED arrays and/or LED array mounting boards (i.e. within any one of the embodiments above) near, adjacent to, or within any one of the various combiner elements thereby eliminating utilization of the concentrator element(s). FIG. 26 illustrates such a scenario wherein LED array mounting board 714*c* is positioned directly within combiner element 740. Even with the absence of the concentrator elements, optional field lenses may still be utilized between the LED arrays/LED array mounting boards, and the combiner element. As a further example, although some embodiments described above include utilization of separate dichroic plates, solid combiner elements (e.g. solid prism, pyramidal, or trapezoidal elements having dichroic coatings thereon and/or therein) may alternatively be employed to provide a similar or same function. Of course, the reverse may also be contemplated. The solid combiner elements may be comprised of glass, plastic, or polymer. Furthermore, although the preferred embodiments are described having certain color channels in certain locations (i.e. following certain paths), these color channel locations/paths may of course be modified as necessary by design. Further, in any of the embodiments above the integrator may be solid or hollow and may provide internal specular reflection or total internal reflection. The integrator may also be tapered in any of the embodiments. It is therefore to be understood that the present invention is not limited to the particular embodiments disclosed above, but it is intended to cover such modifications and variations as defined by the following claims.

What is claimed is:

1. An optical system for a digital light projection system, the optical system comprising:

a plurality of LED arrays, wherein each LED array comprises a plurality of LEDs;

an optical concentrator element positioned substantially adjacent to each of the LED arrays, wherein each concentrator element reflects light emitted from the plurality of LEDs within the corresponding LED array so as to provide substantially uniform light at an output surface of each concentrator element; and an optical combiner element, wherein the output surface of each concentrator element is optically aligned with a corresponding side of the combiner element, and wherein the combiner element chromatically combines the substantially uniform light provided at the output surface of each concentrator element so as to form color-combined light at an output surface of the combiner element;

wherein the combiner element comprises a first diachronic element and a second dethrone element, wherein the first dichroic element and the second dichroic element are positioned substantially adjacent to each other and are angled with respect to each other so as to form a substantially V-shaped pattern, wherein each of the first diachronic element and the second diachronic element spatially combines the substantially uniform tight provided at the output surface of at most two of the concentrator elements, and wherein the substantially uniform light provided at the output surface of at most two of the concentrator elements that is spatially combined originates from only the at most two of the concentrator elements.

2. The optical system of claim 1, wherein the first dichroic element spatially combines the substantially uniform light provided at the output surface of each of a first and a second of the concentrator elements, and wherein the second dichroic element spatially combines the substantially uniform light provided at the output surface of each of the second and a third of the concentrator elements.

3. The optical system of claim 2, wherein the first dichroic element reflects the substantially uniform light provided at the output surface of the first concentrator element and wherein the first dichroic element transmits the substantially uniform light provided at the output surface of the second concentrator element.

4. The optical system of claim 3, wherein the second diachronic element reflects the substantially uniform light provided at the output surface of the third concentrator element, and wherein the second diabolic element transmits the substantially uniform light provided at the output surface of the second concentrator element.

5. The optical system of claim 2, wherein the first concentrator element and the third concentrator element are oriented in substantially opposite directions from each other such that the output surfaces of the first concentrator element and the third concentrator element are optically aligned with opposite sides of the combiner element, wherein the output surface of the second concentrator element is optically aligned with an intermediary side of the combiner element, and wherein the intermediary side of the combiner element joins the opposite sides of the combiner element.

6. The optical system of claim 2, wherein the output surfaces of the first, second, and third concentrator elements are optically aligned with a common side of the combiner element, wherein the combiner element further comprises a first reflector and a second reflector, wherein the first reflector is provided in the optical path between the output surface of the first concentrator element and the first dichroic element, and wherein the second reflector is provided in the optical path between the output surface of the third concentrator element and the second dichroic element.

7. The optical system of claim 2, wherein the plurality of LED arrays consists of 3 LED arrays, wherein the 3 LED arrays consist of 3 single-color LED arrays, and wherein each of the 3 single-color LED arrays is of a different color from one another.

8. The optical system of claim 7, wherein the 3 single-color LED arrays consist of an LED array consisting of only red LEDs, an LED array consisting of only green LEDs, and an LED array consisting of only blue LEDs.

9. An optical system for a digital light projection system, the optical system comprising:

a plurality of LED arrays. wherein each LED array comprises a plurality of LEDs;

an optical concentrator element positioned substantially adjacent to each of the LED arrays, wherein each concentrator element reflects light emitted from the plurality of LEDs within the corresponding LED array so as to provide substantially uniform light at an output surface of each concentrator element; and an optical combiner element, wherein the output surface of each concentrator element is optically aligned with a corresponding side of the combiner element, and wherein the combiner element chromatically combines the substantially uniform light provided at the output surface of each concentrator element so as to form color-combined light at an output surface of the combiner element;

wherein the combiner element comprises a first dichroic element and a second dichroic element, wherein the first dichroic clement and the second picric element are positioned substantially adjacent to each other and are angled with respect to each other so as to form a substantially V-shaped pattern, and wherein each of the first dichroic element and the second dichroic element spatially combines the substantially uniform light provided at the output surface of at most two of the concentrator elements; and wherein the first dichroic element spatially combines the substantially uniform light provided at the output surface of each of a first and a second of the concentrator elements, wherein the second dichroic element spatially combines the substantially uniform light provided at the output surface of each of a third and a fourth of the concentrator elements, and wherein the second concentrator element and the third concentrator element are positioned substantially adjacent to each other such that the output surfaces of the second concentrator element and third concentrator element are optically aligned with a common side of the combiner element.

10. The optical system of claim 9, wherein the first dichroic element reflects the substantially uniform light provided at the output surface of the first concentrator element, and wherein the first dichroic element transmits the substantially uniform light provided at the output surface of the second concentrator element.

11. The optical system of claim 10, wherein the second dichroic element reflects the substantially uniform light provided at the output surface of the fourth concentrator element, and wherein the second dichroic element transmits the substantially uniform light provided at the output surface of the third concentrator element.

12. The optical system of claim 9, wherein the first concentrator element and the fourth concentrator element are oriented in substantially opposite directions from each other such that the output surfaces of the first concentrator element and the fourth concentrator element are optically aligned with opposite sides of the combiner element, and wherein the common side of the combiner element joins the opposite sides of the combiner element.

13. The optical system of claim 9, wherein the output surfaces of the first, second, third, and fourth concentrator elements are optically aligned with the common side of the combiner element, wherein the combiner element further comprises a first reflector and a second reflector, wherein the first reflector is provided in the optical path between the output surface of the first concentrator element and the first dichroic element, and wherein the second reflector is provided in the optical path between the output surface of the fourth concentrator element and the second dichroic element.

14. The optical system of claim 9, wherein the plurality of LED arrays consists of 4 LED arrays, wherein the 4 LED arrays consist of 4 single-color LED arrays, arid wherein 3 of the 4 single-color LED arrays is oh different color from one another.

15. The optical system of claim 14, wherein the 4 single-color LED arrays consist of an LED array consisting of only red LEDs, an LED array consisting of only green LEDs, an LED array consisting of only blue LEDs, and an LED array consisting of only either red, green, or blue LEDs.

16. The optical system of claim 9, wherein the substantially uniform light at the output surface of the second and third concentrator elements is substantially the same color.

17. The optical system of claim 9, wherein the substantially uniform light at the output surface of the second and third concentrator elements is green.

18. The optical system of claim 9 further comprising a common field lens provided between the output surfaces of the second and third concentrator elements, and the common side of the combiner element.

19. The optical system of claim 9 further comprising a digital imaging device, wherein the imaging device has an aspect ratio other than 1:1, and wherein the substantially uniform light provided at the output surfaces of the second and third concentrator elements are directed towards different portions of the imaging device so as to substantially fill the etendue of the imaging device.

20. The optical system of claim 1 further comprising a field lens provided between the output surface of each concentrator element and the corresponding side of the combiner element,

21. The optical system of claim 1, wherein at least one of the first dichroic element and the second dichroic element is a dichroic plate.

22. The optical system of claim 1, wherein the first dichroic element and the second dichroic element are defined by dichroic coatings on two adjacent facets of a prism.

23. The optical system of claim 1, wherein the reflection of light performed by the concentrator elements is total internal reflection.

24. The optical system of claim 1, wherein the reflection of light performed by the concentrator elements is specular reflection.

25. The optical system of claim 1 further comprising an integrator element, wherein the output surface of the combiner element is optically aligned with an input surface of the integrator element and wherein the integrator element spatially homogenizes the color-combined light provided at the output surface of the combiner element so as to form color-combined light which is substantially homogenized at an output surface of the integrator element.

26. The optical system of claim 25 further comprising at least one field lens provided between the output surface of the combiner element and the input surface of the integrator element.

27. The optical system of claim 1, wherein the concentrator elements have a conic shape.

28. The optical system of claim 1, wherein the concentrator elements have a complex conic shape.

29. The optical system of claim 1, wherein the concentrator elements have a substantially parabolic cross section.

30. The optical system of claim 1, wherein the concentrator elements comprise a material selected from the group consisting of a polymer, plastic, glass, metal, and combinations thereof.

31. The optical system of claim 1, wherein the concentrator elements comprise Zeonex®.

32. The optical system of claim 1, wherein the concentrator elements comprise metal.

33. The optical system of claim 1, wherein the optical system is an illumination optical system.

34. The optical system of claim 1 further comprising a digital imaging device.

35. The optical system of claim 34, wherein the output surface of each concentrator element is imaged directly on the digital imaging device.

36. The optical system of claim 34, wherein the imaging device has an aspect ratio other than 1:1.

37. The optical system of claim 34, wherein the imaging device has an aspect ratio of 16:9.

* * * * *